(12) United States Patent
Fukuoka et al.

(10) Patent No.: US 9,726,948 B2
(45) Date of Patent: Aug. 8, 2017

(54) IMAGE DISPLAY DEVICE

(71) Applicant: Sharp Kabushiki Kaisha, Osaka-shi, Osaka (JP)

(72) Inventors: Kenta Fukuoka, Osaka (JP); Tomoyuki Ishihara, Osaka (JP); Yasunori Ake, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 111 days.

(21) Appl. No.: 14/898,765

(22) PCT Filed: Aug. 5, 2014

(86) PCT No.: PCT/JP2014/070581
§ 371 (c)(1),
(2) Date: Dec. 16, 2015

(87) PCT Pub. No.: WO2015/020032
PCT Pub. Date: Feb. 12, 2015

(65) Prior Publication Data
US 2016/0154269 A1 Jun. 2, 2016

(30) Foreign Application Priority Data
Aug. 5, 2013 (JP) ................................ 2013-162267

(51) Int. Cl.
*G02F 1/13* (2006.01)
*G02F 1/1347* (2006.01)
(Continued)

(52) U.S. Cl.
CPC ...... *G02F 1/13471* (2013.01); *G02F 1/13306* (2013.01); *G02F 1/133536* (2013.01);
(Continued)

(58) Field of Classification Search
CPC ........... G02F 1/133536; G02F 1/13362; G02F 1/133528; G02F 1/133555; G02F 1/13471;
(Continued)

(56) References Cited

U.S. PATENT DOCUMENTS

2004/0082367 A1 4/2004 Nakanishi et al.
2010/0177025 A1 7/2010 Nagata et al.

FOREIGN PATENT DOCUMENTS

JP 2002-182201 A 6/2002
JP 2002-374339 A 12/2002
(Continued)

OTHER PUBLICATIONS

Official Communication issued in International Patent Application No. PCT/JP2014/070581, mailed on Oct. 21, 2014.

*Primary Examiner* — Sanjiv D Patel
(74) *Attorney, Agent, or Firm* — Keating & Bennett, LLP

(57) ABSTRACT

There is provided an image display device that includes a display in which a background is transparently seen from a front surface side, and has a high degree of freedom at the time of installation. A liquid crystal panel (32) for adjusting transparency/light-emission adjusts, for each pixel, a ratio between transmitted light-source light and ambient light by respectively controlling a polarization direction of a reflected polarization component of the light-source light irradiated to a reflection-type polarization plate (20) from a light guide plate (180) and a polarization direction of a transmitted polarization component of the ambient light incident to the reflection-type polarization plate (20) from a rear surface side of the display, based on transparent/light-emitting pixel information. Accordingly, when the image display device is viewed from the front surface side of the display, an image is seen for each pixel, a background is transparently seen, or the background is seen so as to be
(Continued)

superimposed on the image. Since it is not necessary to attach the image display device to a case filled with light, the image display device is widely used without limitation of use.

20 Claims, 65 Drawing Sheets

(51) Int. Cl.
  *G02F 1/133*      (2006.01)
  *G09G 3/36*       (2006.01)
  *G02F 1/1335*     (2006.01)
(52) U.S. Cl.
  CPC ......... *G09G 3/36* (2013.01); *G02F 1/133615* (2013.01); *G02F 2001/133567* (2013.01)
(58) Field of Classification Search
  CPC .............. G02F 2203/09; G02F 1/1335; G09G 2360/144; G09G 3/3406; G09G 2360/16; G09G 2320/0233; G09G 2320/062; G09G 2320/0626; G09G 2320/066; G09G 2320/068; G09G 3/36
  See application file for complete search history.

(56) References Cited

FOREIGN PATENT DOCUMENTS

| | | |
|---|---|---|
| JP | 2010-091609 A | 4/2010 |
| WO | 2009/122716 A1 | 10/2009 |

FIG. 16
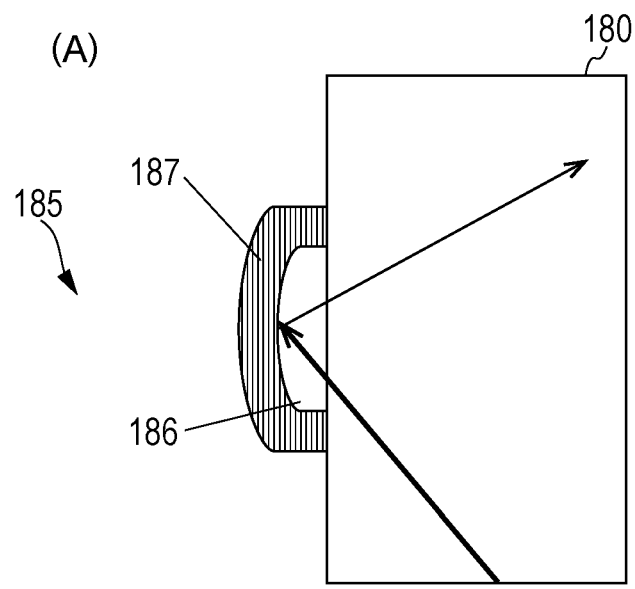
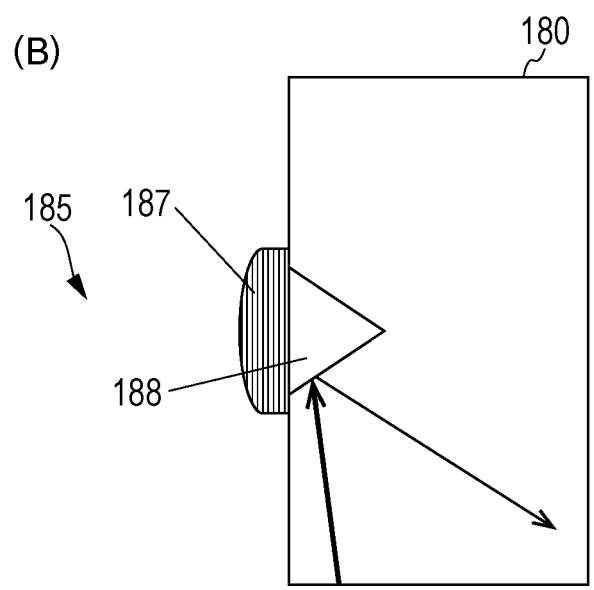

FIG. 18
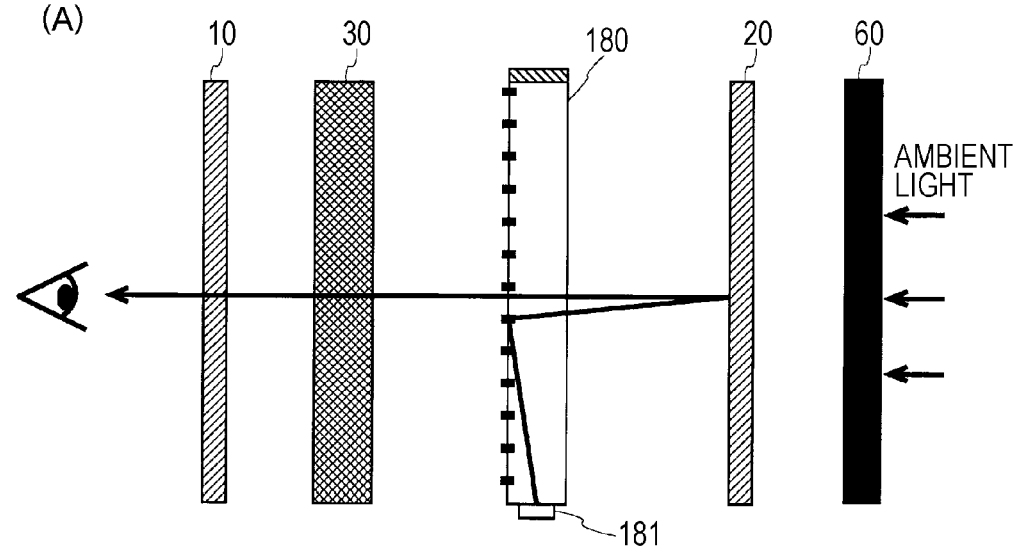
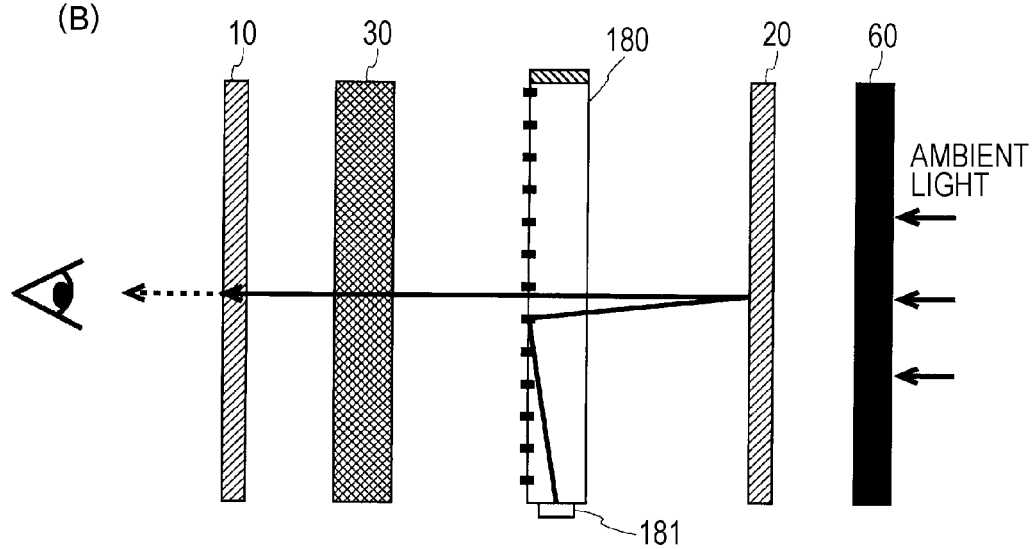

FIG. 34
(A) LIQUID CRYSTAL PANEL FOR ADJUSTING TRANSPARENCY/LIGHT-EMISSION
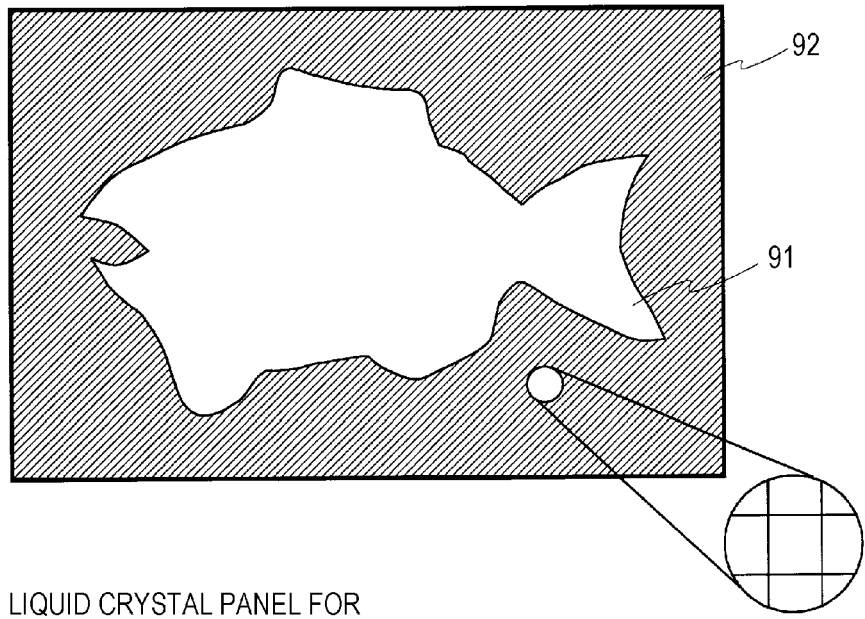
(B) LIQUID CRYSTAL PANEL FOR ADJUSTING TRANSMITTANCE
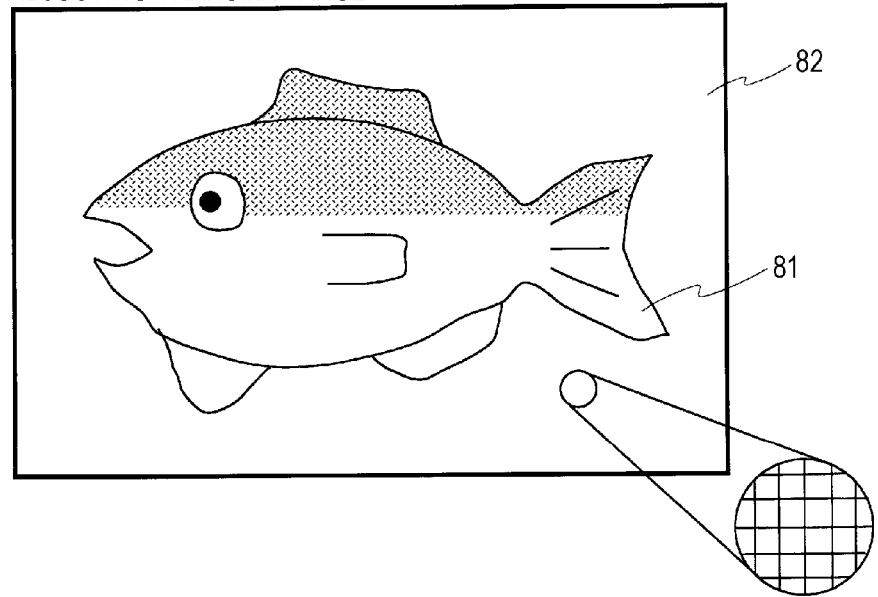

FIG. 40
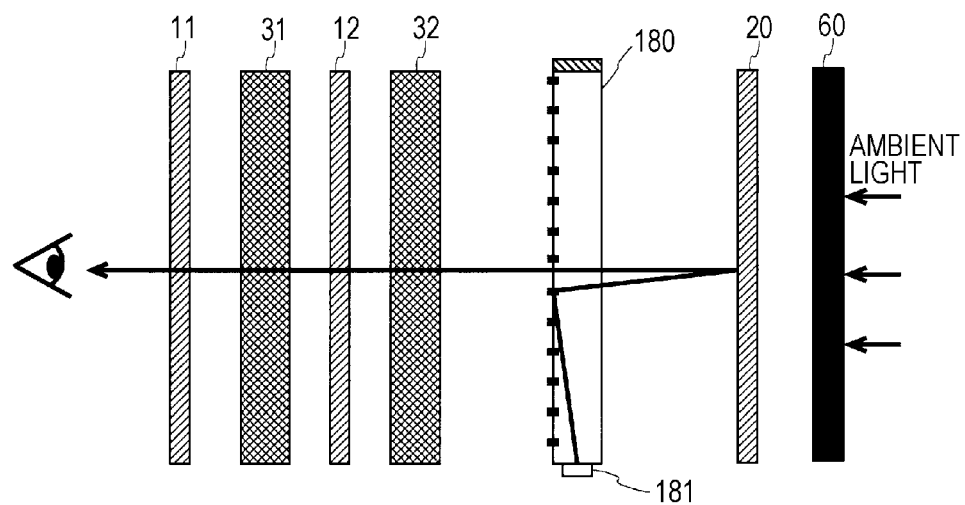
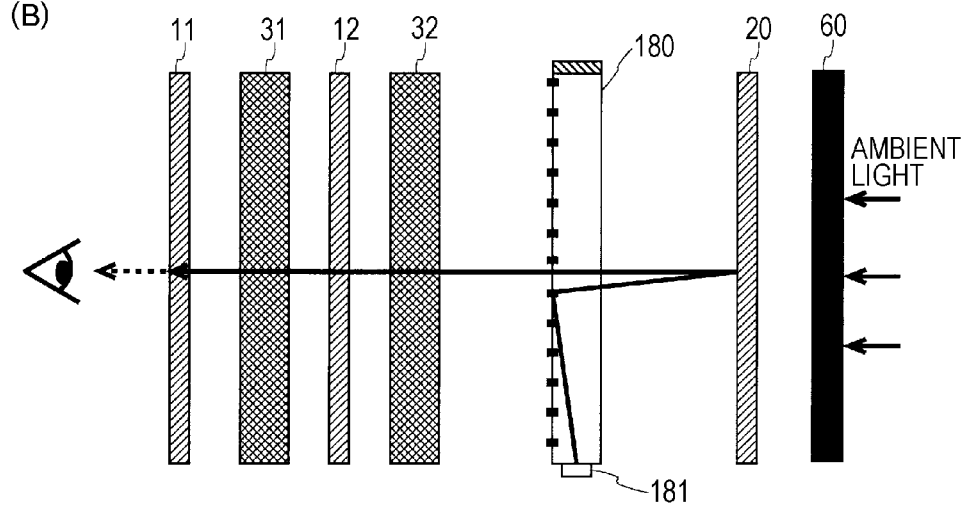

FIG. 41
(A)
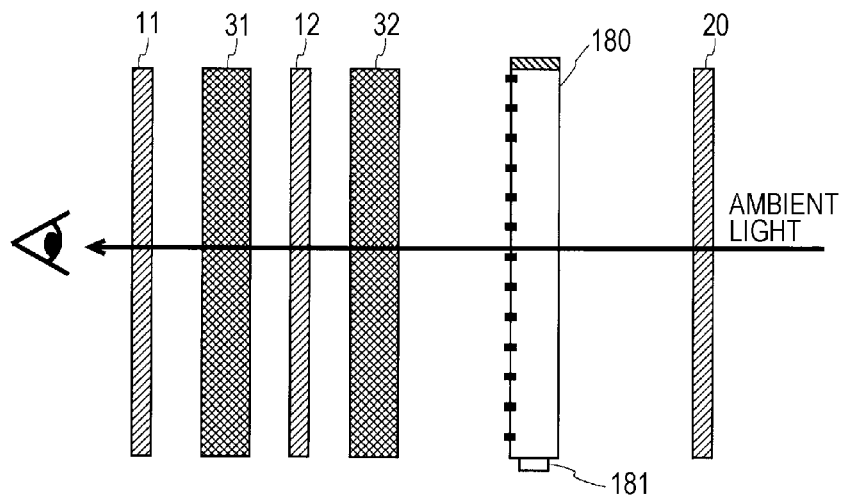
(B)
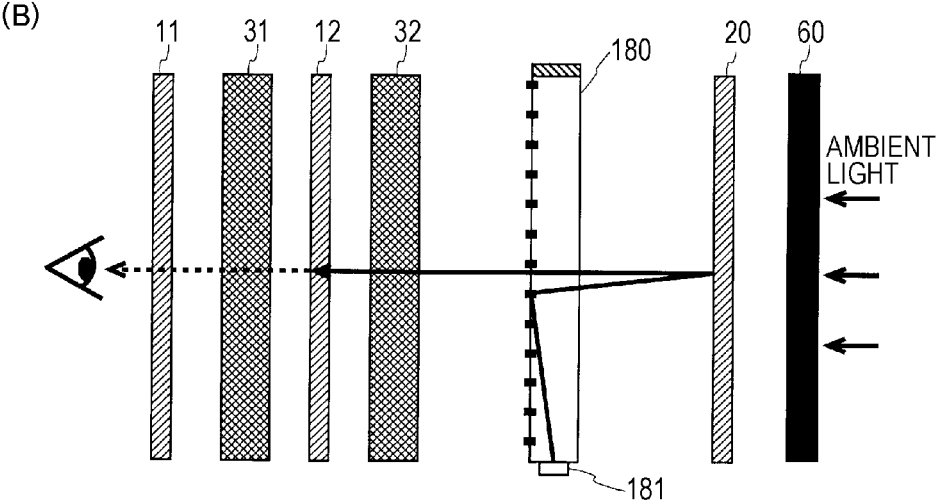

FIG. 47
(A) LIQUID CRYSTAL PANEL FOR ADJUSTING TRANSPARENCY/LIGHT-EMISSION
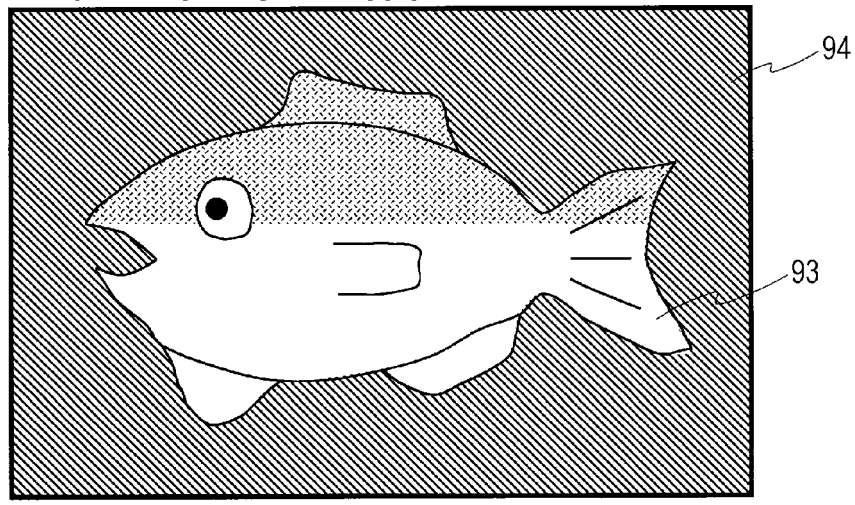
(B) LIQUID CRYSTAL PANEL FOR ADJUSTING TRANSMITTANCE
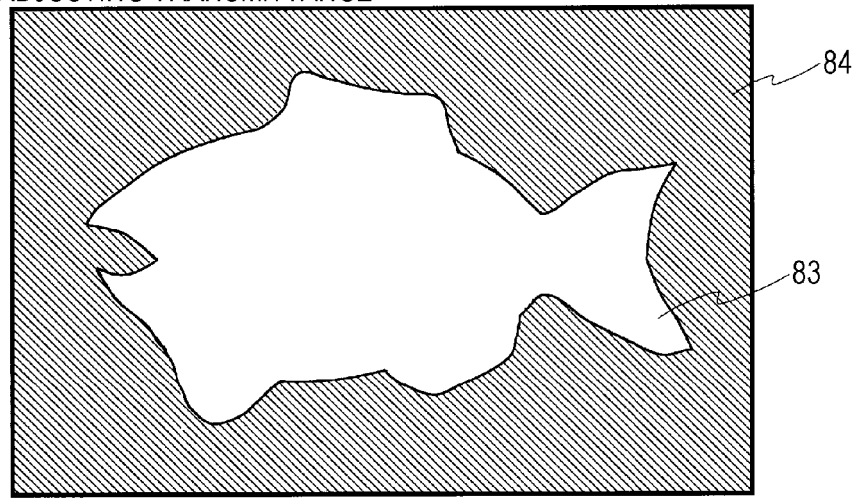

FIG. 48
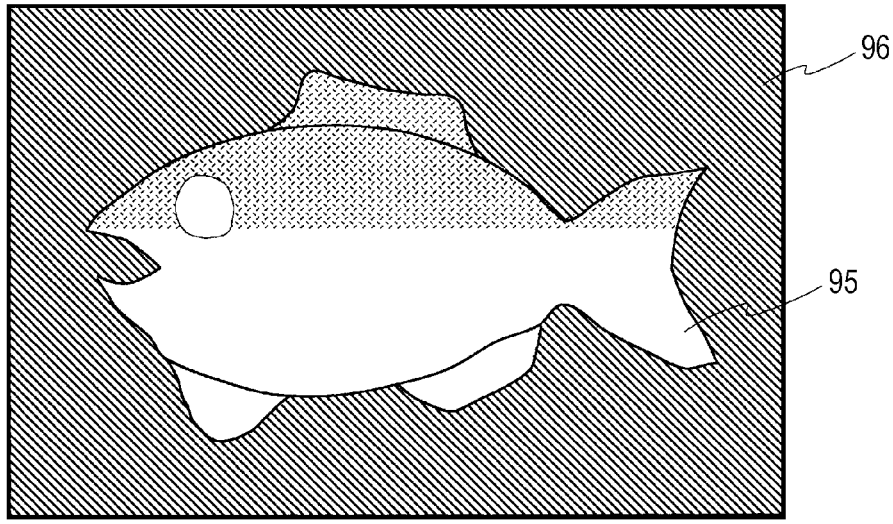
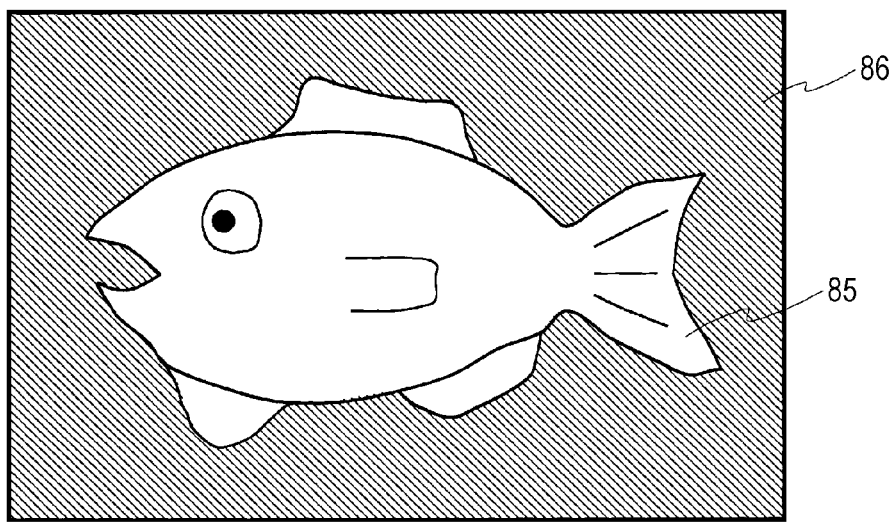

FIG. 56
(A)
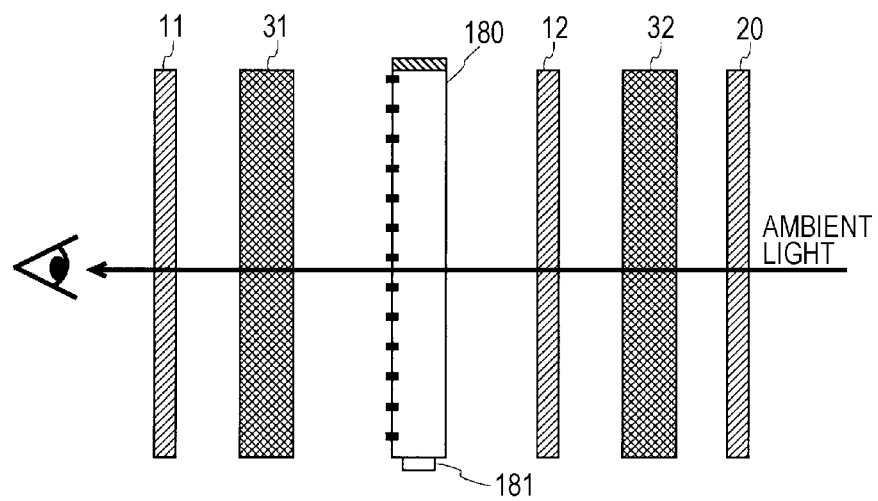
(B)
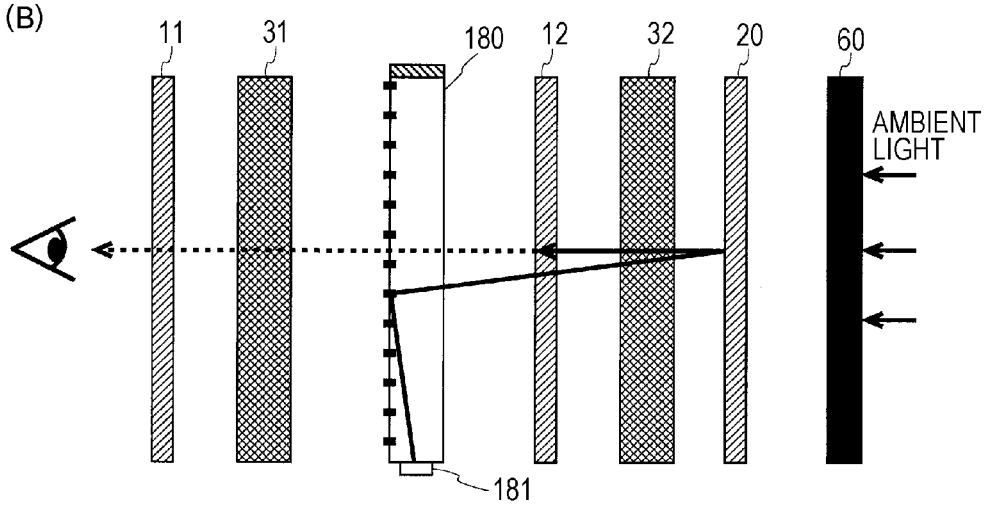

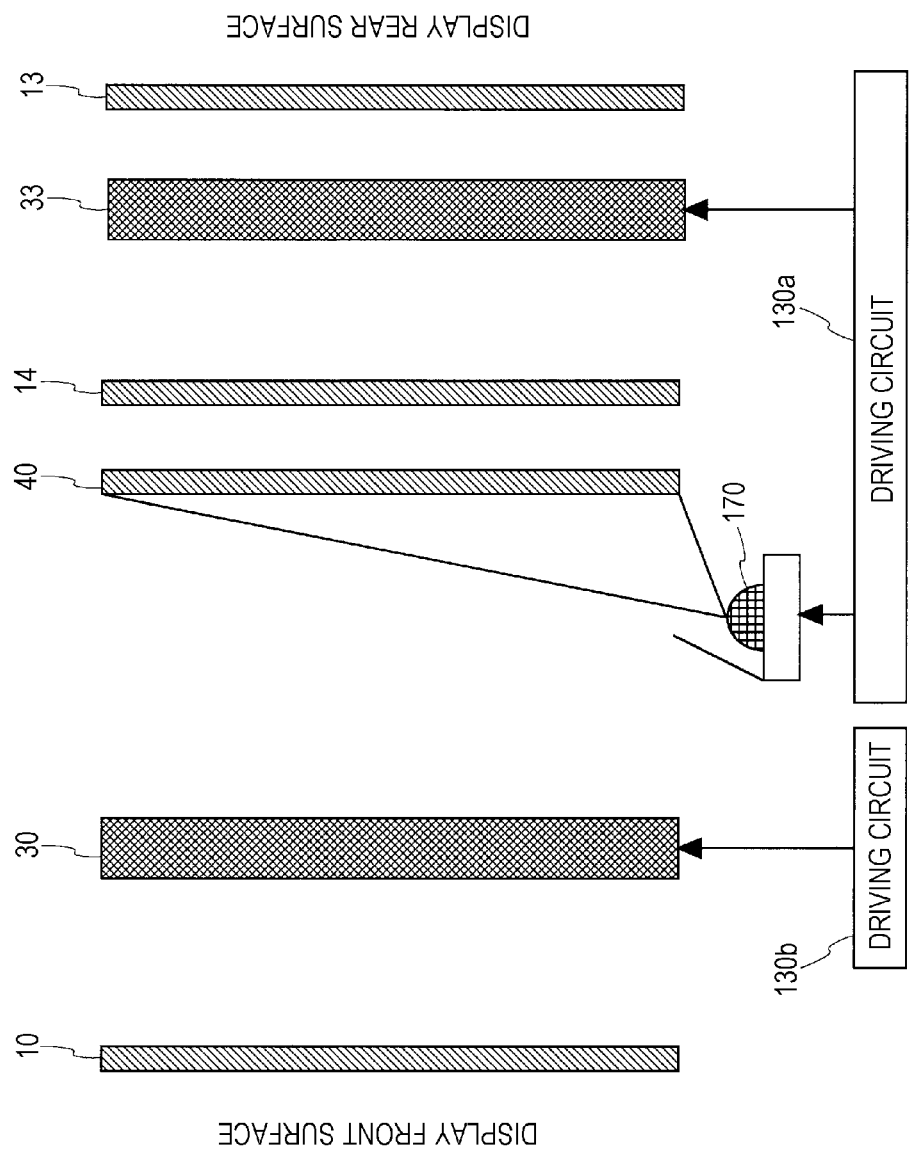

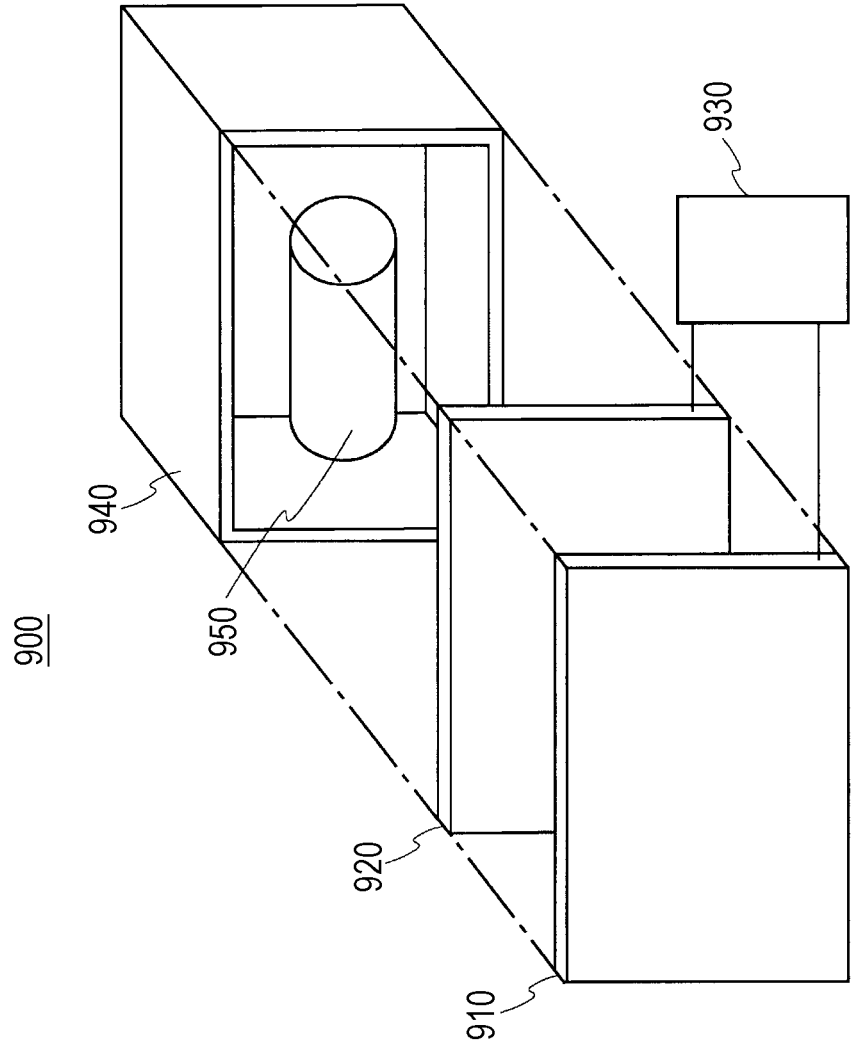

IMAGE DISPLAY DEVICE

TECHNICAL FIELD

The present invention relates to an image display device, and more particularly, to an image display device capable of performing transparent display such that a background is transparently seen from the front surface side of a display.

BACKGROUND ART

In recent year, an image display device capable of performing transparent display in which a background is transparently seen from the front surface side of a display in addition to display an image has been developed. For example, FIG. 65 is a diagram showing the configuration of a liquid crystal display device 900 provided with a display in which a background is transparently seen from a front surface side, which is disclosed in Japanese Unexamined Patent Application Publication No. 2010-91609. As shown in FIG. 65, the liquid crystal display device 900 includes a liquid crystal panel 910, a shutter film 920 provided on the rear surface side of the liquid crystal panel 910, and a control unit 930 that controls the driving of the liquid crystal panel 910 and the shutter film 920. The shutter film 920 switches between a state in which the rear surface side of the shutter film 920 is transparently seen so as to be recognized by directly transmitting incident light from the rear surface side to irradiate the light to the liquid crystal panel 910, and a state in which the rear surface side of the shutter film 920 is blocked so as not to be recognized by indirectly transmitting the incident light from the rear surface side to irradiate the light to the liquid crystal panel 910. Accordingly, the liquid crystal display device 900 can easily display an image displayed on the liquid crystal panel 910, or can cause a rear surface side to be transparently seen through the liquid crystal panel 910.

CITATION LIST

Patent Literature

PTL 1: Japanese Unexamined Patent Application Publication No. 2010-91609

SUMMARY OF INVENTION

Technical Problem

Since the liquid crystal panel 910 is not a self-luminous panel, it is necessary to provide backlight so as to be close to the rear surface side in order to irradiate light to the liquid crystal panel 910. However, in the liquid crystal display device 900 described in Japanese Unexamined Patent Application Publication No. 2010-91609, the backlight is not provided close to the rear surface side of the liquid crystal panel 910. It is necessary to irradiate light to a cylinder 950 displayed at the rear of the liquid crystal panel 910. Thus, in order to irradiate light to the liquid crystal panel 910 and the cylinder 950, it is it is necessary to fill the inside of a case 940 with light by providing the case 940 that accommodates the liquid crystal panel and the cylinder and providing a light source (not shown) within the case. In the liquid crystal display device 900, since the size of the device including the case 940 is large, the degree of freedom at the time of installing the liquid crystal display device 900 is low, and thus, there is a problem that the purpose of use is greatly limited.

The shutter film 920 is a film capable of switching between a transparent state and a non-transparent state, becomes clouded in the non-transparent state, and indirectly applies the incident light from the rear surface side to the liquid crystal panel 910. The shutter film 920 is divided so as to correspond to the divided regions of the liquid crystal panel 910, and the respective regions can be controlled so as to be in the transparent state or the non-transparent state. However, it is difficult to divide the shutter film into regions having the substantially same spatial resolution as that of the pixels of the liquid crystal panel 910. Thus, there is a problem that it is difficult to display an image and a background with the substantially same high spatial resolution as the liquid crystal panel 910.

Therefore, an object of the present invention is to provide an image display device which includes a display in which a background is transparently seen from a front surface side and has a high degree of freedom at the time of installation. An object of the present invention is to provide an image display device provided with a display capable of displaying an image and a background with high spatial resolution.

Solution to Problem

According to a first aspect of the present invention, there is provided an image display device capable of performing transparent display in which a background is transparently seen from a front surface side of a display. The device includes: light-source light/ambient light adjusting means, which includes a pixel array in which a plurality of pixels is arranged, for controlling a polarization direction of light for each pixel in response to an image signal applied from outside, and for transmitting light having a desired polarization component to the front surface side of the display; polarization component selecting means, which is disposed closer to a rear surface side than the light-source light/ambient light adjusting means, for selecting and transmitting a polarization component of ambient light incident from the rear surface side of the display, and for selecting and reflecting a polarization component of light-source light incident on the front surface side of the display; and light-source light irradiating means, which is disposed closer to the front surface side than the polarization component selecting means, and for irradiating the light-source light toward the rear surface side of the display. The image signal includes transparent/light-emitting pixel information for determining a ratio of transmission at which the ambient light which is incident from the rear surface side of the display and is selected by the polarization component selecting means and the light-source light which is irradiated from the light-source light irradiating means and is selected by the polarization component selecting means transmit through the light-source light/ambient light adjusting means, and the light-source light/ambient light adjusting means adjusts, for each pixel, the ratio of transmission of the light-source light and the ambient light transmit by respectively controlling a polarization direction of the polarization component of the light-source light which is perpendicular to the polarization component of the ambient light and is selected by the polarization component selecting means from the light-source light irradiated by the light-source light irradiating means and a polarization direction of the polarization component of the ambient light which is selected by the polarization component selecting means from the ambient light incident from the rear surface side of the display, based on the transparent/light-emitting pixel information.

According to a second aspect of the present invention, in the first aspect of the present invention, the polarization component selecting means may include a reflection-type polarization plate that transmits polarization components of the ambient light and the light-source light which have an identical polarization direction as the transmission axis direction, and reflects polarization components which have an identical polarization direction as the reflection axis direction. The light-source light irradiating means may be disposed in a space interposed between the light-source light/ambient light adjusting means and the reflection-type polarization plate or near the space, and may irradiate the light-source light to the reflection-type polarization plate.

According to a third aspect of the present invention, the image display device according to the first aspect of the present invention may further include: a first absorption-type polarization plate that is disposed closer to the front surface side of the display than the light-source light irradiating means; and a second absorption-type polarization plate that is disposed close to a front surface side of the light-source light/ambient light adjusting means, and causes the polarization direction of the light-source light or the ambient light transmitted through the light-source light/ambient light adjusting means to be in line with a polarization direction of the first absorption-type polarization plate. The polarization component selecting means may include a reflection-type polarization plate that transmits polarization components of the ambient light and the light-source light which have an identical polarization direction as a transmission axis direction, and reflects polarization components which have an identical polarization direction as a reflection axis direction. The light-source light irradiating means may be disposed in a space interposed between the first absorption-type polarization plate and the second absorption-type polarization plate or near the space, and may irradiate the light-source light to the second absorption-type polarization plate. The first absorption-type polarization plate may transmit at least any one of the light-source light and the ambient light transmitted through the second absorption-type polarization plate to the front surface side of the display, and may absorb light-source light which has leaked to the front surface side, of the light-source light irradiated from the light-source light irradiating means.

According to a fourth aspect of the present invention, in the first aspect of the present invention, the light-source light irradiating means may include a light source that emits the light-source light including a plurality of polarization components having different polarization directions. The polarization component selecting means may include a polarization component selecting sheet that reflects the light-source light to the front surface side of the display at an angle different from an incident angle, a first polarization component selecting polarization plate that is disposed close to a rear surface side of the polarization component selecting sheet, and transmits polarization components having a specific polarization direction, of the ambient light incident from the rear surface side of the display, and a second polarization component selecting polarization plate that is disposed on a surface of the light source, and transmits a polarization component having a polarization direction, which is perpendicular to the specific polarization direction, of the light-source light emitted from the light source. The light source may be disposed near a space interposed between the light-source light/ambient light adjusting means and the polarization component selecting sheet, and may irradiate the polarization components of the light-source light, which have transmitted through the second polarization component selecting polarization plate, to the polarization component selecting sheet.

According to a fifth aspect of the present invention, in any one of the second to fourth aspects of the present invention, on the display, a luminance of the light-source light transmitted through a first region set such that only the light-source light transmits, a luminance of the light-source light leaking to the front surface side from a second region set such that the light-source light does not transmit, and a luminance of the ambient light transmitting through a third region set such that only the ambient light transmits may satisfy the following relationship:

Luminance of Light-source Light Transmitted
      through First Region>Luminance of Ambient
      Light Transmitted through Third
      Region>Luminance of Light-source Light Leak-
      ing from Second Region According to a sixth aspect of the present invention, the image display device according to the first aspect of the present invention may further include: transmittance adjusting means, which is disposed close to a front surface side of the light-source light/ambient light adjusting means, and for adjusting transmittances of the light-source light and the ambient light transmitted through the light-source light/ambient light adjusting means; and a first absorption-type polarization plate that is disposed close to a front surface side of the transmittance adjusting means. The polarization component selecting means may include a reflection-type polarization plate that transmits polarization components of the ambient light and the light-source light which have an identical polarization direction as a transmission axis direction, and reflects polarization components having an identical polarization direction as a reflection axis direction. The light-source light irradiating means may be disposed in a space interposed between the light-source light/ambient light adjusting means and the reflection-type polarization plate or near the space, and may irradiate polarization components of the light-source light which have a polarization direction perpendicular to a specific polarization direction to the reflection-type polarization plate. The transmittance adjusting means may transmit polarization components of at least any one of the light-source light and the ambient light to the front surface side of the display by adjusting, for each pixel transmittances of pixels through which polarization components of the light-source light and the ambient light extracted by the light-source light/ambient light adjusting means transmit, based on transmittance pixel information sets the transmittance for each pixel.

According to a seventh aspect of the present invention, in the sixth aspect of the present invention, the light-source light/ambient light adjusting means may include a pixel array for adjusting transparency/light-emission, the transmittance adjusting means may include a pixel array for adjusting transmittance, and pixels of the pixel array for adjusting transparency/light-emission may be different in size from pixels of the pixel array for adjusting transmittance.

According to an eighth aspect of the present invention, the image display device according to the sixth aspect of the present invention may further include: a first driving circuit that drives a pixel array for adjusting transparency/light-emission included in the light-source light/ambient light adjusting means; a second driving circuit that drives a pixel array for adjusting transmittance included in the transmittance adjusting means; a first display control circuit that controls the first driving circuit; and a second display control circuit that controls the second driving circuit. The image signal may include the transparent/light-emitting pixel information for setting, for each pixel, a ratio of transmission at which the ambient light and the light-source light transmit through the pixel array for adjusting transparency/light-emission, and the transmittance pixel information for setting, for each pixel a transmittance of the pixel array for adjusting transmittance. The first driving circuit may adjust, for each pixel, a ratio between the light-source light and the ambient light which transmit through the pixel array for adjusting transparency/light-emission, based on the transparent/light-emitting pixel information. The second driving circuit may adjust, for each pixel, transmittances of the light-source light and the ambient light which transmit through the pixel array for adjusting transmittance, based on the transmittance pixel information.

According to a ninth aspect of the present invention, in the eighth aspect of the present invention, the image signal may further include at least any one of first display pixel information for setting gradation information for displaying an image which is gradation-displayed in each pixel of the pixel array for adjusting transparency/light-emission, and second display pixel information for setting gradation information for displaying an image which is gradation-displayed in each pixel of the pixel array for adjusting transmittance.

According to a tenth aspect of the present invention, in the eighth or ninth aspect of the present invention, the first driving circuit may cause a plurality of pixels of the pixel array for adjusting transparency/light-emission corresponding to the plurality of pixels connected to an identical scanning signal line as that of the pixel array for adjusting transmittance to be in a light-emitting state, based on the transparent/light-emitting pixel information.

According to an eleventh aspect of the present invention, in the ninth aspect of the present invention, the transparent/light-emitting pixel information and the first display pixel information for setting the gradation information for displaying an image which is gradation-displayed in each pixel of the pixel array for adjusting transparency/light-emission, and the transmittance pixel information and the second display pixel information for setting the gradation information for displaying an image which is gradation-displayed in each pixel of the pixel array for adjusting transmittance may be respectively input to the first and second display control circuits from outside, as a first image signal and a second image signal.

According to a twelfth aspect of the present invention, in the eighth aspect of the present invention, the image signal may include the transparent/light-emitting pixel information, the transmittance pixel information, first display pixel information, and second display pixel information. After the image signal is divided into a first image signal which includes the transparent/light-emitting pixel information and the first display pixel information, and a second image signal which includes the transmittance pixel information and the second display pixel information, the first image signal may be input to the first display control circuit, and the second image signal may be input to the second display control circuit.

According to a thirteenth aspect of the present invention, the image display device according to the first aspect of the present invention may further include: transmittance adjusting means, which is disposed close to the front surface side of the light-source light/ambient light adjusting means, and for adjusting transmittances of the light-source light and the ambient light transmitted through the light-source light/ambient light adjusting means; a first absorption-type polarization plate that is disposed close to a front surface side of the transmittance adjusting means; and a second absorption-type polarization plate that is disposed close to the front surface side of the light-source light/ambient light adjusting means, transmits at least any one of the light-source light and the ambient light transmitted through the light-source light/ambient light adjusting means. The polarization component selecting means may include a reflection-type polarization plate that transmits polarization components of the ambient light and the light-source light which have the same polarization direction as a transmission axis direction, and reflects polarization components having the same polarization direction as a reflection axis direction. The light-source light irradiating means may be disposed in a space interposed between the transmittance adjusting means and the second absorption-type polarization plate or near the space, and may irradiate the light-source light toward the second absorption-type polarization plate. The light-source light/ambient light adjusting means may control polarization directions of the light-source light and the ambient light such that at least any of polarization components of the light-source light which is irradiated from the light-source light irradiating means and is reflected by the reflection-type polarization plate, and polarization components of the ambient light which are incident from the rear surface side of the display and are perpendicular to the polarization components of the light-source light are extracted, or may control the polarization direction of the light-source light emitted from the light-source light irradiating means such that the light-source light is extracted to the rear surface side of the display. The transmittance adjusting means may transmit polarization components of at least any one of the light-source light and the ambient light to the front surface side of the display by adjusting, for each pixel, transmittances of pixels through which the polarization components of the light-source light and the ambient light extracted by the light-source light/ambient light adjusting means transmit, based on transmittance pixel information.

According to a fourteenth aspect of the present invention, the image display device according to the thirteenth aspect of the present invention may further include: a first driving circuit that drives a pixel array for adjusting transparency/light-emission included in the light-source light/ambient light adjusting means; a second driving circuit that drives a pixel array for adjusting transmittance included in the transmittance adjusting means; a first display control circuit that controls the first driving circuit; a second display control circuit that controls the second driving circuit; and a switching circuit that is connected to the first display control circuit, selects any one of a first image signal and a second image signal included in the image signal if the first and second image signals are input, and outputs the selected signal to the first display control circuit. The first image signal may include the transparent/light-emitting pixel information for setting, for each pixel, a ratio of transmission at which the ambient light and the light-source light transmit through the pixel array for adjusting transparency/light-emission, and first display pixel information for setting gradation information for displaying an image with gradations, and the second image signal includes the transmittance pixel information for setting, for each pixel, a ratio of transmission at which the ambient light and the light-source light transmits through the pixel array for adjusting transmittance, and second display pixel information for setting gradation information for displaying an image with gradations. If the second image signal is applied to the second display control circuit and the first image signal selected by the switching circuit is applied to the first display control circuit, the first driving circuit may drive the pixel array for adjusting transparency/light-emission such that a transmission ratio between the ambient light and the light-source light is adjusted for each pixel and the ambient light and the light-source light transmitted through the pixel array for adjusting transparency/light-emission are respectively irradiated to corresponding pixels of the pixel array for adjusting transmittance, based on the first image signal, and the second driving circuit may drive the pixel array for adjusting transmittance such that the ambient light and the light-source light irradiated from the pixel array for adjusting transparency/light-emission transmit at transmittances set for each pixel, based on the second image signal. If the second image signal is applied to the second display control circuit and the second image signal selected by the switching circuit is applied to the first display control circuit, the first driving circuit may drive the pixel array for adjusting transparency/light-emission such that an image corresponding to the second image signal is displayed, and the second driving circuit may drive the pixel array for adjusting transmittance such that an image corresponding to the second image signal is displayed.

According to a fifteenth aspect of the present invention, in the fourteenth aspect of the present invention, the first image signal may be input to the switching circuit from outside, and the second image signal may be input to the switching circuit and the second display control circuit from outside.

According to a sixteenth aspect of the present invention, in the fourteenth aspect of the present invention, if the image signal which includes the first image signal and the second image signal is input from outside, after the image signal is divided into the first image signal and the second image signal, the first and second image signals may be applied to the switching circuit, and the second image signal may be applied also to the second display control circuit.

According to a seventeenth aspect of the present invention, in the sixth or thirteenth aspect of the present invention, on the display, a luminance of the light-source light transmitted through a first region set such that only light-source light transmits, a luminance of the light-source light leaking to the front surface side from a second region set such that the light-source light does not transmit, a luminance of the ambient light transmitting through a third region set such that only the ambient light transmits, and a luminance of the light-source light leaking to the front surface side from a fourth region set such that neither the light-source light nor the ambient light transmits may satisfy the following relationship:

Luminance of Light-source Light Transmitted through First Region>Luminance of Ambient Light Transmitted through Third Region>Luminance of Light-source Light Leaked from Second Region>Luminance of Light-source Light leaked from Fourth Region According to an eighteenth aspect of the present invention, in any one of the second, third, sixth and thirteenth aspects of the present invention, the light-source light irradiating means may be a light guide plate provided with a plurality of reflection members on a front surface side thereof. The reflection member may be made of a transparent material having an identical refractive index as that of the light guide plate, and may include a transparent dot formed on a surface of the light guide plate, and a non-transmission member formed so as to cover the transparent dot.

According to a nineteenth aspect of the present invention, in any one of the second, third, sixth and thirteenth aspects of the present invention, the light-source light irradiating means may be a light guide plate provided with a plurality of reflection members on a front surface side thereof. The reflection member may include a groove formed on a surface of the light guide plate, and a non-transmission member formed so as to cover the groove.

According to a twentieth aspect of the present invention, in any one of the second, third, fourth, sixth and thirteenth aspects of the present invention, the light-source light irradiating means may include a plurality of color lamps having different wavelengths. The plurality of color lamps may be arranged such that an incident angle at which light beams from the plurality of color lamps are incident on the polarization component selecting means is increased as the wavelength becomes longer.

According to a twenty-first aspect of the present invention, in any one of the second, third, fourth, sixth and thirteenth aspects of the present invention, the light-source light irradiating means may include a light source that emits the light-source light including a plurality of polarization components having different polarization directions. The image display device may further include uniform irradiation means, which is disposed in front of the light source, and for diffusing light from the light source so as to cause the light to be uniformly irradiated, and the light from the light source may be irradiated to the reflection-type polarization plate via the uniform irradiation means.

According to a twenty-second aspect of the present invention, the image display device according to the first aspect of the present invention may further include: shutter means, which is disposed closer to the rear surface side of the display than the polarization component selecting means, and for blocking at least a part of the ambient light incident from the rear surface side.

According to a twenty-third aspect of the present invention, in the twenty-second aspect of the present invention, the shutter means may include a third absorption-type polarization plate that transmits polarization components of the ambient light incident from the rear surface side, which have an identical direction as a transmission axis of the polarization component selecting means, and a pixel array for shutter capable of changing a blocking ratio of polarization components of the ambient light transmitted through the third absorption-type polarization plate.

Advantageous Effects of Invention

According to the first aspect of the present invention, the light-source light/ambient light adjusting means adjusts the ratio between the transmitted light-source light and ambient light for each pixel by respectively controlling the polarization direction of the reflected polarization components of the light-source light irradiated to the polarization component selecting means from the light-source light irradiating means and the polarization direction of the transmitted polarization components of the ambient light incident on the polarization component selecting means from the rear surface side of the display, based on the transparent/light-emitting pixel information. Accordingly, if the image display device is viewed from the front surface side of the display, the image is seen for each pixel, the background is transparently seen, or the background is seen so as to be superimposed on the image. Since it is not necessary to attach the image display device to the case filled with light, the image display device is widely used without limitation of use.

According to the second aspect of the present invention, the polarization component selecting means of the first aspect is the reflection-type polarization plate, and the light-source light irradiating means applies the light-source light to the reflection-type polarization plate. Accordingly, the same effect as the case of the first aspect is obtained.

According to the third aspect of the present invention, since the distance between the second absorption-type polarization plate and the reflection-type polarization plate approaches about a thickness of the pixel array for controlling polarization direction, the image and the shadow thereof have the substantially same size. Accordingly, an observer may not visually perceive the doubly displayed image, and thus, display quality is improved. The polarization components of the light leaking to the front surface side of the display from the light-source light irradiating means which have the same polarization direction as the absorption axis of the first absorption-type polarization plate are absorbed by providing the first absorption-type polarization plate. Therefore, since the light of the light leaking to the front surface side of the display which is visually perceived by an observer is suppressed by about half, it is possible to suppress gradation in display quality of the image.

According to the fourth aspect of the present invention, the light source of the light-source light irradiating means emits the plurality of polarization components having different polarization directions. These polarization components transmit through the second polarization component selecting polarization plate, and thus, it is possible to cause only the polarization components perpendicular to the polarization direction of the ambient light transmitted through the first polarization component selecting polarization plate to be incident on the polarization component selecting sheet. Accordingly, the polarization component selecting sheet applies the ambient light and the light-source light perpendicular to each other to the light-source light/ambient light adjusting means, and the light-source light/ambient light adjusting means selects at least any one of the light-source light and the ambient light, and transmits the selected light to the front surface side of the display. Accordingly, the same effect as that of the first aspect is obtained.

According to the fifth aspect of the present invention, in a case where the luminances of the light-source light and the ambient light transmitting through the first to third regions satisfy the relationship expressed by an inequality, it is possible to display the image and the background with good visual quality in a state in which transparency is maintained.

According to the sixth aspect of the present invention, the image display device can display the image, cause the background to be transparently seen, or display the display in black by controlling three states of the turn-on state in which the image is displayed, the turn-off state in which the display is displayed in black and the transparent state in which the background is displayed for each pixel. Accordingly, the image display device can display an image with high contrast, or can display an image with a high degree of freedom of express.

According to the seventh aspect of the present invention, the pixels of the pixel array for adjusting transparency/light-emission are different in size from the pixels of the pixel array for adjusting transmittance. Accordingly, it is possible to prevent the occurrence of moiré. Since a pixel array more inexpensive than the pixel array for adjusting transmittance can be used as the pixel array for adjusting transparency/light-emission, it is possible to reduce the manufacturing cost of the image display device.

According to the eighth aspect of the present invention, if the transparent/light-emitting pixel information for determining the ratio at which the ambient light which is incident from the rear surface side of the display and transmits through the pixel array for adjusting transparency/light-emission and the light-source light which is emitted from the light-source light irradiating means and is reflected by the polarization component selecting means transmit through the pixel array for adjusting transparency/light-emission, and the transmittance pixel information for determining the ratio at which the ambient light and the light-source light transmits through the pixel array for adjusting transmittance are applied from outside, the first driving circuit drives the pixel array for adjusting transparency/light-emission based on the transparent/light-emitting pixel information, and the second driving circuit drives the pixel array for adjusting transmittance based on the transmittance pixel information. Accordingly, the image display device can display the image on the display, can display the display in black, or can display the background.

According to the ninth aspect of the present invention, the image signal includes at least one of the first display pixel information for setting the gradation information for display the image in which the gradations are displayed for each pixel of the pixel array for adjusting transparency/light-emission, and the second display pixel information for setting the gradation information for display the image in which the gradations are displayed for each pixel of the pixel array for adjusting transmittance. Accordingly, the image display device can display the image in which the gradations are displayed.

According to the tenth aspect of the present invention, the image signal is written in all the pixels connected to the selected scanning signal line based on the transparent/light-emitting pixel information, and the backlight light transmits by causing the pixels of the pixel array for adjusting transparency/light-emission for each horizontal signal line in which the response of liquid crystal is completed to be in the light-emitting state. Accordingly, it is not necessary to secure a large amount of light for a short period of time, and thus, it is easy to design a circuit that drives backlight.

According to the eleventh aspect of the present invention, the transparent/light-emitting pixel information and the first display pixel information are input to the first display control circuit, as the first image signal, and the transmittance pixel information and the second display pixel information are input to the second display control circuit, as the second image signal. Accordingly, it is possible to update the background at a rate different from a frame rate of the image.

According to the twelfth aspect of the present invention, the transparent/light-emitting pixel information, the transmittance pixel information, the first display pixel information and the second display pixel information are input from outside by being included in one image signal. Accordingly, it is possible to update the background at the same rate as the frame rate of the image.

According to the thirteenth aspect of the present invention, if the image display device is viewed from the front surface side of the display, the image in any state of the turn-on state, the turn-off state and the transparent state, or a superimposed state thereof is displayed for each pixel, similarly to the case of the seventh aspect. If the image display device is viewed from the rear surface side of the display, the rear surface side of the display serves as the mirror due to the light reflected by the reflection-type polarization plate, and the image display device serves as the mirror display that displays the image in any state of the turn-on state and the transparent state, or a superimposed state thereof in the mirror for each pixel.

According to the fourteenth aspect of the present invention, if the first image signal of the first image signal and the second image signal input from outside is applied to the first display control circuit and the second image signal is applied to the second display control circuit, the first display control circuit controls the first driving circuit based on the first image signal, and drives the pixel array for adjusting transparency/light-emission such that the backlight light and the ambient light transmit at the predetermined ratio to the front surface side of the display. The second display control circuit controls the second driving circuit based on the second image signal, and drives the pixel array for adjusting transmittance such that the backlight light and the ambient light transmitted through the pixel array for adjusting transparency/light-emission transmit at the predetermined transmittance. Accordingly, if the image display device is viewed from the front surface side of the display, the image in any state of the turn-on state, the turn-off state and the transparent state, or the superimposed state thereof is displayed for each pixel. Meanwhile, if the second image signal is applied to the first display control circuit and the second display control circuit, the first display control circuit controls the first driving circuit, and drives the pixel array for adjusting transparency/light-emission such that the image based on the second image signal is displayed. The second display control circuit controls the second driving circuit, and drives the pixel array for adjusting transmittance such that the image based on the second image signal is displayed. Accordingly, the same image is displayed on the front surface side and the rear surface side of the display.

According to the fifteenth aspect of the present invention, since the first image signal and the second image signal are respectively input to the switching circuit from outside, the image displayed on the pixel array for adjusting transparency/light-emission and the image displayed on the pixel array for adjusting transmittance can be displayed at different frame rates.

According to the sixteenth aspect of the present invention, since the first image information and the second image information are collectively input as one information item from outside, the image displayed on the pixel array for adjusting transparency/light-emission and the image displayed on the pixel array for adjusting transmittance can be displayed at the same frame rate.

According to the seventeenth aspect of the present invention, in the case where the luminances of the light-source light and the ambient light transmitting through the first to fourth regions satisfy the relationship expressed as the inequality, the image and the background are displayed with good visual quality in the state in which transparency is maintained.

According to the eighteenth aspect of the present invention, the light guide plate provided with the reflection member including the transparent dot and the non-transmission member covering the transparent dot on the surface is the asymmetric light guide plate in which the intensity of the extracted light becomes stronger toward the rear surface side from the front surface side of the display. If the asymmetric light guide plate is used, the direct incident of the light-source light leaked from the light guide plate to the pixels of the pixel array for controlling polarization direction to be in the transparent state is suppressed. Accordingly, since the degree of transparency of the pixels to be in the transparent state is improved, it is possible to realize a display with higher transparency.

According to the nineteenth aspect of the present invention, the light guide plate provided with the reflection member including the groove and the non-transmission member covering the groove on the surface also exhibits the same effect as the nineteenth aspect.

According to the twentieth aspect of the present invention, since the diffraction angle or the refraction angle of the incident light becomes larger as the wavelength becomes shorter, the respective color lamps are arranged such that the incident angle becomes larger as the wavelength becomes shorter. Accordingly, since the reflection angles of the respective color light beams are set to be the same, it is possible to prevent the color shift of the image.

According to the twenty-first aspect of the present invention, the uniform irradiation means for diffusing the light from the light source to uniformly irradiate is disposed in front of the light source. Accordingly, the light from the light source can be uniformly irradiated to the entire surface of the polarization component selecting means, and it is possible to display an image without non-uniformity in display.

According to the twenty-second aspect of the present invention, in the case where the display is viewed from the front surface side, it is possible to cause the display to be in the turn-on state in which the backlight light transmits and the image is displayed, the transparent state in which the ambient light transmits by opening the shutter and the background is transparently seen and the turn-off state in which neither the backlight light nor the ambient light transmit to the front surface side by turning off the light source to close the shutter means. Therefore, since the display can be displayed in black, the image display device can display an image with high contrast or can display an image with a high degree of freedom of expression, similarly to the seventh aspect.

According to the twenty-third aspect of the present invention, since the shutter means includes the third absorption-type polarization plate and the pixel array for shutter capable of adjusting the blocking ratio of the ambient light, it is possible to transmit the ambient light, to completely block the ambient light, or to transmit a part of the ambient light. Therefore, the image display device can display in any state of the turn-on state, the transparent state and the turn-off state, or the superimposed state of these states for each pixel.

BRIEF DESCRIPTION OF DRAWINGS

FIG. 16 is a diagram showing the configuration of a reflection member formed on the surface of a light guide plate included in the image display device shown in FIG. 15, in which (A) is a diagram showing the configuration of the reflection member including a transparent dot, and (B) is a diagram showing the configuration of the reflection member including a groove.

FIG. 18 is a diagram showing the passage routes of light in the respective regions in the image display device shown in FIG. 15, and more specifically, (A) is a diagram showing the passage routes of light in a display region, and (B) is a diagram showing the passage routes of light in a leakage region.

FIG. 34 is a diagram showing an example of the image displayed on the image display device shown in FIG. 31, and more specifically, (A) is a diagram showing a display state of a liquid crystal panel for adjusting transparency/light-emission, and (B) is a diagram showing a display state of a liquid crystal panel for adjusting transmittance.

FIG. 40 is a diagram showing the passage routes of light in the respective regions of the image display device shown in FIG. 31, and more specifically, (A) is a diagram showing the passage route of light in a display region, and (B) is a diagram showing the passage route of light in a leakage region.

FIG. 41 is a diagram showing the passage routes of light in the respective regions of the image display device shown in FIG. 31, and more specifically, (A) is a diagram showing the passage route of light in an ambient light transmission region, and (B) is a diagram showing the passage route of light in a black display region.

FIG. 47 is a diagram showing another example of the image displayed on the display of the image display device shown in FIG. 31, and more specifically, (A) is a diagram showing a display state of the liquid crystal panel for adjusting transparency/light-emission, and (B) is a diagram showing a display state of the liquid crystal panel for adjusting transmittance.

FIG. 48 is a diagram showing still another example of the image displayed on the display of the image display device shown in FIG. 31, and more specifically, (A) is a diagram showing a display state of the liquid crystal panel for adjusting transparency/light-emission, and (B) is a diagram showing a display state of the liquid crystal panel for adjusting transmittance.

FIG. 56 is a diagram showing the passage routes of light in the respective regions of the image display device shown in FIG. 49, and more specifically, (A) is a diagram showing the passage route of light in the ambient light transmission region, and (B) is a diagram showing the passage route of light in the black display region.

FIG. 64 is a diagram showing the configuration an image display device according to a second modification example of the sixth embodiment shown in FIG. 61.

FIG. 65 is a diagram showing the configuration of a liquid crystal display device of the related art provided with a display in which a background is transparently seen from a front surface side.

DESCRIPTION OF EMBODIMENTS

<0. Basic Examination>

Figure 1:
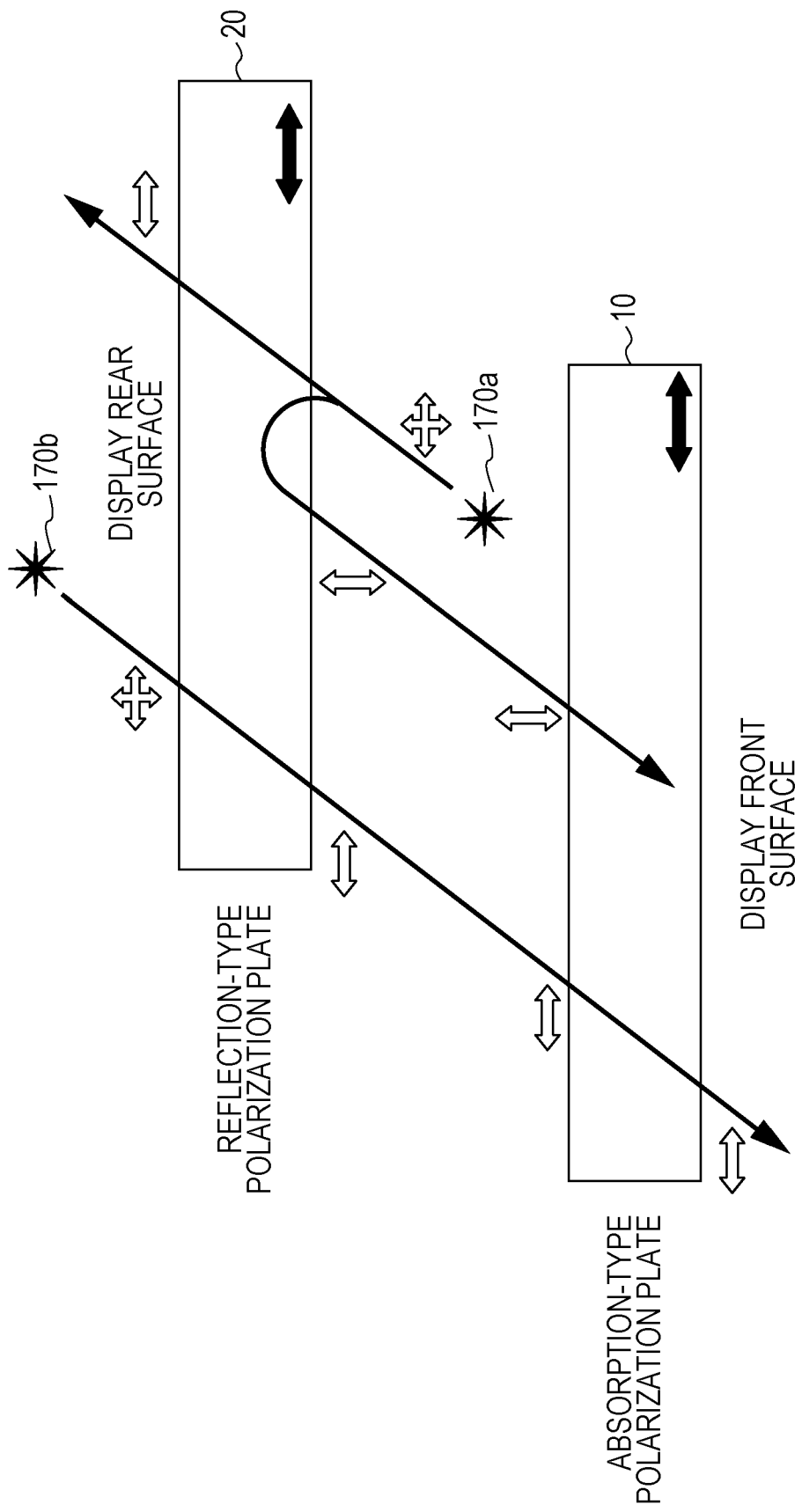
FIG. 1 is a diagram showing a traveling method of linearly polarized light in a case where an absorption-type polarization plate and a reflection-type polarization plate of which transmission axis directions are the same, which are used in a basic examination of the present invention are arranged in parallel.
Figure 2:
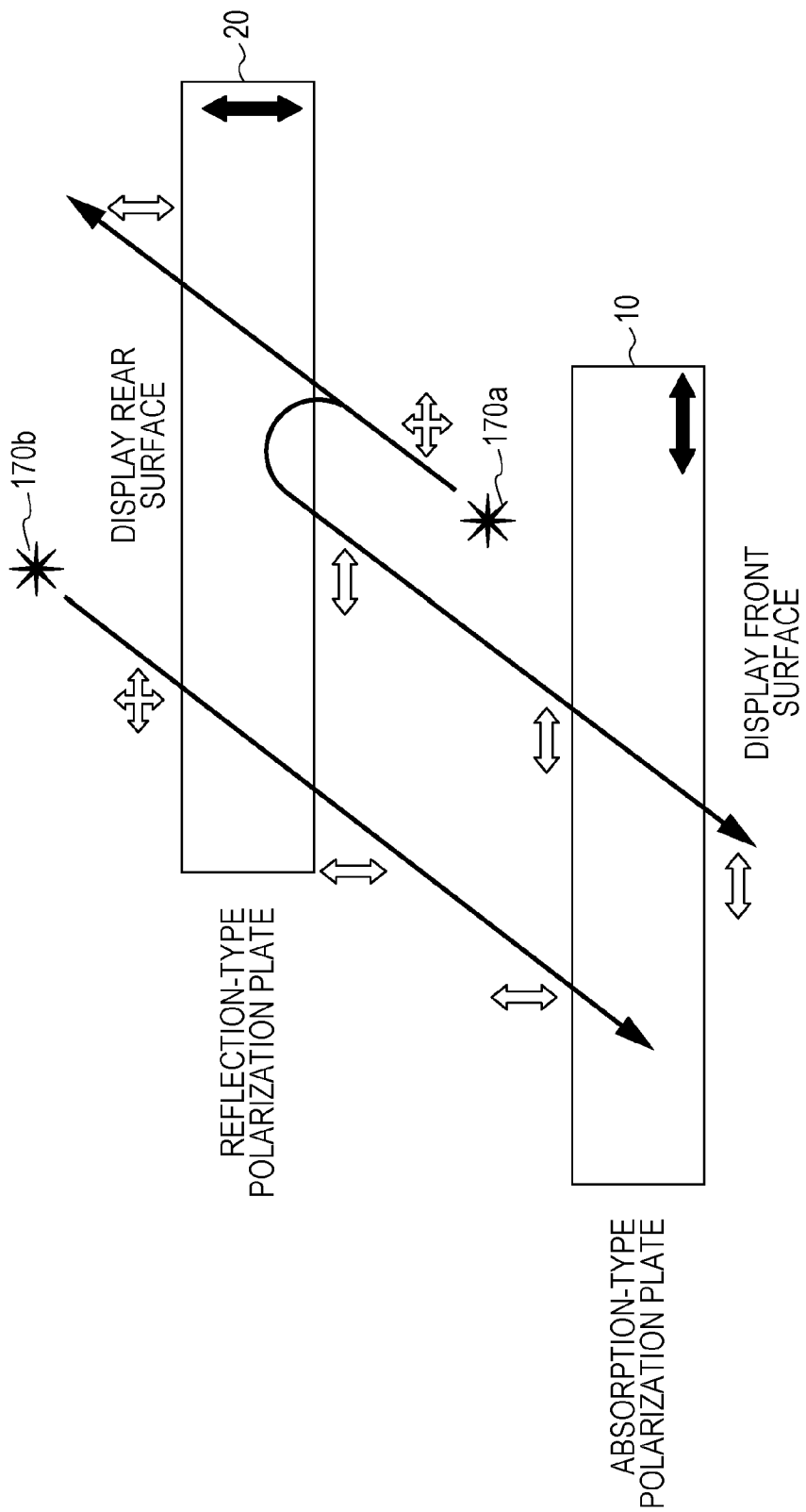
FIG. 2 is a diagram showing a traveling method of the linearly polarized light when the absorption-type polarization plate and the reflection-type polarization plate of which the transmission axis directions are perpendicular to each other, which are used in the basic examination of the present invention are arranged in parallel.

A case where only polarization components of linearly polarized light which have a specific polarization direction are transmitted or are reflected using an absorption-type polarization plate and a reflection-type polarization plate will be examined. FIG. 1 is a diagram showing a traveling method of the linearly polarized light in a case where an absorption-type polarization plate 10 and a reflection-type polarization plate 20 of which transmission axis directions are the same are arranged in parallel. FIG. 2 is a diagram showing a traveling method of the linearly polarized light when the absorption-type polarization plate 10 and the reflection-type polarization plate 20 of which the transmission axis directions are perpendicular to each other are arranged in parallel.

Here, the absorption-type polarization plate 10 has characteristics of transmitting polarization components of the linearly polarized light, which have the same polarization direction as the transmission axis direction, and absorbing polarization components having the same polarization direction as an absorption axis direction. The reflection-type polarization plate 20 has characteristics of transmitting polarization components of the linearly polarized light, which have the same polarization direction as the transmission axis direction, and reflecting polarization components having the same polarization direction as a reflection axis direction. Thus, in the present specifications, as shown in FIGS. 1 and 2, the transmission axis directions of the absorption-type polarization plate 10 and the reflection-type polarization plate 20 are set in a horizontal direction, and the absorption axis direction of the absorption-type polarization plate 10 and the reflection axis direction of the reflection-type polarization plate 20 are set in a vertical direction. Light incident on the polarization plates 10 and 20 is linearly polarized light having polarization components of which polarization directions are perpendicular to each other, and is light emitted from a first light source 170a provided between the absorption-type polarization plate 10 and the reflection-type polarization plate 20 or a second light source 170b provided outside the reflection-type polarization plate 20. In FIGS. 1 and 2, the transmission axis directions of the absorption-type polarization plate 10 and the reflection-type polarization plate 20 are illustrated, but the absorption axis direction and the reflection axis direction are not illustrated.

Initially, the case shown in FIG. 1 will be described. If the linearly polarized light emitted from the first light source 170a is incident on the reflection-type polarization plate 20, the polarization components (the polarization components of which the polarization direction is set in the horizontal direction) having the same polarization direction as the transmission axis direction of the reflection-type polarization plate 20 transmit through the reflection-type polarization plate 20, and escape to the outside. Meanwhile, the polarization components (the polarization components of which the polarization direction is set in the vertical direction) having the same polarization direction as the reflection axis direction are reflected from the reflection-type polarization plate 20 to reverse the traveling direction thereof, are incident on the absorption-type polarization plate 10. Since the polarization direction of the polarization components incident on the absorption-type polarization plate 10 is the same as the absorption axis direction of the absorption-type polarization plate 10, the polarization components are absorbed to the absorption-type polarization plate 10. Thus, the linearly polarized light emitted from the first light source 170a does not transmit through the absorption-type polarization plate 10 toward the front surface side.

If the linearly polarized light emitted from the second light source 170b is incident on the reflection-type polarization plate 20, the polarization components (the polarization components of which the polarization direction is set in the horizontal direction) having the same polarization direction as the transmission axis direction of the reflection-type polarization plate 20 transmit through the reflection-type polarization plate 20, and the polarization components (the polarization components of which the polarization direction is set in the vertical direction) having the same polarization direction as the reflection axis direction are reflected (not shown). Subsequently, the polarization components transmitted through the reflection-type polarization plate 20 are incident on the absorption-type polarization plate 10. Since the polarization direction of the polarization components incident on the absorption-type polarization plate 10 is the same as the transmission axis direction of the absorption-type polarization plate 10, the polarization components transmit toward the front surface side without being absorbed to the absorption-type polarization plate 10.

Hereinafter, the case shown in FIG. 2 will be described. If the linearly polarized light emitted from the first light source 170a is incident on the reflection-type polarization plate 20, the polarization components (the polarization components of which the polarization direction is set in the vertical direction) having the same polarization direction as the transmission axis direction of the reflection-type polarization plate 20 transmit through the reflection-type polarization plate 20, and escape to the outside. Meanwhile, the polarization components (the polarization components of which the polarization direction is set in the horizontal direction) having the same polarization direction as the reflection axis direction are reflected from the reflection-type polarization plate 20 to reverse the traveling direction thereof, and are incident on the absorption-type polarization plate 10. Since the polarization direction of the polarization components incident on the absorption-type polarization plate 10 is the same as the transmission axis direction of the absorption-type polarization plate 10, the polarization components transmit through the absorption-type polarization plate 10 toward the front surface side.

If the linearly polarized light emitted from the second light source 170b is incident on the reflection-type polarization plate 20, the polarization components (the polarization components of which the polarization direction is set in the vertical direction) having the same polarization direction as the transmission axis direction of the reflection-type polarization plate 20 transmit through the reflection-type polarization plate 20. Meanwhile, the polarization components (the polarization components of which the polarization direction is set in the horizontal direction) having the same polarization direction as the reflection axis direction are reflected (not shown). The polarization components transmitted through the reflection-type polarization plate 20 are incident on the absorption-type polarization plate 10. Since the polarization direction of the polarization components incident on the absorption-type polarization plate 10 is the same as the absorption axis direction of the absorption-type polarization plate 10, the polarization components are absorbed to the absorption-type polarization plate 10. Thus, the linearly polarized light emitted from the second light source 170b does not transmit through the absorption-type polarization plate 10 toward the front surface side.

As stated above, by rotating the transmission axis direction of the reflection-type polarization plate 20 by 90°, any one of the light from the first light source 170a and the light from the second light source 170b is selected, and thus, it is possible to transmit the selected light through the absorption-type polarization plate 10 toward the front surface side. The transmission axis direction of the reflection-type polarization plate 20 by 90° means that the reflection-type polarization plate 20 is rotated around a central axis in a longitudinal direction thereof by 90°. Accordingly, both the transmission axis direction and the reflection axis direction of the reflection-type polarization plate 20 are rotated by 90°.

In the above description, the first light source 170*a* is a light source assumed as a backlight of an image display device, to be described below, and the second light source 170*b* is assumed as light (hereinafter, referred to as "ambient light") that expresses a background of the image display device of an image apparatus. From the examined result, by rotating the transmission axis direction of the reflection-type polarization plate 20 by 90°, it is possible to transmit the light emitted from the first light source 170*a* or the light emitted from the second light source 170*b* toward the front surface side of the absorption-type polarization plate 10.

However, instead of rotating the transmission axis direction of the reflection-type polarization plate 20 by 90°, a liquid crystal panel may be used, and the polarization direction of the linearly polarized light transmitting through a liquid crystal panel may be rotated by 90°. As mentioned above, if the liquid crystal panel is used, it is possible to easily rotate the polarization direction of the linearly polarized light by 90°, and by further rotating the polarization direction for each pixel of the liquid crystal panel, it is possible to transmit backlight light or ambient light toward the front surface side of the absorption-type polarization plate 10 for each pixel. In addition to rotating the polarization direction of the linearly polarized light from one polarization direction (for example, the horizontal direction) to the other polarization direction (for example, the vertical direction) by 90°, it is possible to cause the liquid crystal panel to be in a translucent polarization state (hereinafter, referred to as an "intermediate state") including the backlight light and the ambient light at a predetermined ratio (for example, 30% vs. 70%) determined for each pixel. Accordingly, in the intermediate state, since the backlight light and the ambient light transmit through each pixel of the liquid crystal panel, as light obtained by mixing the backlight light with the ambient light at the predetermined ratio, an observer positioned on the front surface side of the absorption-type polarization plate 10 can visually perceive that an image in which gradations are displayed is superimposed on a transparently seen background.

Thus, by rotating the polarization direction of the linearly polarized light by using the liquid crystal panel, the respective embodiments of the image display device capable of displaying an image corresponding to an image signal, transparently displaying a background (a rear surface side of the image display device) so as to be seen through, or displaying the image so as to be superimposed on the background will be described below.

<1. Basic Configuration of Present Invention>

Prior to the description of the respective embodiments of the present invention, the basic configuration of the present invention will be described.

<1.1 Operation Principle>

Figure 3:
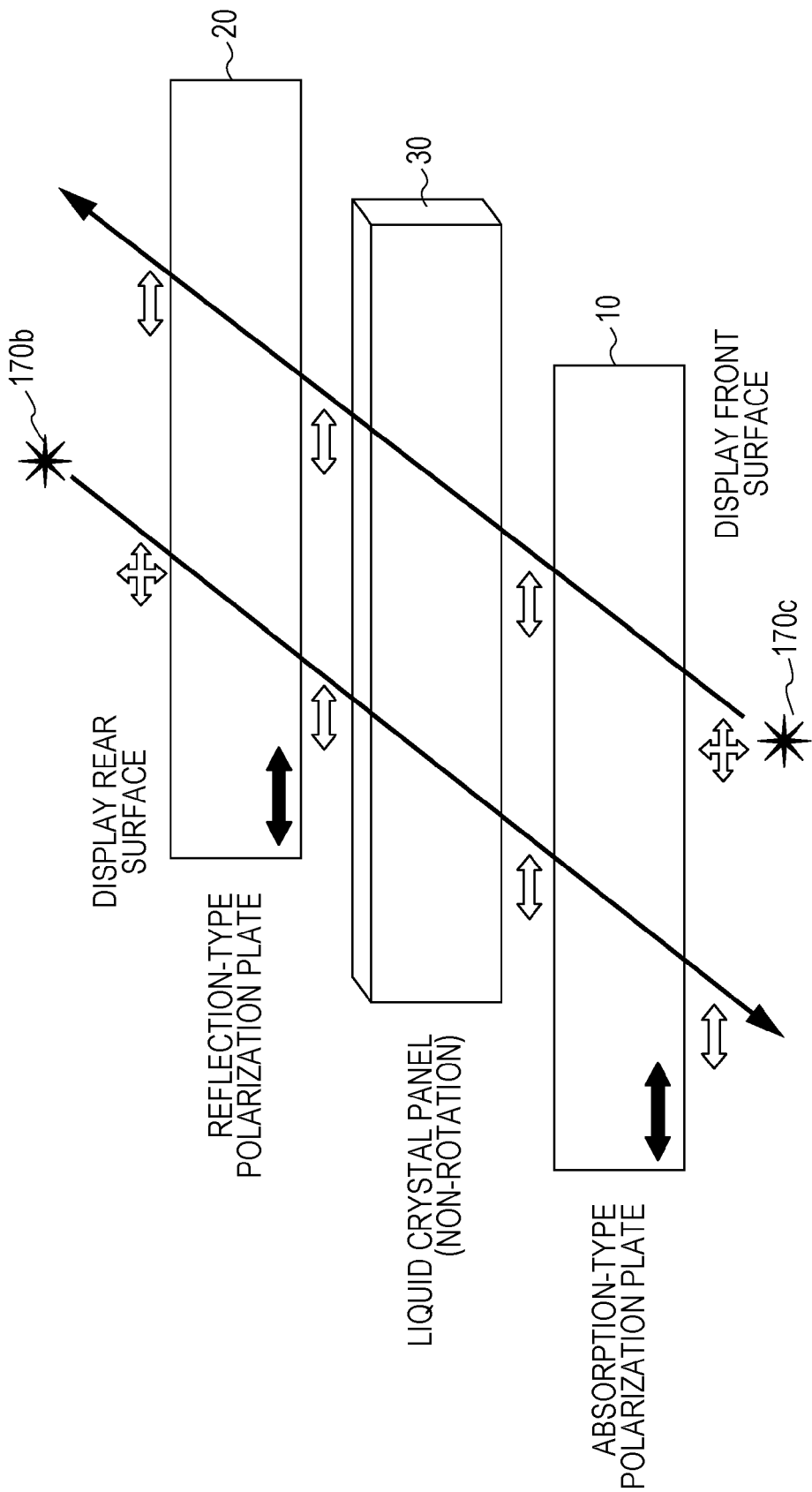
FIG. 3 is a diagram showing a traveling method of the linearly polarized light in a case where a liquid crystal panel fixed in a state in which the polarization direction of transmission light is not rotated is disposed between the absorption-type polarization plate and the reflection-type polarization plate in an image display device which is a basic configuration of the present invention.
Figure 4:
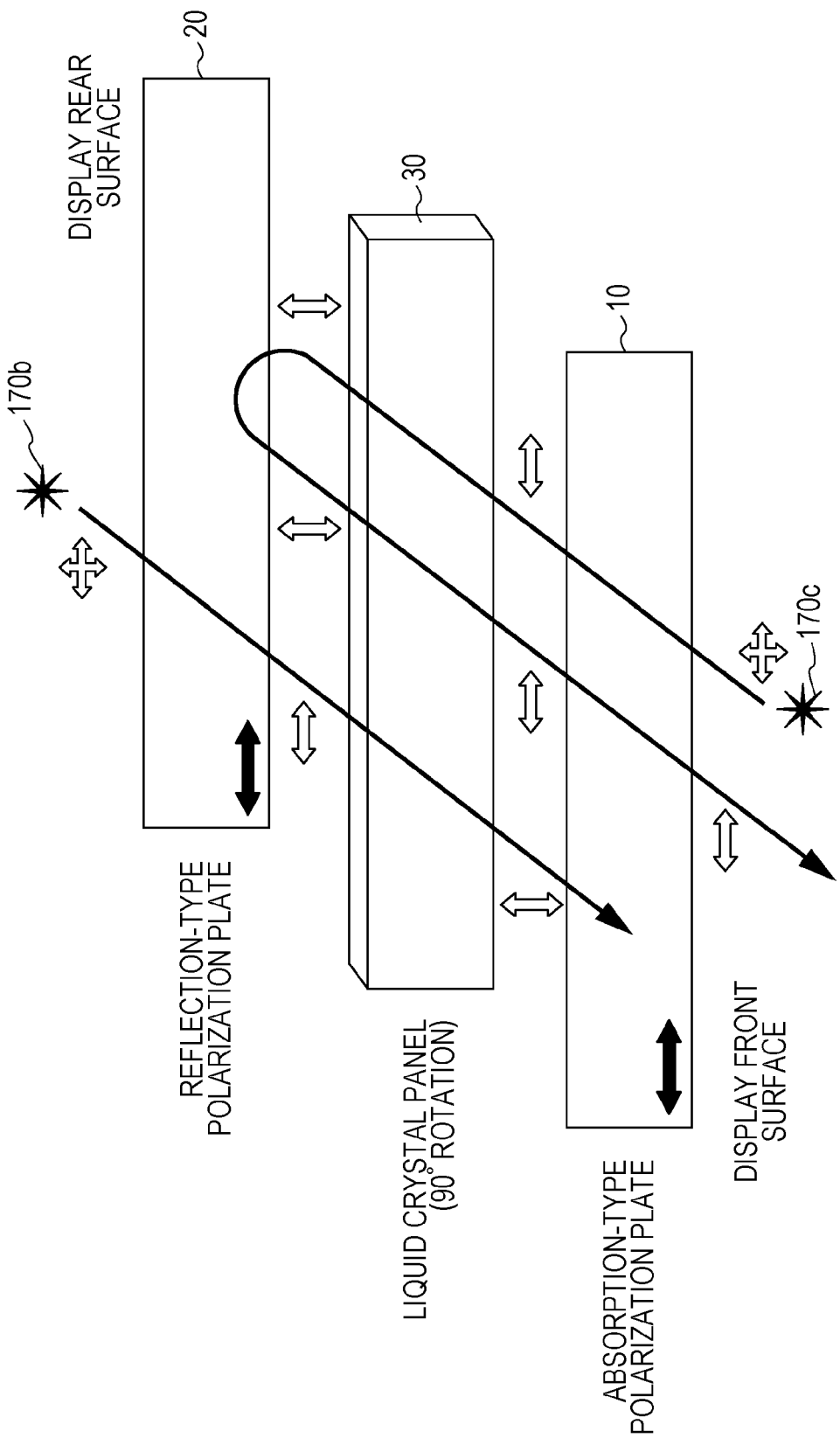
FIG. 4 is a diagram showing a traveling method of the linearly polarized light in a case where the liquid crystal panel fixed in a state in which the polarization direction of the transmission light is rotated is disposed between the absorption-type polarization plate and the reflection-type polarization plate in the image display device which is the basic configuration of the present invention.

In the image display device in which the light source applies the backlight light is not provided, a traveling method of light incident from the absorption-type polarization plate and light incident from the reflection-type polarization plate will be examined. FIG. 3 is a diagram showing a traveling method of the linearly polarized light in a case where a liquid crystal panel 30 fixed in a state in which the polarization direction of transmission light is not rotated is disposed between the absorption-type polarization plate 10 and the reflection-type polarization plate 20. FIG. 4 is a diagram showing a traveling method of the linearly polarized light in a case where the liquid crystal panel 30 fixed in a state in which the polarization direction of the transmission light is rotated is disposed between the absorption-type polarization plate 10 and the reflection-type polarization plate 20.

Unlike FIGS. 1 and 2 used in the basic examination, in FIGS. 3 and 4, the linearly polarized light incident on the absorption-type polarization plate 10 or the reflection-type polarization plate 20 transmit through the liquid crystal panel 30 provided between the absorption-type polarization plate 10 and the reflection-type polarization plate 20, and thus, the polarization direction thereof is rotated. In FIGS. 3 and 4, since the light source is not provided between the absorption-type polarization plate 10 and the reflection-type polarization plate 20, the incident light is only the linearly polarized light incident from the front surface side of the absorption-type polarization plate 10 or the rear surface side of the reflection-type polarization plate 20. In FIGS. 3 and 4, only the transmission axes of the absorption-type polarization plate 10 and the reflection-type polarization plate 20 are illustrated.

Initially, as shown in FIG. 3, if linearly polarized light emitted from a third light source 170*c* provided on the front surface side of the absorption-type polarization plate 10 is incident on the absorption-type polarization plate 10 from the front surface side, the polarization components (the polarization components of which the polarization direction is set in the horizontal direction) having the same polarization direction as the transmission axis direction of the absorption-type polarization plate 10 transmit through the absorption-type polarization plate 10, and are incident on the liquid crystal panel 30. Since the liquid crystal panel 30 is set so as not to rotate the polarization direction of the incident polarization components, the polarization components transmit through the liquid crystal panel 30, and are incident on the reflection-type polarization plate 20 without the rotation of the polarization direction. Since the polarization direction of the polarization components incident on the reflection-type polarization plate 20 is the same as the transmission axis direction of the reflection-type polarization plate 20, the polarization components (the polarization components of which the polarization direction is set in the horizontal direction) incident on the reflection-type polarization plate 20 escape to the outside without being absorbed to the reflection-type polarization plate 20.

Meanwhile, if the linearly polarized light emitted from the second light source 170*b* is incident on the reflection-type polarization plate 20 from the rear surface side, the polarization components having the same polarization direction as the transmission axis direction of the reflection-type polarization plate 20 transmit through the reflection-type polarization plate 20, and are incident on the liquid crystal panel 30. However, the polarization components having the same polarization direction as the reflection axis direction are reflected to the rear surface side by the reflection-type polarization plate 20 (not shown). Since the liquid crystal panel 30 is set so as not to rotate the polarization direction of the incident polarization components, the polarization components transmit through the liquid crystal panel 30, and are incident on the absorption-type polarization plate 10 without the rotation of the polarization direction. Since the polarization direction of the polarization components incident on the absorption-type polarization plate 10 is the same as the transmission axis direction of the absorption-type polarization plate 10, the polarization components (the polarization components of which the polarization direction is set in the horizontal direction) transmit toward the front surface side without being absorbed to absorption-type polarization plate 10.

Subsequently, as shown in FIG. 4, if the linearly polarized light emitted from the third light source 170c is incident on the absorption-type polarization plate 10 from the front surface side, the polarization components (the polarization components of which the polarization direction is set in the horizontal direction) having the same polarization direction as the transmission axis direction of the absorption-type polarization plate 10 transmit through the absorption-type polarization plate 10, and are incident on the liquid crystal panel 30. Since the liquid crystal panel 30 is set so as to rotate the polarization direction of the incident polarization components by 90°, the polarization components transmit through the liquid crystal panel 30 by rotating the polarization direction by 90°, and are incident on the reflection-type polarization plate 20. Since the polarization direction of the polarization components incident on the reflection-type polarization plate 20 is the same as the reflection axis direction of the reflection-type polarization plate 20, the polarization components (the polarization components of which the polarization direction is set in the vertical direction) incident on the reflection-type polarization plate 20 are reflected from the reflection-type polarization plate 20, and are incident on the liquid crystal panel 30 again. The polarization components incident on the liquid crystal panel 30 transmit through the liquid crystal panel 30 by rotating the polarization direction by 90°, and are incident on the absorption-type polarization plate 10. Since the polarization direction of the polarization components incident on the absorption-type polarization plate 10 is the same as the transmission axis direction of the absorption-type polarization plate 10, the polarization components (the polarization components of which the polarization direction is set in the horizontal direction) transmit toward the front surface side without being absorbed to the absorption-type polarization plate 10.

Meanwhile, if the linearly polarized light emitted from the second light source 170b is incident on the reflection-type polarization plate 20 from the rear surface side, the polarization components having the same polarization direction as the transmission axis direction of the reflection-type polarization plate 20 transmit through the reflection-type polarization plate 20, and are incident on the liquid crystal panel 30, and the polarization components having the same polarization direction as the reflection axis direction are reflected to the rear surface side by the reflection-type polarization plate 20 (not shown). Since the liquid crystal panel 30 is set so as not to rotate the polarization direction of the incident polarization components by 90°, the polarization components incident on the liquid crystal panel 30 transmit through the liquid crystal panel 30 by rotating the polarization direction by 90°, and are incident on the absorption-type polarization plate 10. Since the polarization direction of the polarization components incident on the absorption-type polarization plate 10 is the same as the absorption axis direction of the absorption-type polarization plate 10, the polarization components (the polarization components of which the polarization direction is set in the vertical direction) are absorbed to the absorption-type polarization plate 10, and do not transmit toward the front surface side.

As discussed above, in a case where the liquid crystal panel 30 does not rotate the polarization direction of the light, both the polarization components of the linearly polarized light incident on the absorption-type polarization plate 10 from the front surface side do not return to the front surface side. One polarization component of the polarization components included in the linearly polarized light incident from the rear surface side transmits toward the front surface side of the absorption-type polarization plate 10. Accordingly, when viewed from the front surface side of the absorption-type polarization plate 10, the liquid crystal panel is in a transparent state, and the background of the reflection-type polarization plate 20 is seen. Meanwhile, in a case where the liquid crystal panel 30 rotates the polarization direction of the linearly polarized light by 90°, one polarization component of the polarization components included in the light incident on the absorption-type polarization plate 10 from the front surface side returns to the front surface side of the absorption-type polarization plate 10. The light incident on the reflection-type polarization plate 20 from the rear surface side is absorbed to the absorption-type polarization plate 10, and does not transmit to the front surface side. Accordingly, the front surface side of the absorption-type polarization plate 10 is in a mirror state, and becomes a mirror that reflects scenery in front of the absorption-type polarization plate 10.

It has been described in the above description that the liquid crystal panel 30 is set so as to rotate the polarization direction of the light by 90° or so as not to rotate the polarization direction of the light at all. However, the liquid crystal panel 30 may be set in an intermediate state in which the polarization direction of the linearly polarized light is rotated by an arbitrary angle in a range of 0° to 90°. For example, in the intermediate state, gradations are displayed by setting the transparent state to be 30% and the mirror state to be 70% for each pixel, and thus, it is possible to transparently display the background in the mirror at a luminance which is 30% of the original luminance.

In the respective embodiments to be described below, a case where the liquid crystal panel is set so as to rotate the polarization direction of the light by 90° or so as not to rotate the polarization direction of the light at all will be described unless the context clearly indicates otherwise. However, the liquid crystal panel may be set in the intermediate state in which the polarization direction of the linearly polarized light is rotated by the arbitrary angle in the range of 0° to 90°.

<1.2 Configuration of Image Display Device>

Figure 5:
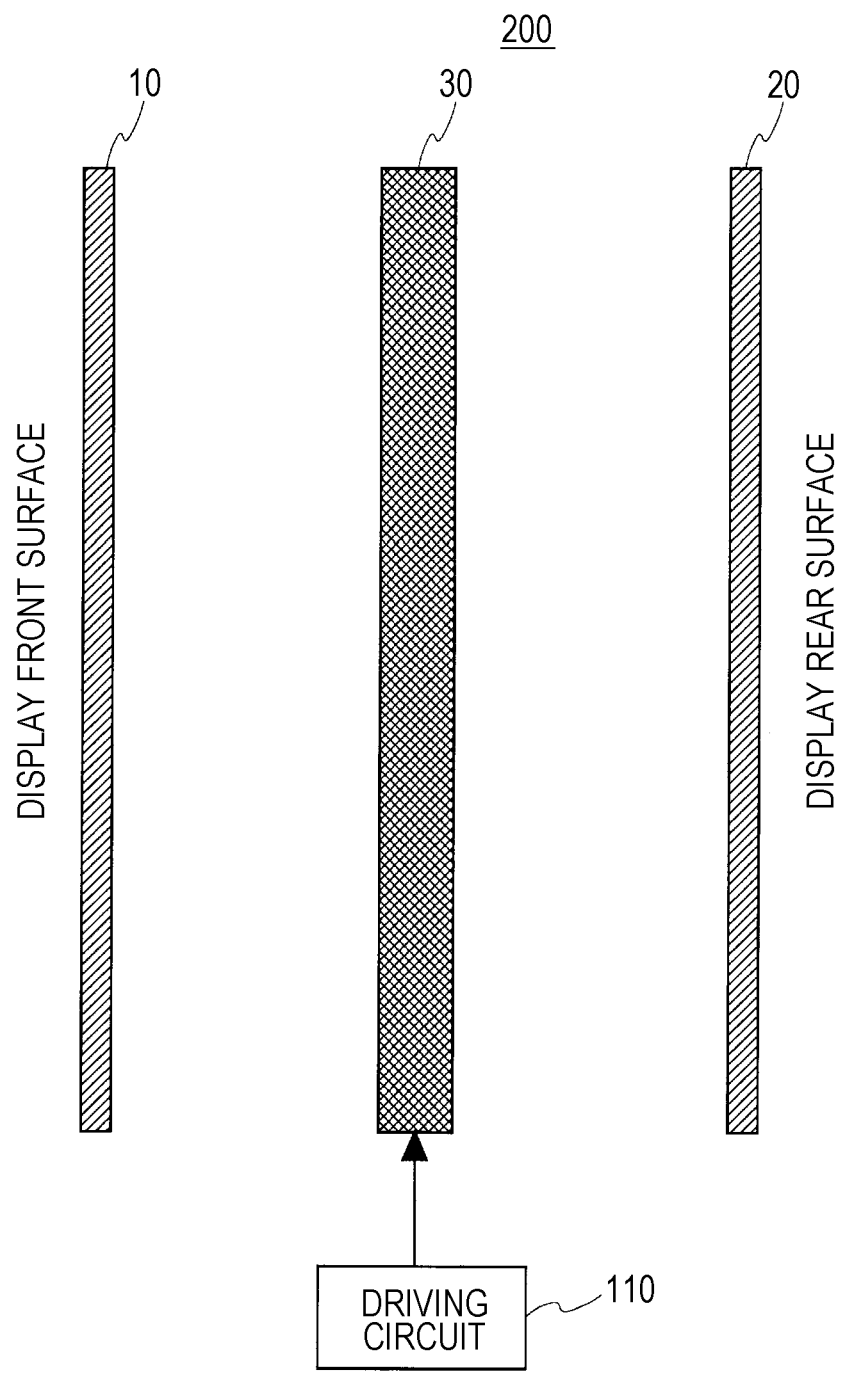
FIG. 5 is a diagram showing the configuration of the image display device which is the basic configuration of the present invention.

FIG. 5 is a diagram showing the configuration of an image display device 200 which is the basic configuration of the present invention. As shown in FIG. 5, in the image display device 200, an absorption-type polarization plate 10 for controlling polarization rotation, a liquid crystal panel 30 for controlling polarization rotation, and a reflection-type polarization plate 20 are sequentially arranged so as to be parallel to one another. A driving circuit 110 for displaying an image by driving the liquid crystal panel 30 for controlling polarization rotation in response to an image signal applied from the outside is connected to the liquid crystal panel 30 for controlling polarization rotation. However, a light source for irradiating backlight light to the liquid crystal panel 30 for controlling polarization rotation is not provided in the image display device 200.

As described in the operation principle, in the image display device 200, the polarization direction of the linearly polarized light is not rotated, is rotated by 90°, or is rotated by a predetermined angle in a range of 0° to 90° by controlling the respective pixels of the liquid crystal panel 30 for controlling polarization rotation. Accordingly, the respective pixels are in the transparent state in which the background is transparently seen, are in the mirror state like a mirror, or are in a state in which the background is transparently seen in the mirror.

<1.3 Driving Circuit>

Figure 6:
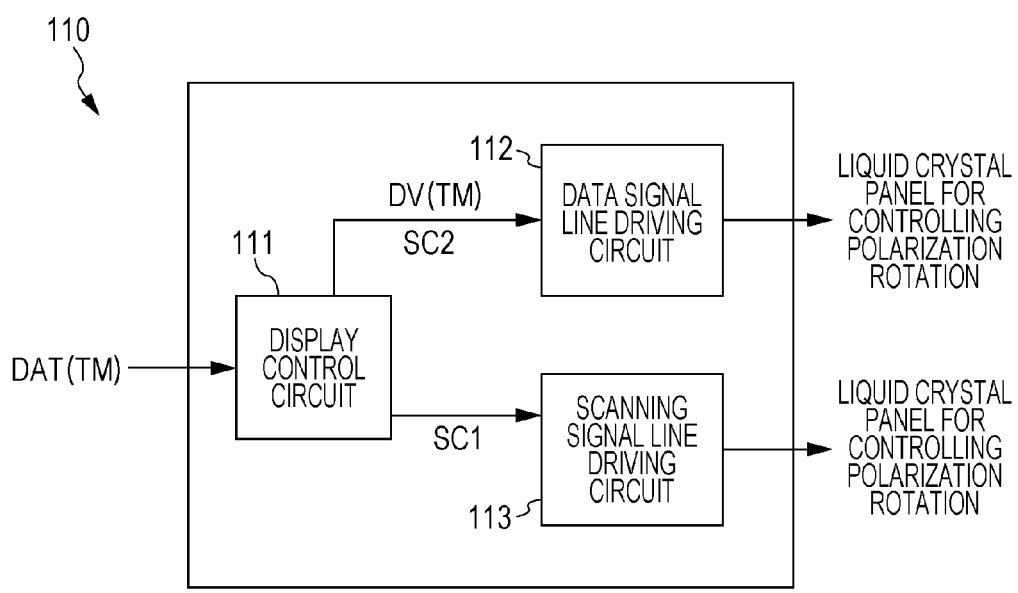
FIG. 6 is a block diagram showing the configuration of driving circuit that drives the liquid crystal panel included in the image display device shown in FIG. 5.

FIG. 6 is a block diagram showing the configuration of a driving circuit 110 that drives the liquid crystal panel 30 for controlling polarization rotation in the image display device 200. The driving circuit 110 includes a display control circuit 111, a data signal line driving circuit 112, and a scanning signal line driving circuit 113. An image signal DAT including transparent/mirror pixel information TM which switches between the transparent state and the mirror state for each pixel is applied to the display control circuit 111 from the outside. The display control circuit 111 generates control signals SC1 and SC2 which respectively control operation timings of the scanning signal line driving circuit 113 and the data signal line driving circuit 112 and a pixel information signal DV including the transparent/mirror pixel information TM, outputs the control signal SC1 to the scanning signal line driving circuit 113, and outputs the control signal SC2 and the pixel information signal DV to the data signal line driving circuit 112. The transparent/mirror pixel information TM includes information for setting a transmission ratio of ambient light to for each pixel in addition to information for switching between the transparent state in which the ambient light transmits and the mirror state in which the ambient light is reflected for each pixel. The control signals SC1 and SC2 are timing control signals such as a start pulse or a clock signal.

The scanning signal line driving circuit 113 sequentially selects a plurality of scanning signal lines (not shown) formed in the liquid crystal panel 30 for controlling polarization rotation one by one, based on the control signal SC1. Accordingly, a plurality of pixels (not shown) connected to the selected scanning signal line is simultaneously selected. The data signal line driving circuit 112 applies a signal voltage corresponding to the pixel information signal DV to a plurality of data signal lines (not shown), based on the control signal SC2. Accordingly, the pixel information signal DV including the transparent/mirror pixel information TM is written in a plurality of pixels connected to the selected scanning signal line at a predetermined frame rate, and the respective pixels are in the transparent state in which the ambient light transmits or the mirror state in which the ambient light is reflected, based on the transparent/mirror pixel information TM. The pixels in the mirror state become a mirror. Since the pixels in the transparent state transmit the ambient light, a viewer positioned close to the front surface side of the display can visually perceive the background as being transparent. The transmission ratio of the ambient light in the pixels in the mirror state is adjusted for each pixel, and thus, a mirror display in which the background is displayed in the mirror can be realized using the transparent/mirror pixel information TM.

<1.4 Application Example>

The image display device 200 is provided at a window such that the front surface side of the display faces the inside of a room, and if the image display device 200 is viewed from the inside of the room, it is possible to visually perceive that the window becomes a mirror. The mirror is formed in a desired shape and the surrounding region becomes a transparent region by controlling the liquid crystal panel 30 for controlling polarization rotation, and thus, it is possible to enjoy outside scenery through the transparent region. By displaying the gradations of pixels at a boundary between the mirror and the transparent region, it is possible to blur the contour of the mirror, and thus, it is possible to seem as though the mirror floats. By controlling the respective pixels within the display, it is possible to display characters on the window or display a monochrome image.

Since one polarization component of the polarization components of the linearly polarized light incident from the rear surface side of the display is reflected from the reflection-type polarization plate 20 and the other polarization component is absorbed to the absorption-type polarization plate 10 for controlling polarization rotation, the linearly polarized light incident from the rear surface side does not transmit to the front surface side (see FIG. 4). Meanwhile, one polarization component of the polarization components of the linearly polarized light incident on the absorption-type polarization plate 10 for controlling polarization rotation from the front surface side of the display is reflected from the reflection-type polarization plate 20, and returns to the front surface side of the display again (see FIG. 4). In this case, since the display becomes a mirror even though the display is viewed from any side, a person positioned on one side does not recognize a state of the other side. Thus, by using such an image display device 200, it is possible to protect the privacy of the persons on the respective sides.

<1.5 Effect>

According to the basic configuration of the present invention, if the image display device 200 is viewed from the front surface side, the background is transparently seen for each pixel, the image display device becomes a mirror, or the background is transparently seen in the mirror. Meanwhile if the image display device 200 is viewed from the rear surface side, pixels through which the light incident from the front surface side transmits become a half mirror in which the circumstances of the front surface side are transparently seen in the mirror, and pixels through which the light incident front surface side does not transmit become a mirror. Since it is not necessary to attach the image display device 200 to a case filled with light, the image display device is used without limitation of use. Since a liquid crystal panel used in a liquid crystal display device can be used as the liquid crystal panel 30 for controlling polarization rotation, the image display device 200 has high spatial resolution.

2. First Embodiment

<2.1 Configuration and Operation of Image Display Device>

Figure 7:
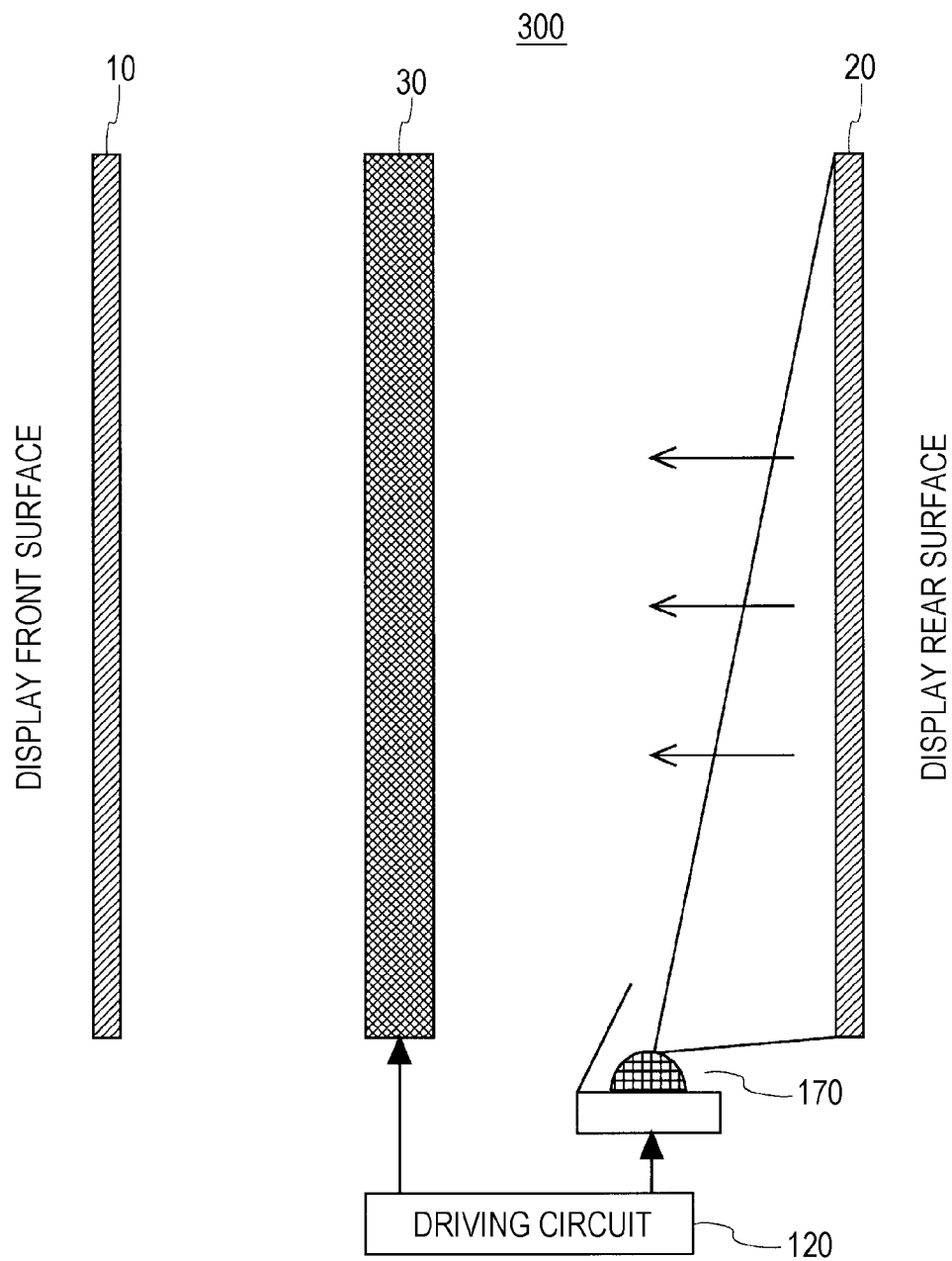
FIG. 7 is a diagram showing the configuration of an image display device according to a first embodiment of the present invention.

FIG. 7 is a diagram showing the configuration of an image display device 300 according to a first embodiment of the present invention. As shown in FIG. 7, in the image display device 300, an absorption-type polarization plate 10 for controlling polarization rotation, a liquid crystal panel 30 for controlling polarization rotation, and a reflection-type polarization plate 20 are sequentially arranged so as to be parallel to one another. A light source 170 that applies light as backlight light to the entire surface of the reflection-type polarization plate 20 is disposed near a space interposed between the liquid crystal panel 30 for controlling polarization rotation and the reflection-type polarization plate 20. A driving circuit 120 that drives the liquid crystal panel 30 for controlling polarization rotation and the light source 170 is connected to the liquid crystal panel and the light source. As will be described below, the driving circuit 120 displays an image by turning on the light source 170 based on an image signal applied from the outside and driving the liquid crystal panel 30 for controlling polarization rotation to control the polarization direction.

Light emitted from the light source 170 is irradiated to the reflection-type polarization plate 20. The polarization components of the light irradiated to the reflection-type polarization plate 20 which have the same polarization direction as the reflection axis direction of the reflection-type polarization plate 20 are reflected, and are incident on the liquid crystal panel 30 for controlling polarization rotation, as backlight light. Meanwhile, the polarization components having the same polarization direction as the transmission axis direction of the reflection-type polarization plate 20 transmit through the reflection-type polarization plate 20, and escape to the outside. As described above, the polarization components of the light emitted from the light source 170 which are reflected from the reflection-type polarization plate 20 become backlight light.

If ambient light is incident on the reflection-type polarization plate 20 from the rear surface side of the display, the polarization components of the ambient light having the same polarization direction as the transmission axis direction of the reflection-type polarization plate 20 transmit through the reflection-type polarization plate 20, and the polarization components having the same polarization direction as the reflection axis direction are reflected from the reflection-type polarization plate 20.

Accordingly, the polarization components incident on the liquid crystal panel 30 for controlling polarization rotation are polarization components which are incident as the backlight light, are incident together with the polarization components having the same polarization direction as the reflection axis direction of the reflection-type polarization plate 20, as the ambient light, and have the same polarization direction as the transmission axis direction of the reflection-type polarization plate 20. Since the transmission axis direction and the reflection axis direction of the reflection-type polarization plate 20 are perpendicular to each other, the polarization direction of the backlight light incident on the liquid crystal panel 30 for controlling polarization rotation and the polarization direction of the ambient light are perpendicular to each other.

In the liquid crystal panel 30 for controlling polarization rotation, a driving signal voltage generated by the data signal line driving circuit 112 of the driving circuit 120 is written in each pixel, based on the image signal applied from the outside, and the rotation direction of liquid crystal molecules is rotated for each pixel depending on the driving signal voltage. If the polarization components of the light which have a specific polarization direction are incident on such pixels, the liquid crystal panel 30 for controlling polarization rotation rotates the polarization direction of the polarization components of the incident light depending on the arrangement of the liquid crystal molecules, and emits the light.

For example, in a case where the backlight light transmits to the front surface side of the display, it is necessary to adjust the polarization direction of the backlight light emitted from the absorption-type polarization plate 10 for controlling polarization rotation so as to be the same as the transmission axis direction of the absorption-type polarization plate 10 for controlling polarization rotation. Thus, the liquid crystal panel 30 for controlling polarization rotation rotates the polarization direction of the backlight light which is reflected from the reflection-type polarization plate 20 and is incident. Similarly, in order for the background to be transparently seen, since the polarization direction of the ambient light is the same as the transmission axis direction of the absorption-type polarization plate 10 for controlling polarization rotation, the liquid crystal panel 30 for controlling polarization rotation does not rotate the polarization direction of the ambient light.

Figure 8:
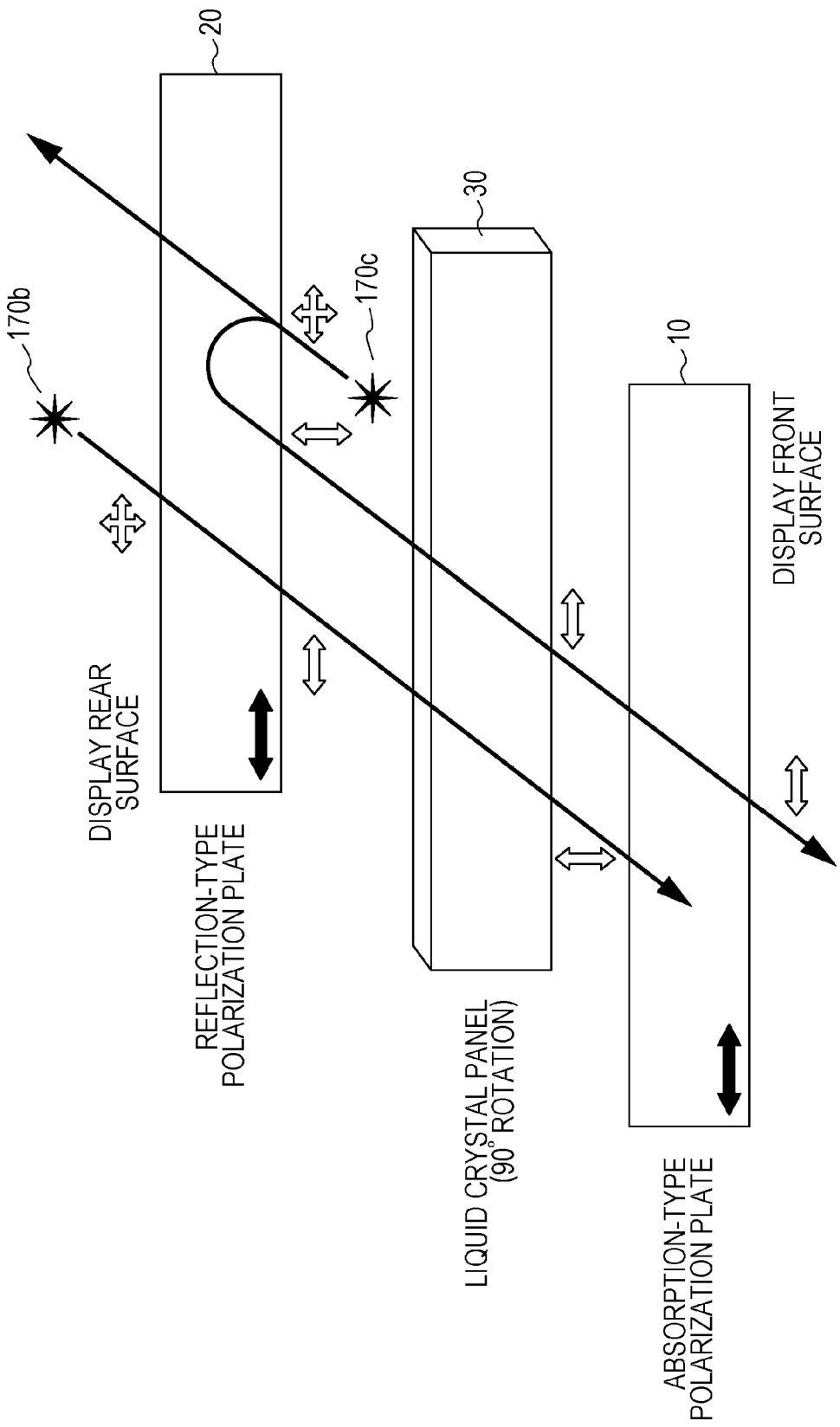
FIG. 8 is a diagram showing the polarization directions of the light beams at the time of the extraction of backlight light to the front surface side of the display in a case where the transmission axis direction of the reflection-type polarization plate and the transmission axis direction of the absorption-type polarization plate are the same in the image display device shown in FIG. 7.
Figure 9:
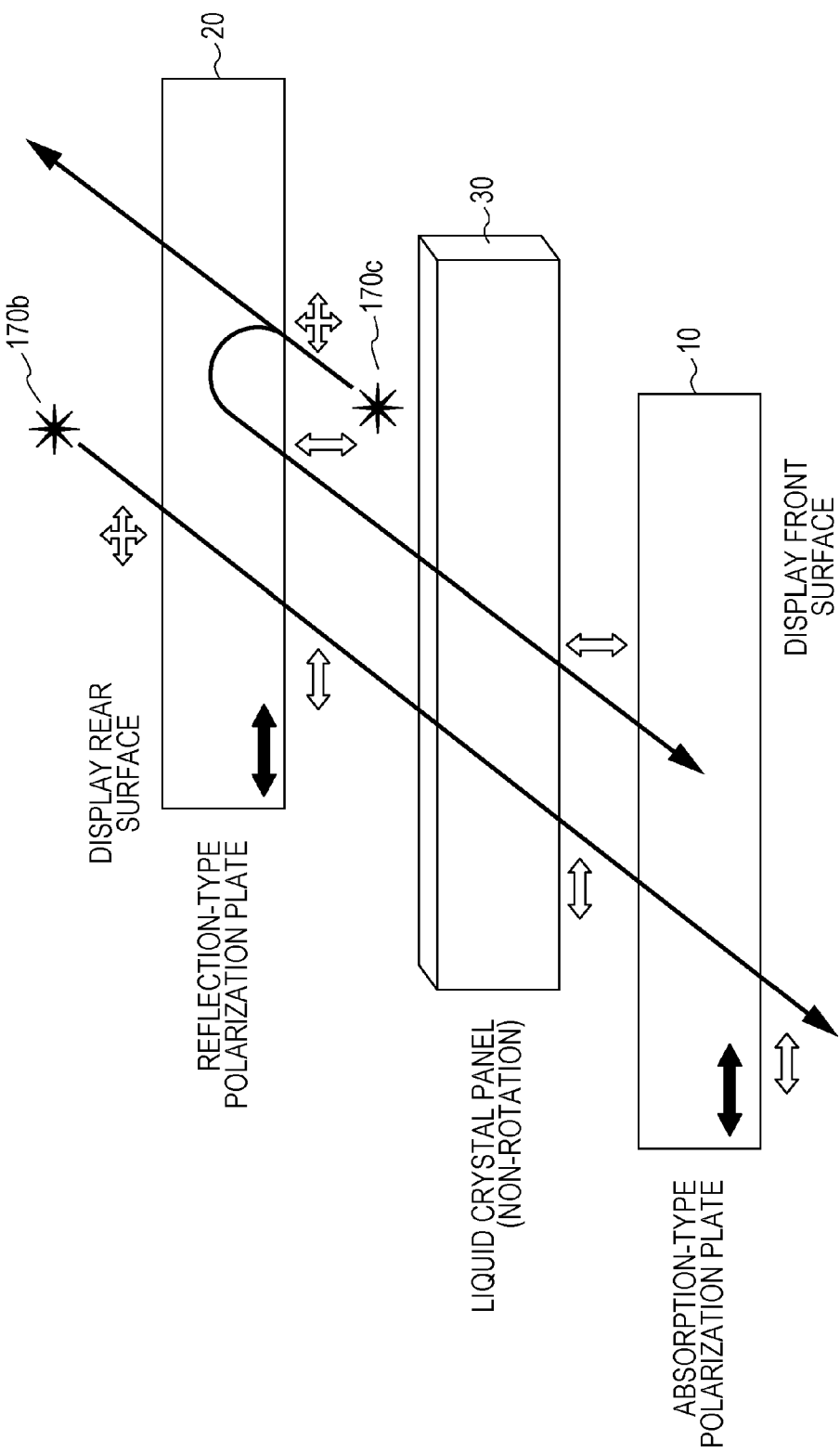
FIG. 9 is a diagram showing the polarization directions of the light beams at the time of the extraction of ambient light to the front surface side of the display in the case where the transmission axis direction of the reflection-type polarization plate and the transmission axis direction of the absorption-type polarization plate are the same in the image display device shown in FIG. 7.

Whether or not to rotate the polarization directions of the backlight light and the ambient light is determined by the transmission axis direction of the reflection-type polarization plate 20, the transmission axis direction of the absorption-type polarization plate 10 for controlling polarization rotation, and the rotation of the polarization direction due to the liquid crystal panel 30 for controlling polarization rotation. A case where the backlight light transmits to the front surface side of the display and the ambient light is blocked will be described with reference to FIGS. 8 and 9. In the description of FIGS. 8 and 9, the absorption-type polarization plate 10 for controlling polarization rotation will be described as the absorption-type polarization plate 10, and the liquid crystal panel 30 for controlling polarization rotation will be described as the liquid crystal panel 30.

FIG. 8 is a diagram showing the polarization directions of the light beams at the time of the extraction of the backlight light to the front surface side of the display in a case where the transmission axis direction of the reflection-type polarization plate 20 and the transmission axis direction of the absorption-type polarization plate 10 are the same. As shown in FIG. 8, in the case where the transmission axis direction of the reflection-type polarization plate 20 and the transmission axis direction of the absorption-type polarization plate 10 are the same, the liquid crystal panel 30 causes the backlight light and the ambient light to be incident on the absorption-type polarization plate 10 by rotating the polarization directions thereof by 90°. Accordingly, the backlight light transmits through the absorption-type polarization plate 10, and the ambient light is absorbed to the absorption-type polarization plate 10. In a case where the transmission axis direction of the reflection-type polarization plate 20 and the transmission axis direction of the absorption-type polarization plate 10 are perpendicular to each other (not shown), the liquid crystal panel 30 causes the backlight light and the ambient light to be incident on the absorption-type polarization plate 10 without rotating the polarization directions thereof.

A case where the ambient light transmits to the front surface side of the display and the backlight light is blocked will be described. FIG. 9 is a diagram showing the polarization directions of the light beams at the time of the extraction of the ambient light to the front surface side of the display in the case where the transmission axis direction of the reflection-type polarization plate 20 and the transmission axis direction of the absorption-type polarization plate 10 are the same. As shown in FIG. 9, in the case where the transmission axis direction of the reflection-type polarization plate 20 and the transmission axis direction of the absorption-type polarization plate 10 are the same, the liquid crystal panel 30 causes the backlight light and the ambient light to be incident on the absorption-type polarization plate 10 without rotating the polarization directions thereof. Accordingly, the backlight light is absorbed to the absorption-type polarization plate 10, and the ambient light transmits through the absorption-type polarization plate 10. In the case where the transmission axis direction of the reflection-type polarization plate 20 and the transmission axis direction of the absorption-type polarization plate 10 are perpendicular to each other (not shown), the liquid crystal panel 30 causes the backlight light and the ambient light to be incident on the absorption-type polarization plate 10 by rotating the polarization directions thereof by 90°.

As stated above, if the liquid crystal panel 30 is disposed between the absorption-type polarization plate 10 and the reflection-type polarization plate 20, since the arrangement of the liquid crystal molecules can be changed for each pixel, it is possible to rotate the polarization direction of the backlight light or the ambient light for each pixel. As a result, an image corresponding to an image signal is displayed on pixels through which the backlight light transmits, and a background is transparently displayed on pixels through which the ambient light transmits. Since at least any one of the backlight light and the ambient light transmits through the pixels of the liquid crystal panel 30, in the image display device 300, the pixels are not displayed in black even in a case where the light source 170 is turned off.

It has been described in the above description that any one of the backlight light and the ambient light transmits to the front surface side. However, since the liquid crystal panel 30 for controlling polarization rotation can display the gradations of the image, by causing the backlight light and the ambient light to transmit at a predetermined ratio (for example, the backlight light vs. the ambient light is 30% vs. 70%) without causing only one of the backlight light and the ambient light to transmit through the absorption-type polarization plate 10 for controlling polarization rotation, it is possible to cause the liquid crystal panel to be in an intermediate state in which the image in which the gradations are displayed is superimposed on the pixels through the background is transparently seen. In the intermediate state, the rotation angle of the polarization direction rotated by the liquid crystal panel 30 for controlling polarization rotation may be set to be not 90° but a predetermined angle determined by a ratio of the image and the background to be displayed.

The image display device 300 may display a color image. The color image may be displayed by dividing each pixel of the liquid crystal panel 30 for controlling polarization rotation into three sub-pixels and forming red, green and blue color filters on the sub-pixels, or the color image may be displayed by a field sequential driving type of sequentially applying red, green and blue image signals to the pixels, synchronizing these image signals with one another, performing time division on red, green and blue backlight light beams, and sequentially irradiating these light beams. Since such methods are well-known technologies, the detailed description thereof will be omitted. The image display devices, to be described below, may also display the color image in the field sequential driving type or a color filter driving type.

Hereinafter, the constituent members constituting the image display device 300 will be described. Preferably, concave and convex portions to some extent to which transparency is not degraded are formed on the surface of the reflection-type polarization plate 20. Thus, the reflection-type polarization plate 20 efficiently reflects the light emitted from the light source 170, and thus, it is possible to increase the extraction efficiency of the backlight light. Preferably, the concave and convex portions to some extent to which transparency is not degraded refer to concave and convex portions formed at intervals of 100 μm or less. It is preferable that the concave and convex portions to some extent to which transparency is not degraded are formed in the reflection-type polarization plates of all the image display devices described in the present specifications in addition to the image display device 300.

Figure 10:
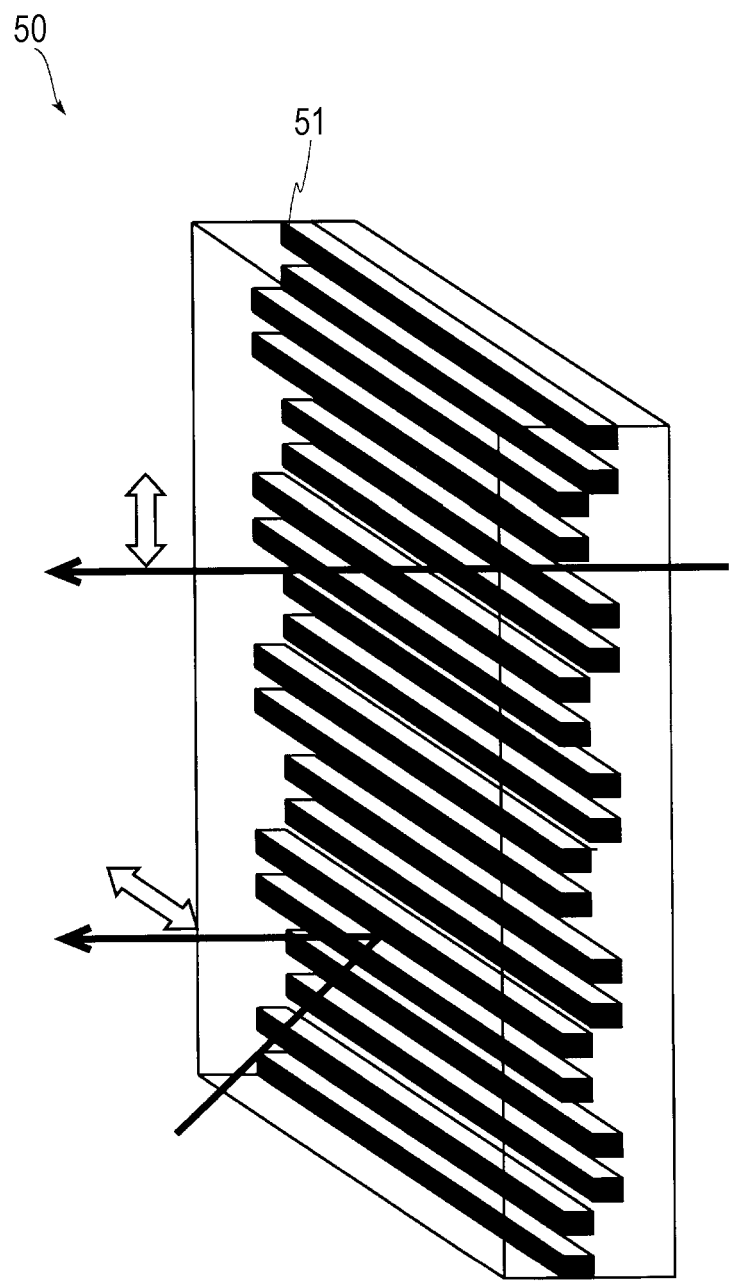
FIG. 10 is a diagram showing the configuration of a wire grid polarizer capable of being used in the image display device shown in FIG. 7.

A wire grid polarizer described in Japanese Unexamined Patent Application Publication No. 2006-133275 may be used instead of the reflection-type polarization plate 20. FIG. 10 is a diagram showing the configuration of a wire grid polarizer 50 capable of being used in the image display device 300. As shown in FIG. 10, in the wire grid polarizer 50, light reflecting members 51 arranged in a stripe pattern at pitches shorter than a wavelength of incident light are formed on the surface of a light-transmitting substrate provided with stepped portions at pitches longer than the wavelength of the incident light. The wire grid polarizer 50 transmits polarization components having the polarization direction perpendicular to the stripes of the light reflecting members 51, and reflects polarization components having the polarization direction parallel to the stripes of the light reflecting members 51. However, at the time of reflecting the polarization components, the wire grid polarizer has characteristics of reflecting the polarization components such that a reflection angle is smaller than an incident angle. Accordingly, the reflected light is incident on the liquid crystal panel 30 for controlling polarization rotation at an incident angle which approximates 90°. Similarly to the reflection-type polarization plate 20, such a wire grid polarizer 50 can extract one polarization component from polarization components of which polarization directions are perpendicular to each other.

Figure 11:
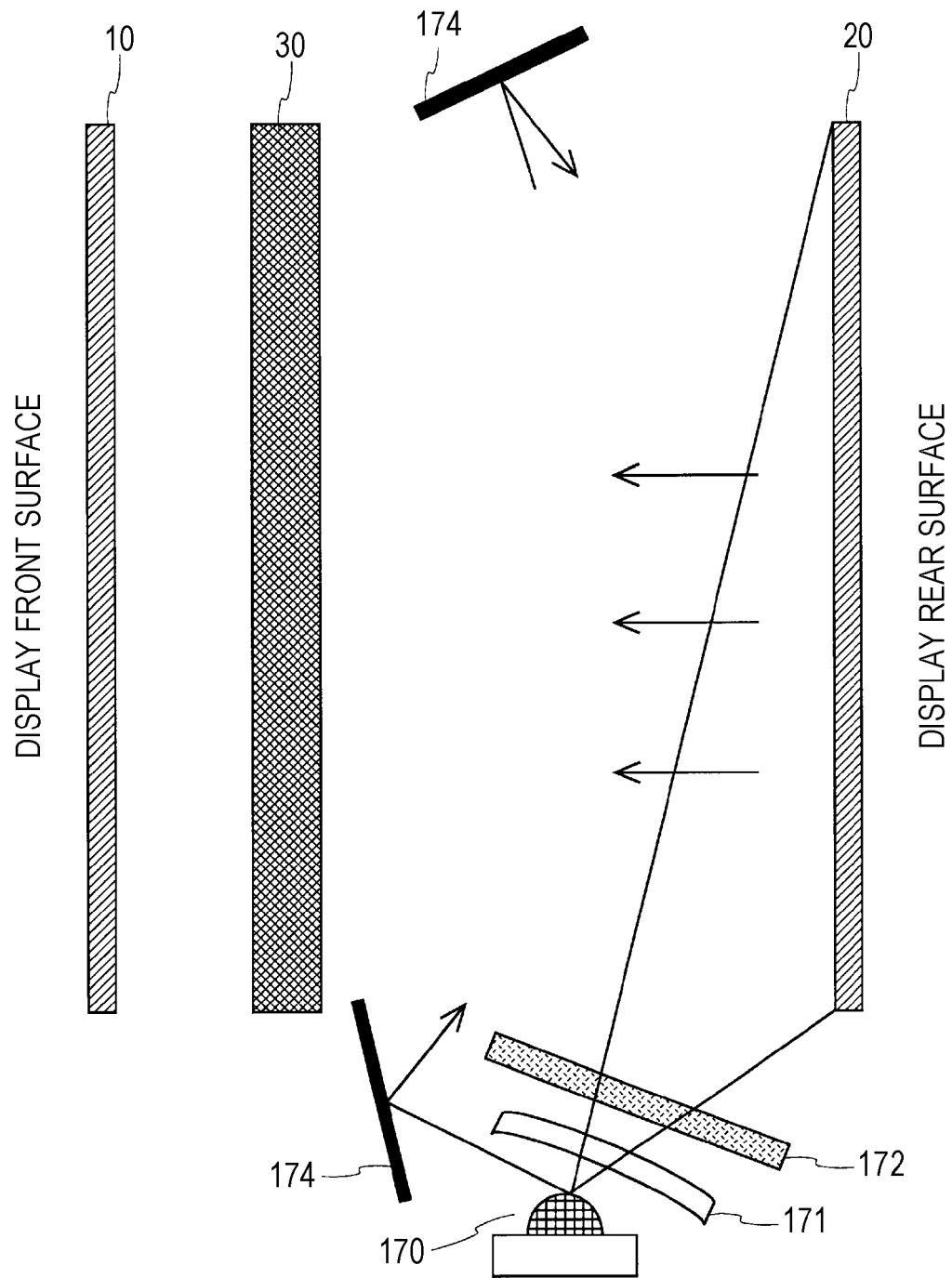
FIG. 11 is a diagram showing an example of the configuration of the light source included in the image display device shown in FIG. 7.

The light source 170 will be described. FIG. 11 is a diagram showing an example of the configuration of the light source 170 used in the image display device 300. If the light emitted from the light source 170 is uniformly irradiated to the reflection-type polarization plate 20, the reflection-type polarization plate 20 reflects the polarization components having the same polarization direction as the transmission axis direction thereof, and applies the light to the liquid crystal panel 30 for controlling polarization rotation. In this case, as shown in FIG. 11, a lens 171 and a diffusion plate 172 are provided in front of the light source 170, and the light emitted from the light source 170 transmits through the lens 171 and the diffusion plate 172. Accordingly, the light emitted from the light source 170 is uniformly irradiated to the reflection-type polarization plate 20, and the reflection-type polarization plate 20 reflects the polarization components having the same polarization direction as the reflection axis direction, and uniformly applies the light to the liquid crystal panel 30 for controlling polarization rotation. Preferably, a reflection plate 174 is provided so as to surround a space interposed between the reflection-type polarization plate 20 and the liquid crystal panel 30 for controlling polarization rotation or a region around the light source 170 such that the light emitted from the light source 170 is not diffused to a surrounding space. Accordingly, light beams of the light emitted from the light source 170 which are not directed to the reflection-type polarization plate 20 may be reflected from the reflection plate 174, and more light beams may be irradiated to the reflection-type polarization plate 20. Thus, it is possible to efficiently use the light emitted from the light source 170.

Figure 12:
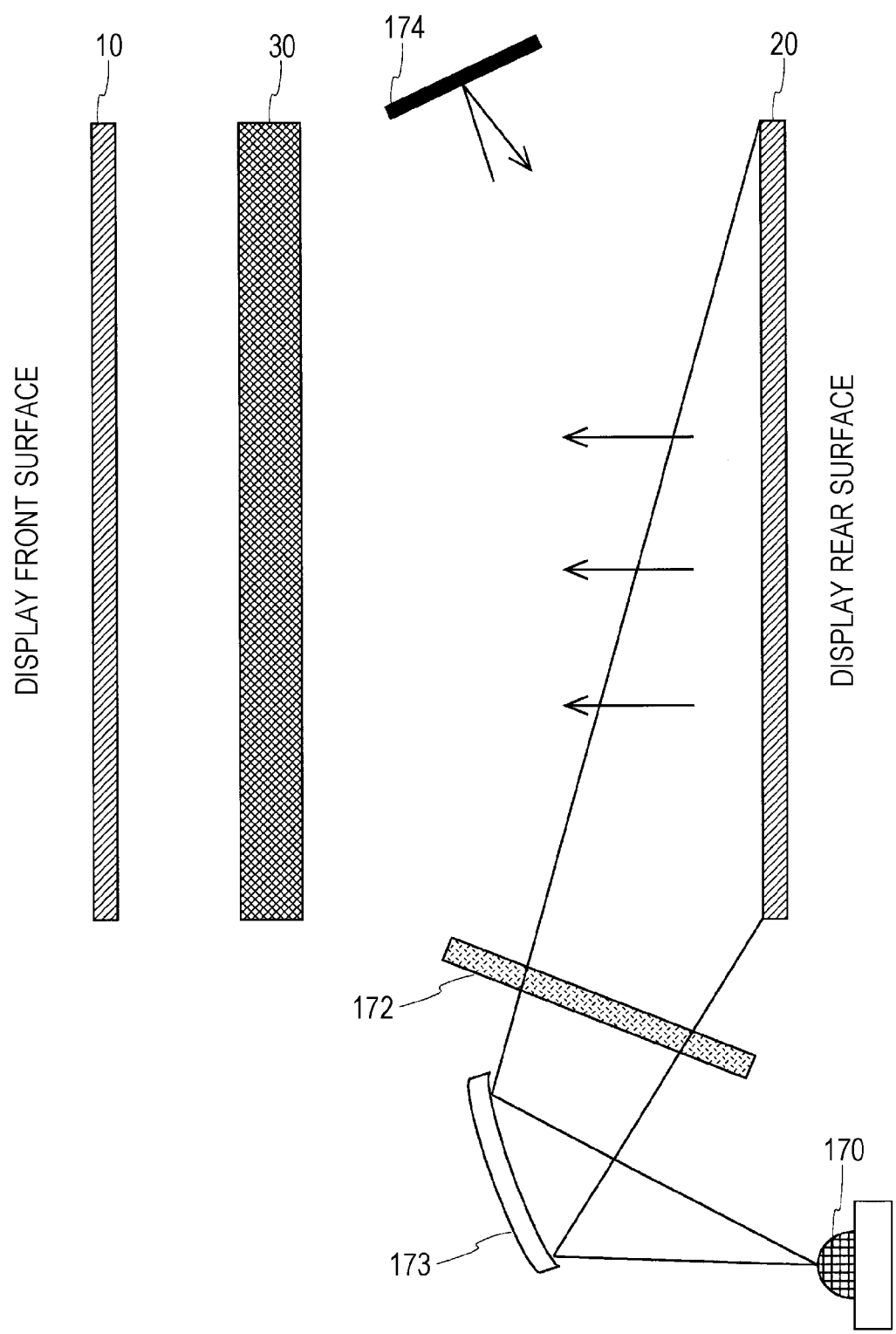
FIG. 12 is a diagram showing another example of the configuration of the light source included in the image display device shown in FIG. 7.

FIG. 12 is a diagram showing another example of the configuration of the light source 170 used in the image display device 300. As shown in FIG. 12, a mirror 173 and a diffusion plate 172 are provided in front of the light source 170. The light emitted from the light source 170 is uniformly irradiated to the reflection-type polarization plate 20 by the mirror 173 and the diffusion plate 172. Thus, the reflection-type polarization plate 20 reflects the polarization components having the same polarization direction as the reflection axis direction, and uniformly applies the light to the liquid crystal panel 30 for controlling polarization rotation. Similarly to the case shown in FIG. 11, in order to efficiently use the light emitted from the light source 170, the reflection plate 174 is preferably provided. In the present specifications, members such as the set of the lens 171 and the diffusion plate 172 and the set of the mirror 173 and the diffusion plate 172 that diffuse the light emitted from the light source 170 to uniformly irradiate the light may be referred to as "uniform irradiation means".

In the present specifications, the liquid crystal panel 30 for controlling polarization rotation and the absorption-type polarization plate 10 for controlling polarization rotation may be collectively referred to as "light-source light/ambient light adjusting means", the reflection-type polarization plate 20 may be referred to as "polarization component selecting means", and the liquid crystal panel 30 for controlling polarization rotation may be referred to as a "pixel array for adjusting transparency/light-emission". The linearly polarized light incident on the reflection-type polarization plate 20 from the rear surface side is referred to as "ambient light". The pixel array for adjusting transparency/light-emission is not limited to the liquid crystal panel 30 for controlling polarization rotation, but includes another pixel array capable of rotating the polarization direction of the polarization components.

<2.2 Driving Circuit>

Figure 13:
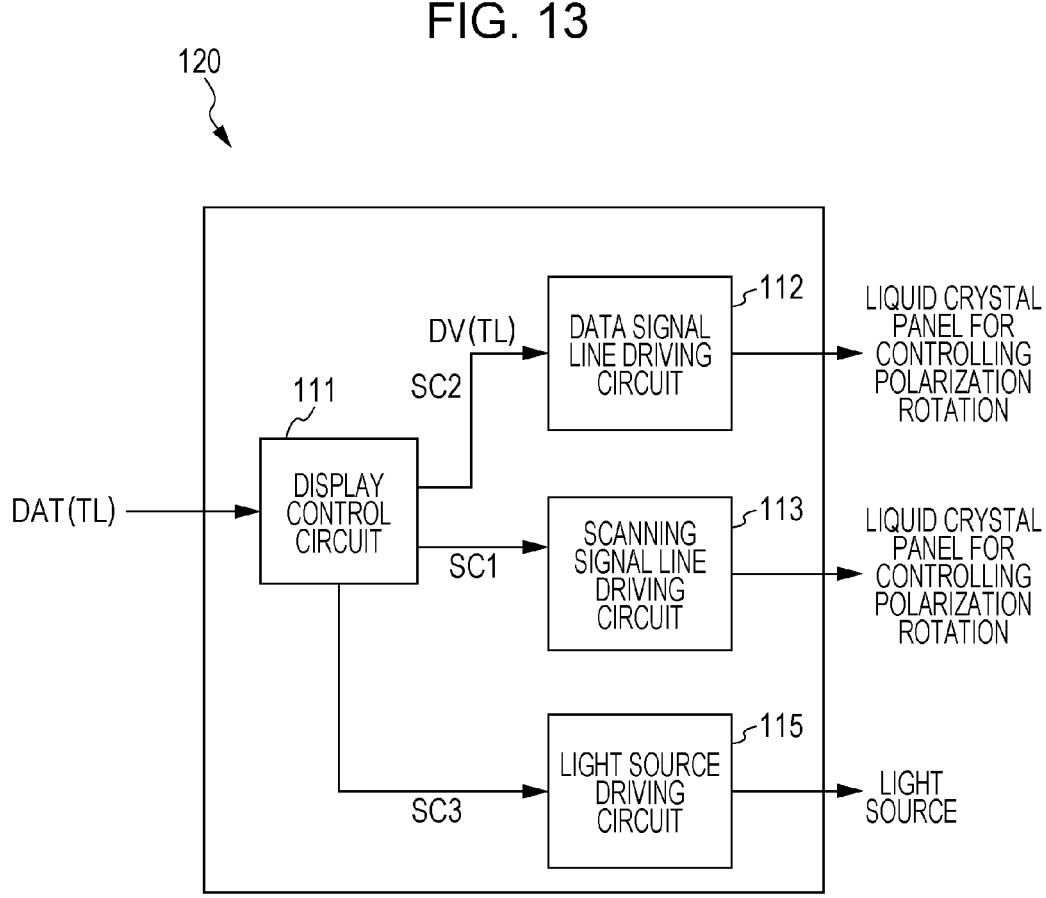
FIG. 13 is a block diagram showing the configuration of the driving circuit that drives the light source and the liquid crystal panel included in the image display device shown in FIG. 7.

FIG. 13 is a block diagram showing the configuration of the driving circuit 120 that drives the light source 170 and the liquid crystal panel 30 for controlling polarization rotation of the image display device 300. The driving circuit 120 is constructed by adding a light source driving circuit 115 to the driving circuit 110 shown in FIG. 6. Thus, the same circuits as the circuits of the driving circuit 110 shown in FIG. 6 will be assigned the same reference numerals, and thus, the description thereof will be omitted.

In the driving circuit 120, if an image signal DAT including transparent/light-emitting pixel information TL which switches between the transparent state and the light-emitting state for each pixel is applied to the display control circuit 111 from the outside, the display control circuit 111 generates control signals SC1 and SC2 which respectively control operation timings of the scanning signal line driving circuit 113 and the data signal line driving circuit 112 based on the image signal DAT, and generates a pixel information signal DV including the transparent/light-emitting pixel information TL based on the image signal DAT. The display control circuit 111 outputs the control signal SC1 to the scanning signal line driving circuit 113, and outputs the pixel information signal DV including the transparent/light-emitting pixel information TL and the control signal SC2 to the data signal line driving circuit 112.

Similarly to the case of the driving circuit 110, the pixel information signal DV including the transparent/light-emitting pixel information TL is written in the plurality of pixels connected to the selected scanning signal line at the predetermined frame rate. The respective pixels are in a transparent state in which the ambient light transmits and a light-emitting state in which the backlight light transmits, based on the transparent/light-emitting pixel information TL. In the pixels in the light-emitting state, since the backlight light transmits at a transmittance determined by the transparent/light-emitting pixel information TL, the image in which the gradations are displayed is displayed. In the pixels in the transparent state, since the ambient light transmits, the background is transparently seen. Since the transparent/light-emitting pixel information TL can adjust a transmission ratio of the backlight light and the ambient light for each pixel in addition to completely switching between the transparent state and the light-emitting state for each pixel, it is possible to display the image so as to be superimposed on the background by adjusting the transmission ratio of the backlight light and the ambient light. The light source driving circuit 115 controls the light source 170 to be turned on at a timing when the image is displayed for each pixel, based on the control signal SC3 applied from the display control circuit 111. Since the description of the control signals SC1 to SC3 is the same as that of driving circuits in the following embodiments, the description of the control signals SC1 to SC3 will be omitted in the description related to the following driving circuits.

<2.3 Relationship Between Average Display Luminance and Transmittance>

Figure 14:
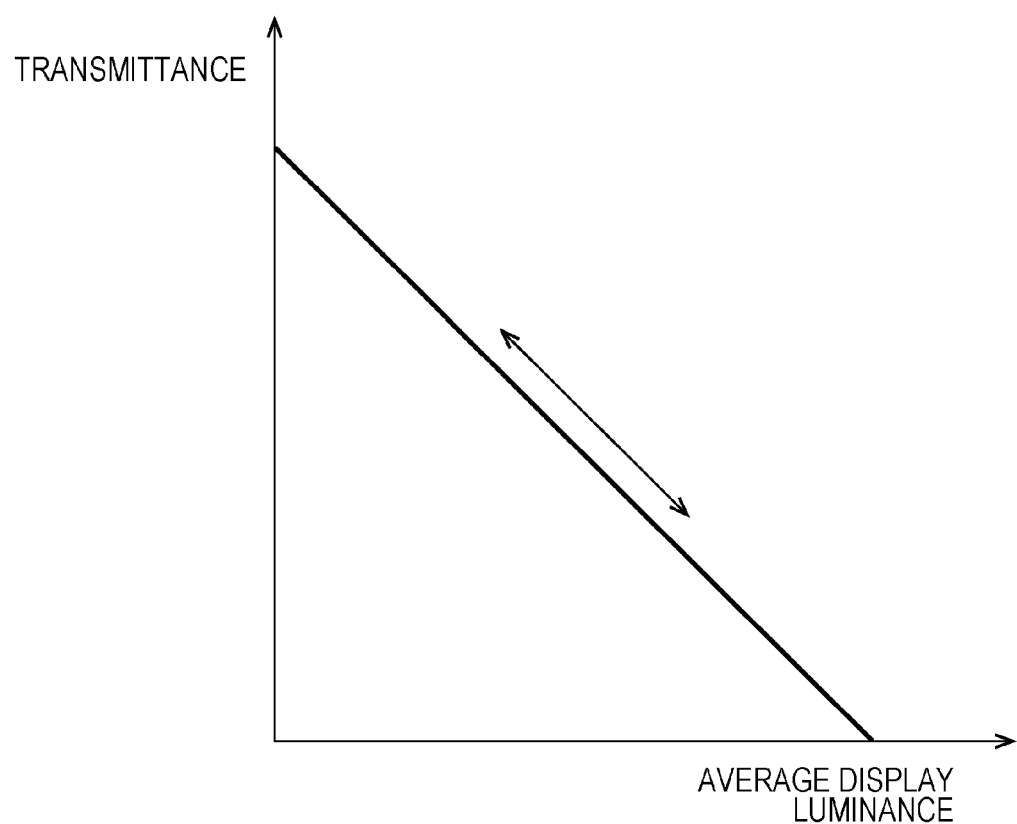
FIG. 14 is a diagram showing the relationship between the average display luminance and the transmittance of the image displayed on the liquid crystal panel for controlling polarization rotation included in the image display device shown in FIG. 7.

FIG. 14 is a diagram showing the relationship between the average display luminance and the transmittance of the image displayed on the liquid crystal panel 30 for controlling polarization rotation in the present embodiment. The average display luminance of the image displayed on the liquid crystal panel 30 for controlling polarization rotation can obtain only a value on a hypotenuse. Thus, the average display luminance of the pixel in a case where the transmittance is the maximum value is "0", and such pixel is in the transparent state in which only the ambient light transmits to the front surface side of the display. Meanwhile, the transmittance in a case where the average display luminance of the pixel is the maximum value is "0", and only the backlight light transmits to the front surface side of the display. Thus, such pixel is in a turn-on state in which the image is displayed. In a case where the transmittance and the average display luminance are in an intermediate state therebetween, the backlight light and the ambient light transmit at a predetermined ratio. Such a pixel is in the turn-on state in which the image in which the gradations are displayed is displayed so as to be superimposed on the transparently seen background.

<2.4 Application Example>

If the image display device 300 is provided on a window such that the front surface side of the display faces the outside and characters or images are displayed on the front surface side of the display, it is possible to exhibit an advertising effect to the outside, and it is possible to use the light incident from the outside, as illumination light in the inside of the room.

In a case where the display is viewed from the front surface side, the background is transparently seen, or the image is displayed. Meanwhile, in a case where the display is viewed from the rear surface side, since half of the light emitted from the light source 170 transmits through the reflection-type polarization plate 20 and the light incident from the rear surface side is reflected from the reflection-type polarization plate 20, the entire display is seen as a shining mirror. Thus, if a product is exhibited close to the rear surface side of the display, it is possible to use the light transmitting through the reflection-type polarization plate 20, as illumination. In this case, the image display device 300 is used as a display window that exhibits the product in a brightly illuminated state. If the display is viewed from the front surface side, it is possible to see the product exhibited close to the rear surface side and an explanatory note thereof through the transparent pixels.

The image display device 300 may be provided on a window on a passageway such that the front surface side of the display faces the passageway and the rear surface side faces the inside of the room. In this case, if a person positioned on the passageway sees the display from the front surface side of the display, it is possible to see the image displayed on the front surface side of the display and the inside circumstance of the room through the transparent pixels. However, since a person positioned on the inside of the room views the display from the rear surface side, the entire display is seen as the mirror by the reflection-type polarization plate 20, and thus, it is difficult to see the image displayed on the front surface side of the display or the circumstance of the passageway. As mentioned above, the image display device 300 is also used as a magic mirror.

<2.5 Effect>

According to the present embodiment, the image display device 300 can cause the background to be transparently seen, cause the gradations of the image to be displayed, or display the image so as to be superimposed on the background. In a case where the background and the image are displayed so as to be superimposed on each other, it is possible to appropriately adjust a ratio of the background and the image. Since it is not necessary to attach the image display device 300 to a case filled with light, the image display device is widely used without limitation of use. Since a liquid crystal panel used in a liquid crystal display device can be used as the liquid crystal panel 30 for controlling polarization rotation, the image display device 300 has high spatial resolution.

<2.6 Modification Example>

Figure 15:
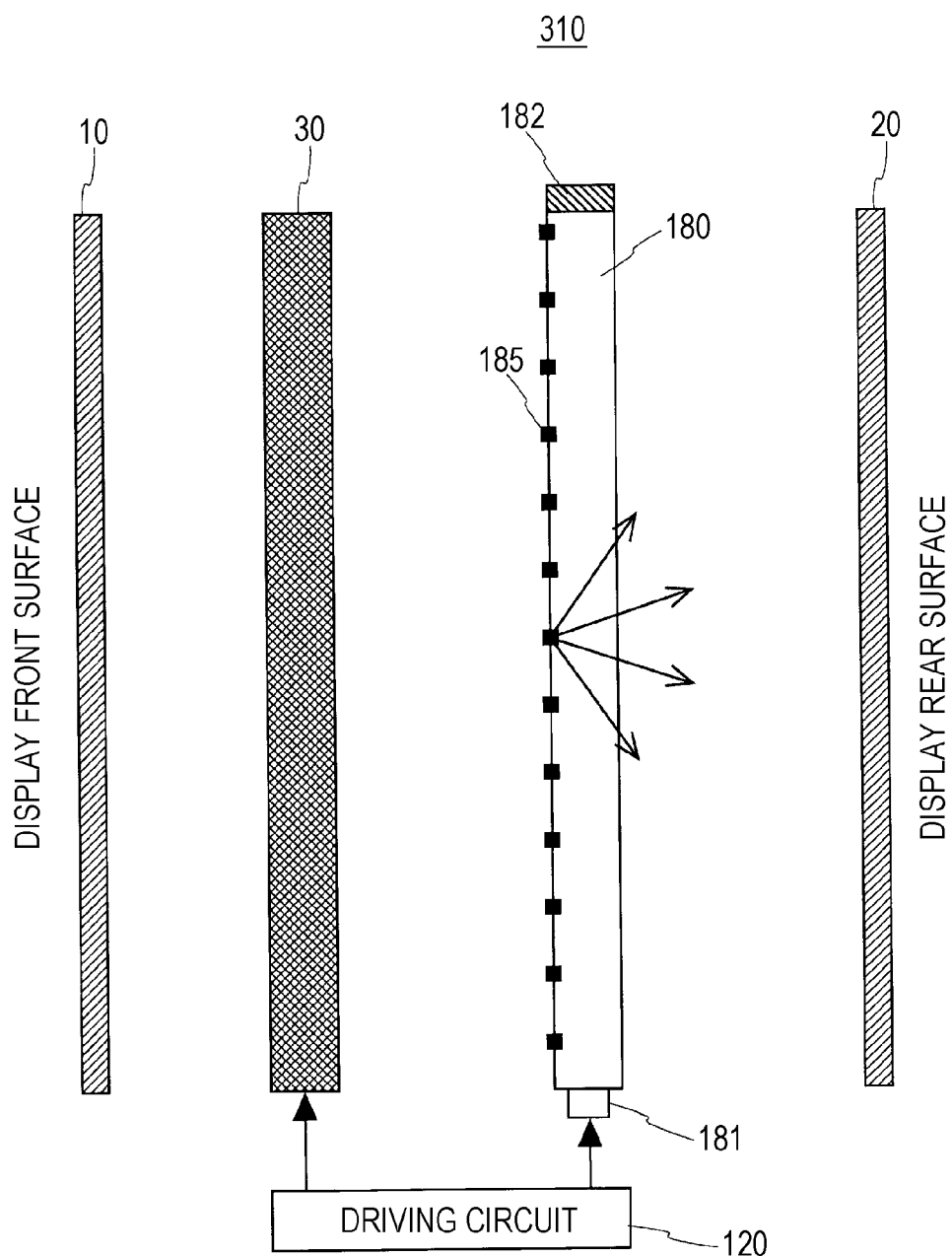
FIG. 15 is a diagram showing the configuration of an image display device according to a modification example of the image display device shown in FIG. 7.

FIG. 15 is a diagram showing the configuration of an image display device according to a modification example of the present embodiment. In an image display device 310 according to the present modification example, a light guide plate 180 is provided in a space between a liquid crystal panel 30 for controlling polarization rotation and a reflection-type polarization plate 20, instead of the light source 170 provided near the space interposed between the reflection-type polarization plate 20 and the liquid crystal panel 30 for controlling polarization rotation of the image display device 300 shown in FIG. 7. For example, a light source 181 in which LEDs (Light-Emitting Diodes) are arranged in a straight line shape is attached to one end of the light guide plate 180, and a reflection sheet 182 adheres to an end facing the one end. Reflection members 185 are formed on the surface of the light guide plate 180 facing the liquid crystal panel 30 for controlling polarization rotation. Light emitted from the light source 181 may travel upward while being totally reflected within the light guide plate 180, or may be incident on the reflection members 185 while the light is reflected from the reflection sheet 182 and travels downward. The light incident on the reflection members 185 is reflected from the reflection members 185, and is emitted toward the reflection-type polarization plate 20 from the surface facing the surface on which the reflection members 185 of the light guide plate 180 are formed. As discussed above, by forming the reflection members 185 on the surface facing the liquid crystal panel 30 for controlling polarization rotation, the light guide plate 180 emits more light beams of incident light from the light source 181 toward the reflection-type polarization plate 20, and reduce the amount of light leaking to the liquid crystal panel 30 for controlling polarization rotation. Such a light guide plate 180 is referred to as an "asymmetric light guide plate". All light guide plates 180 used in the respective embodiments and modification examples, to be described below, are asymmetric light guide plates. The configurations and functions of the absorption-type polarization plate 10 for controlling polarization rotation, the liquid crystal panel 30 for controlling polarization rotation and the reflection-type polarization plate 20 in the present modification example are the same as those in the case shown in FIG. 7, and thus, the description thereof will be omitted. The light source 170 and the light guide plate 180 to which the light source 181 is attached are collectively referred to as "light-source light irradiating means".

The configuration of the reflection member 185 will be described. FIG. 16 is a diagram showing the configuration of the reflection member 185 formed on the surface of the light guide plate 180. More specifically, FIG. 16(A) is a diagram showing a configuration example of the reflection member 185, and FIG. 16(B) is a diagram showing another configuration example of the reflection member 185. The reflection member 185 shown in FIG. 16(A) includes a transparent dot 186 formed on the surface of the light guide plate 180, and a non-transmission member 187 formed so as to cover the transparent dot 186. The transparent dot 186 is made of a transparent ink (for example, an ultraviolet-curable resin ink) having the same refractive index as the refractive index of the light guide plate 180. The non-transmission member 187 is made of a material that does not transmit light, and is made of, for example, a black ink which absorbs incident light or a metal thin film (aluminum or the like) which reflects the incident light. Accordingly, light incident on the transparent dot 186 does not escape to the outside.

If a case where the light travels while being totally reflected within the light guide plate 180 is incident on the reflection member 185, since the refractive index of the transparent dot 186 and the refractive index of the light guide plate 180 are approximately equal to each other, the light incident on the reflection member 185 travels within the transparent dot 186 without being refracted at a boundary between the transparent dot 186 and the light guide plate 180, and is reflected such that an incident angle and a reflection angle are equal to each other at the boundary between the transparent dot 186 and the non-transmission member 187. The light reflected in this manner travels within the transparent dot 186 and the light guide plate 180 in a direction determined by the reflection angle, and is emitted to the reflection-type polarization plate 20 from the plane facing the light guide plate 180. In the present specifications, the refractive indexes of the transparent dot 186 and the light guide plate 180 being approximately equal to each other may be referred to as a case where "refractive indexes are equal to each other".

The reflection member 185 shown in FIG. 16(B) includes a groove 188 formed on the surface of the light guide plate 180, and a non-transmission member 187 formed so as to cover the groove 188. The groove 188 is formed on the surface of the light guide plate 180 using, for example, a mold press. The light incident to the side of the groove 188 is reflected such that the incident angle and the reflection angle are equal to each other, travels in a straight line within the light guide plate 180 in a direction determined by the reflection angle, and is emitted toward the reflection-type polarization plate from the plane facing the light guide plate 180. In FIG. 15(B), an air surrounded by the surface of the groove 188 and the non-transmission member 187 is filled with air, but the non-transmission member 187 may be formed so as to cover the surface of the groove 188.

As mentioned above, the light guide plate 180 provided with the reflection members 185 on the surface is an asymmetric light guide plate in which the intensity of light extracted from the reflection-type polarization plate 20 becomes higher than the intensity of light extracted from the liquid crystal panel 30 for controlling polarization rotation. If the asymmetric light guide plate is used, by transmitting the ambient light having the polarization direction as the transmission axis of the reflection-type polarization plate 20, the light-source light leaking from the light guide plate 180 is suppressed from being directly incident on the pixels of the liquid crystal panel 30 for controlling polarization rotation to be in the transparent state. Accordingly, since the degree of transparency of the pixels to be in the transparent state is high, it is possible to realize a display with higher transparency. The reflection member 185 reflects the incident light such that the incident angle and the reflection angle are equal to each other. Thus, the traveling direction of the reflected light is controlled by changing the shape of the boundary between the non-transmission member 187 and the transparent dot 186 from which the incident light is reflected, and thus, it is possible to adjust front luminance or a viewing angle of the display.

Figure 17:
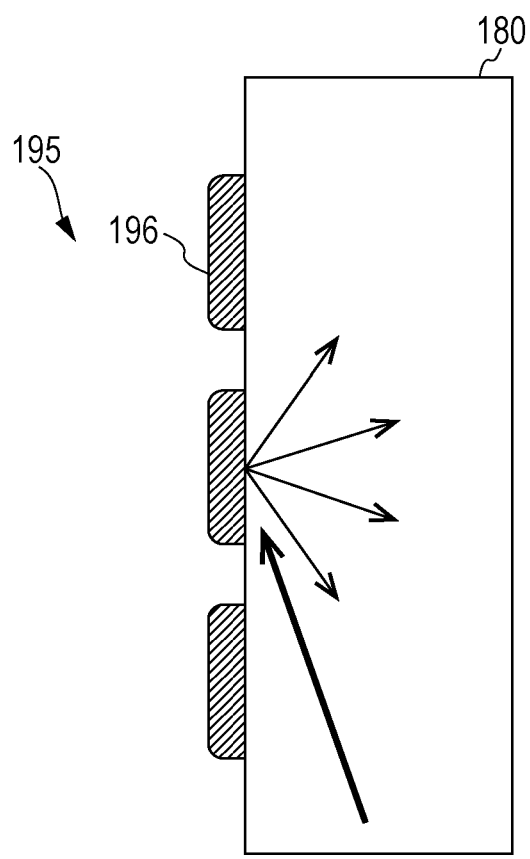
FIG. 17 is a diagram showing the configuration of a scattering member formed on the surface of the light guide plate included in the image display device shown in FIG. 15.

Instead of the reflection member 185, a scattering member 195 which scatters the incident light may be formed on the surface of the light guide plate 180. FIG. 17 is a diagram showing an opaque dot 196 which is an example of the scattering member 195 formed on the surface of the light guide plate 180. As shown in FIG. 17, in order to scatter the incident light toward the reflection-type polarization plate 20, the opaque dot 196 needs to be opaque. Thus, the opaque dot 196 is made of, for example, a white opaque ink such as an organic ultraviolet-curable ink, or a metal ink such as aluminum or gold. Since these inks or the metal ink are opaque or easily reflects the light, if the light within the light guide plate 180 is incident on the opaque dot 196, the light is easily scattered toward the reflection-type polarization plate 20. The light from the light guide plate 180 on which the scattering member 195 is formed more easily leaks to the liquid crystal panel 30 for controlling polarization rotation than the light guide plate 180 on which the reflection member 185 is formed. Accordingly, in the image display device using the light guide plate 180 provided with the scattering member 195, the degree of transparency of the pixels is lower than that in the image display device using the light guide plate 180 provided with the reflection member 185.

Both the transparent dot 186 of the reflection member 185 and the opaque dot 196 of the scattering member 195 are formed on the surface of the light guide plate 180 by using a printing technique. In order to achieve the transparent state due to the light reflected from the reflection-type polarization plate 20, if a case where the shape thereof is, for example, a circular shape, a diameter is preferably in a range of 1 to 100 µm, and a diameter is more preferably in a range of 1 to 10 µm. In order to easily form the dots and easily adjust the reflectance or scattering rate of the light, in the case where the shape thereof is the circular shape, an occupancy rate on the surface of the light guide plate 180 is preferably in a range of 0.1 to 70% per unit area.

In a case where the shape of the groove 188 of the reflection member 185 is, for example, a quadrangular pyramid, one side of bases of the quadrangular pyramid is preferably in a range of 1 to 100 µm, and is more preferably in a range of 1 to 10 µm. In order to easily form the dots and easily adjust the scattering rate of the light, in a case where the shape of the groove 188 is a conical shape, the occupancy rate on the surface of the light guide plate 180 is preferably in a range of 0.1 to 70% per unit area. The shape of the groove 188 is not limited to the quadrangular pyramid, but may be a pyramid such as a triangular pyramid or a cone.

An anti-reflection process is preferable performed on the surface of the light guide plate 180 such that the light reflected from the reflection member 185 formed on the surface of the light guide plate 180 or the light scattered from the scattering member 195 are reflected from the surface of the light guide plate 180 facing the surface on which the scattering member 195 or the reflection member 185 is formed, and are not returned to the inside of the light guide plate 180.

<2.7 Adjustment of Image Display Device>

Figure 19:
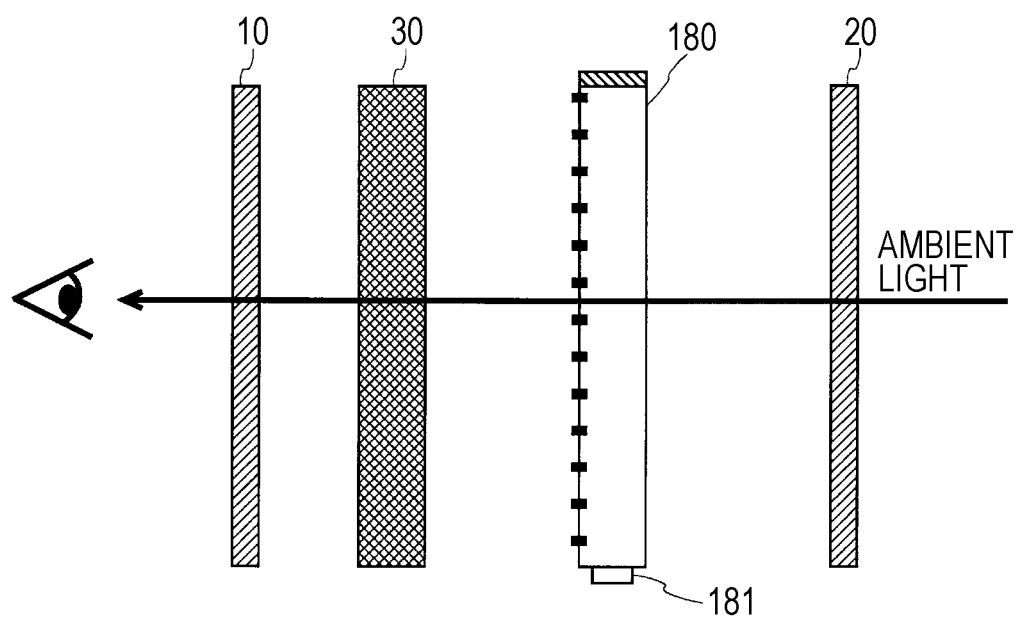
FIG. 19 is a diagram showing the passage routes of light in an ambient light transmission region of the image display device shown in FIG. 15.

FIG. 18 is a diagram showing the passage routes of light in the respective regions, and more specifically, FIG. 18(A) is a diagram showing the passage route of the light in the display region, and FIG. 18(B) is a diagram showing the passage route of the light in a leakage region. FIG. 19 is a diagram showing the passage routes of light in an ambient light transmission region. Here, the display region refers to a region where only the light-source light emitted from the light source 181 is extracted. The leakage region refers to a region where only the ambient light is originally extracted but the light-source light leaks and is extracted. The ambient light transmission region refers to a region where only the ambient light incident from the rear surface side is extracted. The display region may be referred to as a "first region", the leakage region may be referred to as a "second region", and the ambient light transmission region may be referred to as a "third region".

Initially, a case where the light-source light is extracted to the display region will be described. As shown in FIG. 18(A), the light source 181 is turned on in a state in which the ambient light is not incident from the rear surface side by covering the rear surface side of the reflection-type polarization plate 20 with black cloth 60. Accordingly, the light-source light emitted from the light guide plate 180 is reflected from the reflection-type polarization plate 20, and is incident on the liquid crystal panel 30 for controlling polarization rotation. Since the liquid crystal panel 30 for controlling polarization rotation rotates the polarization direction thereof such that the light-source light can transmit through the absorption-type polarization plate 10 for controlling polarization rotation, only the light-source light transmits through the display region of the absorption-type polarization plate 10 for controlling polarization rotation, and is extracted to the front surface side.

Hereinafter, a case where the light-source light leaks to the leakage region will be described. As shown in FIG. 18(B), the leakage region is the same as the display region until the light source 181 is turned on in a state where the ambient light is not incident from the rear surface side by covering the rear surface side of the reflection-type polarization plate 20 with the black cloth 60 and the light emitted from the light source 181 is incident on the liquid crystal panel 30 for controlling polarization rotation. However, since the liquid crystal panel 30 for controlling polarization rotation rotates the polarization direction such that the ambient light can transmit through the absorption-type polarization plate 10 for controlling polarization rotation, the light-source light is originally supposed to not transmit through the absorption-type polarization plate 10 for controlling polarization rotation, but a part of the light-source light transmits through the leakage region of the absorption-type polarization plate 10 for controlling polarization rotation, and is extracted to the front surface side.

Hereinafter, a case where the ambient light is extracted to the ambient light transmission region will be described. As shown in FIG. 19, since the light source 181 is turned off, the light-source light is not emitted. However, since the rear surface side of the reflection-type polarization plate 20 is not covered with the black cloth 60, the ambient light is incident from the rear surface side. The ambient light transmits through the reflection-type polarization plate 20, and is incident on the liquid crystal panel 30 for controlling polarization rotation. Since the liquid crystal panel 30 for controlling polarization rotation rotates the polarization direction thereof such that the ambient light can transmit through the absorption-type polarization plate 10 for controlling polarization rotation, the ambient light transmits through the ambient light transmission region of the absorption-type polarization plate 10 for controlling polarization rotation, and is extracted to the front surface side. The luminance of the ambient light transmission region is calculated by Expression (1) based on the brightness of the background and the total transmittance of the respective optical elements such as the liquid crystal panel 30 for controlling polarization rotation, the absorption-type polarization plate 10 for controlling polarization rotation, the reflection-type polarization plate 20 and the light guide plate 180 through which the ambient light transmits.

> Luminance of Ambient Light Transmission Region=
> (Brightness of Background)×(Total Transmittance of Respect Optical Elements through which Ambient Light Transmit)   (1)

In this case, in the transparent pixels, the background is transparently seen as though looking through a glass. However, actually, since the leaked light is also incident on pixels desired to be transparent and the pixels desired to be transparent shine, the background is hard to be seen. The visibility of the background due to the leaked light is determined by the luminance of the background and the luminance of the leaked light, and the background is easily seen through the transparent pixels in a case where Expression (2) is satisfied.

> Luminance of Ambient Light Transmitted through Ambient Light Transmission Region>Luminance of Light-source Light Transmitted through Leakage Region   (2)

If the image displayed in the display region is dark, the image is buried in the background, and thus, the image is hard to be seen. Thus, the visibility of the image displayed in the display region is determined by the luminance of the background and the luminance of the image, and is calculated by Expression (3).

> Luminance of Light-source Light Transmitted through Display Region>Luminance of Ambient Light Transmitted through Ambient Light Transmission Region   (3)

Accordingly, Expression (4) is obtained from Expressions (2) and (3).

> Luminance of Light-source Light Transmitted through Display Region>Luminance of Ambient Light Transmitted through Ambient Light Transmission Region>Luminance of Light-source Light Transmitted through Leakage Region   (4)

As a result, in the image display device 310, if a case where luminances of light in the display region, the leakage region and the ambient light transmission region satisfy Expression (4), the background and the image are respectively displayed in the ambient light transmission region and the display region so as to be easily seen.

Hereinafter, an example of a method of adjusting the luminances such that the luminances in the respective regions satisfy Expression (4) will be described. Initially, using the actual image display device, the maximum luminance ratio (the luminance ratio between the light-source light indicating a completely white state and the leakage light indicating a completely transparent state) between the luminance of the light-source light in the display region and the luminance of the leakage light in the leakage region is calculated. Subsequently, the luminance of the light-source light in the display region in a case where the image signal is input and the image is displayed is obtained through the calculation, and the amounts of the obtained luminance of the light-source light are obtained in comparison with the luminance in the completely white state and the luminance in the completely transparent state. An effective luminance ratio between the luminance of the light-source light in the display region and the leakage light in the leakage region is calculated using the luminance of the light-source light obtained in this manner. Thereafter, the illumination of the ambient light is measured by an illumination sensor (not shown). In this case, in a case where the illumination of the ambient light is measured in a plurality of positions, an average value thereof becomes the illumination of the ambient light. In a condition where the luminance ratio between the luminance of the light-source light in the display region and the luminance of the light-source light in the leakage region becomes the effective luminance ratio, the luminance of the light-source light is adjusted by increasing a power to be supplied to the light source such that the luminance of the ambient light in the ambient light transmission region is between the luminance of the light-source light in the display region and the luminance of the light-source light in the leakage region. By doing this, the luminances in the respective regions are adjusted so as to satisfy Expression (4).

The illumination sensor (not shown) may be provided, and the illumination of the ambient light before the ambient light is incident on the image display device 310 may be measured, or a light source for illumination (not shown) may be provided close to the rear surface side of the display, and the luminance of the ambient light may be adjusted so as to be increased. The luminance may be non-uniformed in the display region and the leakage region in a case where the luminance ratio at the time of displaying the image is calculated, or the luminance may be non-uniformed in the ambient light transmission region in some positions where the luminance of the ambient light is measured. Thus, at the time of applying Expression (4), it is preferable that the average luminance thereof is calculated as a luminance which is representative of the respective regions and the average luminance is adjusted so as to satisfy Expression (4).

<2.8 Modification Examples of Driving Circuit>

Figure 20:
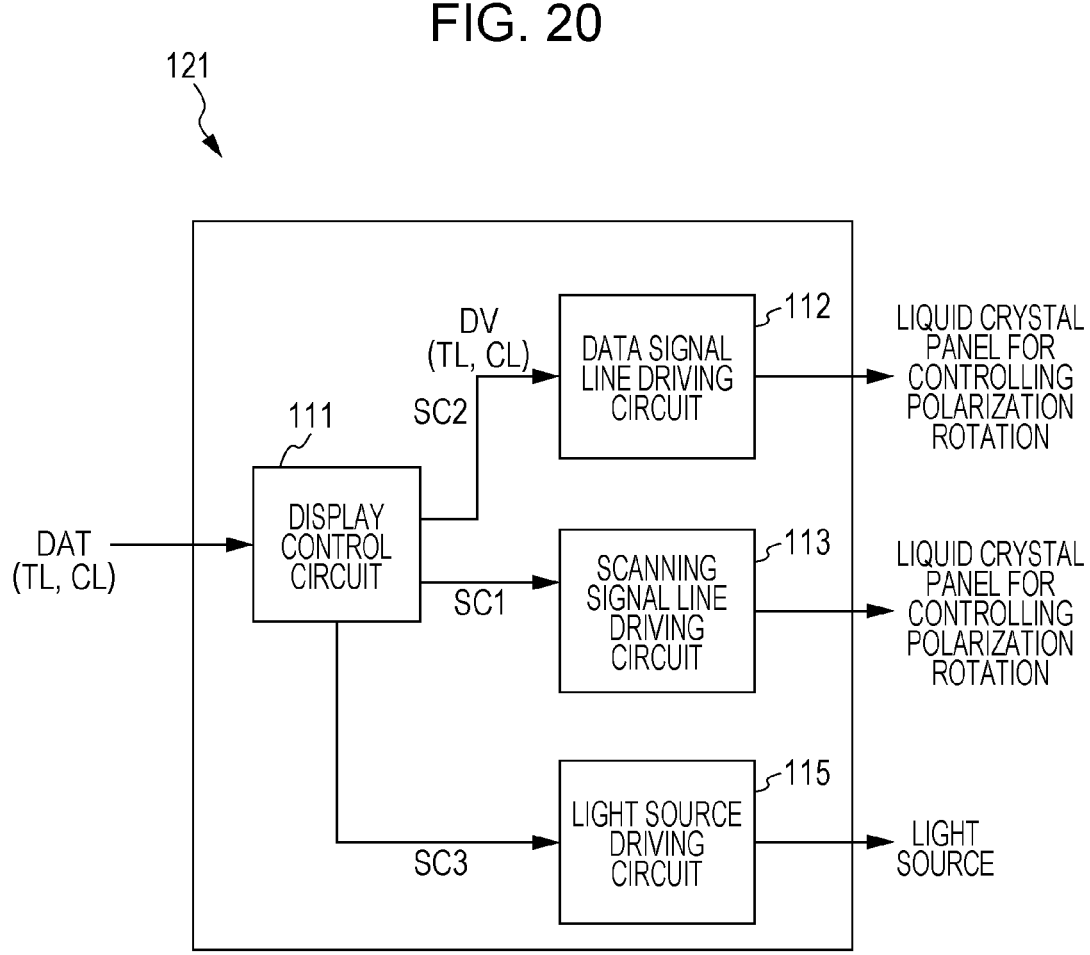
FIG. 20 is a block diagram showing a first modification example of the driving circuit included in the image display device shown in FIG. 7.

FIG. 20 is a diagram showing a first modification example of the driving circuit 120 shown in FIG. 13. Since a circuit configuration of a driving circuit 121 of the present modification example is the same as the circuit configuration of the driving circuit 120 shown in FIG. 13, and thus, the same circuits as the circuits shown in FIG. 13 will be assigned the same reference numerals, and thus, the description thereof will be omitted. Unlike the case of the driving circuit 120 shown in FIG. 13, in the driving circuit 121 of the present modification example, the image signal DAT includes display pixel information CL for setting gradation information in order to display the gradations of the image, in addition to the transparent/light-emitting pixel information TL indicating the transmittance of the backlight light and the ambient light transmitting through the respective pixels. In a case where the color image is displayed, the gradation information includes red, green and blue gradation values. If the image signal DAT is input to the display control circuit 111, the display control circuit 111 generates the pixel information signal DV including the transparent/light-emitting pixel information TL and the display pixel information CL, based on the image signal DAT, and applies the generated signal to the data signal line driving circuit 112. The data signal line driving circuit 112 drives the liquid crystal panel 30 for controlling polarization rotation, based on the pixel information signal DV. Specifically, in the pixels in the light-emitting state in which the backlight light transmits, the driving is performed such that the backlight light transmits at a predetermined transmittance, and the image in which the gradations are displayed is displayed. In the pixels in the transparent state in which the ambient light transmits, the driving is performed such that the ambient light transmits at a predetermined transmittance, and the background is displayed. The transparent/light-emitting pixel information TL may transmit only any one of the backlight light and the ambient light for each pixel and may also adjust the transmission ratio therebetween. In this case, it is possible to display the image in which the image in which the gradations are displayed so as to be superimposed on the background. Since the transparent/light-emitting pixel information TL and the display pixel information CL are included in the image signal DAT and are applied to the display control circuit 111, an update rate of the transparent/light-emitting pixel information TL is the same as the frame rate of the image. Accordingly, the background and the image are simultaneously updated at the same frame rate.

Figure 21:
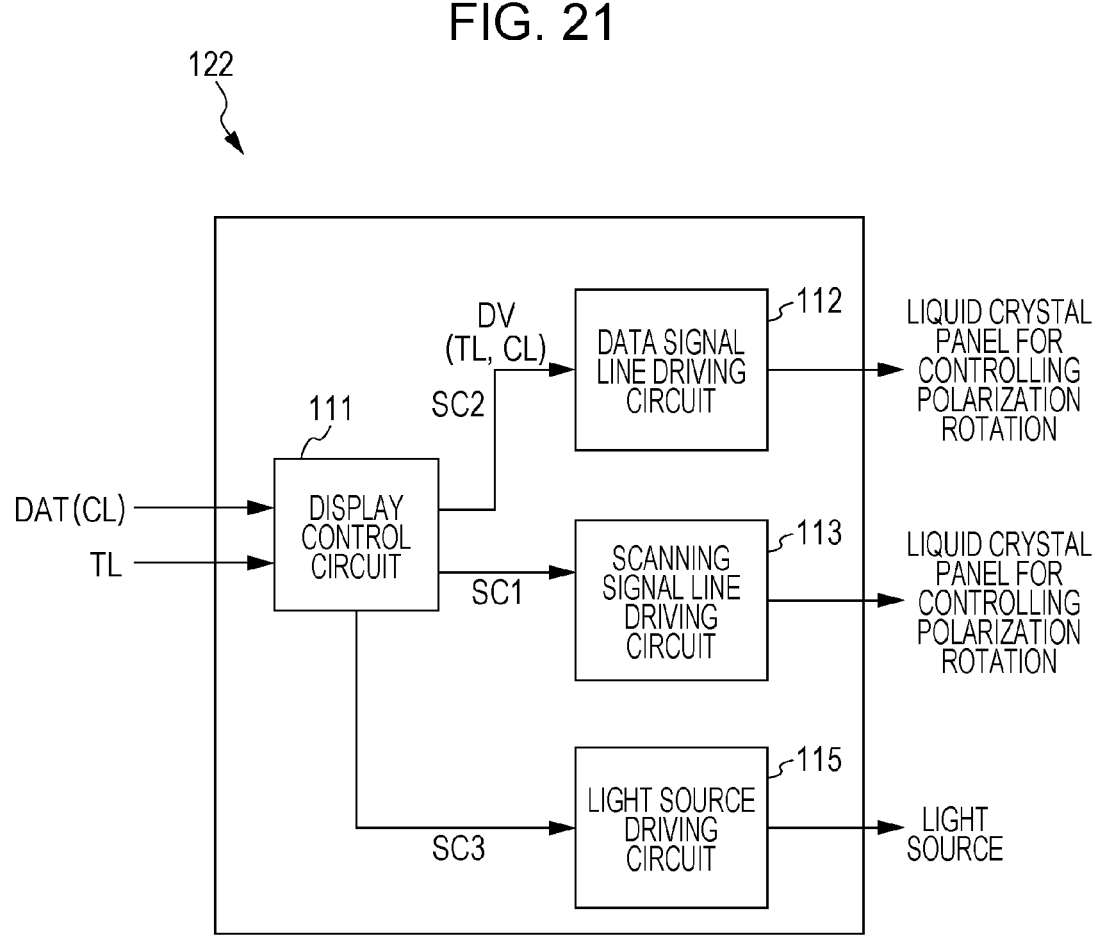
FIG. 21 is a block diagram showing a second modification example of the driving circuit included in the image display device shown in FIG. 7.

FIG. 21 is a diagram showing a second modification example of the driving circuit 120 shown in FIG. 13. Since a circuit configuration of a driving circuit 122 of the present modification example is the same as the circuit configuration of the driving circuit 120 shown in FIG. 13, the same circuits as the circuits shown in FIG. 13 will be assigned the same reference numerals, and thus, the description thereof will be omitted. Unlike the case of the driving circuit 120 shown in FIG. 13, in the driving circuit 122 of the present modification example, the transparent/light-emitting pixel information TL and the image signal DAT including the display pixel information CL indicating the gradation information of each pixel are respectively input to the display control circuit 111, as separate signals. The display control circuit 111 generates the pixel information signal DV including the display pixel information CL and the transparent/light-emitting pixel information TL, and applies the generated signal to the data signal line driving circuit 112. The operation of the data signal line driving circuit 112 to which the pixel information signal DV is applied is the same as the operation of the data signal line driving circuit 112 shown in FIG. 20, and thus, the description thereof will be omitted. Similarly to the case of the first modification example, in the case of the second modification example, in the pixels in the light-emitting state in which the backlight light transmits, the driving is also performed such that the backlight light transmits at a predetermined transmittance, and the image in which the gradations are displayed is displayed. In the pixels in the transparent state in which the ambient light transmits, the driving is performed such that the ambient light transmits at a predetermined transmittance, and the background is displayed. In the pixels in the intermediate state therebetween, the image in which the gradations are displayed is displayed so as to be superimposed on the background.

The transparent/light-emitting pixel information TL and the image signal DAT are input to the display control circuit 111, as separate signals. Thus, an update rate of the transparent/light-emitting pixel information TL may be set to be a rate different from the frame rate of the image displayed by the display pixel information CL. Accordingly, it is possible to respective update the background and the image at different frame rates.

3. Second Embodiment

<3.1 Configuration and Operation of Image Display Device>

Figure 22:
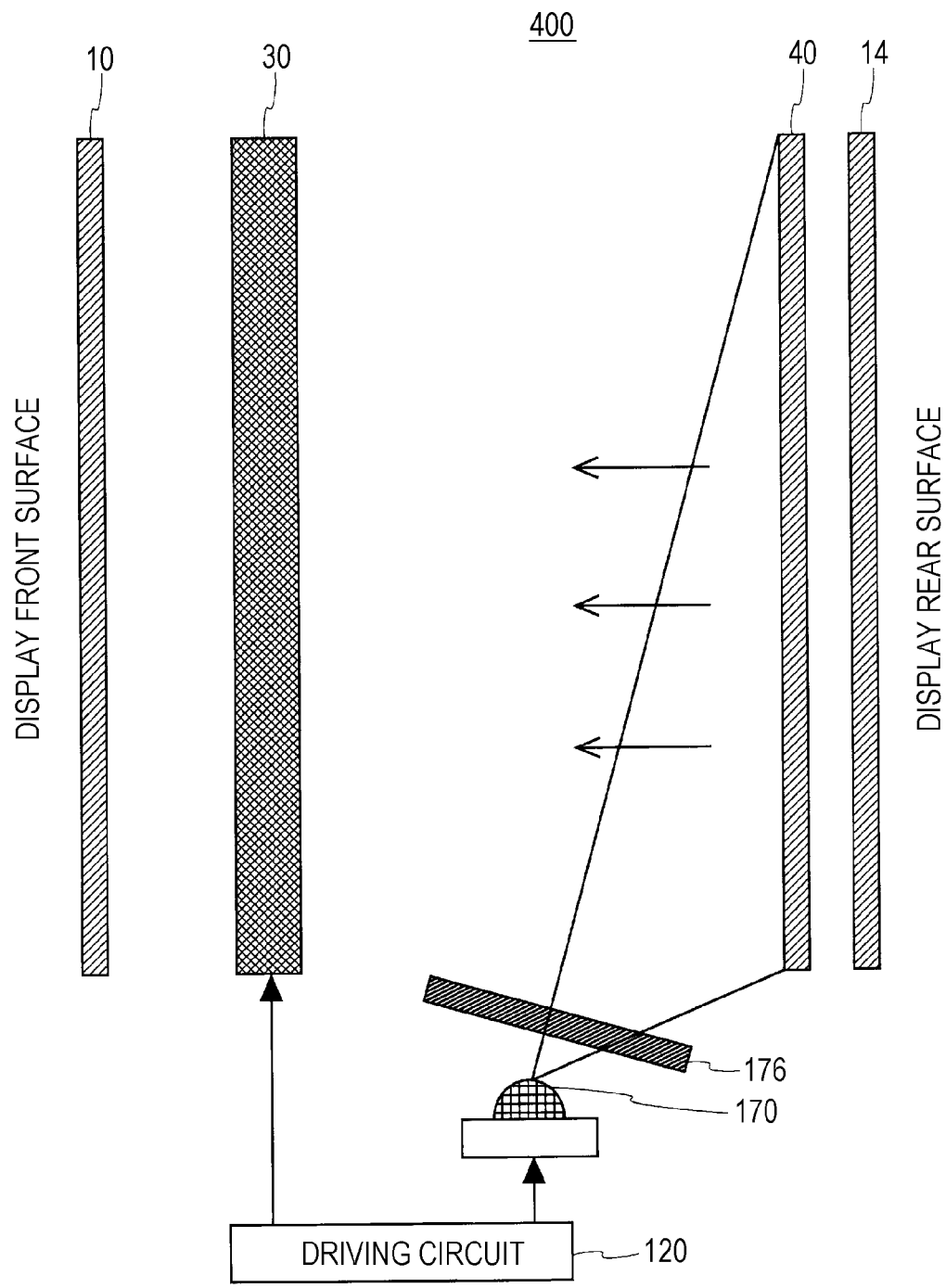
FIG. 22 is a diagram showing the configuration of an image display device according to a second embodiment of the present invention.

FIG. 22 is a diagram showing the configuration of an image display device 400 according to a second embodiment of the present invention. As shown in FIG. 22, in the image display device 400, an absorption-type polarization plate 10 for controlling polarization rotation, a liquid crystal panel 30 for controlling polarization rotation, a diffraction grating sheet 40, and an absorption-type polarization plate 14 for selecting ambient light are sequentially arranged so as to be parallel to one another. A light source 170 that applies light having a single polarization component, as backlight light, to the diffraction grating sheet 40 is disposed near a space interposed between the liquid crystal panel 30 for controlling polarization rotation and the diffraction grating sheet 40. A driving circuit 120 that drives the liquid crystal panel 30 for controlling polarization rotation and the light source 170 is connected to the liquid crystal panel and the light source.

The same constituent members of the image display device 400 as the constituent members of the image display device 300 shown in FIG. 7 will be assigned the same reference numerals, and the description thereof will be omitted. Different constituent members will be mainly described. Unlike the case of the image display device 300, in the image display device 400, the diffraction grating sheet 40 and the absorption-type polarization plate 14 for selecting ambient light are arranged in place of the reflection-type polarization plate 20.

A position where the light source 170 is provided is different from that in the image display device 300, but an absorption-type polarization plate 176 is disposed on the surface of the light source 170. Light emitted from the light source 170 is linearly polarized light including polarization components having various polarization directions. However, the light transmits through the absorption-type polarization plate 176, and thus, polarization components which have the same polarization direction as the transmission axis direction are extracted. That is, the light from the light source 170 transmits through the absorption-type polarization plate 176, and thus, the single polarized light is obtained. In addition to the absorption-type polarization plate 176, a reflection-type polarization plate may be used as a polarization plate disposed on the surface of the light source 170 in order to obtain the single polarized light. Thus, these polarization plates may be collectively referred to as a "second polarization component selecting polarization plate". A laser light source such as a light source that emits light having a single polarization component may be used. In this case, since it is not necessary to provide the absorption-type polarization plate 176 on the surface of the laser light source, the structure can be simplified.

The single polarized light emitted from the light source 170 is uniformly irradiated to the diffraction grating sheet 40. The diffraction grating sheet 40 diffracts a part of the irradiated single polarized light, and diffracts the partial light toward the liquid crystal panel 30 for controlling polarization rotation at a diffraction angle smaller than an incident angle. As described above, the incident light being diffracted or refracted at the diffraction angle smaller than the incident angle may be referred to as "being raised" in the present specifications. The light having the polarization component raised by the diffraction grating sheet 40 is irradiated to the liquid crystal panel 30 for controlling polarization rotation, as backlight light. As stated above, the diffraction grating sheet 40 merely raises the irradiated light, and thus, it is difficult to extract a specific polarization component as in the reflection-type polarization plate 20. Thus, as described above, in the image display device 400, it is necessary to render the light emitted from the light source 170 into a single polarized light by causing the light to transmit through the absorption-type polarization plate 176.

Light of the light emitted from the light source 170 which is not diffracted transmits through the diffraction grating sheet 40, and is irradiated to the absorption-type polarizaplate 14 for selecting ambient light. If the absorption-type polarization plate 14 for selecting ambient light is disposed such that the absorption axis direction is the same as the polarization direction of the transmission light, the light transmitted through the diffraction grating sheet 40 is absorbed to the absorption-type polarization plate 14 for selecting ambient light. The polarization components of the ambient light incident on the absorption-type polarization plate 14 for selecting ambient light from the rear surface side of the display which have the same polarization direction as the transmission axis direction of the absorption-type polarization plate 14 for selecting ambient light transmit through the absorption-type polarization plate 14 for selecting ambient light, are diffracted by the diffraction grating sheet 40, and are incident on the liquid crystal panel 30 for controlling polarization rotation. In this case, preferably, the absorption axis of the absorption-type polarization plate 14 for selecting ambient light has the same direction as the polarization direction of the light emitted from the light source 170. Accordingly, since the polarization direction of the backlight light and the polarization direction of the ambient light are perpendicular to each other, any one of the ambient light and the backlight light of which the rotation is controlled by the liquid crystal panel 30 for controlling polarization rotation transmits through the absorption-type polarization plate 10 for controlling polarization rotation, and transmits to the front surface side of the display.

In order to reflect the light having the single polarization component from the light source 170, a prism sheet may be used in place of the diffraction grating sheet 40. Similarly to the diffraction grating sheet 40, the prism sheet refracts the single polarized light emitted from the light source 170 toward the liquid crystal panel 30 for controlling polarization rotation so as to be raised.

A reflection-type polarization plate for selecting ambient light may be disposed instead of the absorption-type polarization plate 14 for selecting ambient light disposed outside the diffraction grating sheet 40. In this case, the reflection-type polarization plate for selecting ambient light is preferably disposed such that the reflection axis direction of the reflection-type polarization plate for selecting ambient light is the same as the polarization direction of the polarization component of the light emitted from the light source 170. Accordingly, since the light of the emitted light from the light source 170, which has transmitted through the diffraction grating sheet 40, can be reflected from the reflection-type polarization plate for selecting ambient light, as the backlight light, and can be incident on the liquid crystal panel 30 for controlling polarization rotation, it is possible to effectively use the light emitted from the light source 170. The polarization component of the polarization components of the ambient light which is perpendicular to the light emitted from the light source 170 transmits through the reflection-type polarization plate for selecting ambient light, and is incident on the liquid crystal panel 30 for controlling polarization rotation. The ambient light and the backlight light of which the polarization direction is controlled by the liquid crystal panel 30 for controlling polarization rotation are incident on the absorption-type polarization plate 10 for controlling polarization rotation, any one of the ambient light and the backlight light is selected, and the selected light transmits to the front surface side of the display.

In the present specifications, the diffraction grating sheet 40 and the prism sheet may be collectively referred to as a "polarization component selecting sheet", and the absorption-type polarization plate 14 for selecting ambient light and the reflection-type polarization plate for selecting ambient light may be collectively referred to as a "polarization component selecting polarization plate". The "polarization component selecting sheet" and the "polarization component selecting polarization plate" may be collectively referred to as a "first polarization component selecting polarization plate".

<3.2 Light Source>

Figure 23:
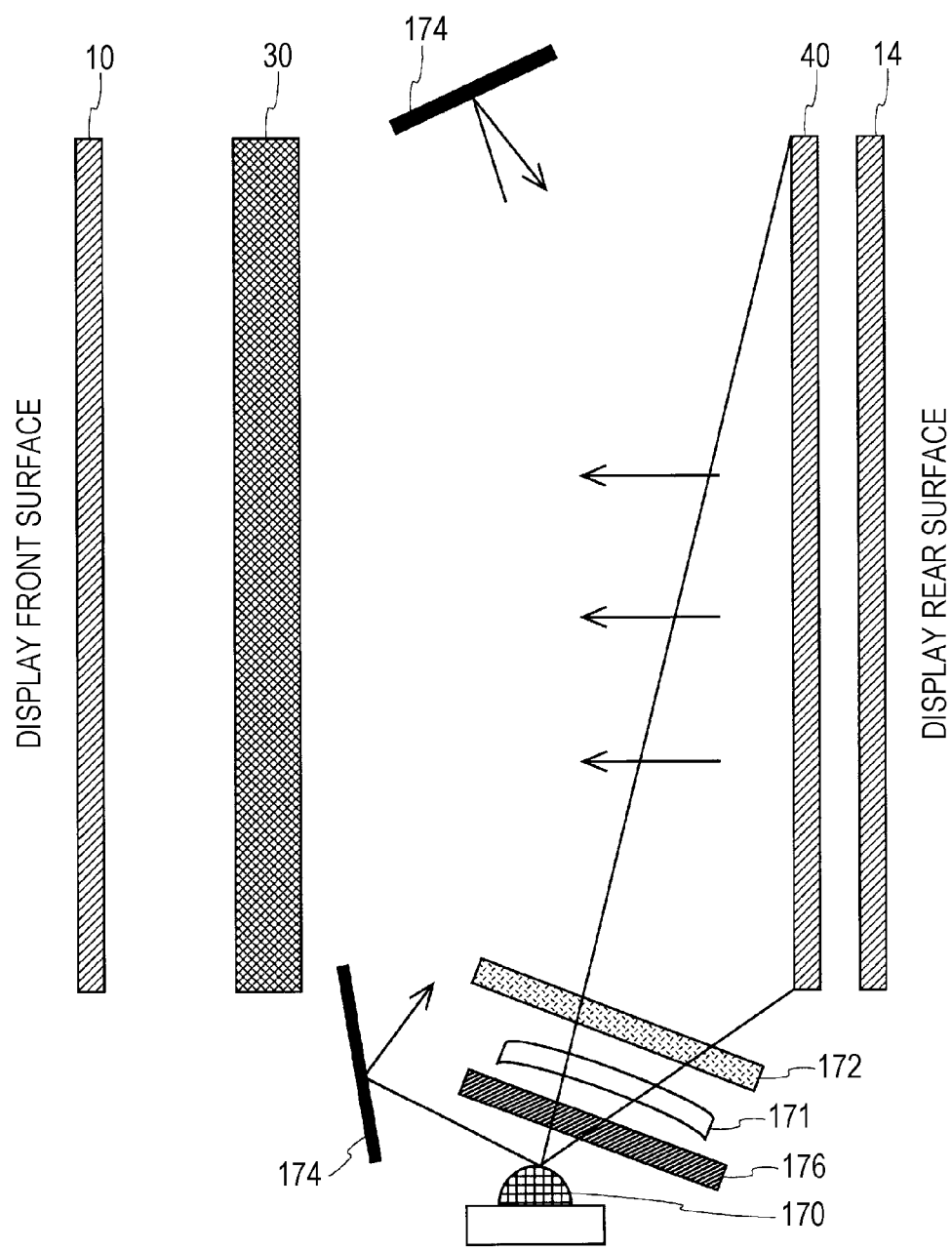
FIG. 23 is a diagram showing an example of the configuration of the light source included in the image display device shown in FIG. 22.
Figure 24:
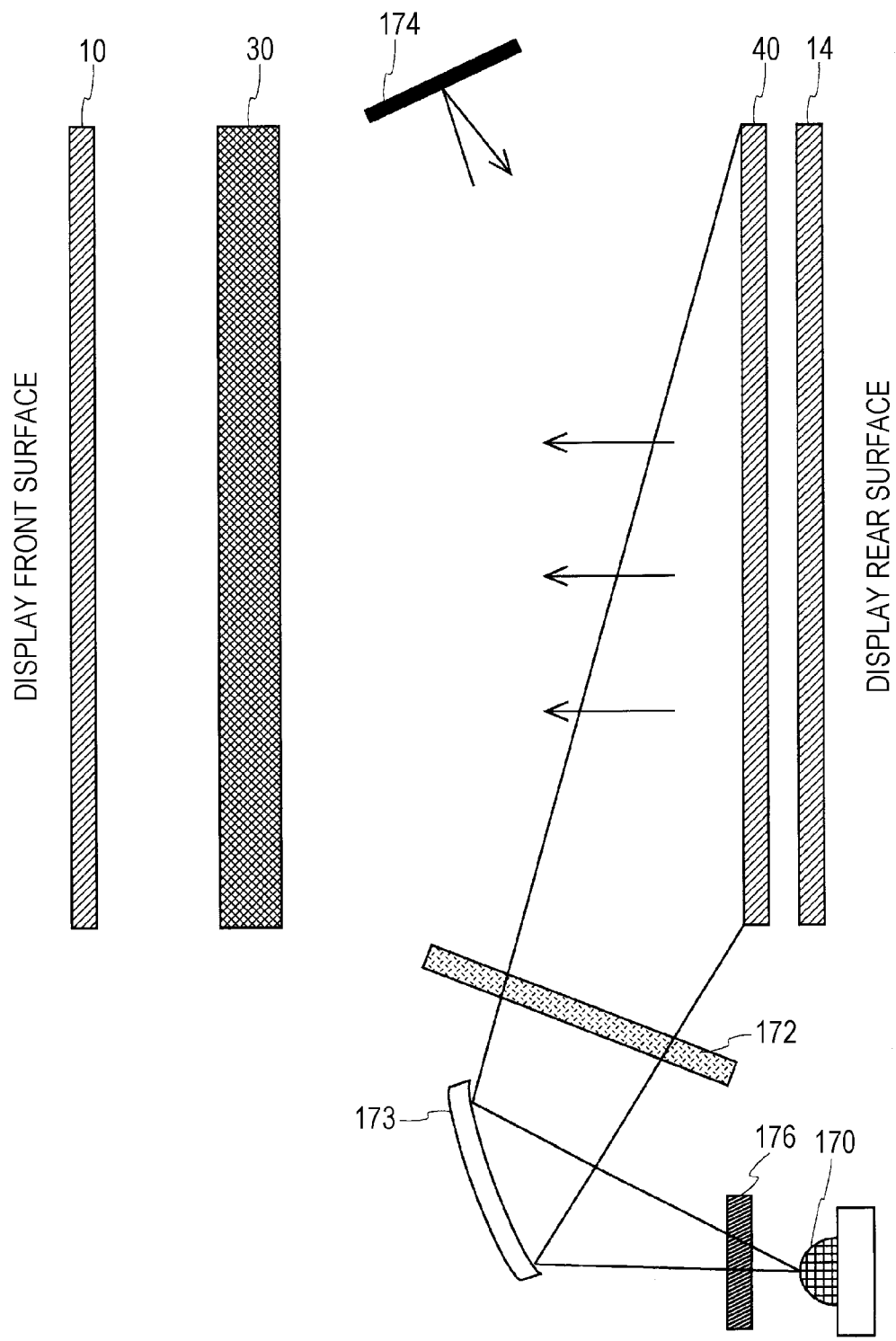
FIG. 24 is a diagram showing another example of the configuration of the light source included in the image display device shown in FIG. 22.

FIG. 23 is a diagram showing an example of the configuration of the light source 170 used in the image display device 400. As shown in FIG. 23, an absorption-type polarization plate 176, a lens 171, and a diffusion plate 172 are sequentially arranged in front of the light source 170. FIG. 24 is a diagram showing another example of the configuration of the light source 170 used in the image display device 400. As shown in FIG. 24, an absorption-type polarization plate 176, a mirror 173, and a diffusion plate 172 are sequentially arranged in front of the light source 170. In both cases, the light from the light source 170 is rendered into a single polarized light by causing the light to transmit through the absorption-type polarization plate 176, and is irradiated to the diffraction grating sheet 40. The lens 171 or the diffusion plate 172 is used in order for the single polarized light to be uniformly irradiated to the diffraction grating sheet 40. Preferably, a reflection plate 174 is disposed so as to surround a region around the light source 170 or a space interposed between the liquid crystal panel 30 for controlling polarization rotation and the reflection-type polarization plate 20 such that the single polarized light to be irradiated to the diffraction grating sheet 40 is not diffused to a surrounding space.

Figure 25:
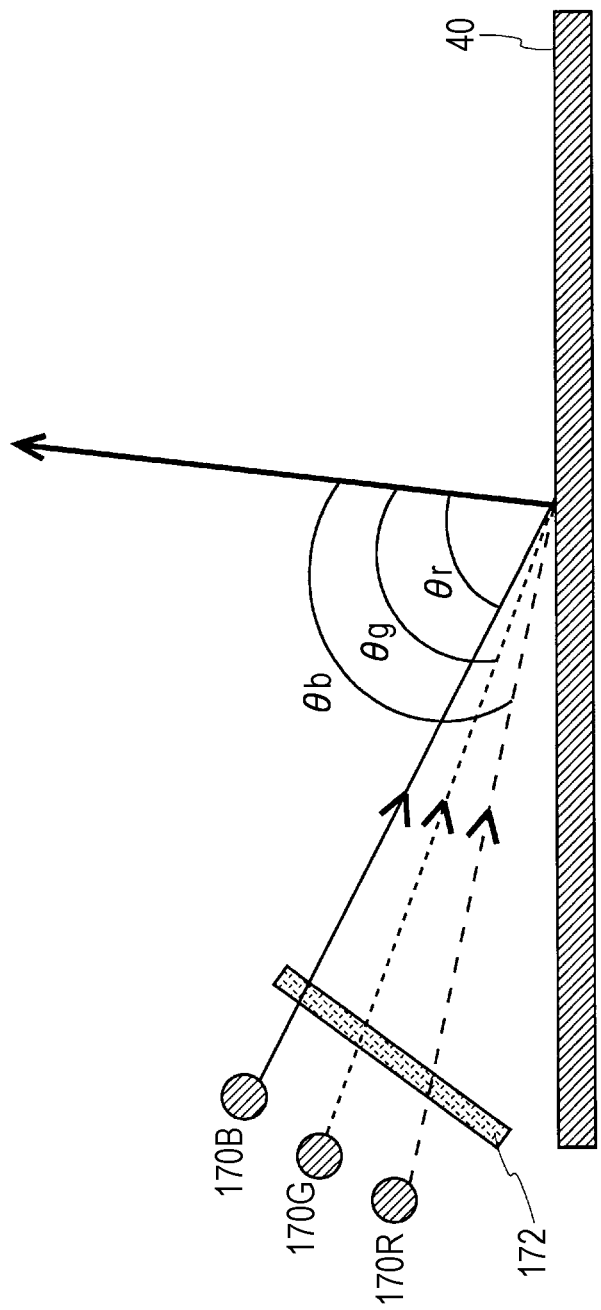
FIG. 25 is a diagram showing the arrangement of the respective color lamps as light sources with consideration for wavelength dispersion in the image display device shown in FIG. 22.

In the image display device 400, the image of which the colors are shifted may be displayed by the wavelength dispersion of a diffraction angle generated at the time of the diffraction of the light emitted from the light source 170 due to the diffraction grating sheet 40. Thus, the color shift of the image is prevented by devising the arrangement of a red lamp 170R, a green lamp 170G and a blue lamp 170B constituting the light source 170. FIG. 25 is a diagram showing the arrangement of the respective color lamps with consideration for the wavelength dispersion. If the red, green and blue light beams are respectively diffracted by the diffraction grating sheet 40, the wavelength dispersion in which the diffraction angles of red, green and blue are sequentially increased occurs. Thus, as shown in FIG. 25, the blue lamp 170B, the green lamp 170G and the red lamp 170R are arranged such that the incident angles of the blue, green and red are sequentially increased. Accordingly, the respective color light beams diffracted by the diffraction grating sheet 40 have the same diffraction angle, and thus, it is possible to prevent the color shift of the image. In addition to the case where the light emitted from the light source 170 is diffracted by the diffraction grating sheet 40, in a case where the light is refracted from the front surface of the prism sheet, a case where the light is irradiated to the rear surface of the diffraction grating sheet or the prism sheet and the traveling direction thereof is bent, or a case where the field sequential driving is performed, the respective color lamps constituting the light source 170 are arranged in the same manner, and thus, it is possible to prevent the color shift of the image.

The driving circuit 120 that drives the liquid crystal panel 30 for controlling polarization rotation and the light source 170 is the same as the driving circuit 120 described in the basic configuration of the present invention, and thus, the block diagram and description thereof will be omitted. An application example of the image display device 400 is also the same as the application example described in the first embodiment, and thus, the description thereof will be omitted.

<3.3 Effect>

According to the present embodiment, the image display device 400 exhibits the same effects as those in the case of the first embodiment. Since the absorption-type polarization plate 14 for selecting ambient light has excellent absorption characteristics, the absorption-type polarization plate 14 for selecting ambient light is disposed close to the rear surface side of the diffraction grating sheet 40, and thus, the image display device 400 can display an image with high contrast. Since the absorption-type polarization plate is inexpensive, the manufacturing cost of the image display device 400 can be more reduced than that in the case where the reflection-type polarization plate is used.

<3.4 Reference Example>

Figure 26:
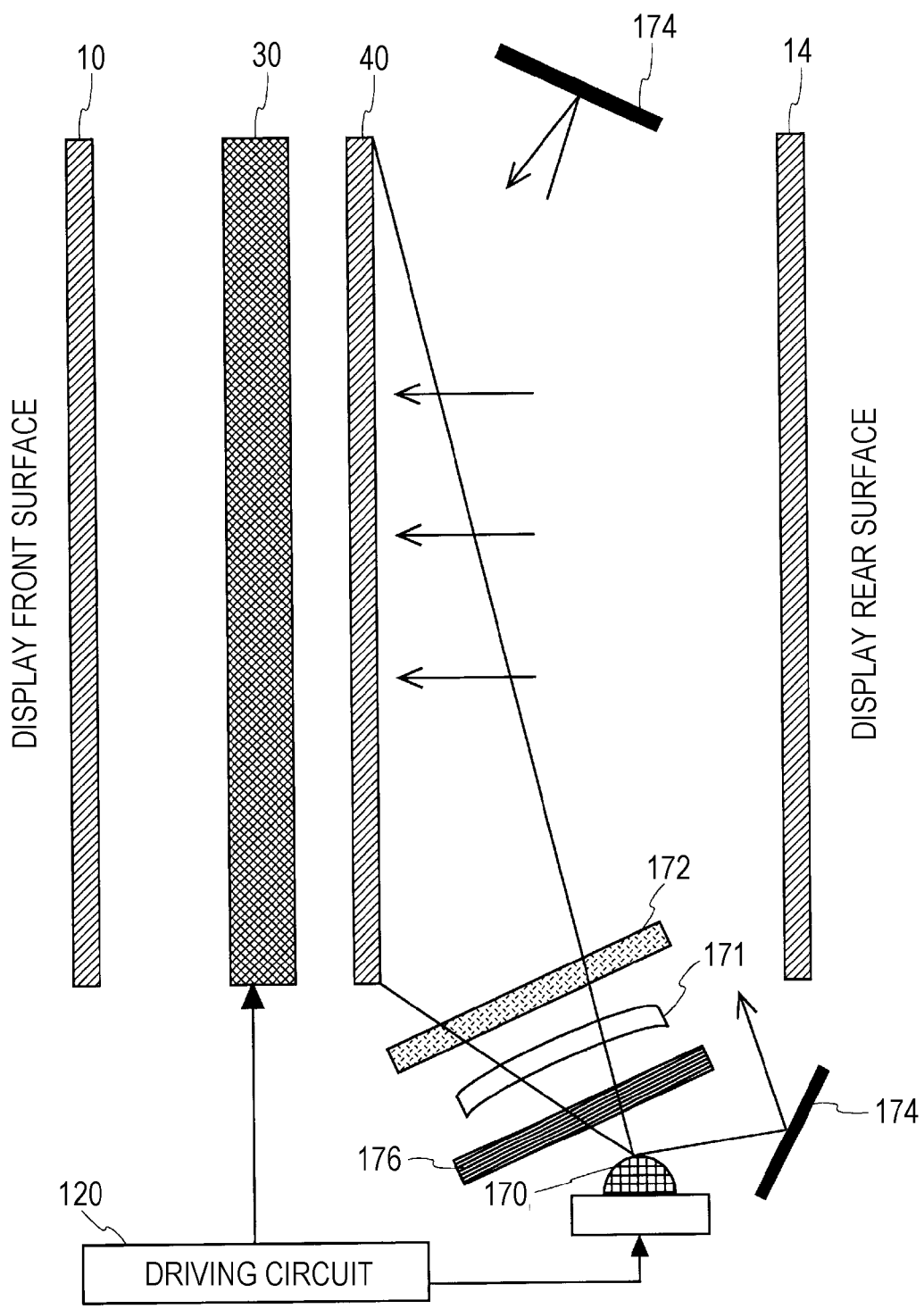
FIG. 26 is a diagram showing the configuration of an image display device according to a reference example of the second embodiment of the present invention.

FIG. 26 is a diagram showing the configuration of an image display device 410 according to a modification example of the present embodiment. In the image display device 400 according to the above-described embodiment, the light source 170 is disposed near the space interposed between the liquid crystal panel 30 for controlling polarization rotation and the diffraction grating sheet 40, as shown in FIG. 22. However, in the present modification example, a light source 170 is disposed near a space interposed between a diffraction grating sheet 40 and an absorption-type polarization plate 14 for selecting ambient light, as shown in FIG. 26. Accordingly, single polarized light of light emitted from the light source 170, which has transmitted through the absorption-type polarization plate 176, is irradiated from the rear surface side of the diffraction grating sheet 40, and the light diffracted by the diffraction grating sheet 40 is irradiated to the liquid crystal panel 30 for controlling polarization rotation, as backlight light. Meanwhile, the light which is diffracted to the rear surface side by the diffraction grating sheet 40 and is incident on the absorption-type polarization plate 14 for selecting ambient light is absorbed to the absorption-type polarization plate 14 for selecting ambient light. Polarization components of ambient light incident on the absorption-type polarization plate 14 for selecting ambient light from the rear surface side of the display which have the same polarization direction as the transmission axis direction of the absorption-type polarization plate 14 for selecting ambient light transmit through the absorption-type polarization plate 14 for selecting ambient light, are incident on the diffraction grating sheet 40, are raised by the diffraction grating sheet 40, and are incident on the liquid crystal panel 30 for controlling polarization rotation. Thus, of the light emitted from the light source 170 which is incident on the liquid crystal panel 30 for controlling polarization rotation, the polarization direction of the light-source light transmitted through the absorption-type polarization plate 176 and the polarization direction of the ambient light transmitted through the absorption-type polarization plate 14 for selecting ambient light are perpendicular to each other.

Other constituent members are the same as the constituent members of the image display device 400 shown in FIG. 19, and thus, the description thereof will be omitted. Similarly to the case of the image display device 400 according to the present embodiment, the prism sheet may be used instead of the diffraction grating sheet 40, the reflection-type polarization plate may be used instead of the absorption-type polarization plate 14 for selecting ambient light, and the set of the lens 171 and the diffusion plate 172 or the set of the mirror 173 and the diffusion plate 172 may be arranged in front of the light source 170 in order to uniformly irradiate the light emitted from the light source 170 to the diffraction grating sheet 40, and thus, the description thereof will be omitted.

4. Third Embodiment

<4.1 Configuration and Operation of Image Display Device>

Figure 27:
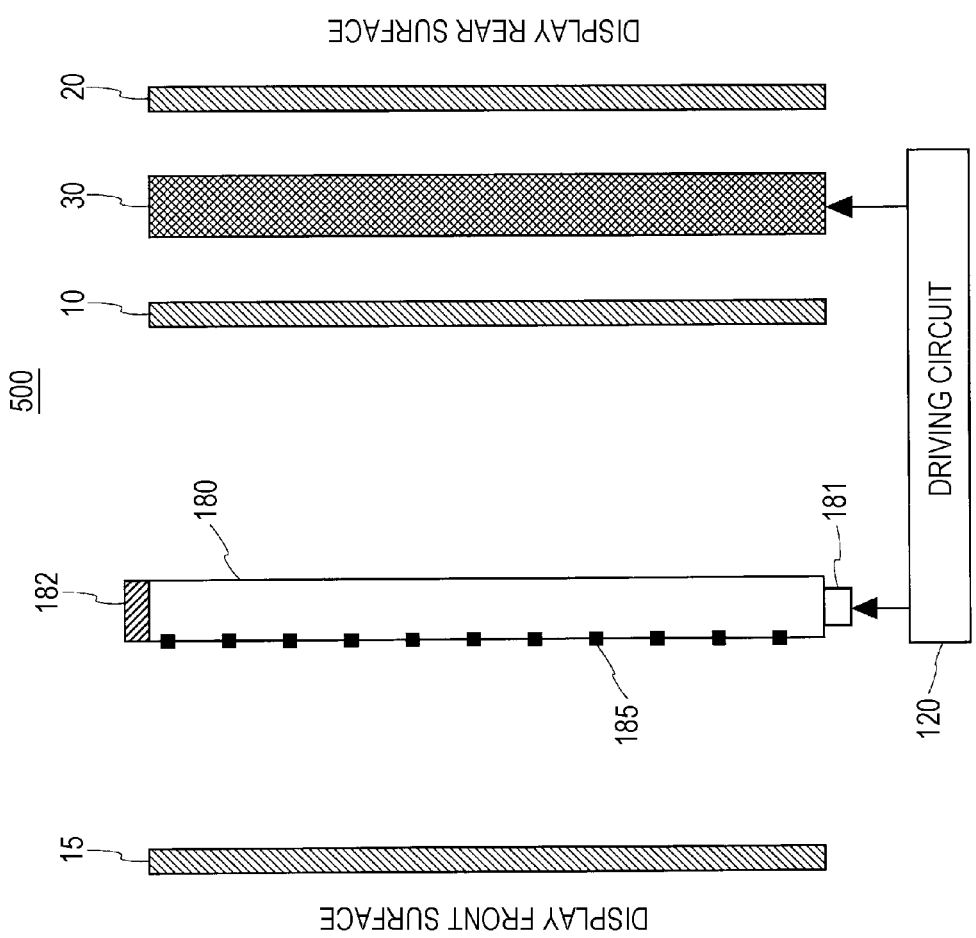
FIG. 27 is a diagram showing the configuration of an image display device according to a third embodiment of the present invention.

FIG. 27 is a diagram showing the configuration of an image display device 500 according to a third embodiment of the present invention. As shown in FIG. 27, in the image display device 500, an absorption-type polarization plate 15 for suppressing leakage, a light guide plate 180 in which a light source 181 is attached to an end, an absorption-type polarization plate 10 for controlling polarization rotation, a liquid crystal panel 30 for controlling polarization rotation, and a reflection-type polarization plate 20 are sequentially arranged so as to be parallel to one another toward the rear surface side of the display from the front surface side thereof. As stated above, in the image display device 500, the light guide plate 180 is disposed close to the front surface side of the absorption-type polarization plate 10 for controlling polarization rotation. Since the light guide plate 180 preferably extracts backlight light from the surface of the rear surface side of the light guide plate 180, an asymmetric light guide plate provided with reflection members 185 on the surface is used. Light emitted from the light guide plate 180 toward the rear surface side is reflected from the reflection-type polarization plate 20, and is irradiated to the liquid crystal panel 30 for controlling polarization rotation, as backlight light. A driving circuit 120 that drives the light source 181 of the light guide plate 180 and the liquid crystal panel 30 for controlling polarization rotation is connected to the light source and the liquid crystal panel. However, the configuration of the driving circuit 120 is the same as the configuration of the driving circuit 120 shown in FIG. 13, and thus, the block diagram and description thereof will be omitted.

Since the light guide plate 180 is the asymmetric light guide plate, light-source light as the backlight light is mainly emitted from the surface of the rear surface side. However, it is difficult to emit the light-source light to only the rear surface side, and a part of the light-source light also leaks to the front surface side. In this case, since regions which are originally supposed to be in the transparent state shine due to the leaked light, the background is hard to be seen, and thus, there is a problem that the display quality of the image is degraded.

Thus, in the present embodiment, the absorption-type polarization plate 15 for suppressing leakage is disposed close to the front surface side of the light guide plate 180, and thus, the transmission axis direction is the same as the transmission axis direction of the absorption-type polarization plate 10 for controlling polarization rotation. Accordingly, the polarization directions of the backlight light and the ambient light transmitted through the absorption-type polarization plate 10 for controlling polarization rotation are the same as the transmission axis direction of the absorption-type polarization plate 15 for suppressing leakage. Therefore, if the backlight light and the ambient light transmitted through the absorption-type polarization plate 10 for controlling polarization rotation are incident on the absorption-type polarization plate 15 for suppressing leakage, these light beams transmit through the absorption-type polarization plate 15 for suppressing leakage. However, the backlight light leaked to the front surface side of the light guide plate 180 includes the polarization components having the same polarization direction as the absorption axis direction in addition to the polarization components having the same polarization direction as the transmission axis direction of the absorption-type polarization plate 15 for suppressing leakage. Thus, the absorption-type polarization plate 15 for suppressing leakage is provided close to the front surface side of the light guide plate 180, and the polarization components of the light-source light leaked to the front surface side from the light guide plate 180 which have the same polarization direction as the absorption axis direction of the absorption-type polarization plate 15 for suppressing leakage are absorbed to the absorption-type polarization plate 15 for suppressing leakage. Accordingly, since light of the light leaked to the front surface side from the light guide plate 180 which is visually perceived by an observer is reduced by half, degradation in the display quality of the image is suppressed. A light source 170 may be disposed in place of the light guide plate 180 provided with the light source 181. If the case where the light source 170 is used, a lens 171, a diffusion plate 172 and a mirror 173 may be arranged in front of the light source 170.

<4.2 Passage Route of Backlight Light and Ambient Light>

In the following description, it is assumed that the respective transmission axis directions of the absorption-type polarization plate 15 for suppressing leakage, the absorption-type polarization plate 10 for controlling polarization rotation and the reflection-type polarization plate 20 are the same, and it is assumed that the liquid crystal panel 30 for controlling polarization rotation is a normally white type. In this case, even in a case where the power of the image display device 500 is turned off, since the ambient light transmits from the rear surface side to the front surface side, an observer can visually perceive the background from the front surface side of the display. In a case where the background may not be visually perceived at the time of the turn-off of the power of the image display device 500, it is not necessary to cause all the absorption-type polarization plate 15 for suppressing leakage, the absorption-type polarization plate 10 for controlling polarization rotation and the reflection-type polarization plate 20 to be in the same transmission axis direction, and at least one polarization plate of these polarization plates may be disposed such that the polarization direction is perpendicular to the polarization direction of another polarization plate. The liquid crystal panel 30 for controlling polarization rotation may be a normally black type.

<4.2.1 Turn-on State>

Figure 28:
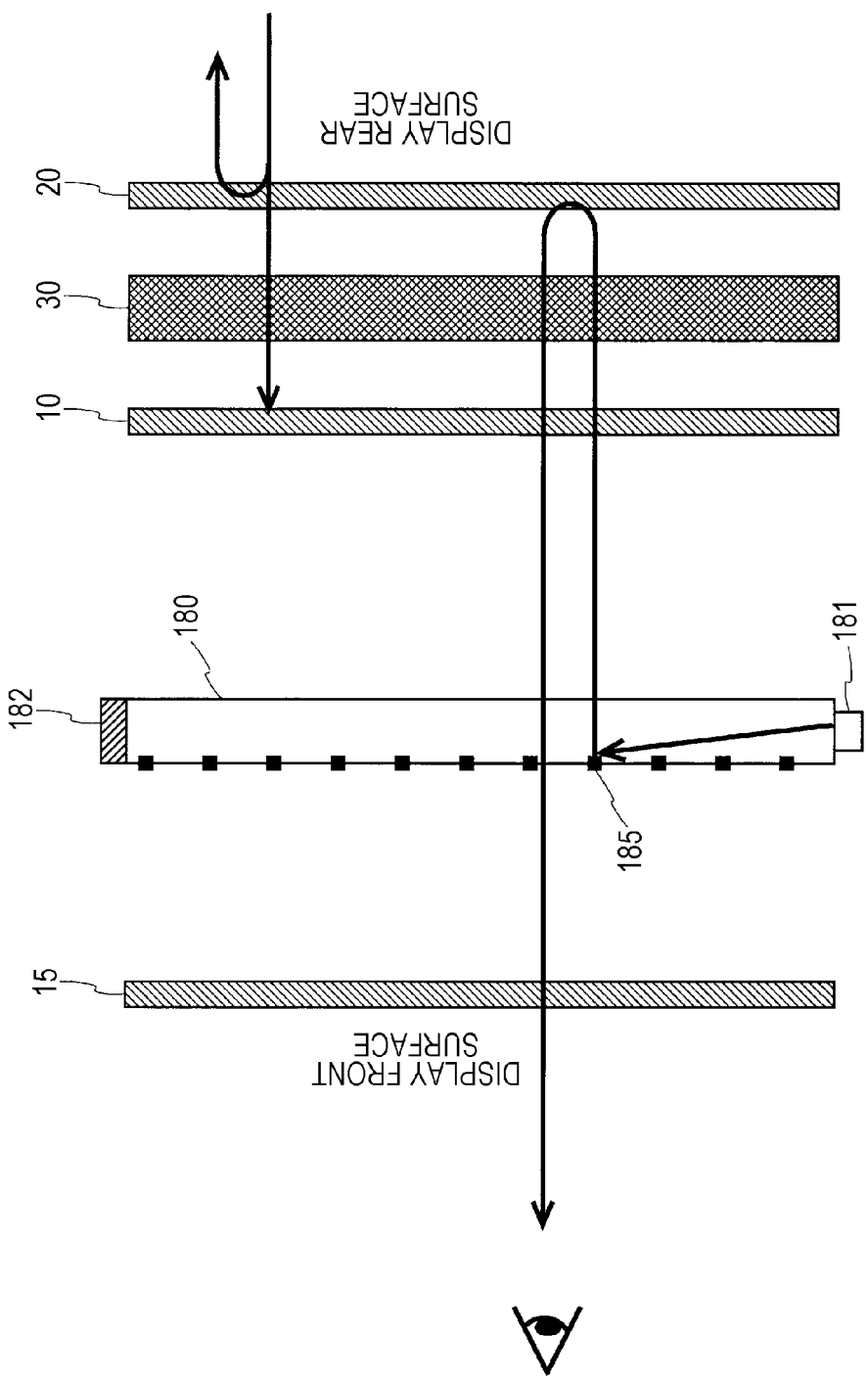
FIG. 28 is a diagram showing the passage routes of the backlight light and the ambient light in a case where the image is displayed on the display of the image display device shown in FIG. 27.

FIG. 28 is a diagram showing the passage routes of the backlight light and the ambient light in a case where the image is displayed on the display of the image display device 500. Initially, the passage route of backlight light will be described. As shown in FIG. 28, only the polarization components of the backlight light irradiated to the absorption-type polarization plate 10 for controlling polarization rotation from the light guide plate 180, which have the same polarization direction as the transmission axis direction of the absorption-type polarization plate 10 for controlling polarization rotation, transmit through the absorption-type polarization plate 10 for controlling polarization rotation. The polarization direction of the backlight light transmitted through the absorption-type polarization plate 10 for controlling polarization rotation is rotated by the liquid crystal panel 30 for controlling polarization rotation by 90°, and then, the light is incident on the reflection-type polarization plate 20. Since the reflection axis direction of the reflection-type polarization plate 20 is the same as the polarization direction of the incident backlight light, the reflection-type polarization plate 20 reflects the backlight light. The reflected backlight light is incident on the liquid crystal panel 30 for controlling polarization rotation, the polarization direction thereof is rotated by the liquid crystal panel 30 for controlling polarization rotation by 90°, and the light is incident on the absorption-type polarization plate 10 for controlling polarization rotation. Since the transmission axis direction of the absorption-type polarization plate 10 for controlling polarization rotation is the same as the polarization direction of the incident backlight light, the backlight light transmits through the absorption-type polarization plate 10 for controlling polarization rotation, and is incident on the absorption-type polarization plate 15 for suppressing leakage. Since the transmission axis direction of the absorption-type polarization plate 15 for suppressing leakage is the same as the transmission axis direction of the absorption-type polarization plate 10 for controlling polarization rotation, the incident backlight light transmits through the absorption-type polarization plate 15 for suppressing leakage.

Hereinafter, the passage route of the ambient light will be described. The polarization components of the ambient light incident on the reflection-type polarization plate 20 from the rear surface side of the display which have the same polarization direction as the transmission axis direction of the reflection-type polarization plate 20 transmit through the reflection-type polarization plate 20, and the polarization components having the polarization direction as the reflection axis direction are reflected. The polarization direction of the polarization components of the ambient light transmitted through the reflection-type polarization plate 20 is rotated by the liquid crystal panel 30 for controlling polarization rotation by 90°, and then, the light is incident on the absorption-type polarization plate 10 for controlling polarization rotation. Since the polarization direction of the ambient light incident on the absorption-type polarization plate 10 for controlling polarization rotation is the same as the absorption axis direction of the absorption-type polarization plate 10 for controlling polarization rotation, the polarization components of the ambient light are absorbed to the absorption-type polarization plate 10 for controlling polarization rotation, and is hard to transmit through the absorption-type polarization plate 10 for controlling polarization rotation.

As discussed above, in the turn-on state, the backlight light transmits to the front surface side of the display, whereas the ambient light is absorbed to the absorption-type polarization plate 10 for controlling polarization rotation, and is hard to transmit to the front surface side. Thus, an observer can visually perceive the displayed image.

<4.2.2 Transparent State>

Figure 29:
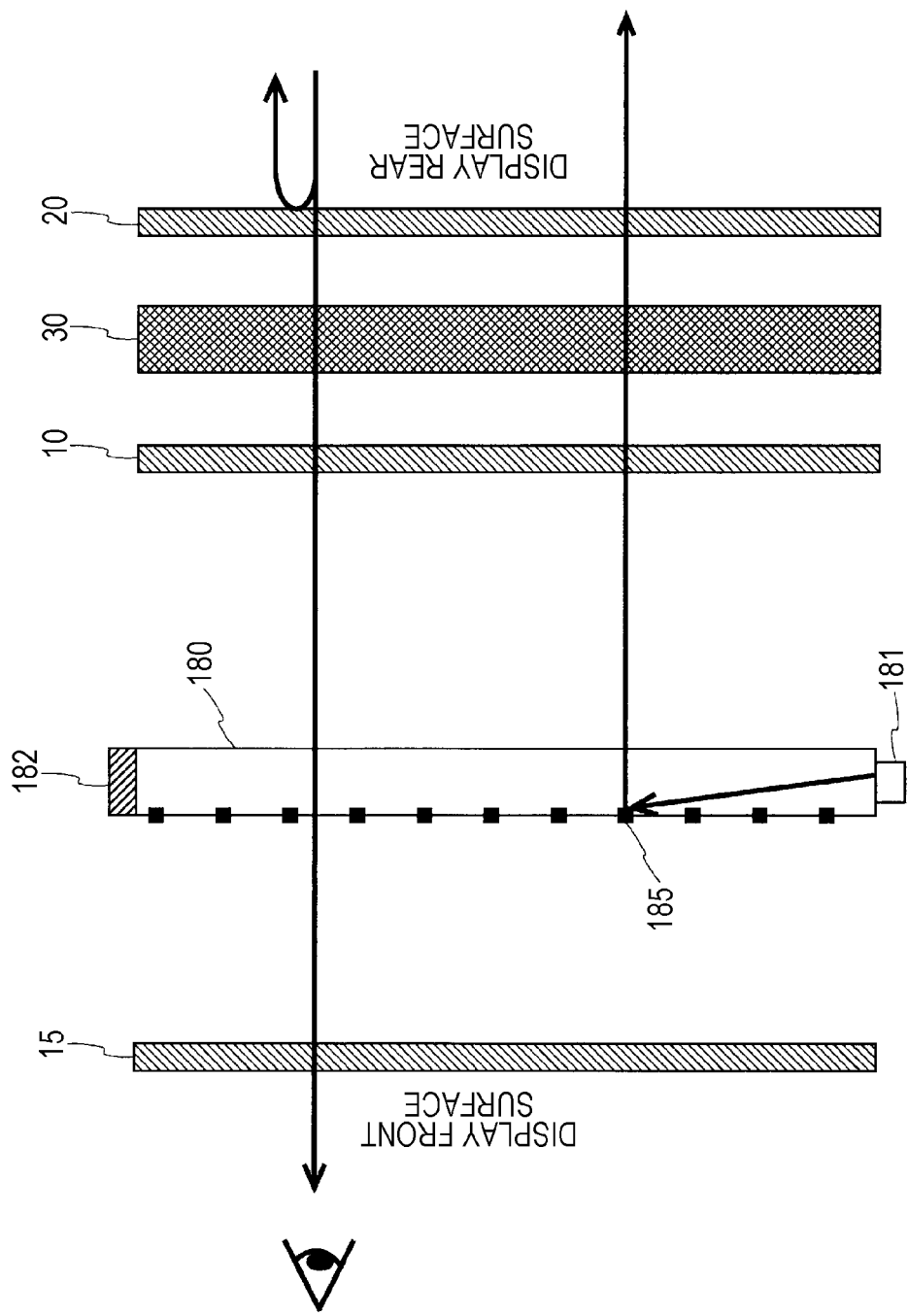
FIG. 29 is a diagram showing the passage routes of the backlight light and the ambient light in a case where the background is transparently seen on the display of the image display device shown in FIG. 27.

FIG. 29 is a diagram showing the passage routes of the backlight light and the ambient light in a case where the background is transparently seen on the display of the image display device 500. Initially, the passage route of the backlight light will be described. As shown in FIG. 29, only the polarization components of the backlight light irradiated to the absorption-type polarization plate 10 for controlling polarization rotation from the light guide plate 180, which have the same polarization direction as the transmission axis direction of the absorption-type polarization plate 10 for controlling polarization rotation, transmit through the absorption-type polarization plate 10 for controlling polarization rotation. The backlight light transmitted through the absorption-type polarization plate 10 for controlling polarization rotation is incident on the reflection-type polarization plate 20 without the rotation of the polarization direction by the liquid crystal panel 30 for controlling polarization rotation. Since the transmission axis of the reflection-type polarization plate 20 is the same as the polarization direction of the incident backlight light, the backlight light transmits through the reflection-type polarization plate 20, and escapes to the outside.

Hereinafter, the passage route of the ambient light will be described. Of the ambient light incident on the reflection-type polarization plate 20 from the rear surface side of the display, the light having the polarization components of which the polarization direction is the same as the transmission axis direction of the reflection-type polarization plate 20 transmits through the reflection-type polarization plate 20, and the light having the polarization components of which the polarization direction is the same as the reflection axis direction is reflected. The polarization components of the ambient light transmitted through the reflection-type polarization plate 20 are incident on the absorption-type polarization plate 10 for controlling polarization rotation without the rotation of the polarization direction by the liquid crystal panel 30 for controlling polarization rotation. Since the polarization direction of the ambient light is the same as the transmission axis light of the absorption-type polarization plate 10 for controlling polarization rotation, the ambient light transmits through the absorption-type polarization plate 10 for controlling polarization rotation, and is incident on the absorption-type polarization plate 15 for suppressing leakage. Since the transmission axis direction of the absorption-type polarization plate 15 for suppressing leakage, the ambient light transmits through the absorption-type polarization plate 15 for suppressing leakage.

As mentioned above, in the transparent state, the backlight light escapes to the rear surface side, whereas the ambient light transmits to the front surface side. Thus, an observer can visually perceive the transparently seen background from the front surface side.

<4.2.3 Mirror Display>

Figure 30:
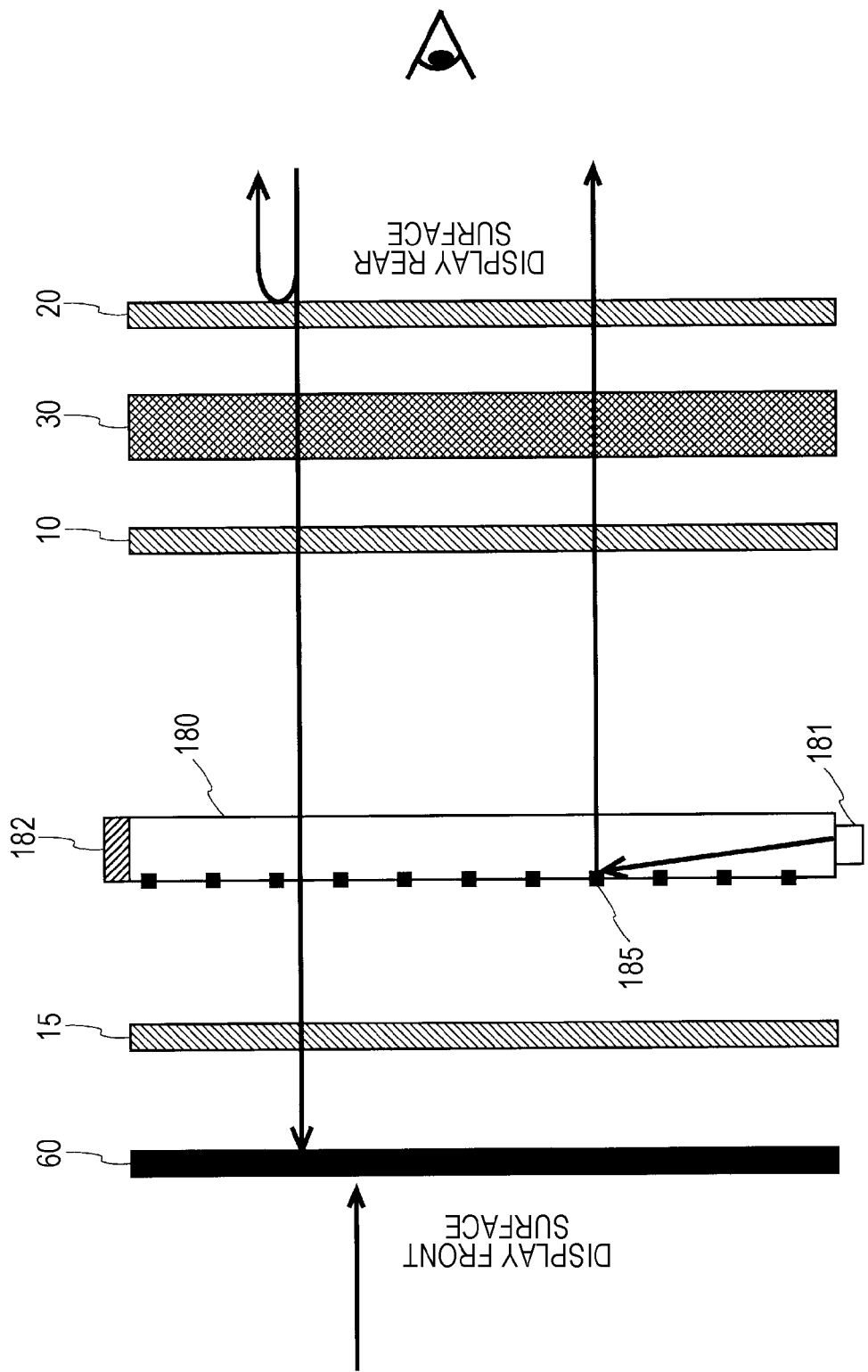
FIG. 30 is a diagram showing the passage routes of the backlight light and the ambient light in a case where the rear surface side of the display of the image display device shown in FIG. 27 is used as a mirror display.

FIG. 30 is a diagram showing the passage routes of the backlight light and the ambient light in a case where the rear surface side of the display is used as a mirror display. As shown in FIG. 30, the front surface side of the display is covered with black cloth 60. Initially, the passage route of the backlight light will be described. The light guide plate 180 that emits the backlight light, and the liquid crystal panel 30 for controlling polarization rotation interposed between the absorption-type polarization plate 10 for controlling polarization rotation and the reflection-type polarization plate 20 has the same configuration as that of the liquid crystal panel in the typical liquid crystal display device except that the reflection-type polarization plate 20 is used instead of the absorption-type polarization plate. Thus, if the image signal is applied to each pixel of the liquid crystal panel 30 for controlling polarization rotation, the image corresponding to the image signal is displayed on the rear surface side of the display.

Hereinafter, the ambient light will be described. Of the ambient light incident on the reflection-type polarization plate 20 from the rear surface side of the display, the light having the polarization components of which the polarization direction is the same as the transmission axis direction of the reflection-type polarization plate 20 transmits through the reflection-type polarization plate 20, and the light having the polarization components of which the polarization direction is the same as the reflection axis direction is reflected. The polarization components of the ambient light transmitted through the reflection-type polarization plate 20 transmit without the rotation of the polarization direction by the liquid crystal panel 30 for controlling polarization rotation, transmit sequentially through the absorption-type polarization plate 10 for controlling polarization rotation and the absorption-type polarization plate 15 for suppressing leakage, and then, are absorbed to the black cloth 60 that covers the front surface side of the display. Since the ambient light incident from the front surface side is absorbed to the black cloth 60, the ambient light is not incident within the display.

As described above, in the mirror display state, since a part of the ambient light incident from the rear surface side is reflected from the reflection-type polarization plate 20, the rear surface side of the display becomes a mirror. The light emitted from the light guide plate 180 becomes backlight light of the liquid crystal panel 30 for controlling polarization rotation, and thus, the image is displayed on the rear surface side. Accordingly, an observer can visually perceive the image displayed in the mirror.

<4.3 Effect>

According to the present embodiment, the background is transparently seen by causing the ambient light to transmit through arbitrary pixels on the image, the image is displayed by causing the backlight light to transmit, or the intermediate state therebetween is displayed.

In the image display device 310 shown in FIG. 15, a distance between the liquid crystal panel 30 for controlling polarization rotation and the reflection-type polarization plate 20 is long in view of the structure. In this case, a phenomenon in which the shadow of the image displayed on the liquid crystal panel 30 for controlling polarization rotation is reflected in the reflection-type polarization plate 20 occurs in the liquid crystal panel 30 for controlling polarization rotation by irradiating the ambient light from the front surface side in addition to irradiating the backlight light from the rear surface side. Accordingly, an observer positioned close to the front surface side of the display see the shadow of the image reflected in the reflection-type polarization plate 20, in addition to the image displayed by the backlight light transmitted through the liquid crystal panel 30 for controlling polarization rotation. Since the liquid crystal panel 30 for controlling polarization rotation and the reflection-type polarization plate 20 are arranged so as to be separated from each other, the shadow of the image seen by an observer positioned close to the front surface side of the display is seen so as to have a size greater than the size of the image. As a result, an observer visually perceives the doubly displayed image. However, in the image display device 500 of the present embodiment, since the distance between the liquid crystal panel 30 for controlling polarization rotation and the reflection-type polarization plate 20 approximates about a thickness of the liquid crystal panel 30 for controlling polarization rotation, the image and the shadow thereof have the substantially same size. Accordingly, an observer does not visually perceive the doubly displayed image, and thus, the display quality is improved.

In the image display device 500 of the present embodiment, the reflection-type polarization plate 20, the liquid crystal panel 30 for controlling polarization rotation, the absorption-type polarization plate 10 for controlling polarization rotation, and the light guide plate 180 are sequentially arranged so as to be parallel to one another toward the front surface side from the rear surface side. This structure is a structure in which the absorption-type polarization plate in the typical liquid crystal display is replaced with the reflection-type polarization plate 20. Thus, an observer can also visually perceive the sharp image from the rear surface side of the display. Since the image visually perceived when viewed from the front surface side and the image visually perceived when viewed from the rear surface side are the images displayed on the liquid crystal panel based on the image signal, an observer positioned close to the front surface side of the display and an observer positioned close to the rear surface side can see the same image. For example, in a case where a red image is displayed on the front surface side through the field sequential driving or the color filter driving, it is necessary to reflect red light to the front surface side and transmit green and blue light beams to the rear surface side. Thus, in a case where the image display device 500 is used as a double-sided display, it is necessary to take care that the image displayed on the front surface side and the image displayed on the rear surface side becomes an image in which a negative-to-positive reversal is performed in any of the driving types.

If the image display device 500 is viewed from the rear surface side while the front surface side of the display is covered with the black cloth 60, the display of the image display device 500 becomes the mirror display that displays the image in the mirror, as described above. As stated above, the front surface side of the display is merely covered with the black cloth 60, and thus, it is possible to use the front surface side of the display as the mirror display. Since the image displayed in the mirror becomes the negative-to-positive inverted image, in a case where an image in which a negative-to-positive reversal is not performed is displayed in the mirror, it is necessary to input an image signal that represents the image in which the negative-to-positive reversal is performed to the liquid crystal panel 30 for controlling polarization rotation.

In a case where the front surface side of the display is not covered with the black cloth 60, the ambient light incident from the front surface side of the display also transmits through the liquid crystal panel 30 for controlling polarization rotation, in addition to the backlight light. Thus, the display of the image display device 500 becomes a half mirror, and thus, an observer positioned close to the rear surface side can visually perceive a scenery on the front surface side in the mirror, in addition to the image corresponding to the image signal.

5. Fourth Embodiment

<5.1 Configuration of Image Display Device>

Figure 31:
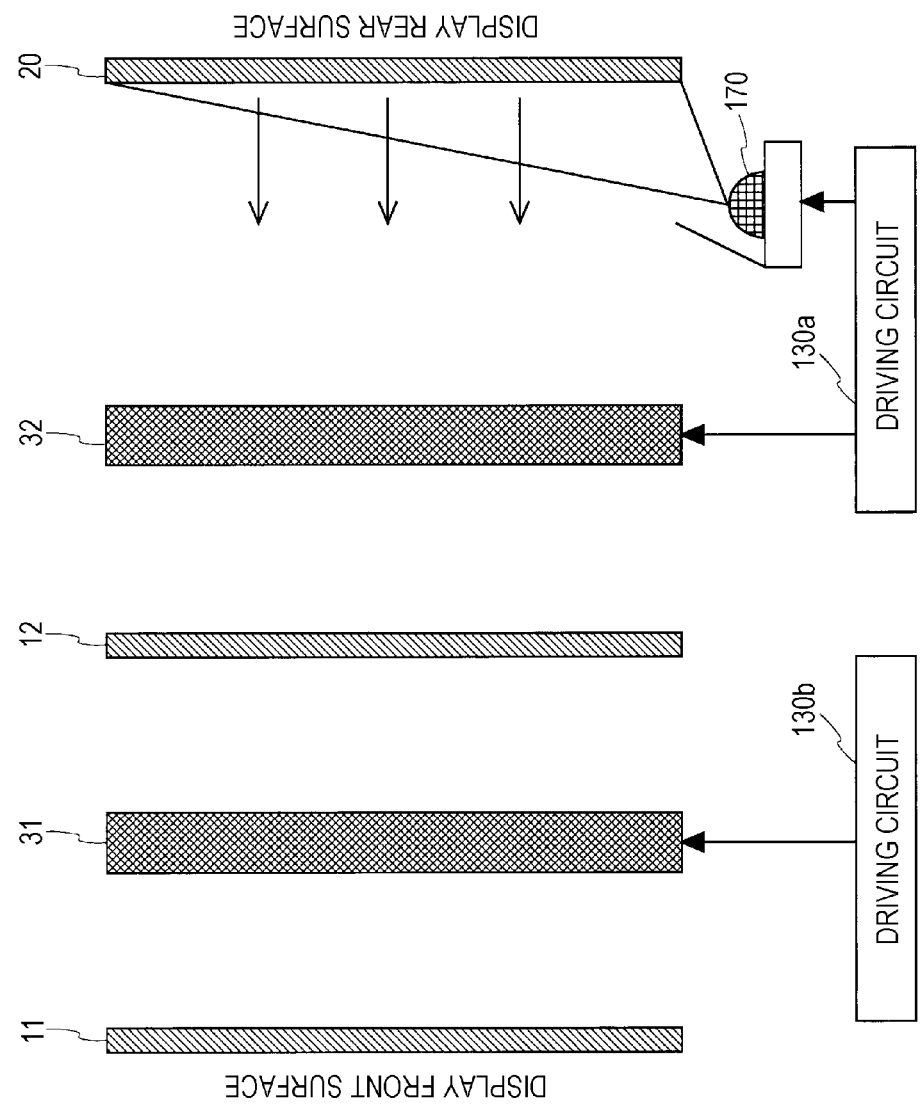
FIG. 31 is a diagram showing the configuration of an image display device according to a fourth embodiment of the present invention.

FIG. 31 is a diagram showing the configuration of an image display device 600 according to a fourth embodiment of the present invention. As shown in FIG. 31, in the image display device 600, an absorption-type polarization plate 11 for adjusting transmittance, a liquid crystal panel 31 for adjusting transmittance, an absorption-type polarization plate 12 for adjusting transparency/light-emission, a liquid crystal panel 32 for adjusting transparency/light-emission, and a reflection-type polarization plate 20 are sequentially arranged so as to be parallel to one another toward the rear surface side from the front surface side. A light source 170 is disposed near a space interposed between the liquid crystal panel 32 for adjusting transparency/light-emission and the reflection-type polarization plate 20, and light emitted from the light source 170 is irradiated to the reflection-type polarization plate 20. A second driving circuit 130b included in a driving circuit 130, to be described below, is connected to the liquid crystal panel 31 for adjusting transmittance, and a first driving circuit 130a is connected to the liquid crystal panel 32 for adjusting transparency/light-emission and the light source 170. A second driving circuit 140b included in a driving circuit 140, to be described below, may be connected to the liquid crystal panel 31 for adjusting transmittance, and a first driving circuit 140a may be connected to the liquid crystal panel 32 for adjusting transparency/light-emission and the light source 170. In place of the light source 170, a light guide plate 180 to which a light source 181 is attached may be disposed in a space interposed between the liquid crystal panel 32 for adjusting transparency/light-emission and the reflection-type polarization plate 20.

<5.2 Passage Routes of Backlight Light and Ambient Light>

<5.2.1 Turn-on State>

Figure 32:
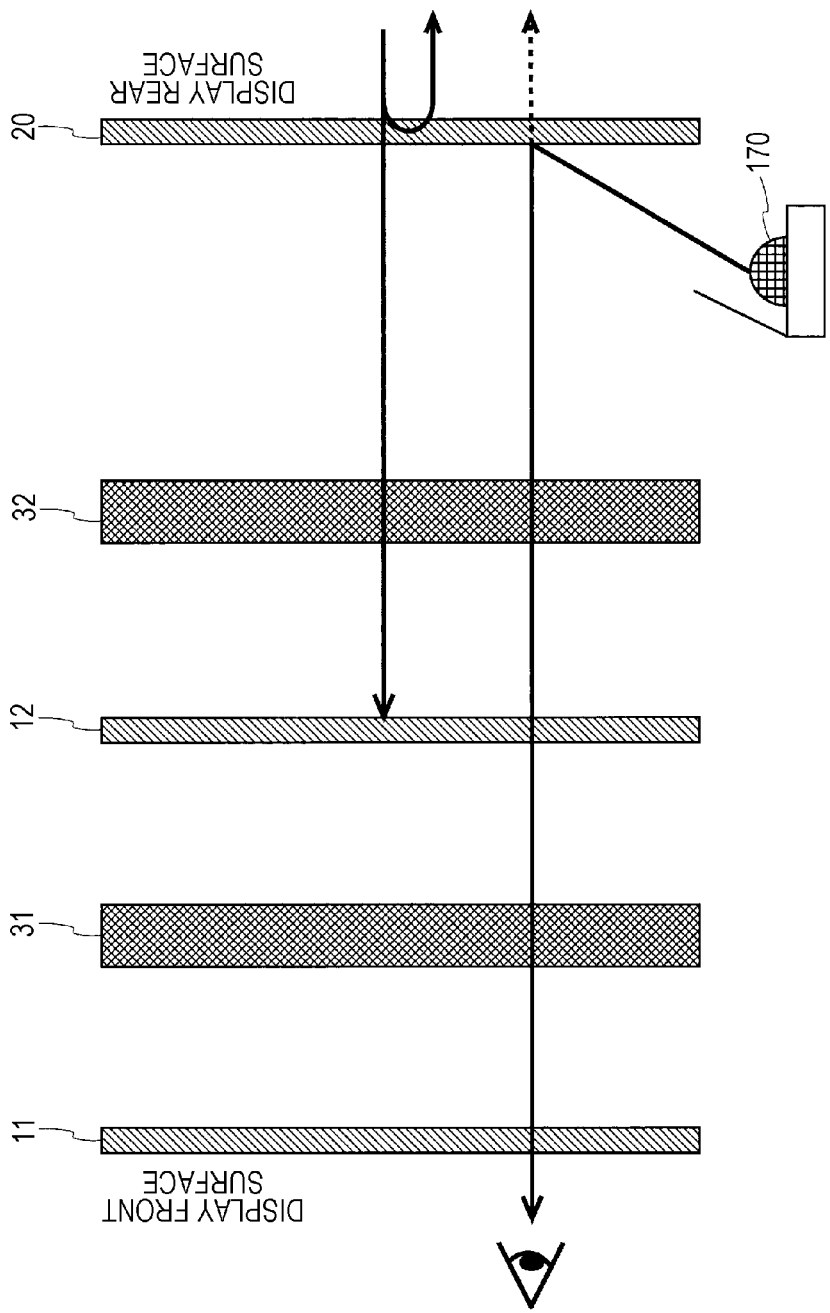
FIG. 32 is a diagram showing the passage routes of the backlight light and the ambient light in a case where the image is displayed on the front surface side of the display in the image display device shown in FIG. 31.

FIG. 32 is a diagram showing the passage routes of the backlight light and the ambient light in a case where the image is displayed on the front surface side of the display in the image display device 600. As shown in FIG. 32, of the backlight light irradiated to the reflection-type polarization plate 20 from the light source 170, only the polarization components having the same polarization direction as the reflection axis direction of the reflection-type polarization plate 20 are reflected from the reflection-type polarization plate 20, and are incident on the liquid crystal panel 32 for adjusting transparency/light-emission, as the backlight light, and the polarization components having the same polarization direction as the transmission axis direction escape to the outside. The liquid crystal panel 32 for adjusting transparency/light-emission rotates the polarization direction of the incident backlight light such that the backlight light transmits through the absorption-type polarization plate 12 for adjusting transparency/light-emission. The backlight light of which the polarization direction is rotated transmits through the absorption-type polarization plate 12 for adjusting transparency/light-emission, and is incident on the liquid crystal panel 31 for adjusting transmittance. The liquid crystal panel 31 for adjusting transmittance transmits the backlight light at a transmittance corresponding to the image signal applied to the pixels of the liquid crystal panel 31 for adjusting transmittance, and applies the backlight light to the absorption-type polarization plate 11 for adjusting transmittance. Since the transmission axis direction of the absorption-type polarization plate 11 for adjusting transmittance is the same as the polarization direction of the backlight light, the backlight light transmits through the absorption-type polarization plate 11 for adjusting transmittance.

The polarization components of the ambient light having the same polarization direction as the transmission axis of the reflection-type polarization plate 20 transmit through the reflection-type polarization plate 20, and are incident on the liquid crystal panel 32 for adjusting transparency/light-emission, and the polarization components of the ambient light having the same polarization direction as the reflection axis are reflected. The liquid crystal panel 32 for adjusting transparency/light-emission rotates the polarization direction of the incident ambient light. Thus, the polarization direction of the ambient light is the same as the absorption axis direction of the absorption-type polarization plate 12 for adjusting transparency/light-emission, and the polarization components thereof are absorbed to the absorption-type polarization plate 12 for adjusting transparency/light-emission. As mentioned above, since only the backlight light transmits to the front surface side and the ambient light is hard to transmit, an observer visually perceive the image in which the gradations are displayed and which corresponds to the image signal.

<5.2.2 Transparent State>

Although not shown, in a case where the liquid crystal panel 32 for adjusting transparency/light-emission does not rotate the polarization directions of the ambient light and the backlight light, only the ambient light transmits to the front surface side, and the backlight light is hard to transmit to the front surface side. Accordingly, an observer can visually perceive only the transparently seen background.

<5.2.3 Turn-Off State>

Figure 33:
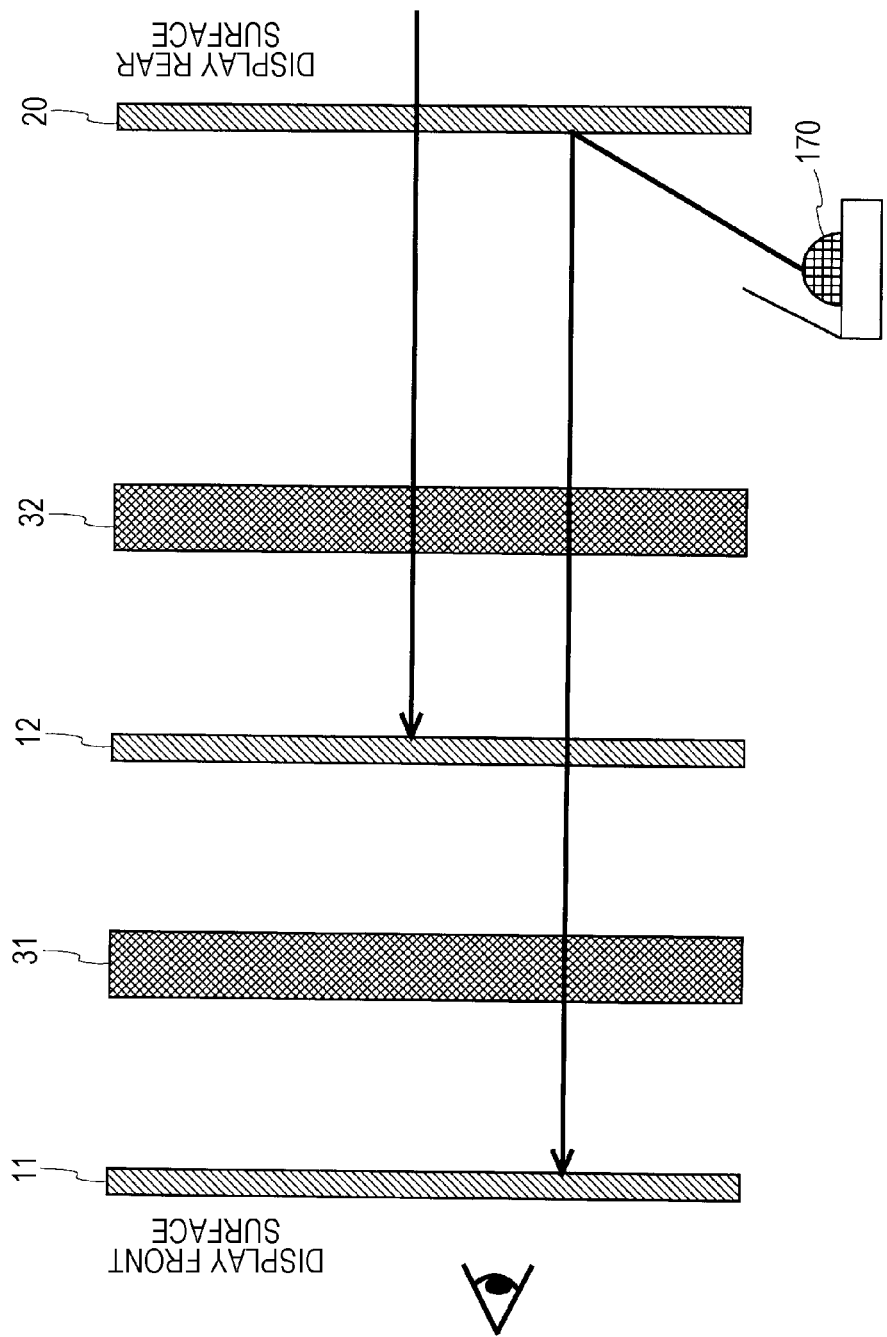
FIG. 33 is a diagram showing the passage routes of the backlight light and the ambient light in a case where neither the image nor the background are displayed and the display is displayed in black in the image display device shown in FIG. 31.

FIG. 33 is a diagram showing the passage routes of the backlight light and the ambient light in a case where neither the image nor the background are displayed and the display is displayed in black in the image display device 600. As shown in FIG. 33, of the backlight light irradiated to the reflection-type polarization plate 20 from the light source 170, only the polarization components having the same polarization direction as the reflection axis direction of the reflection-type polarization plate are reflected from the reflection-type polarization plate 20, and are incident on the liquid crystal panel 32 for adjusting transparency/light-emission, as the backlight light. The liquid crystal panel 32 for adjusting transparency/light-emission rotates the polarization direction of the incident backlight light such that the backlight light transmits through the absorption-type polarization plate 12 for adjusting transparency/light-emission. Accordingly, the backlight light transmits through the absorption-type polarization plate 12 for adjusting transparency/light-emission, and is incident on the liquid crystal panel 31 for adjusting transmittance. The liquid crystal panel 31 for adjusting transmittance rotates the polarization direction of the backlight light such that the backlight light does not transmit the absorption-type polarization plate 11 for adjusting transmittance, and applies the backlight light to the absorption-type polarization plate 11 for adjusting transmittance. As a result, since the polarization direction of the backlight light is the same as the absorption axis direction of the absorption-type polarization plate 11 for adjusting transmittance, the backlight light is absorbed to the absorption-type polarization plate 11 for adjusting transmittance.

Meanwhile, the polarization components of the ambient light having the same polarization direction as the transmission axis direction of the reflection-type polarization plate 20 transmit trough the reflection-type polarization plate 20, and are incident on the liquid crystal panel 32 for adjusting transparency/light-emission. The polarization direction of the ambient light is rotated by the liquid crystal panel 32 for adjusting transparency/light-emission, and is the same as the absorption axis direction of the absorption-type polarization plate 12 for adjusting transparency/light-emission. Accordingly, the ambient light is absorbed to the absorption-type polarization plate 12 for adjusting transparency/light-emission. In this case, since neither the backlight light nor the ambient light transmit to the front surface side, the display is displayed in black.

Although not shown, in a case where the liquid crystal panel 32 for adjusting transparency/light-emission does not rotate the polarization directions of the ambient light and the backlight light and the liquid crystal panel 31 for adjusting transmittance rotates the polarization directions of the ambient light and the backlight light, the ambient light is absorbed to the absorption-type polarization plate 11 for adjusting transmittance, and the backlight light is absorbed to the absorption-type polarization plate 12 for adjusting transparency/light-emission. Accordingly, the display is displayed in black.

As stated above, the image display device 600 may cause each pixel to be in a turn-on state in which the image is displayed with gradations corresponding to the image signal by transmitting the backlight light or in a transparent state in which the backlight light is transparently seen by causing each pixel to be transparent. In addition, the image display device may cause each pixel to be in a turn-off state in which neither the image nor the background are displayed by blocking the backlight light and the ambient light. As discussed above, since the image display device 600 can display in black by being in the turn-off state in addition to being in the turn-on state and the transparent state, the image display device can display an image with higher contrast and a higher degree of freedom of expression than in the image display device 300 according to the first embodiment. It is possible to display the image so as to be superimposed on the background by adjusting the transmission ratio between the backlight light and the ambient light.

Since the pixels of the liquid crystal panel 32 for adjusting transparency/light-emission have a size greater than the pixels of the liquid crystal panel 31 for adjusting transmittance, a liquid crystal panel which is more inexpensive than the liquid crystal panel 31 for adjusting transmittance is used as a liquid crystal panel used as the liquid crystal panel 32 for adjusting transparency/light-emission. Accordingly, the manufacturing cost of the image display device 600 can be reduced.

In a case where the pixels of the liquid crystal panel 32 for adjusting transparency/light-emission have the same size as that of the pixels of the liquid crystal panel 31 for adjusting transmittance, moiré easily occurs by overlapping these panels with each other. Thus, it is possible to prevent the occurrence of moiré by changing the size of the pixels of the liquid crystal panel 32 for adjusting transparency/light-emission and the size of the pixels of the liquid crystal panel 31 for adjusting transmittance.

The light source 170 of the image display device 600 may be replaced with the light guide plate 180 to which the light source 181 is attached, or the reflection-type polarization plate 20 may be replaced with a diffraction grating sheet and an absorption-type polarization plate. A lens 171 and a diffusion plate 172, or a mirror 173 and a diffusion plate 172 may be provided in front of the light source 170.

The image display device 600 may display a color image in addition to displaying a monochrome image. As described in the first embodiment, in a case where the color image is displayed, the color filter driving may be performed by constructing each pixel with sub-pixels to which color filters adhere, or the field sequential driving may be performed on the liquid crystal panel 31 for adjusting transmittance and the liquid crystal panel 32 for adjusting transparency/light-emission.

The light emitted from the light source 170 may be diffracted by the surface of the diffraction grating sheet, may be refracted by the surface of the prism sheet, or may be irradiated from the rear surface side of the diffraction grating sheet or the prism sheet. In a case where the field sequential driving is performed, in order to prevent the color shift, the respective color lamps constituting the light source 170 is preferably disposed as shown in FIG. 25 with consideration for the wavelength dispersion.

In the present specifications, the liquid crystal panel 32 for adjusting transparency/light-emission may be referred to as a "pixel array for adjusting transparency/light-emission", and the liquid crystal panel 31 for adjusting transmittance may be referred to as a "pixel array for adjusting transmittance". The liquid crystal panel 31 for adjusting transmittance may be referred to as "transmittance adjusting means", and the absorption-type polarization plate 11 for adjusting transmittance may be referred to as a "first absorption-type polarization plate".

<5.3 Example of Image Displayed on Display>

FIG. 34 is a diagram showing the image displayed on the image display device 600. More specifically, FIG. 34(A) is a diagram showing a display state of the liquid crystal panel 32 for adjusting transparency/light-emission, and FIG. 34(B) is a diagram showing a display state of the liquid crystal panel 31 for adjusting transmittance. As shown in FIG. 34(A), the contour of an external appearance of a fish is drawn in the liquid crystal panel 32 for adjusting transparency/light-emission. This region is a region where the backlight light of the light emitted from the light source 170 which is reflected from the reflection-type polarization plate 20 transmits, and is a region 91 (hereinafter, referred to as a "fish display region 91") where the fish is displayed. A region where slanting lines are displayed is a region where the ambient light of the ambient light incident on the reflection-type polarization plate 20 from the rear surface side of the display, which has transmitted through the reflection-type polarization plate 20, transmits, and is a region 92 (hereinafter, referred to as a "surrounding region 92") that surrounds the fish. The polarization direction of the light transmitting through the fish display region 91 and the polarization direction of the light transmitting through the surrounding region 92 are perpendicular to each other. Thus, both the ambient light transmitted through the fish display region 91 and the backlight light transmitted through the surrounding region 92 are absorbed to the absorption-type polarization plate 12 for adjusting transparency/light-emission.

The backlight light transmitted through the fish display region 91 of the liquid crystal panel 32 for adjusting transparency/light-emission transmits through the absorption-type polarization plate 12 for adjusting transparency/light-emission, and is incident on a fish display region 81 which displays the fish of the liquid crystal panel 31 for adjusting transmittance corresponding to the fish display region 91. Since the pixels of the fish display region 81 are adjusted at a transmittance determined based on the image signal, a fish image in which the gradations are displayed is displayed in the fish display region 81. Meanwhile, the ambient light transmitted through the surrounding region 92 of the liquid crystal panel 32 for adjusting transparency/light-emission transmits through the absorption-type polarization plate 12 for adjusting transparency/light-emission, and is incident on a surrounding region 82 of the liquid crystal panel 31 for adjusting transmittance corresponding to the surrounding region 92. Since the surrounding region 82 is adjusted so as to transmit only the ambient light, only the ambient light transmits through the surrounding region 82. Accordingly, in the surrounding region 82, the background is transparently seen.

As can be seen the enlarged portions of FIG. 34(A) and FIG. 34(B), the size of the pixels of the liquid crystal panel 31 for adjusting transmittance is less than the size of the pixels of the liquid crystal panel 32 for adjusting transparency/light-emission. This is because the resolution of the liquid crystal panel 32 for adjusting transparency/light-emission may not be necessarily high, but it is necessary to display the fish image with a high resolution by increasing the resolution of the liquid crystal panel 31 for adjusting transmittance.

<5.4 Driving Circuit>

As a signal applied to the driving circuit 130 or the driving circuit 140 from the outside, there are an image signal DAT for driving the liquid crystal panel 31 for adjusting transmittance, and a transparent/light-emitting pixel information TL for driving the liquid crystal panel 32 for adjusting transparency/light-emission. As a method of applying these signals to the driving circuit from the outside, there are a method of independently applying the image signal DAT and the transparent/light-emitting pixel information TL as in the driving circuit 130, and a method of applying the transparent/light-emitting pixel information TL including the image signal DAT as in the driving circuit 140. The configurations of the driving circuits to be used are different due to a difference between such methods. Thus, the driving circuit 130 for independently applying the image signal DAT and the transparent/light-emitting pixel information TL and the driving circuit 140 for applying the image signal DAT including the transparent/light-emitting pixel information TL will be separately described below.

<5.4.1 Case where Image Signal and Transparent/Light-Emitting Pixel Information are Independently Applied>

Figure 35:
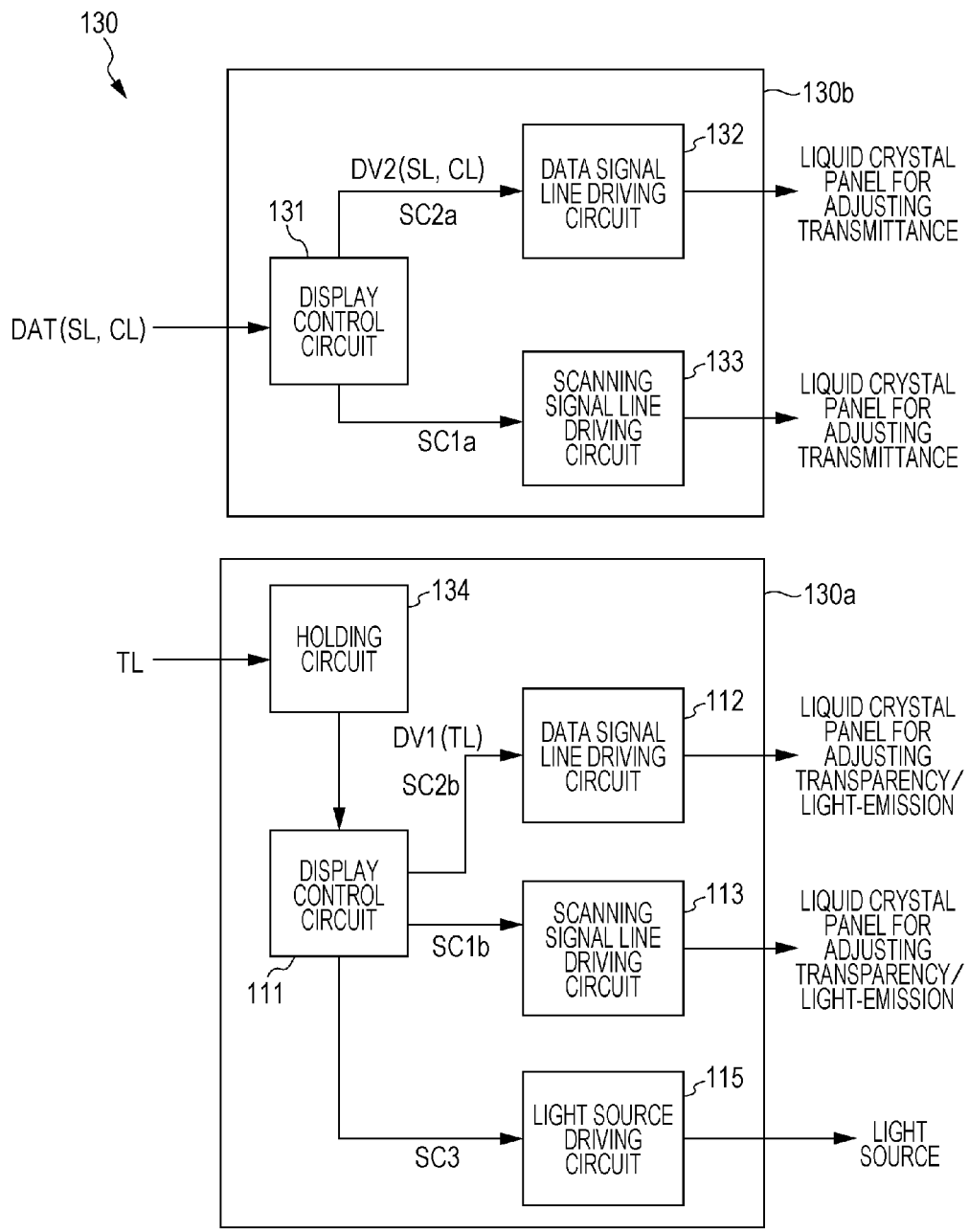
FIG. 35 is a block diagram showing the configuration of the driving circuit to which an image signal and transparent/light-emitting pixel information are independently applied, which is included in the image display device shown in FIG. 31.

FIG. 35 is a block diagram showing the configuration of the driving circuit 130 in which the image signal DAT and the transparent/light-emitting pixel information TL are respectively applied to different circuits, as separate signals, in the image display device 600. As shown in FIG. 35, the driving circuit 130 includes the first driving circuit 130a that drives the liquid crystal panel 32 for adjusting transparency/light-emission and the light source 170, and the second driving circuit 130b that drives the liquid crystal panel 31 for adjusting transmittance.

The first driving circuit 130a includes a display control circuit 111, a data signal line driving circuit 112, a scanning signal line driving circuit 113, and a light source driving circuit 115, and further includes a holding circuit 134 which is connected to the display control circuit 111 and holds the transparent/light-emitting pixel information TL directly applied from the outside. The display control circuit 111 generates a pixel information signal DV1 including the transparent/light-emitting pixel information TL, based on the transparent/light-emitting pixel information TL applied from the outside through the holding circuit 134, and applies the generated signal to the data signal line driving circuit 112. The transparent/light-emitting pixel information TL is information for setting the transparent state, the light-emitting state, or the intermediate state therebetween for each pixel, and the update rate thereof necessarily does not coincide with the frame rate of the image displayed based on the image signal DAT applied to a display control circuit 131. Thus, even in a case where the transparent/light-emitting pixel information TL is applied without being synchronized with the frame rate of the image, the display control circuit 111 reads the transparent/light-emitting pixel information TL from the holding circuit 134 whenever the image is displayed on the liquid crystal panel 31 for adjusting transmittance, generates the pixel information signal DV1 for driving the liquid crystal panel 32 for adjusting transparency/light-emission based on the transparent/light-emitting pixel information TL, and applies the generated signal to the data signal line driving circuit 112. The liquid crystal panel 32 for adjusting transparency/light-emission transmits through the ambient light in the pixels in the transparent state, transmits the backlight light in the pixels in the light-emitting state, respectively transmits the ambient light and the backlight light in the pixels in the intermediate state between the transparent state and the light-emitting state at a predetermined ratio, and applies the respective light beams to the corresponding pixels of the liquid crystal panel 31 for adjusting transmittance.

The second driving circuit 130b includes the display control circuit 131, a data signal line driving circuit 132, and a scanning signal line driving circuit 133. If the image signal DAT including transmittance pixel information SL for setting a transmittance of at least any one of the ambient light and the backlight light and display pixel information CL for setting gradation information for displaying the gradations of the image by further controlling the transmittance of the backlight light is applied to the display control circuit 131 from the outside, the display control circuit 131 generates a pixel information signal DV2 including the transmittance pixel information SL and the display pixel information CL based on the image signal DAT, and applies the generated signal to the data signal line driving circuit 132. Accordingly, the transmittance pixel information SL and the display pixel information CL are written in each pixel of the liquid crystal panel 31 for adjusting transmittance. As a result, an observer positioned close to the front surface side of the display can visually perceive the transparently seen background in the pixels corresponding to the transparent state, the image in which the gradations are displayed in the pixels corresponding to the light-emitting state, and the image in which the gradations are displayed and which is superimposed on the background in the pixels corresponding to the intermediate state in which the transmission ratio between the ambient light and the backlight light is adjusted, respectively.

<5.4.2 Case where Transparent/Light-Emitting Pixel Information is Included in Image Signal>

Figure 36:
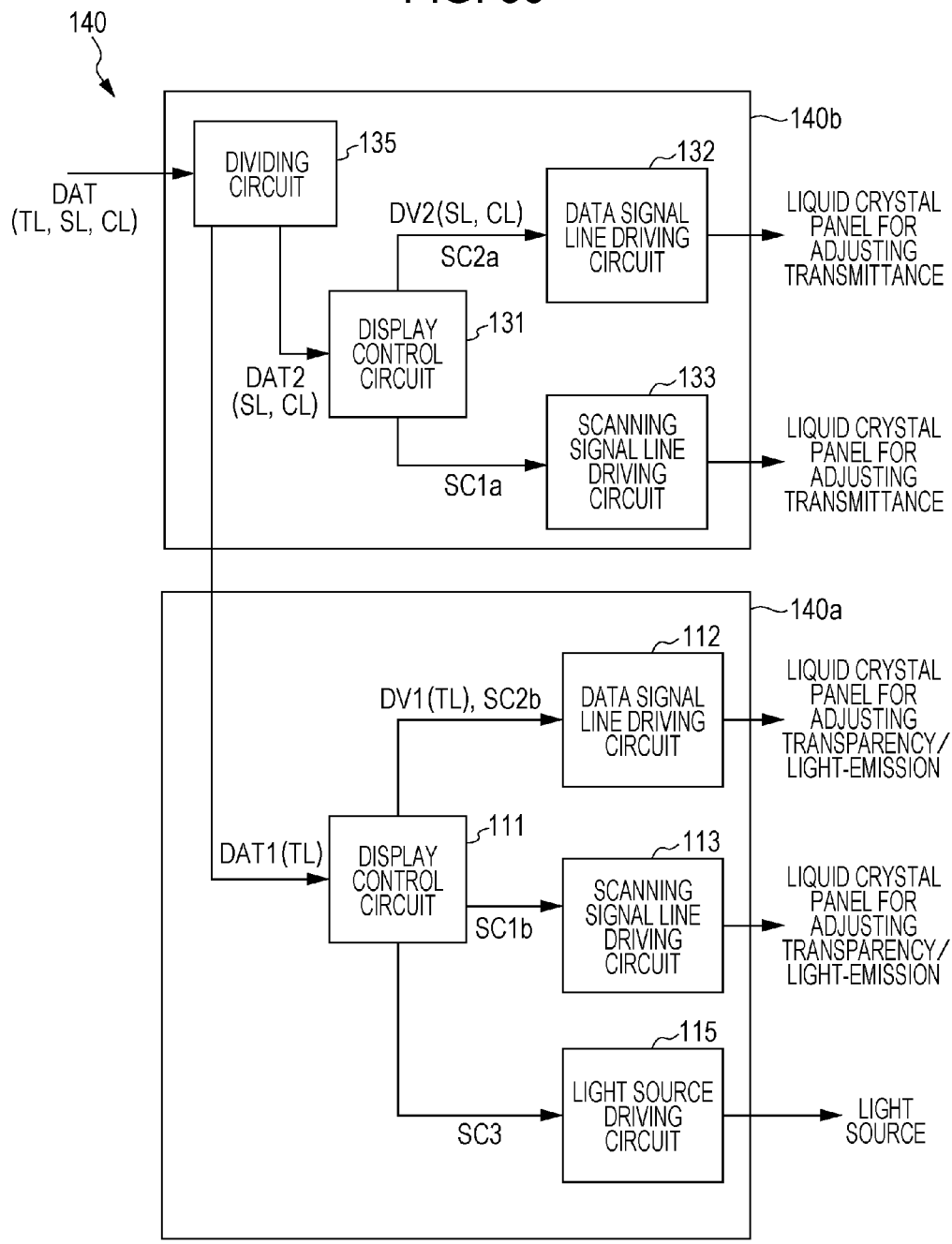
FIG. 36 is a block diagram showing the configuration of the driving circuit to which the image signal including the transparent/light-emitting pixel information is applied from outside, which is included in the image display device shown in FIG. 31.

FIG. 36 is a block diagram showing the configuration of the driving circuit 140 to which the image signal DAT including the transparent/light-emitting pixel information TL, the transmittance pixel information SL and the display pixel information CL is applied from the outside. In the following description, the same circuits as those of the driving circuit 130 shown in FIG. 35 will be assigned the same reference numerals, and the description thereof will be omitted. Different circuits will be mainly described. Unlike the case shown in FIG. 35, the image signal DAT input to the second driving circuit 140b also includes the transparent/light-emitting pixel information TL, in addition to the transmittance pixel information SL and the display pixel information CL.

A dividing circuit 135 is connected to a display control circuit 131 of the second driving circuit 140b and a display control circuit 111 of the first driving circuit 140a is provided. The dividing circuit 135 divides the image signal DAT into an image signal DAT1 including the transparent/light-emitting pixel information TL and an image signal DAT2 including the transmittance pixel information SL and the display pixel information CL, applies the image signal DAT1 to the display control circuit 111, and applies the image signal DAT2 to the display control circuit 131. The display control circuit 111 generates the pixel information signal DV1 including the transparent/light-emitting pixel information TL for setting the transparent state, the light-emitting state or the intermediate state therebetween based on the image signal DAT1, and applies to the generated signal to the data signal line driving circuit 112. Accordingly, at least any one of the ambient light and the backlight light transmits through the respective pixels of the liquid crystal panel 32 for adjusting transparency/light-emission at a transmittance set based on the transparent/light-emitting pixel information TL, and is applied to the liquid crystal panel 31 for adjusting transmittance. The display control circuit 131 generates the pixel information signal DV2 including the transmittance pixel information SL for setting a transmittance for each pixel such that at least any one of the backlight light and the ambient light transmits and the display pixel information CL for setting the gradation information for displaying the image in which the gradations are displayed to pixels desired to display the image based on the image signal DAT2, and applies the generated signal to the data signal line driving circuit 132. Accordingly, at least any one of the backlight light and the ambient light transmits through the respective pixels of the liquid crystal panel 31 for adjusting transmittance at a transmittance set based on the display pixel information CL and the transmittance pixel information SL updated in synchronization with the transparent/light-emitting pixel information TL. As a result, an observer positioned close to the front surface side of the display sees the transparently seen background in the pixels corresponding to the transparent state, the image in which the gradations are displayed in the pixels corresponding to the light-emitting state, and image in which the gradations are displayed and which is superimposed on the background in the pixels corresponding to the intermediate state in which the transmission ratio of the ambient light and the backlight light is adjusted. Unlike the case of the first driving circuit 130a shown in FIG. 35, the holding circuit is not provided in the first driving circuit 140a. This is because the transparent/light-emitting pixel information TL is simultaneously updated at the time of updating the transmittance pixel information SL and the display pixel information CL in order to apply the image signal DAT including the transparent/light-emitting pixel information TL in addition to the transmittance pixel information SL and the display pixel information CL.

If the data amount of the image signal DAT is previously set so as to transmit the image data which is greater than the number of pixels of the entire screen, it is possible to transmit the image signal DAT including the transparent/light-emitting pixel information TL. Alternatively, a case where the image signal of each pixel coincides with a predetermined gradation value, a case where the image signal thereof is equal to or greater than the predetermined gradation value, and a case where the image signal thereof is equal to or less than the predetermined gradation value may be in the transparent state, and a case that does not correspond to the transparent state may be in the light-emitting state.

It has been described in the above description that the holding circuit 134 is included in the first driving circuit 130a in FIG. 35, and the dividing circuit 135 is included in the second driving circuit 140b in FIG. 36. However, the holding circuit 134 and the dividing circuit 135 may be arbitrarily arranged as long as they are arranged within the driving circuit 130 and the driving circuit 140.

<5.5 Active Backlight>

In the present embodiment, the liquid crystal panel 31 for adjusting transmittance may be regarded as a liquid crystal panel in a liquid crystal display device of the related art, and the plates from the absorption-type polarization plate 12 for adjusting transparency/light-emission up to the reflection-type polarization plate 20 may be regarded as backlights. In this case, the liquid crystal panel 32 for adjusting transparency/light-emission has a function of the backlight capable of controlling light emission intensity for each pixel, and may be referred to as an active backlight. Thus, a driving type in a case where the liquid crystal panel 32 for adjusting transparency/light-emission is used as the active backlight will be described.

Initially, it is possible to extract the backlight light by causing only a predetermined region of the liquid crystal panel 32 for adjusting transparency/light-emission to be transparent. Thus, if the liquid crystal panel 32 for adjusting transparency/light-emission is used as the active backlight light, it is possible to easily perform area active driving. In the area active driving, a region where the backlight light is not extracted is not displayed in black, and is transparent in order to transmit the ambient light.

Figure 37:
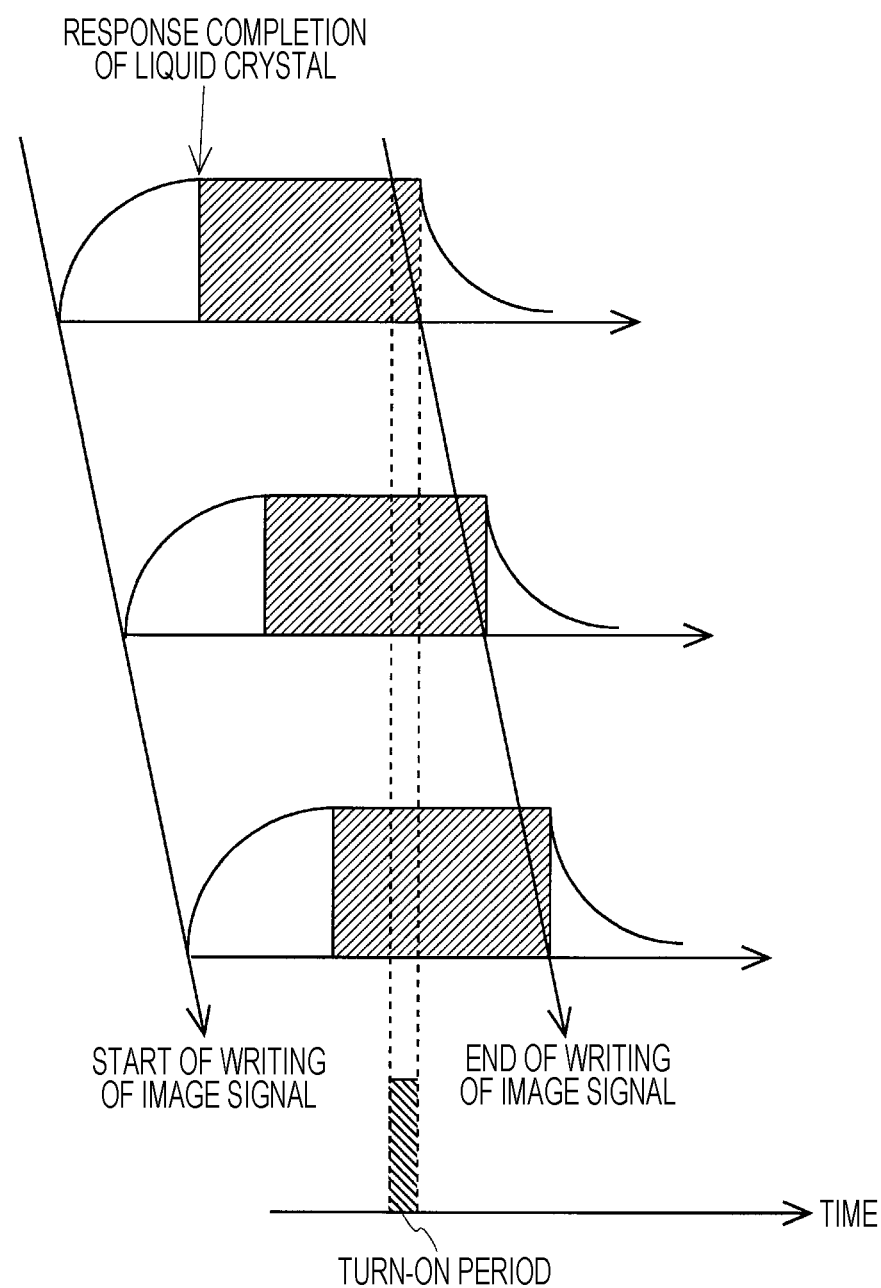
FIG. 37 is a diagram showing a turn-on timing of a light source in a scanning backlight driving type of the related art.

FIG. 37 is a diagram showing a turn-on timing of a light source in a backlight driving type of the related art. As shown in FIG. 37, the backlight driving of the related art is a whole backlight driving in which backlight light is irradiated by turning on all LEDs for a short period of time from a point of time when the writing of the image signal in all the pixels of the liquid crystal panel 32 for adjusting transparency/light-emission is end and the response of the liquid crystal is completed up to a point of time when the writing in the pixels of the next field is started. To achieve this, it is necessary to obtain the light amount of the backlight light by arranging a plurality of LEDs and simultaneously turning on these LEDs. However, in order to simultaneously turn on the plurality of LEDs, a high current needs to be supplied. In the case of the field sequential driving, more time is needed in the writing of the image signal than in the color filter driving. Thus, it is difficult to sufficiently secure the turn-on time of the backlight, and thus, a color mixing disorder may occur.

Figure 38:
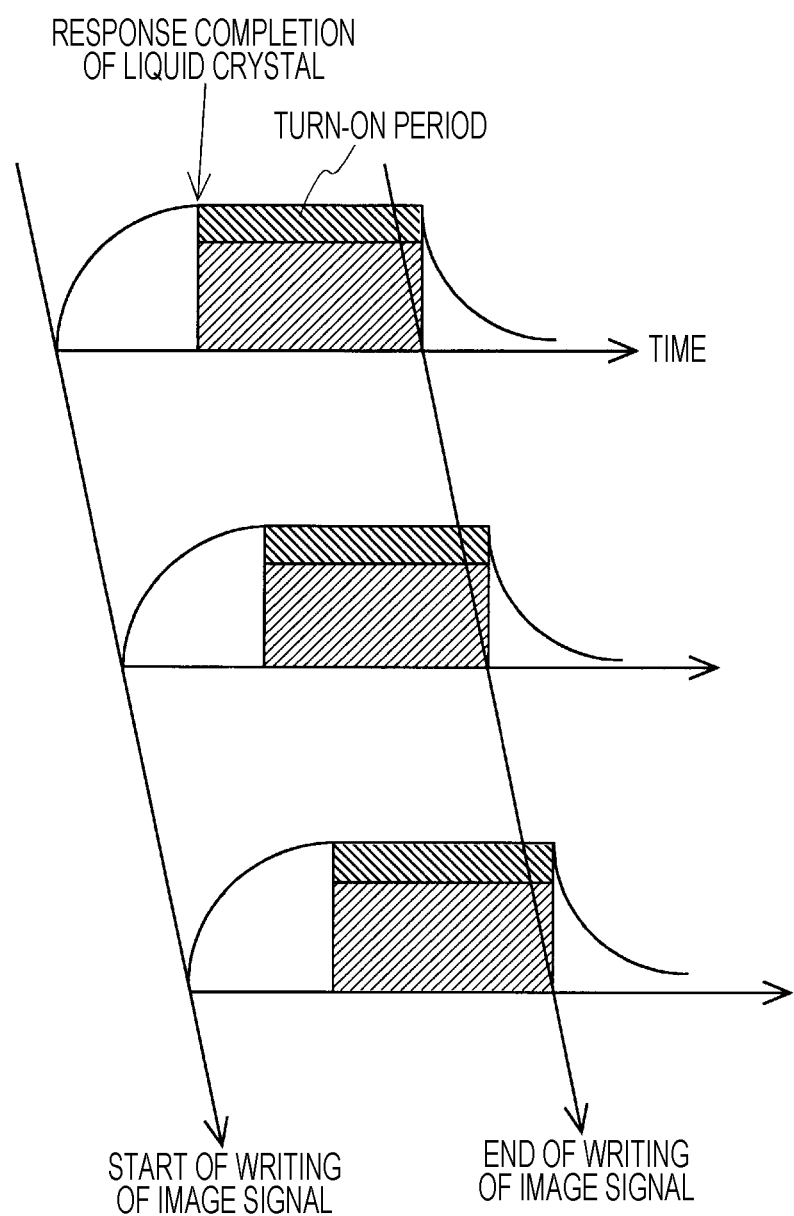
FIG. 38 is a diagram showing a turn-on timing of the light source in a case where the scanning backlight driving is performed using the liquid crystal panel for adjusting transparency/light-emission as the backlight in the image display device shown in FIG. 31.

Thus, if the liquid crystal panel 32 for adjusting transparency/light-emission is used as the active backlight, it is possible to easily perform scanning backlight driving. FIG. 38 is a diagram showing a turn-on timing in a case where the scanning backlight driving is performed using the liquid crystal panel 32 for adjusting transparency/light-emission as the backlight. As shown in FIG. 38, the image signal is written in all the pixels connected to the selected scanning signal line. From a point of time when the response of the liquid crystal is completed, among the pixels of one row connected to the scanning signal line of the liquid crystal panel 32 for adjusting transparency/light-emission, the pixels in which the image signal of the image to be displayed is written are in the light-emitting state, and the backlight light can transmit. As stated above, since the liquid crystal panel 32 for adjusting transparency/light-emission is in the light-emitting state for each scanning signal line in which the response of the liquid crystal is completed and the backlight light transmits, it is not necessary to secure the large light amount for a short period of time. Thus, it is easy to design the circuit that drives the backlight, and thus, it is possible to reduce the manufacturing cost of the image display device 600. If the liquid crystal panel 32 for adjusting transparency/light-emission is used, it is possible to perform the scanning backlight driving by writing the transparent/light-emitting pixel information TL in pixels desired to transmit the backlight light. Accordingly, it is possible to more easily perform the scanning backlight driving than the scanning backlight driving of the related art that controls the backlight. Particularly, in a case where the field sequential driving requiring more time in the writing of the image signal is performed, since it is possible to sufficiently secure the turn-on time of the backlight, the occurrence of the color mixing disorder is suppressed.

It is possible to control the region where the backlight light transmits for each pixel of the liquid crystal panel 32 for adjusting transparency/light-emission. Thus, it is possible to easily perform local dimming (backlight automatic control) for improving a contrast ratio of the image by automatically controlling the luminance of a part of the backlight. The phenomenon of "bright black" in which a black portion of the image is brightly seen is suppressed by performing the local dimming.

<5.6 Relationship Between Average Display Luminance and Transmittance>

Figure 39:
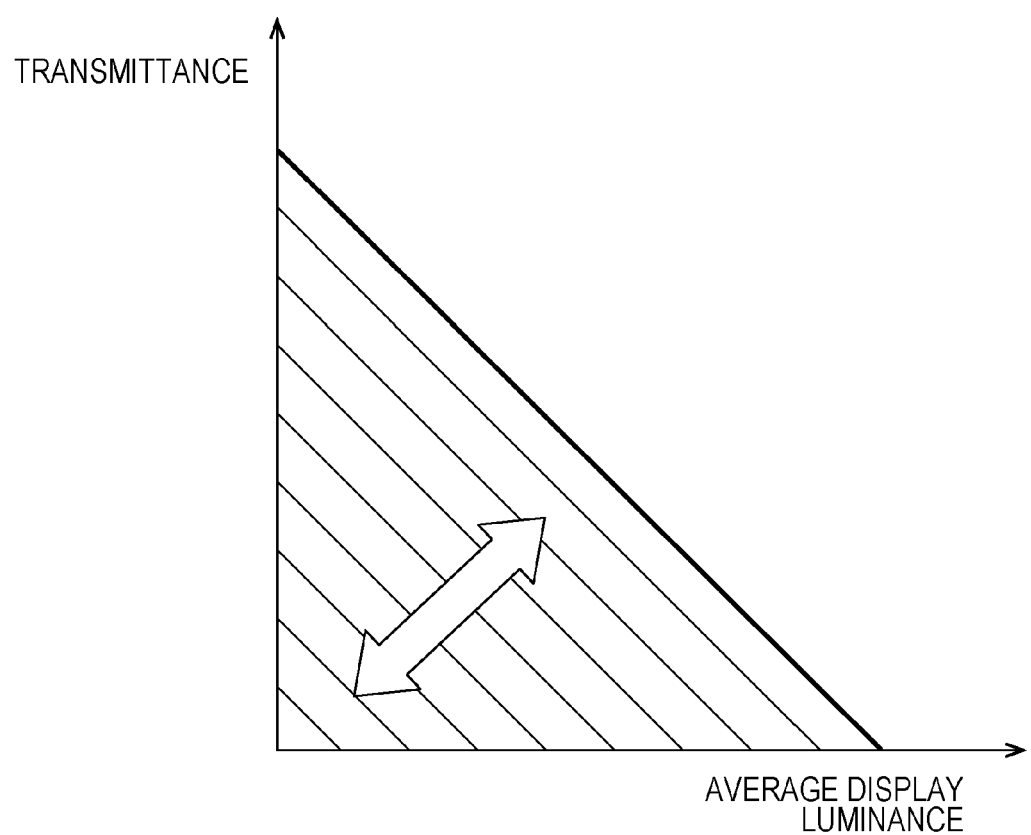
FIG. 39 is a diagram showing the relationship between the average display luminance and the transmittance of the image displayed in an image display area of the display in the image display device shown in FIG. 31.

FIG. 39 is a diagram showing the relationship between the average display luminance and the transmittance of the image displayed in an image display area of the display in the present embodiment. Unlike the display of the second embodiment, as shown in FIG. 39, the display of the present embodiment includes the liquid crystal panel 31 for adjusting transmittance, and the liquid crystal panel 32 for adjusting transparency/light-emission. The liquid crystal panel 32 for adjusting transparency/light-emission adjusts the transmission ratio between the ambient light and the backlight light, and the liquid crystal panel 31 for adjusting transmittance adjusts to what extent does the light transmitted through the liquid crystal panel 32 for adjusting transparency/light-emission transmit. Since this corresponds to a case where a hypotenuse shown in FIG. 39 is slid toward an origin, the average display luminance and the transmittance of the image displayed on the display correspond to any points within a triangle. Accordingly, since the image displayed in the image display area is set in an arbitrary state from the turn-on state in which the transmittance is 100% to the turn-off state in the transmittance is 0%, it is possible to display an image with high contrast or an image with a high degree of freedom of expression.

<5.7 Adjustment of Image Display Device>

FIGS. 40 and 41 are diagrams showing the passage routes of light in the respective regions of the image display device, and more specifically, FIG. 40(A) is a diagram showing the passage route of light in the display region, and FIG. 40(B) is a diagram showing the passage route of light in the leakage region. FIG. 41(A) is a diagram showing the passage route of light in the ambient light transmission region, and the FIG. 41(B) is a diagram showing the passage route of light in a black display region. Since the image display device 600 can display in black, the black display region is added to the display region, the leakage region and the ambient light transmission region described in the image display device 310 shown in FIG. 15. The display region, the leakage region, the ambient light transmission region and the black display region may be respectively referred to as a "first region", a "second region", a "third region" and a "fourth region".

Unlike the image display device 600 according to the present embodiment, in the image display device shown in FIGS. 40 and 41, a light guide plate 180 in which a light source 181 is attached to an end is provided. However, similarly to the case of the image display device 600, in the image display device shown in FIGS. 40 and 41, since the adjustment for displaying the image and the background with good visual quality is similarly performed in a state where transparency is maintained, the image display device provided with the light guide plate 180 instead of the light source 170 will be described.

A case where the light-source light is extracted to the display region will be described. As shown in FIG. 40(A), the light source 181 is turned on in a state in which the ambient light is not incident from the rear surface side by covering the rear surface side of the reflection-type polarization plate 20 with the black cloth 60. Accordingly, the light-source light emitted from the light guide plate 180 is reflected from reflection-type polarization plate 20, and is incident on the liquid crystal panel 32 for adjusting transparency/light-emission. The polarization direction of the light-source light is rotated by the liquid crystal panel 32 for adjusting transparency/light-emission so as to transmit through the absorption-type polarization plate 12 for adjusting transparency/light-emission. The polarization direction of the light-source light transmitted through the absorption-type polarization plate 12 for adjusting transparency/light-emission is rotated by the liquid crystal panel 31 for adjusting transmittance so as to transmit through the absorption-type polarization plate 11 for adjusting transmittance. Therefore, only the light-source light transmits through the display region of the absorption-type polarization plate 11 for adjusting transmittance, and is reflected to the front surface side.

A case where the light-source light leaks to the leakage region will be described. As shown in FIG. 40(B), the leakage region is the same as the display region until the light source 181 is turned on in the state in which the ambient light is not incident from the rear surface side by covering the rear surface side of the reflection-type polarization plate 20 with the black cloth 60 and the light emitted from the light source 181 transmits through the absorption-type polarization plate 12 for adjusting transparency/light-emission. Since the liquid crystal panel 31 for adjusting transmittance rotates the polarization direction of the ambient light such that the ambient light transmits through the absorption-type polarization plate 11 for adjusting transmittance, the light-source light having the polarization direction perpendicular to that of the ambient light is originally hard to transmit through the absorption-type polarization plate 11 for adjusting transmittance. However, in a case where the rotation of the polarization direction of the light-source light is insufficient or the asymmetry of the light guide plate 180 is insufficient, the light from the light source 181 leaks in an undesired direction. Since the reflection polarization contrast of the reflection-type polarization plate 20 is insufficient, the polarization components of the light-source light which are not to be reflected are reflected. In such cases, a part of the light-source light transmits through the absorption-type polarization plate 11 for adjusting transmittance, and is extracted to the front surface side of the display. Accordingly, the luminance of the leaked light-source light is measured as the luminance of the leakage region.

A case where the ambient light is extracted to the ambient light transmission region will be described. As shown in FIG. 41(A), since the light source 181 is turned off, the light-source light is not emitted, but since the rear surface side of the reflection-type polarization plate 20 is not covered with the black cloth 60, the ambient light is incident from the rear surface side. The ambient light transmits through the reflection-type polarization plate 20, and the polarization direction thereof is rotated by the liquid crystal panel 32 for adjusting transparency/light-emission so as to transmit through the absorption-type polarization plate 12 for adjusting transparency/light-emission. The polarization direction of the ambient light transmitted through the absorption-type polarization plate 12 for adjusting transparency/light-emission is not rotated by the liquid crystal panel 31 for adjusting transmittance so as to transmit through the absorption-type polarization plate 11 for adjusting transmittance. Accordingly, only the ambient light transmits through the ambient light transmission region of the absorption-type polarization plate 11 for adjusting transmittance, and is extracted to the front surface side. The luminance in the ambient light transmission region is calculated by Expression (5) based on the brightness of the background and the total transmittance of the respective optical elements such as the absorption-type polarization plate 11 for adjusting transmittance, the liquid crystal panel 31 for adjusting transmittance, the absorption-type polarization plate 12 for adjusting transparency/light-emission, the liquid crystal panel 32 for adjusting transparency/light-emission, and the light guide plate 180 through which the ambient light transmits.

Luminance of Ambient Light Transmission Region=
(Brightness of Background)×(Total Transmittance of Respect Optical Elements through Which Ambient Light Transmit) (5)

The black display region refers to a region where neither the light-source light nor the ambient light are extracted to the front surface side of the display. In the black display region, the smaller the leaked light, the smaller the luminance of the black display region, and thus, it is possible to display an image with high contrast. Thus, the black display region where neither the light-source light nor the ambient light are extracted will be described. As shown in FIG. 41(B), the ambient light is not incident from the rear surface side by covering the rear surface side of the reflection-type polarization plate 20 with the black cloth 60, the liquid crystal panel 32 for adjusting transparency/light-emission is set so as to cause the light-source light not to transmit, and the liquid crystal panel 31 for adjusting transmittance is in the transparent state in which the light-source light transmits. If the light source 181 is turned on in this state, the polarization direction of the light-source light is rotated by the liquid crystal panel 32 for adjusting transparency/light-emission such that the light-source light is absorbed to the absorption-type polarization plate 12 for adjusting transparency/light-emission. Accordingly, the light-source light is absorbed to the absorption-type polarization plate 12 for adjusting transparency/light-emission. The region where the light-source light is blocked in this manner becomes the black display region. However, in a case where the rotation of the polarization direction of the light-source light is insufficient, the light from the light source 181 leaks in a direction desired not to emit since the asymmetry of the light guide plate 180 is insufficient, or the polarization components of the light-source light not to be reflected are reflected since the reflection polarization contrast of the reflection-type polarization plate 20 is insufficient, the light-source light may transmit through the absorption-type polarization plate 12 for adjusting transparency/light-emission, may further transmit through the liquid crystal panel 31 for adjusting transmittance in the transparent state, and may be extracted to the front surface side. Accordingly, the luminance of the leaked light-source light is measured as the luminance of the black display region.

In this case, in the image and the background displayed on the image display device 600, the luminances of the backlight light or the ambient light transmitted through the display region, the leakage region and the ambient light transmission region have the same relationship as Expression (4). In the black display region, the smaller the luminance of the backlight light, the better. As a result, in a case where the luminances of the respective light beams in the display region, the leakage region, the ambient light transmission region and the black display region satisfy Expression (6), both the image and the background in a case where transparency is maintained are displayed with good visual quality Luminance of Light-source Light Transmitted through Display Region>Luminance of Ambient Light Transmitted through Ambient Light Transmission Region>Luminance of Light-source Light Transmitted through Leakage Region>Luminance of Light-source Light Transmitted through Black Display Region (6)

In Expression (6), the black display region is further added to Expression (4). In order to satisfy the relationship of Expression (6), a case where an illumination sensor (not shown) for measuring the luminance of the ambient light is disposed or a light source for illumination (not shown) is disposed close to the rear surface side is the same as the case of the image display device 310 shown in FIG. 14. A case where values which are representative of the respective regions are used as the luminances of the respective regions is also the same as the case of the image display device 310 shown in FIG. 14.

<5.8 Application Example>

The image display device 600 is provided such that the front surface side of the display becomes the front surface side of a display window, and a product is displayed close to the rear surface side. In the display window, the reflection-type polarization plate 20 close to the rear surface side of the display reflects the ambient light, and transmits a half amount of light in the case where the light source 170 is turned on. It is possible to use the image display device 600 as a new-type display window by using the light as an illumination of the displayed product.

An observer positioned close to the front surface side of the display sees the image displayed on the front surface side of the display or sees the transparently seen background. However, an observer positioned close to the rear surface side of the display merely sees the image displayed on the front surface side of the display or sees the rear surface side of the display of which the front surface side looks like a mirror due to the reflection-type polarization plate 20 without recognizing that the background is transparently seen. Thus, for example, it is possible to use the image display device 600 as a magic mirror by attaching the image display device to a window between the inside of a room and a passageway. In this case, a person positioned on the passageway knows circumstances within the room, but a person positioned in the room does not know circumstances on the passageway.

<5.9 Effect>

According to the present embodiment, the image display device 600 can display the image, cause the background to be transparently seen, or display the display in black by controlling three states the turn-on state in which the image is displayed, the turn-off state in which the display is displayed in black and the transparent state in which the background is displayed for each pixel. Accordingly, the image display device 600 has high expressiveness. Particularly, since the display can be displayed in black in the turn-off state, it is possible to display an image with high contrast, or to display an image with a high degree of freedom of expression. It is not necessary to attach the image display device 600 to a case filled with light, and thus, the image display device is widely used without limitation of use. Since a liquid crystal panel used in a liquid crystal display device can be used as the liquid crystal panel 31 for adjusting transmittance, the image display device 600 has high spatial resolution.

<5.10 First Modification Example>

Figure 42:
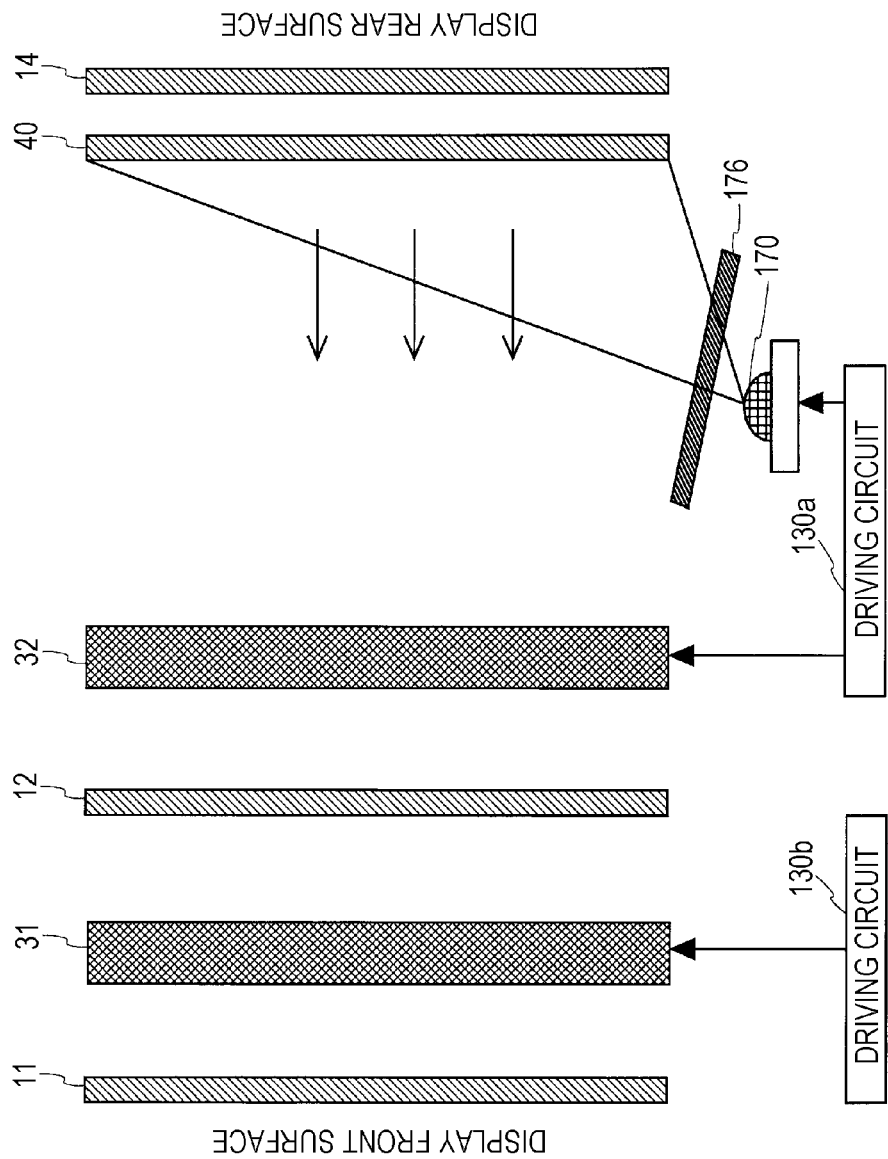
FIG. 42 is a diagram showing the configuration of an image display device according to a first modification example of the fourth embodiment of the present invention.

FIG. 42 is a diagram showing the configuration of an image display device 610 according to a first modification example of the present embodiment. As shown in FIG. 42, in the image display device 610, an absorption-type polarization plate 11 for adjusting transmittance, a liquid crystal panel 31 for adjusting transmittance, an absorption-type polarization plate 12 for adjusting transparency/light-emission, a liquid crystal panel 32 for adjusting transparency/light-emission, a diffraction grating sheet 40, and an absorption-type polarization plate 14 for selecting ambient light are sequentially arranged from the front surface side of the display toward the rear surface side so as to be parallel to one another. A light source 170 and an absorption-type polarization plate 176 are arranged near a space interposed between the liquid crystal panel 32 for adjusting transparency/light-emission and the diffraction grating sheet 40 in order to irradiate single polarized light as backlight light to the diffraction grating sheet 40. A second driving circuit 130b included in a driving circuit 130, to be described below, is connected to the liquid crystal panel 31 for adjusting transmittance, and a first driving circuit 130a is connected to the liquid crystal panel 32 for adjusting transparency/light-emission and the light source 170. A second driving circuit 140b included in a driving circuit 140, to be described below, is connected to the liquid crystal panel 31 for adjusting transmittance, and a first driving circuit 140a is connected to the liquid crystal panel 32 for adjusting transparency/light-emission and the light source 170.

The constituent members from the absorption-type polarization plate 11 for adjusting transmittance to the liquid crystal panel 32 for adjusting transparency/light-emission have the same configurations as those of the image display device 600 shown in FIG. 31, and the diffraction grating sheet 40 and the absorption-type polarization plate 14 for selecting ambient light are arranged instead of the reflection-type polarization plate 20. Of the light emitted from the light source 170, the single polarized light transmitted through the absorption-type polarization plate 176 is raised by the diffraction grating sheet 40, and is irradiated to the liquid crystal panel 32 for adjusting transparency/light-emission, as backlight light. Of the ambient light incident from the rear surface side of the display, the polarization components transmitted through the absorption-type polarization plate 14 for selecting ambient light are irradiated to the liquid crystal panel 32 for adjusting transparency/light-emission. The light source 170, the absorption-type polarization plate 176, the diffraction grating sheet 40 and the absorption-type polarization plate 14 for selecting ambient light have the same functions as those in the image display device 400 shown in FIG. 22, and thus, the description thereof will be omitted.

Similarly to the image display device 600, the image display device 610 according to the present modification example can display the image, causing the background to be transparently seen, or display in black by controlling three display states of the turn-on state in which the image is displayed, the transparent state in which the background is displayed and the turn-off state in which neither the image nor the background are displayed and the display is displayed in black for each pixel. Accordingly, the image display device 610 has high expressiveness.

In the image display device 610, a reflection-type polarization plate for selecting ambient light may be disposed instead of the diffraction grating sheet 40 and the absorption-type polarization plate 14 for selecting ambient light, and a light guide plate 180 to which a light source 181 is attached may be disposed instead of the light source 170 and the absorption-type polarization plate 176.

<5.11 Second Modification Example>

In an image display device according to a second modification example of the present embodiment, a panel which includes pixels and is formed by MEMS (Micro Electro Mechanical Systems) may be used instead of the liquid crystal panel 31 for adjusting transmittance. The MEMS refers to a device in which mechanical element components, actuators and electronic circuits are integrated on one silicon substrate or glass substrate. The panel which includes the pixels and is formed by MEMS is provided with mechanical shutters functioning as pixels on the panel, and the mechanical shutters are opened or closed at a high speed in response to the image signal. Accordingly, similarly to the liquid crystal panel 31 for adjusting transmittance, the MEMS can display the image by adjusting the transmittance of the backlight light. It is possible to display the gradations of the image by changing the opening and closing speed of the shutter in response to the image signal or changing an opening area of the shutter.

A panel which includes pixels formed using an electro wetting phenomenon may be used instead of the liquid crystal panel 31 for adjusting transmittance. The electro wetting phenomenon is a phenomenon in which if a switch between an electrode formed on the inner surface of a fine pipe and an external electrode is turned on, a liquid spreads by changing the wettability of the liquid with respect to the inner surface of the fine pipe and decreasing a contact angle of the liquid with respect to the inner surface of the fin pipe and if the switch is turned off, the liquid is discharged from the fine pipe by changing the wettability of the liquid with respect to the inner surface of the fine pipe and increasing the contact angle. Since the pixels formed using this phenomenon are opened or closed similarly to the pixels of the liquid crystal panel 31 for adjusting transmittance by turning on or off the switch, it is possible to display the image by adjusting the transmittance of the backlight light. It is possible to display the gradations of the image by changing the movement speed of the liquid due to the change in the wettability of the liquid in response to the image signal or by changing the movement area. As described above, since the panel having pixels formed by the MEMS and the panel having the pixels formed using the electro wetting phenomenon transmits the backlight light by opening or closing the pixels, it is possible to realize the same function of the liquid crystal panel 31 for adjusting transmittance.

<5.12 Modification Examples of Driving Circuit>

Figure 43:
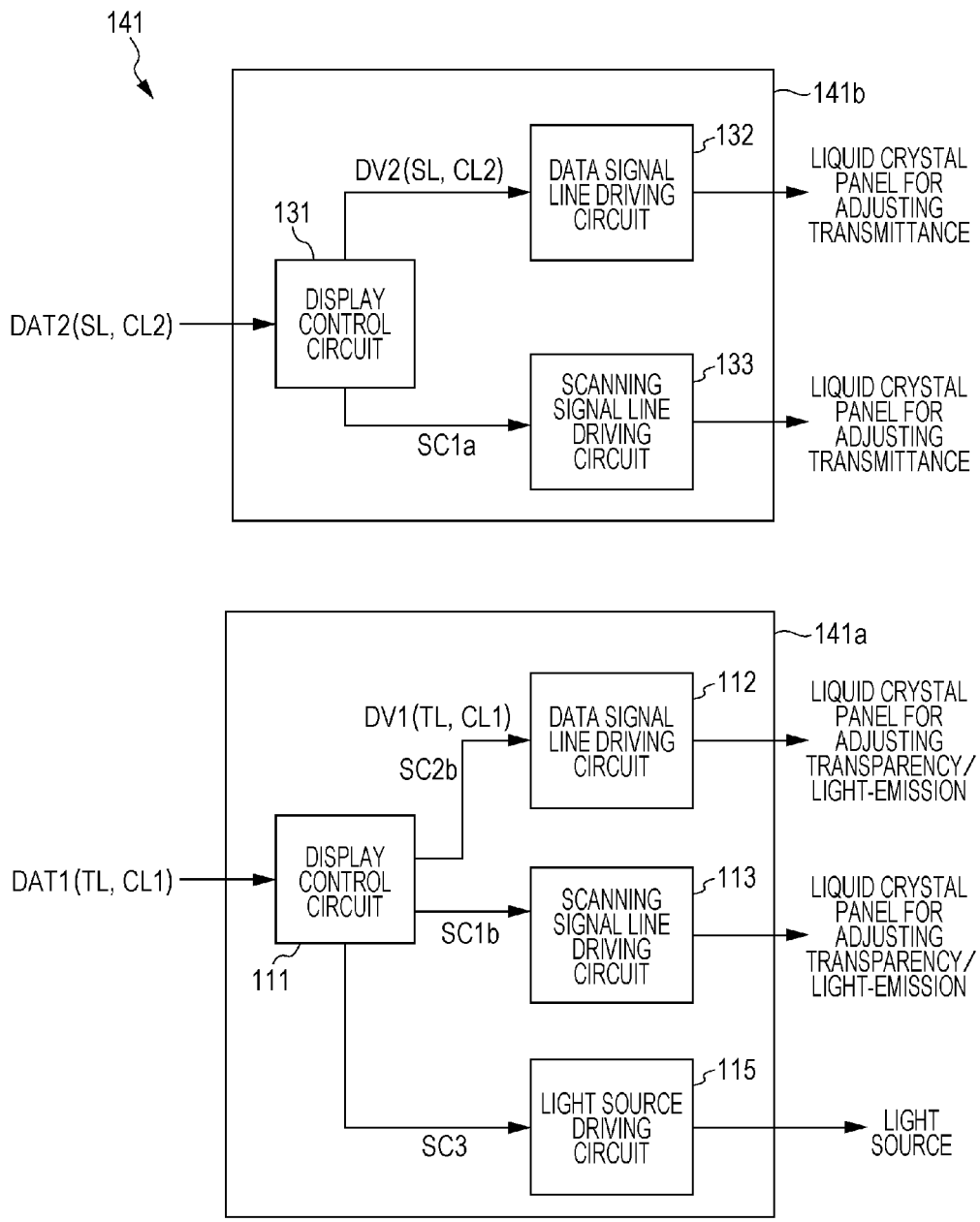
FIG. 43 is a block diagram showing a first modification example of the driving circuit included in the image display device shown in FIG. 31.

FIG. 43 is a diagram showing a first modification example of the driving circuit used in the image display device 600. A circuit configuration of a driving circuit 141 of the present modification example is the same as the circuit configuration of the driving circuit 130 shown in FIG. 35, except that the holding circuit is not provided in the first driving circuit 141*a*. Thus, the same circuits as the circuits shown in FIG. 35 will be assigned the same reference numerals, and the description thereof will be omitted. Unlike the case shown in the driving circuit 130 shown in FIG. 35, in the driving circuit 141 of the first modification example, the image signal DAT1 input to the display control circuit 111 includes the transparent/light-emitting pixel information TL indicating the transmission ratio between the backlight light and the ambient light in order to set the transparent state, the light-emitting state or the intermediate state therebetween for each pixel and the display pixel information CL1 for setting the gradation information for displaying the gradations of the image by further controlling the transmittance of the backlight light. The display control circuit 111 generates the pixel information signal DV1 including the transparent/light-emitting pixel information TL and the display pixel information CL1 based on the image signal DAT1, and applies the generated signal to the data signal line driving circuit 112. The liquid crystal panel 32 for adjusting transparency/light-emission is driven by the data signal line driving circuit 112, and applies the respective light beams to the corresponding pixels of the liquid crystal panel 31 for adjusting transmittance by transmitting the ambient light through the pixels in the transparent state, transmitting the backlight light through the pixels in the light-emitting state, and transmitting the backlight light and the ambient light through the pixels in the intermediate state between the transparent state and the light-emitting state at a predetermined ratio.

The image signal DAT2 input to the display control circuit 131 includes the transmittance pixel information SL for setting the transmittance for each pixel such that at least any one of the backlight light and the ambient light transmits and the display pixel information CL2 for setting the gradation information for displaying the gradation of the image desired to display. The display control circuit 131 generates the pixel information signal DV2 including the transmittance pixel information SL and the display pixel information CL2 based on the image signal DAT2, and applies the generated signal to the data signal line driving circuit 132. The liquid crystal panel 31 for adjusting transmittance is driven by the data signal line driving circuit 132, transmits at least any one of the ambient light and the backlight light at the transmittance set for each pixel for each pixel, and transmits the backlight light in the pixels desired to display the image to display the gradation of the image based on the set gradation information. The display pixel information CL1 may be referred to as "first display pixel information", and the display pixel information CL2 may be referred to as "second display pixel information".

In this case, at least any one of the backlight light and the ambient light transmitted through the liquid crystal panel 32 for adjusting transparency/light-emission is irradiated to the liquid crystal panel 31 for adjusting transmittance. Thus, an observer positioned close to the front surface side of the display can visually perceive an image obtained by superimposing the images in which the gradations are respectively displayed by the liquid crystal panel 31 for adjusting transmittance and the liquid crystal panel 32 for adjusting transparency/light-emission, can visually perceive the transparently displayed background, or can visually perceive the image of which the gradation are displayed and which is superimposed on the background. A specific example of the image displayed in the display in a case where the liquid crystal panel 31 for adjusting transmittance and the liquid crystal panel 32 for adjusting transparency/light-emission are driven by the driving circuit 141 will be described. The image signal DAT1 and the image signal DAT2 are previously synchronized before these signals are respectively input to the display control circuits 111 and 131.

Figure 44:
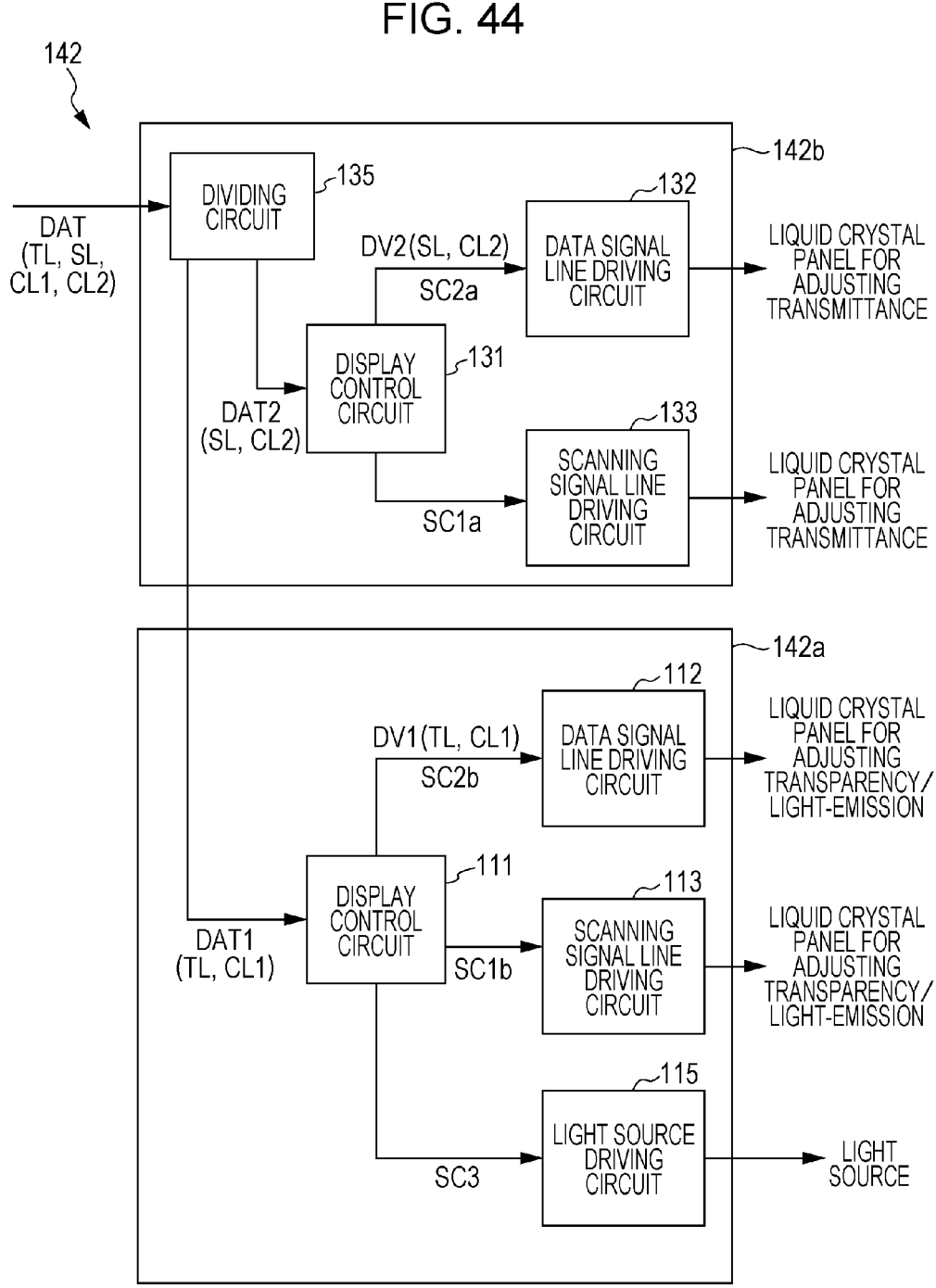
FIG. 44 is a block diagram showing a second modification example of the driving circuit included in the image display device shown in FIG. 31.

FIG. 44 is a diagram showing a second modification example of the driving circuit used in the image display device 600. Since a circuit configuration of a driving circuit 142 of the second modification example is the same as the circuit configuration of the driving circuit 140 shown in FIG. 36, the same circuits as those of the circuits shown in FIG. 36 will be assigned the same reference numerals, and thus, the description thereof will be omitted. In the second modification example, the image signal DAT1 for driving the liquid crystal panel 32 for adjusting transparency/light-emission and the image signal DAT2 for driving the liquid crystal panel 31 for adjusting transmittance are input from the outside, as the one image signal DAT. Accordingly, in the present modification example, the dividing circuit 135 connected to the display control circuit 111 and the display control circuit 131 is further provided. Accordingly, if the image signal DAT is input to the dividing circuit 135, the image signal DAT is divided into the image signal DAT1 and the image signal DAT2 by the dividing circuit 135, and the divided signals are respectively input to the display control circuit 111 and the display control circuit 131. The same processing as that in the case of the driving circuit 141 shown in FIG. 43 is performed on the image signals DAT1 and DAT2 input to the display control circuits 111 and 131, and thus, the description thereof will be omitted.

Figure 45:
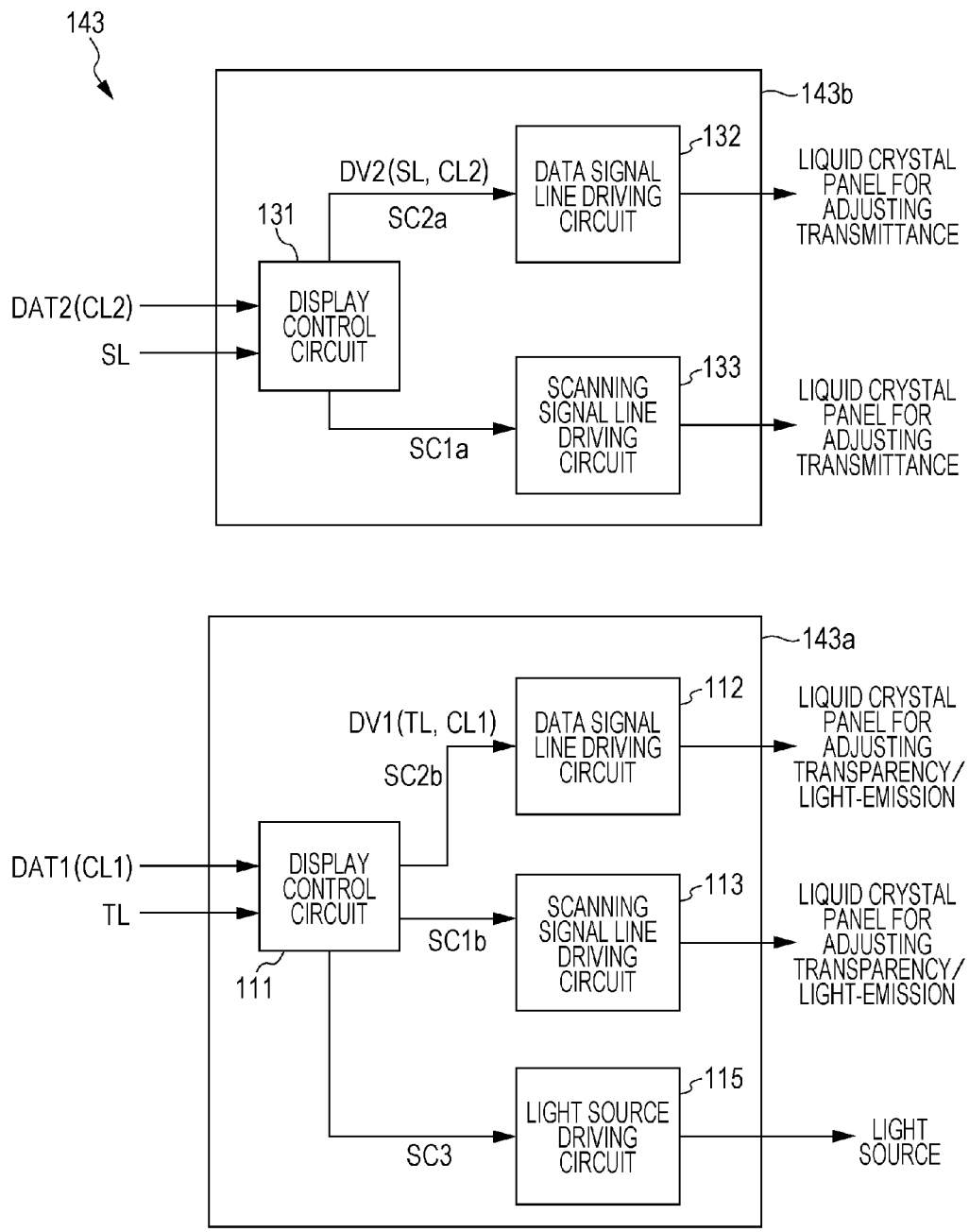
FIG. 45 is a block diagram showing a third modification example of the driving circuit included in the image display device shown in FIG. 31.

FIG. 45 is a diagram showing a third modification example of the driving circuit used in the image display device 600. Since a circuit configuration of a driving circuit 143 of the third modification example is the same as the circuit configuration of the driving circuit 141 shown in FIG. 43, the same circuits as the circuits in the case of FIG. 43 will be assigned the same reference numerals, and thus, the description thereof will be omitted. Unlike the case of the driving circuit 141 shown in FIG. 43, in the third modification example, the image signal DAT1 including the display pixel information CL1 and the transparent/light-emitting pixel information TL are respectively input to the display control circuit 111, as separate signals, and the image signal DAT2 including the display pixel information CL2 and the transmittance pixel information SL are respectively input to the display control circuit 131, as separate signals. The display control circuit 111 generates the pixel information signal DV1 including the transparent/light-emitting pixel information TL for setting the transparent state, the light-emitting state or the intermediate state therebetween for each pixel and the display pixel information CL1 for setting the gradation information for displaying the gradation of the image by further controlling the transmittance of the backlight light, based on the transparent/light-emitting pixel information TL and the image signal DAT1, and applies the generated signal to the data signal line driving circuit 112. The display control circuit 131 generates the pixel information signal DV2 including the transmittance pixel information SL for setting the transmittance of at least any one of the backlight light and the ambient light for each pixel and the display pixel information CL2 for setting the gradation information for displaying the image in which the gradations are displayed on the pixels desired to display the image, based on the transmittance pixel information SL and the image signal DAT2, and applies the generated signal to the data signal line driving circuit 132. The subsequent processes are the same as those in the case of the driving circuit 141 shown in FIG. 43, and thus, the description thereof will be omitted.

Figure 46:
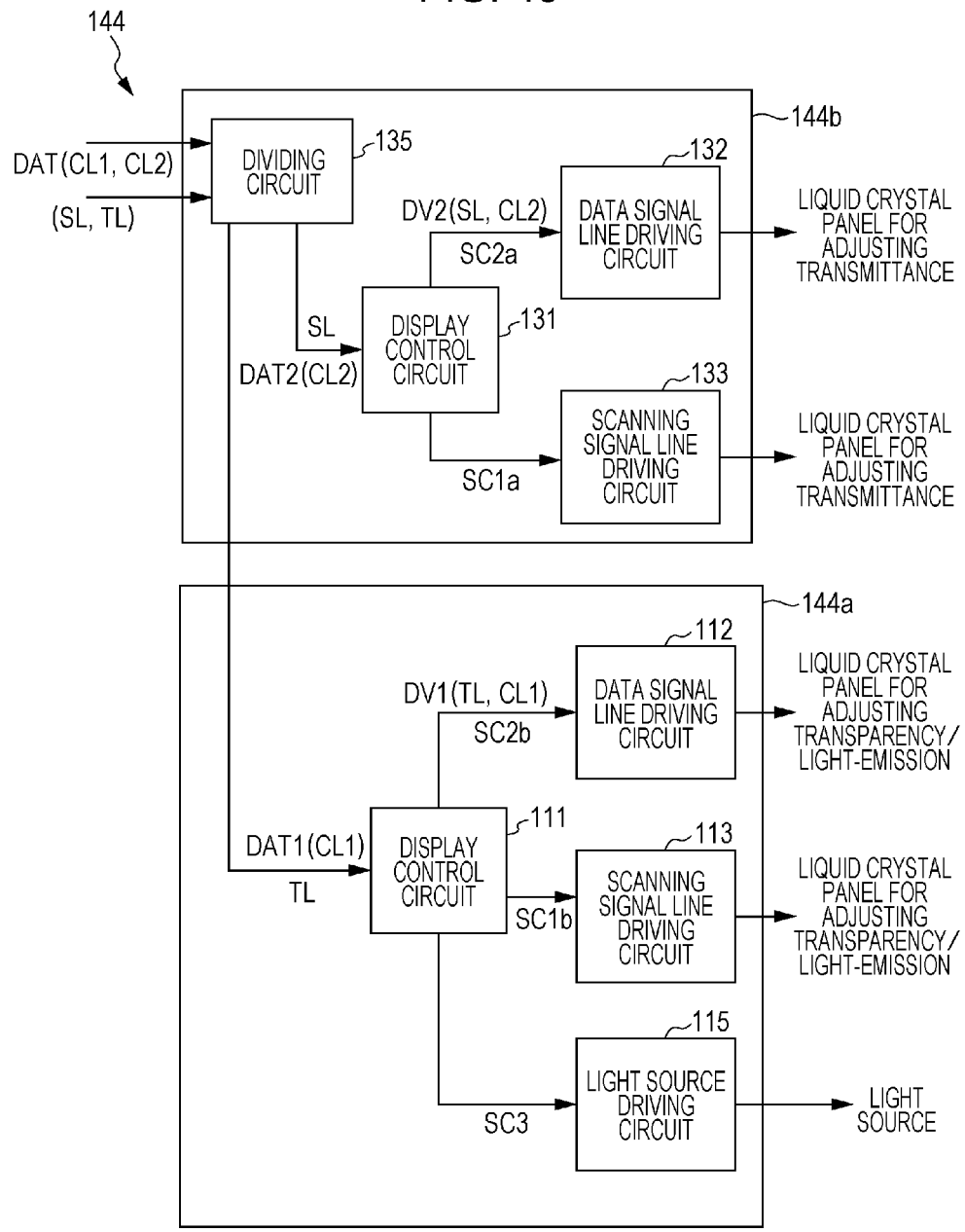
FIG. 46 is a block diagram showing a fourth modification example of the driving circuit included in the image display device shown in FIG. 31.

FIG. 46 is a diagram showing a fourth modification example of the driving circuit used in the image display device 600. Since a circuit configuration of a driving circuit 144 of the fourth modification example is the same as the circuit configuration of the driving circuit 142 shown in FIG. 44, the same circuits as the circuits in the case of FIG. 44 will be assigned the same reference numerals, and thus, the description thereof will be omitted. In the fourth modification example, the image signal DAT including the display pixel information CL1 for driving the liquid crystal panel 32 for adjusting transparency/light-emission and the display pixel information CL2 for driving the liquid crystal panel 31 for adjusting transmittance, the transmittance pixel information SL and the transparent/light-emitting pixel information TL are respectively input to the dividing circuit 135, as separate signals. The dividing circuit 135 divides the image signal DAT into the image signal DAT1 including the display pixel information CL1 and the transparent/light-emitting pixel information TL, the image signal DAT2 including the display pixel information CL2 and the transmittance pixel information SL, applies the image signal DAT1 and the transparent/light-emitting pixel information TL to the display control circuit 111, and applies the image signal DAT2 and the transmittance pixel information SL to the display control circuit 131. The display control circuit 111 generates the pixel information signal DV1 including the transparent/light-emitting pixel information TL and the display pixel information CL1, and applies the generated signal to the data signal line driving circuit 112. The display control circuit 131 generates the pixel information signal DV2 including the transmittance pixel information SL and the display pixel information CL2, and applies the generated signal to the data signal line driving circuit 132. The subsequent processes are the same as those in the driving circuit 141 shown in FIG. 43, and thus, the description thereof will be omitted.

<5.13 Another Example of Image Displayed on Display>

An example of the image displayed on the display of the image display device 600 will be described using the driving circuit 141 shown in FIG. 43. FIG. 47 is a diagram showing another example of the image displayed on the display of the image display device 600, and more specifically, FIG. 47(A) is a diagram showing a display state of the liquid crystal panel 32 for adjusting transparency/light-emission included in the image display device 600, and FIG. 47(B) is a diagram showing a display state of the liquid crystal panel 31 for adjusting transmittance included in the image display device 600.

As shown in FIG. 47(A), a fish is drawn in the liquid crystal panel 32 for adjusting transparency/light-emission. The external appearance of a fish in which scales on the back, the eye and the pectoral fins of the fish are displayed is displayed so as to be superimposed on a background in a region (hereinafter, referred to as a "fish display region") 93 where the fish is displayed. Only the background is transparently seen in a region (hereinafter, referred to as a "surrounding region") 94 that surrounds the fish. In order to display such an image on the liquid crystal panel 32 for adjusting transparency/light-emission, the first driving circuit 141a applies, to the fish display region 93, the display pixel information CL1 which is the gradation information for displaying the eye and pectoral fins of the fish and the transparent/light-emitting pixel information TL set such that the backlight light and the ambient light transmit at a predetermined ratio. The first driving circuit applies, to the surrounding region 94, the transparent/light-emitting pixel information TL set such that only the ambient light transmits.

In FIG. 47(B), the transmittance pixel information SL indicating the transparent state is applied to a fish display region 83 of the liquid crystal panel 31 for adjusting transmittance. Accordingly, the backlight light and the ambient light transmitted through the fish display region 93 of the liquid crystal panel 32 for adjusting transparency/light-emission transmit through the fish display region 83 of the liquid crystal panel 31 for adjusting transmittance at a predetermined transmittance determined by the transmittance pixel information SL. A surrounding region 84 corresponding to the surrounding region 94 shown in FIG. 47(A) is also transparent, but a degree of transparency thereof is lower than a degree of transparency of the fish display region 83. Thus, the transmittance pixel information SL for transmitting only the ambient light having a low degree of transparency is applied to the surrounding region 84. Accordingly, only the ambient light transmits in the surrounding region 84, and the transmittance thereof is lower than that of the fish display region 83. In this example, since the eye and pectoral fins of the fish displayed on the liquid crystal panel 32 for adjusting transparency/light-emission are not displayed on the liquid crystal panel 31 for adjusting transmittance, the display pixel information CL2 is not applied to the liquid crystal panel 31 for adjusting transmittance.

As described above, by driving the liquid crystal panel 32 for adjusting transparency/light-emission and the liquid crystal panel 31 for adjusting transmittance, an observer positioned close to the front surface side of the display sees as though the fish displayed so as to be superimposed on the background in the middle of the screen and the background having a luminance lower than the fish in the region that surrounds the fish are transparent. In this case, since the luminance of the region that surrounds the fish is lower than the luminance of the fish, the fish is displayed with good visual quality.

Hereinafter, still another example of the image displayed on the image display device 600 by the same driving circuit 141 as the aforementioned case will be described. FIG. 48 is a diagram showing still another example of the image displayed on the display of the image display device 600, and more specifically, FIG. 48(A) is a diagram showing a display state of the liquid crystal panel 32 for adjusting transparency/light-emission included in the image display device 600, and FIG. 48(B) is a diagram showing a display state of the liquid crystal panel 31 for adjusting transmittance included in the image display device 600.

Similarity to the case shown in FIG. 47(A), the external appearance of a fish in which scales are displayed on the back is displayed in a fish display region 95 of the liquid crystal panel 32 for adjusting transparency/light-emission, which is shown in FIG. 48(A), and the background is transparently displayed in a surrounding region 96. However, the eye and pectoral fins of the fish are not displayed unlike the case shown in FIG. 47(A). In order to display such an image on the liquid crystal panel 32 for adjusting transparency/light-emission, the first driving circuit 141*a* applies, to the fish display region 95, the transparent/light-emitting pixel information TL indicating the transmission ratio between the backlight light and the ambient light and the display pixel information CL1 indicating the gradation information such as the external appearance and the scales on the back. Accordingly, the backlight light and the ambient light transmit through the fish display region 95 at predetermined transmittances, respectively. Since the transparent/light-emitting pixel information TL set such that only the ambient light transmits is applied to the surrounding region 96, only the ambient light transmits in the surrounding region 96.

As shown in FIG. 48(B), the eye and pectoral fins are drawn together with the external appearance of the fish in the liquid crystal panel 31 for adjusting transmittance. Thus, the transmittance pixel information SL for transmitting the backlight light and the ambient light and the display pixel information CL2 indicating the gradation information such as the eye and pectoral fins are applied to a fish display region 85 of the liquid crystal panel 31 for adjusting transmittance corresponding to the fish display region 95 of the liquid crystal panel 32 for adjusting transparency/light-emission. Accordingly, the backlight light and the ambient light transmitted through the fish display region 95 of the liquid crystal panel 32 for adjusting transparency/light-emission transmit through the fish display region 85 of the liquid crystal panel 31 for adjusting transmittance at predetermined transmittances respectively set by the transmittance pixel information SL. Therefore, the fish in which the external appearance, eye and pectoral fins of the fish are drawn is displayed on the liquid crystal panel 31 for adjusting transmittance. A surrounding region 86 is also transparent, but a degree of transparency thereof is lower than a degree of transparency of the fish display region 85. Thus, the transmittance pixel information SL for transmitting only the ambient light having a low degree of transparency is applied to the surrounding region 86. Accordingly, only the ambient light transmits in the surrounding region 86, and a transmittance thereof is lower than that of the fish display region 85.

In this case, similarly to the case shown in FIG. 47, the background is superimposed in the middle of the screen, the fish having the scales on the back, eye and pectoral fins, and the background having a luminance lower than the fish in the region that surrounds the fish are transparently seen. In this case, since the luminance of the region that surrounds the fish is lower than the luminance of the fish, the fish is displayed with good visual quality.

6. Fifth Embodiment

<6.1 Configuration of Image Display Device>

Figure 49:
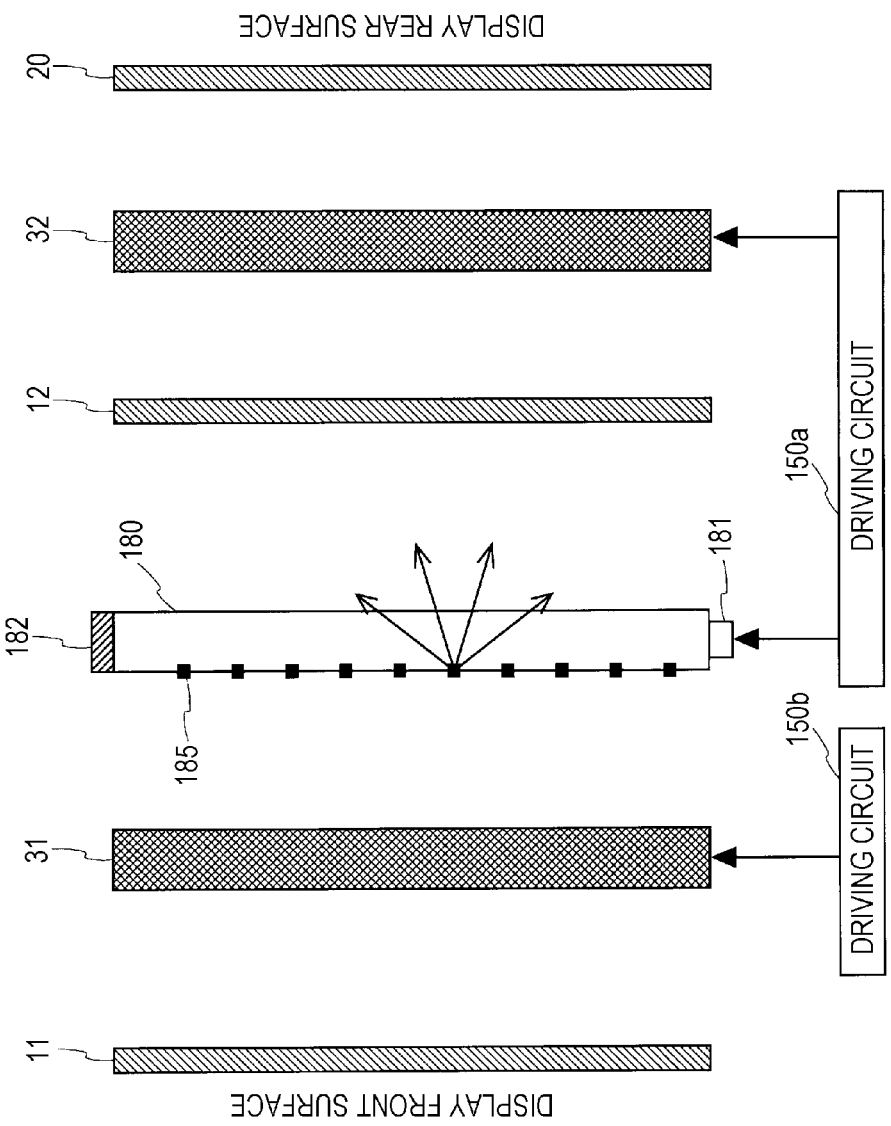
FIG. 49 is a diagram showing the configuration of an image display device according to a fifth embodiment of the present invention.

FIG. 49 is a diagram showing the configuration of an image display device 700 according to a fifth embodiment of the present invention. As shown in FIG. 49, in the image display device 700, an absorption-type polarization plate 11 for adjusting transmittance, a liquid crystal panel 31 for adjusting transmittance, a light guide plate 180 to which a light source 181 is attached to an end, an absorption-type polarization plate 12 for adjusting transparency/light-emission, a liquid crystal panel 32 for adjusting transparency/light-emission, and a reflection-type polarization plate 20 are sequentially arranged so as to be parallel to one another. The light guide plate 180 is disposed in a space interposed between the liquid crystal panel 31 for adjusting transmittance and the absorption-type polarization plate 12 for adjusting transparency/light-emission. Since the light guide plate 180 is an asymmetric light guide plate, light emitted from the light source 181 is mainly emitted to the rear surface side. A second driving circuit 150*b* included in a driving circuit 150, to be described below, is connected to the liquid crystal panel 31 for adjusting transmittance, and a first driving circuit 150*a* is connected to the liquid crystal panel 32 for adjusting transparency/light-emission and the light source 181. A second driving circuit 160*b* included in a driving circuit 160, to be described below, may be connected to the liquid crystal panel 31 for adjusting transmittance, and a first driving circuit 160*a* may be connected to the liquid crystal panel 32 for adjusting transparency/light-emission and the light source 181.

When viewed from the front surface side, the image display device 700 controls such that any one of the turn-of state, the transparent state and the turn-off state, or a superimposed state of these states is displayed for each pixel. Meanwhile, when viewed from the rear surface side, the image display functions as a mirror display. Thus, these functions will be described. In the following description, an example in which the transmission axis directions of the absorption-type polarization plate 11 for adjusting transmittance, the absorption-type polarization plate 12 for adjusting transparency/light-emission and the reflection-type polarization plate 20 are assumed as being the same and the liquid crystal panel 31 for adjusting transmittance and the liquid crystal panel 32 for adjusting transparency/light-emission are assumed as being a normally white type will be described. Thus, in a case where the power of the image display device 700 is turned off, an observer positioned close to the front surface side of the display can see transparently the background. However, in a case where the background may not be transparently seen at the time of turning off the power of the image display device 700, it is not necessary to cause the transmission axis directions of the absorption-type polarization plate 11 for adjusting transmittance, the absorption-type polarization plate 12 for adjusting transparency/light-emission and the reflection-type polarization plate 20 to be in the same direction, and at least one polarization plate of these polarization plates may be disposed such that the polarization direction thereof is perpendicular to the polarization direction of another polarization plate. The liquid crystal panel 30 for controlling polarization rotation may be a normally black type.

The light source 170 may be disposed instead of the light guide plate 180 to which the light source 181 is attached. In a case where the light source 170 is used, a lens 171, a diffusion plate 172, and a mirror 173 may be arranged in front of the light source 170. In the present specifications, the absorption-type polarization plate 11 for adjusting transmittance may be referred to as a "first absorption-type polarization plate", and the absorption-type polarization plate 12 for adjusting transparency/light-emission may be referred to as a "second absorption-type polarization plate".

<6.2 Passage Routes of Backlight Light and Ambient Light>

<6.2.1 Turn-on State>

Figure 50:
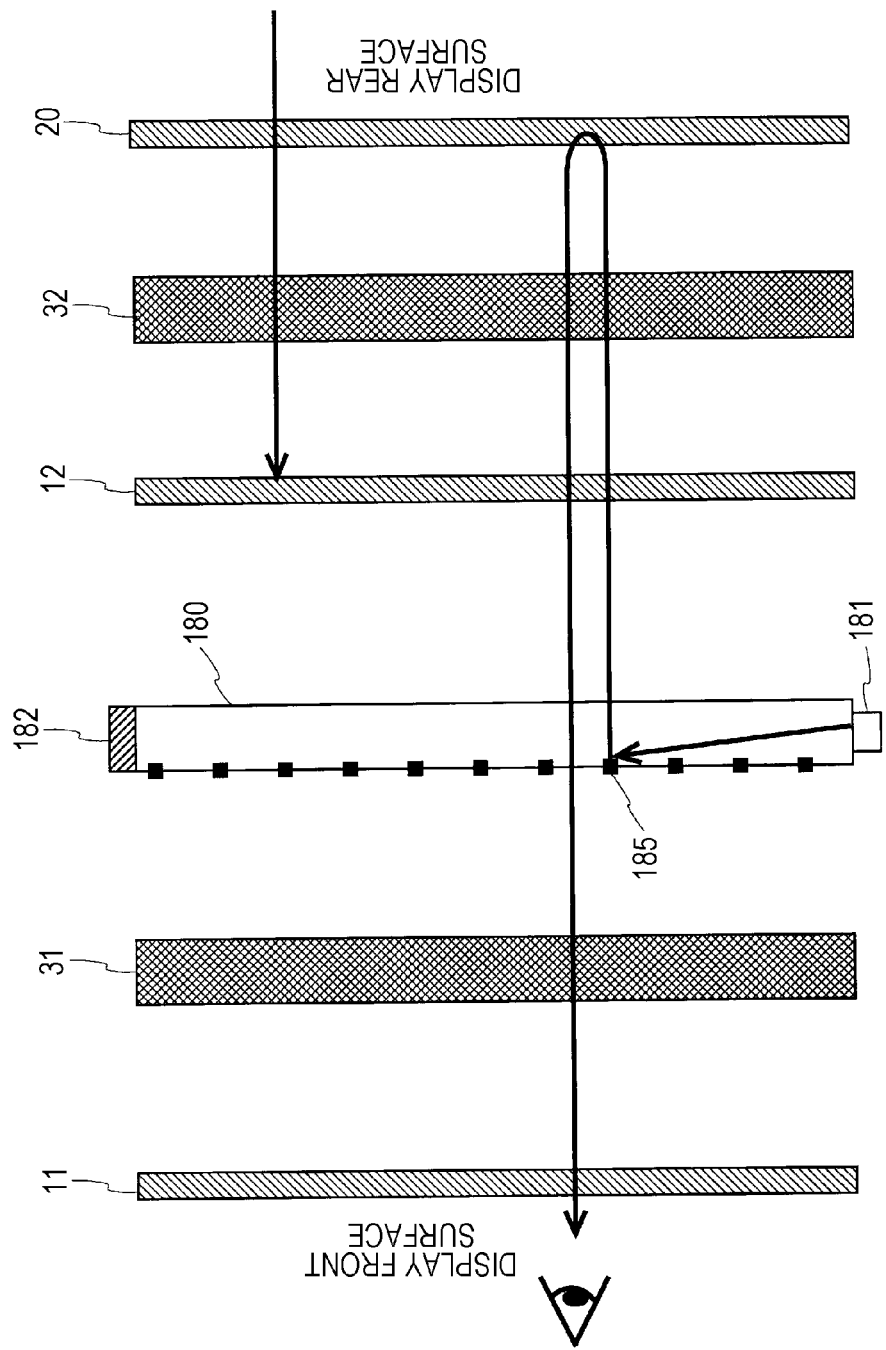
FIG. 50 is a diagram showing the passage routes of the backlight light and the ambient light in the case where the image is displayed on the front surface side of the display in the image display device shown in FIG. 49.

FIG. 50 is a diagram showing the passage routes of the backlight light and the ambient light in the turn-on state. Initially, the passage route of the backlight light will be described. As shown in FIG. 50, of the light-source light irradiated to the absorption-type polarization plate 12 for adjusting transparency/light-emission from the light guide plate 180, only the polarization components having the same polarization direction as the transmission axis direction of the absorption-type polarization plate 12 for adjusting transparency/light-emission transmit through the absorption-type polarization plate 12 for adjusting transparency/light-emission. The polarization direction of the polarization components of the light-source light transmitted through the absorption-type polarization plate 12 for adjusting transparency/light-emission is rotated by the liquid crystal panel 32 for adjusting transparency/light-emission by 90°, and the polarization components are incident on the reflection-type polarization plate 20. Since the reflection axis direction of the reflection-type polarization plate 20 is the same as the polarization direction of the light-source light, the reflection-type polarization plate 20 reflects the light-source light. The reflected light-source light sequentially transmits through the liquid crystal panel 32 for adjusting transparency/light-emission, the absorption-type polarization plate 12 for adjusting transparency/light-emission and the light guide plate 180, as the backlight light, and is irradiated to the liquid crystal panel 31 for adjusting transmittance. Accordingly, the pixels of the liquid crystal panel 31 for adjusting transmittance transmit the backlight light at a transmittance corresponding to the applied image signal. Although not shown, if the image signal for rotating the polarization direction of the backlight light by 90° is applied to the pixels of the liquid crystal panel 31 for adjusting transmittance, the polarization direction of the backlight light is the same as the absorption axis direction of the absorption-type polarization plate 11 for adjusting transmittance. Accordingly, the backlight light incident on the absorption-type polarization plate 11 for adjusting transmittance is absorbed and does not transmit to the front surface side.

Hereinafter, the passage route of the ambient light will be described. Of the ambient light incident on the reflection-type polarization plate 20 from the rear surface side of the display, the polarization components having the same polarization direction as the transmission axis direction of the reflection-type polarization plate 20 transmit through the reflection-type polarization plate 20. The polarization direction of the polarization components of the ambient light transmitted through the reflection-type polarization plate 20 is rotated by the liquid crystal panel 32 for adjusting transparency/light-emission by 90°, and the polarization components are incident on the absorption-type polarization plate 12 for adjusting transparency/light-emission. Since the polarization direction of the ambient light incident on the absorption-type polarization plate 12 for adjusting transparency/light-emission is the same as the absorption axis direction of the absorption-type polarization plate 12 for adjusting transparency/light-emission, the polarization components of the ambient light are absorbed, and are hard to transmit through the absorption-type polarization plate 12 for adjusting transparency/light-emission.

As mentioned above, in the turn-on state, since the ambient light is absorbed to the absorption-type polarization plate 12 for adjusting transparency/light-emission, an observer positioned close to the front surface side is hard to transparently see the background. However, since the pixels in which the backlight light transmits to the front surface side are in the turn-on state in which the image corresponding to the image signal is displayed, an observer can visually perceive the image in which the gradations are displayed. The pixels in which the backlight light is absorbed to the liquid crystal panel 31 for adjusting transmittance are in the turn-off state in which the display is displayed in black.

<6.2.2 Transparent State>

Figure 51:
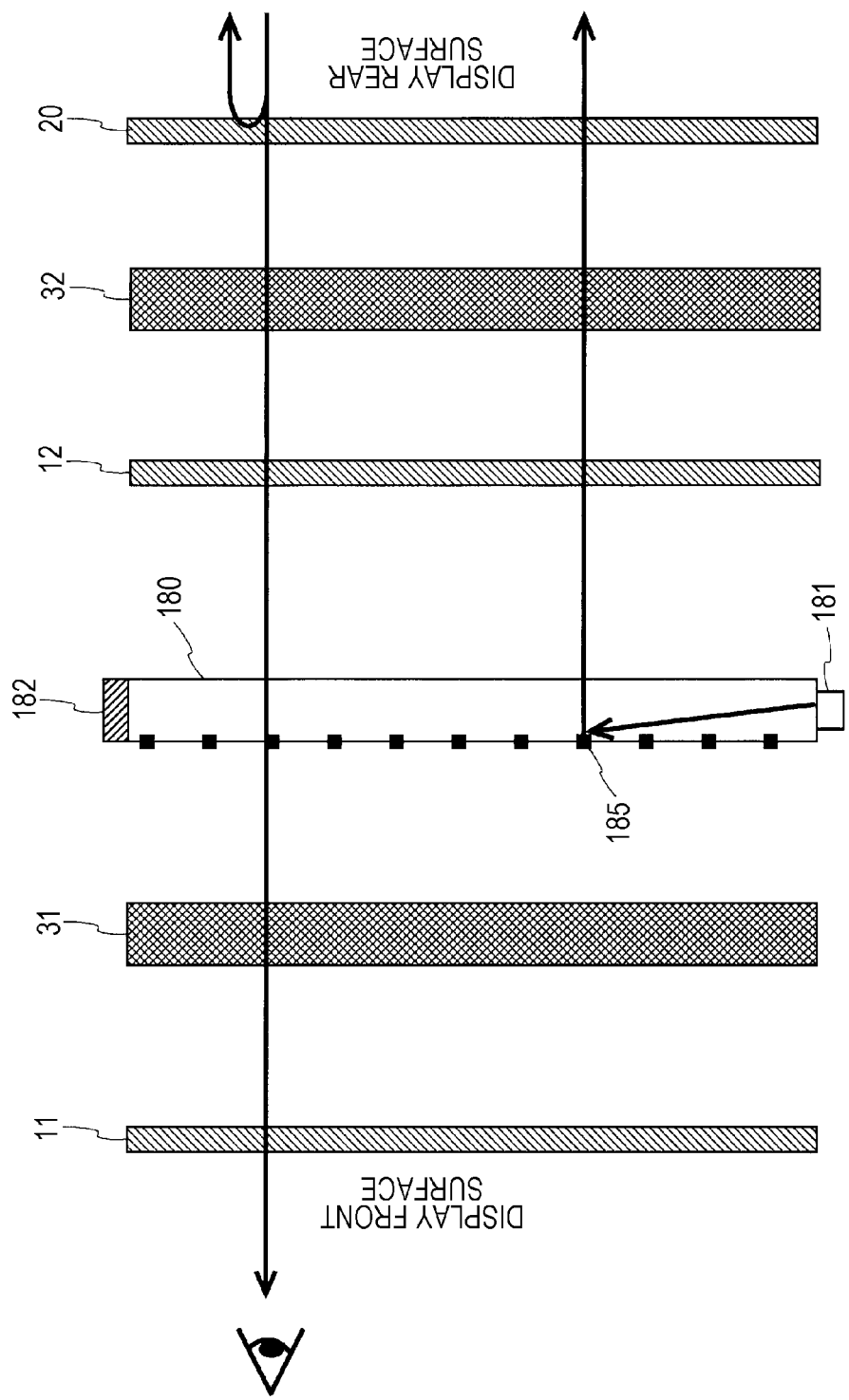
FIG. 51 is a diagram showing the passage routes of the backlight light and the ambient light in the case where the background is displayed on the front surface side of the display in the image display device shown in FIG. 49.

FIG. 51 is a diagram showing the passage routes of the backlight light and the ambient light in the transparent state. Initially, the passage route of the backlight light will be described. As shown in FIG. 51, of the light-source light irradiated to the absorption-type polarization plate 12 for adjusting transparency/light-emission from the light guide plate 180, only the polarization components having the same polarization direction as the transmission axis direction of the absorption-type polarization plate 12 for adjusting transparency/light-emission transmit through the absorption-type polarization plate 12 for adjusting transparency/light-emission. The polarization components of the light-source light transmitted through the absorption-type polarization plate 12 for adjusting transparency/light-emission are incident on the reflection-type polarization plate 20 without the rotation of the polarization direction by the liquid crystal panel 32 for adjusting transparency/light-emission. Since the transmission axis direction of the reflection-type polarization plate 20 is the same as the polarization direction of the polarization components of the light-source light, the light-source light transmits through the reflection-type polarization plate 20, as the backlight light, without being reflected, and escapes to the outside. Accordingly, the image is not displayed on the front surface side of the display.

Hereinafter, the passage route of the ambient light will be described. Of the ambient light incident on the reflection-type polarization plate 20 from the rear surface side of the display, the light having the polarization components of which the polarization direction is the same as the transmission axis direction of the reflection-type polarization plate 20 transmits through the reflection-type polarization plate 20. The polarization components of the ambient light transmitted through the reflection-type polarization plate 20 are incident on the absorption-type polarization plate 12 for adjusting transparency/light-emission without the rotation of the polarization direction by the liquid crystal panel 32 for adjusting transparency/light-emission. Since the polarization direction of the ambient light is the same as the transmission axis direction of the absorption-type polarization plate 12 for adjusting transparency/light-emission, the ambient light transmits through the absorption-type polarization plate 12 for adjusting transparency/light-emission, and is incident on the liquid crystal panel 31 for adjusting transmittance. If the image signal for transmitting the ambient light is applied to the pixels of the liquid crystal panel 31 for adjusting transmittance, since the ambient light transmits through the liquid crystal panel 31 for adjusting transmittance, the background is transparently seen from the front surface side of the display. Although not shown, since the ambient light of which the polarization direction is rotated by the liquid crystal panel 31 for adjusting transmittance is absorbed to the absorption-type polarization plate 11 for adjusting transmittance, the ambient light is hard to transmit to the front surface side.

As discussed above, in the transparent state, since the backlight light escapes to the outside from the rear surface side, the image is not displayed. However, since the pixels in which the ambient light transmits to the front surface side are in the transparent state, an observer positioned close to the front surface side can transparently see the background. The pixels in which the ambient light is absorbed to the liquid crystal panel 31 for adjusting transmittance are in the turn-off state in which the display is displayed in black.

<6.2.3 Mirror Display>

Figure 52:
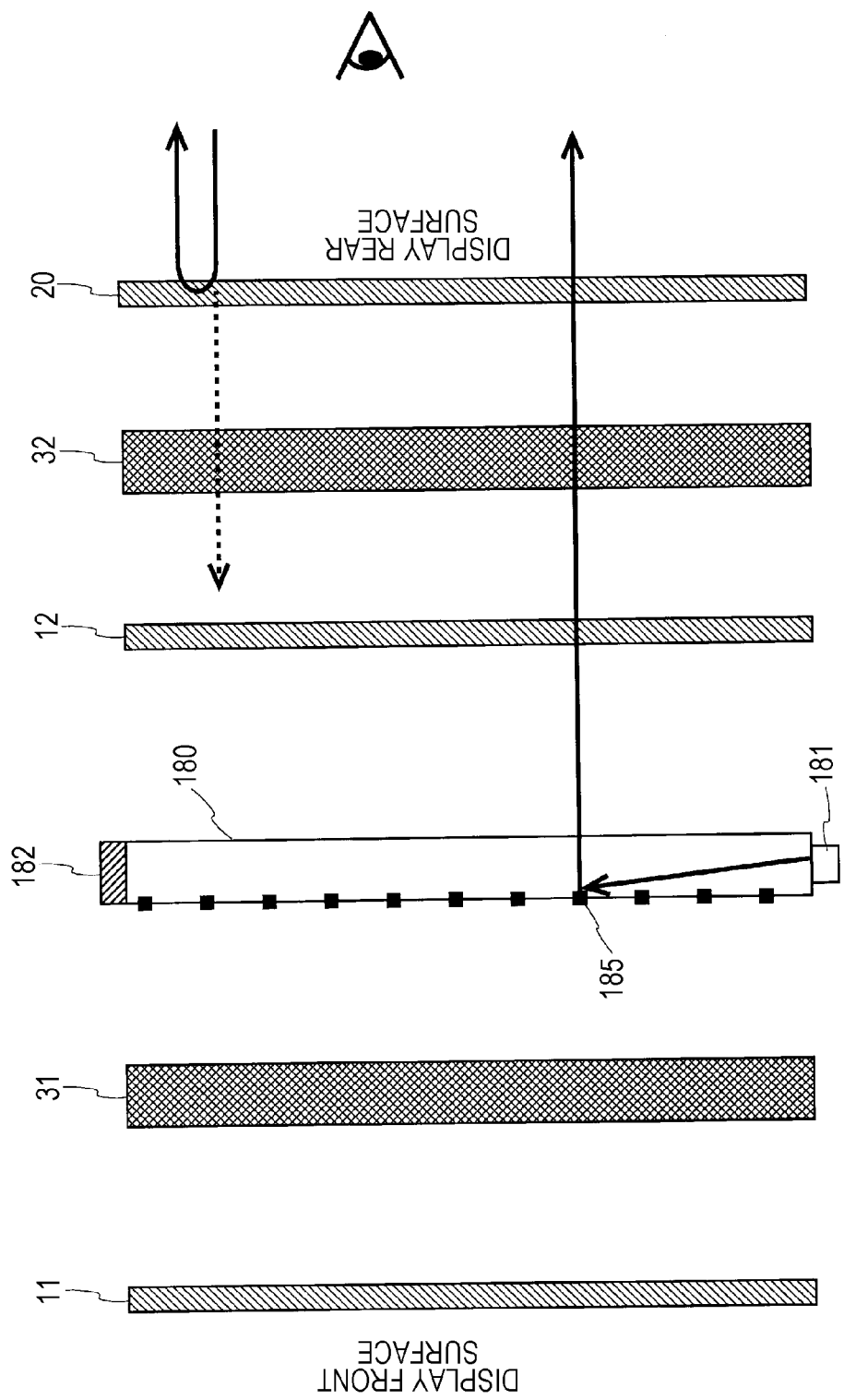
FIG. 52 is a diagram showing the passage routes of the backlight light and the ambient light in a case where the rear surface side of the display serves as a mirror display in the image display device shown in FIG. 49.

FIG. 52 is a diagram showing the passage routes of the backlight light and the ambient light in a case where the rear surface side of the display serves as a mirror display. Initially, the passage route of the backlight light will be described. As shown in FIG. 52, the light guide plate 180 is a backlight-light source, the absorption-type polarization plate 12 for adjusting transparency/light-emission, the liquid crystal panel 32 for adjusting transparency/light-emission and the reflection-type polarization plate 20 have the same configurations as those of the liquid crystal panel in the typical liquid crystal device except that the reflection-type polarization plate 20 is used instead of the absorption-type polarization plate. Thus, if the image signal is applied to each pixel of the liquid crystal panel 32 for adjusting transparency/light-emission, the image corresponding to the image signal is displayed on the rear surface side of the display.

Hereinafter, the passage route of the ambient light will be described. Of the ambient light incident on the reflection-type polarization plate 20 from the rear surface side of the display, the polarization components having the same polarization direction as the reflection axis direction of the reflection-type polarization plate 20 are reflected from the reflection-type polarization plate 20, and thus, the display serves as a mirror. The light-source light transmitted through the reflection-type polarization plate 20 transmits through the rear surface side of the display serving as the mirror, and thus, the image is displayed in the mirror. In this case, if the image display device 700 is driven through the field sequential driving or the color filter driving, it is possible to display the image as a color image. Of the ambient light, the polarization components having the same polarization direction as the transmission axis direction of the reflection-type polarization plate 20 transmits through the reflection-type polarization plate 20, travels toward the front surface side of the display, and transmits to the front surface side of the display, or is absorbed on the way. However, since the polarization components do not involve in the operation of the display serving as the mirror display, and thus, the description thereof will be omitted. Since the absorption-type polarization plate 11 for adjusting transmittance and the liquid crystal panel 31 for adjusting transmittance are constituent members that are not used in the mirror display, the description thereof will be omitted.

As described above, the image display device 700 according to the present embodiment displays any state of the turn-on state in which the image is displayed, the transparent state in which the background is transparently seen and the turn-off state in which the backlight light and the ambient light are blocked and the display is displayed in black or a superimposed state of these states for each pixel when viewed from the front surface side of the display, and serves as the mirror display that displays the image in the mirror when viewed from the rear surface side of the display.

In a case where the image or the backlight is displayed on the front surface side of the display, the liquid crystal panel 32 for adjusting transparency/light-emission selects any light of the backlight light and the ambient light for each pixel, and transmits the selected light. However, in a case where the image display device is used as the mirror display, the light-source light emitted from the light guide plate 180 transmits in all the pixels, and the image is displayed. As stated above, in the case where the image or the background is displayed on the front surface side, since the operation of the liquid crystal panel 32 for adjusting transparency/light-emission is different from the case of the mirror display, the image display device 700 is hard to simultaneously display the same image on the front surface side and the rear surface side of the display.

<6.3 Driving Circuit>

In the case where the image or the background is displayed on the front surface side of the display of the image display device 700 according to the present embodiment, the liquid crystal panel 32 for adjusting transparency/light-emission is used to selectively transmit any one of the backlight light and the ambient light to the front surface side of the display, and in the case where the rear surface side of the display is used as the mirror display, the liquid crystal panel for adjusting transparency/light-emission is used to display the image by controlling the transmittance of the light-source light for each pixel in response to the image signal. The operation of the liquid crystal panel 32 for adjusting transparency/light-emission required to determine whether or not to operate the image display device as any display is switched by the transparent/light-emitting pixel information TL applied from the outside. The transparent/light-emitting pixel information TL may be separately applied from the image signal DAT, or may be applied by being included in the image signal DAT. Thus, a driving circuit 150 in the case where the transparent/light-emitting pixel information TL is separately applied from the image signal DAT and a driving circuit 160 in the case where the transparent/light-emitting pixel information TL is applied by being included in the image signal DAT will be separately described.

<6.3.1 Case where Transparent/Light-Emitting Pixel Information is Separately Applied from Image Signal>

Figure 53:
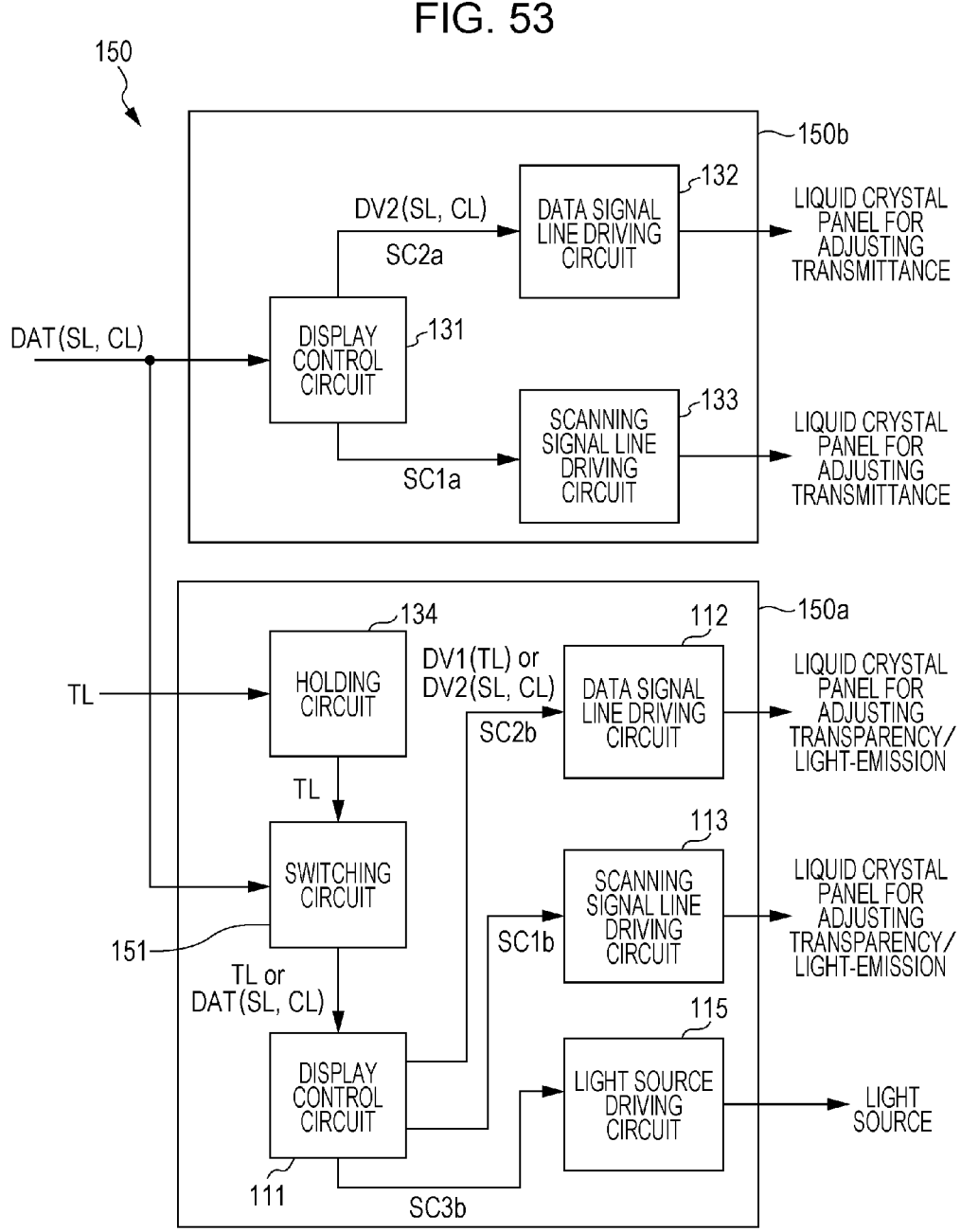
FIG. 53 is a block diagram showing the configuration of the driving circuit in the case where the transparent/light-emitting pixel information is separately applied from the image signal, which is included in the image display device shown in FIG. 49.

FIG. 53 is a block diagram showing the configuration of the driving circuit 150 in the case where the transparent/light-emitting pixel information TL is separately applied from the image signal DAT. As shown in FIG. 53, the driving circuit 150 includes a first driving circuit 150a that drives the liquid crystal panel 32 for adjusting transparency/light-emission and the light source 181, and a second driving circuit 150b that drives the liquid crystal panel 31 for adjusting transmittance and the light source 181. The configuration of the second driving circuit 150b is the same as the configuration of the second driving circuit 130b shown in FIG. 35, and thus, the description thereof will be omitted.

A circuit configuration of the first driving circuit 150a is partially different from the configuration of the first driving circuit 130a shown in FIG. 35. Thus, different circuits will be described and the same circuits will be assigned the same reference numerals, and thus, the description thereof will be omitted. In the first driving circuit 150a, a switching circuit 151 is further added to the configuration circuit of the first driving circuit 130a. In order to switch between the case where the image or the background is displayed on the front surface side of the display and the case where the rear surface side of the display is used as the mirror display, the switching circuit 151 is a circuit that switches the operation of the liquid crystal panel 32 for adjusting transparency/light-emission, and is disposed between the holding circuit 134 and the display control circuit 111. The switching circuit 151 selects any one of the transparent/light-emitting pixel information TL which is applied from the outside and is held by the holding circuit 134 and the image signal DAT including the transmittance pixel information SL and the display pixel information CL which is applied from the outside, and applies to the selected one to the display control circuit 111.

In a case where the transparent/light-emitting pixel information TL from the switching circuit 151, the display control circuit 111 generates the pixel information signal DV1 including the transparent/light-emitting pixel information TL, and applies the generated signal to the data signal line driving circuit 112. Accordingly, the first driving circuit 150a divides the pixels of the liquid crystal panel 32 for adjusting transparency/light-emission into pixels in the transparent state in which the ambient light transmits, pixels in the light-emitting state in which the backlight light transmits, and pixels in the intermediate state in which the backlight light and the ambient light transmit at a predetermined ratio, and drives the divided pixels.

Meanwhile, in a case where the image signal DAT including the transmittance pixel information SL and the display pixel information CL is applied, the display control circuit 111 generates the pixel information signal DV2 including the transmittance pixel information SL and the display pixel information CL, and applies the generated signal to the data signal line driving circuit 112. Accordingly, the data signal line driving circuit 112 displays the image corresponding to the image signal DAT on the liquid crystal panel 32 for adjusting transparency/light-emission. The reflection-type polarization plate 20 is disposed close to the rear surface side of the liquid crystal panel 32 for adjusting transparency/light-emission serves as a mirror that reflects the ambient light incident from the outside. Thus, an observer who sees the liquid crystal panel 32 for adjusting transparency/light-emission from the rear surface side of the display visually perceives the image displayed in the mirror, and thus, the display functions as the mirror display. The pixel information signal DV2 applied to the data signal line driving circuit 112 is the same signal as the pixel information signal DV2 applied to the data signal line driving circuit 132. The same is true of FIGS. 54 and 57 to 60, to be described below.

<6.3.2 Case where Transparent/Light-Emitting Pixel Information is Included in Image Signal>

Figure 54:
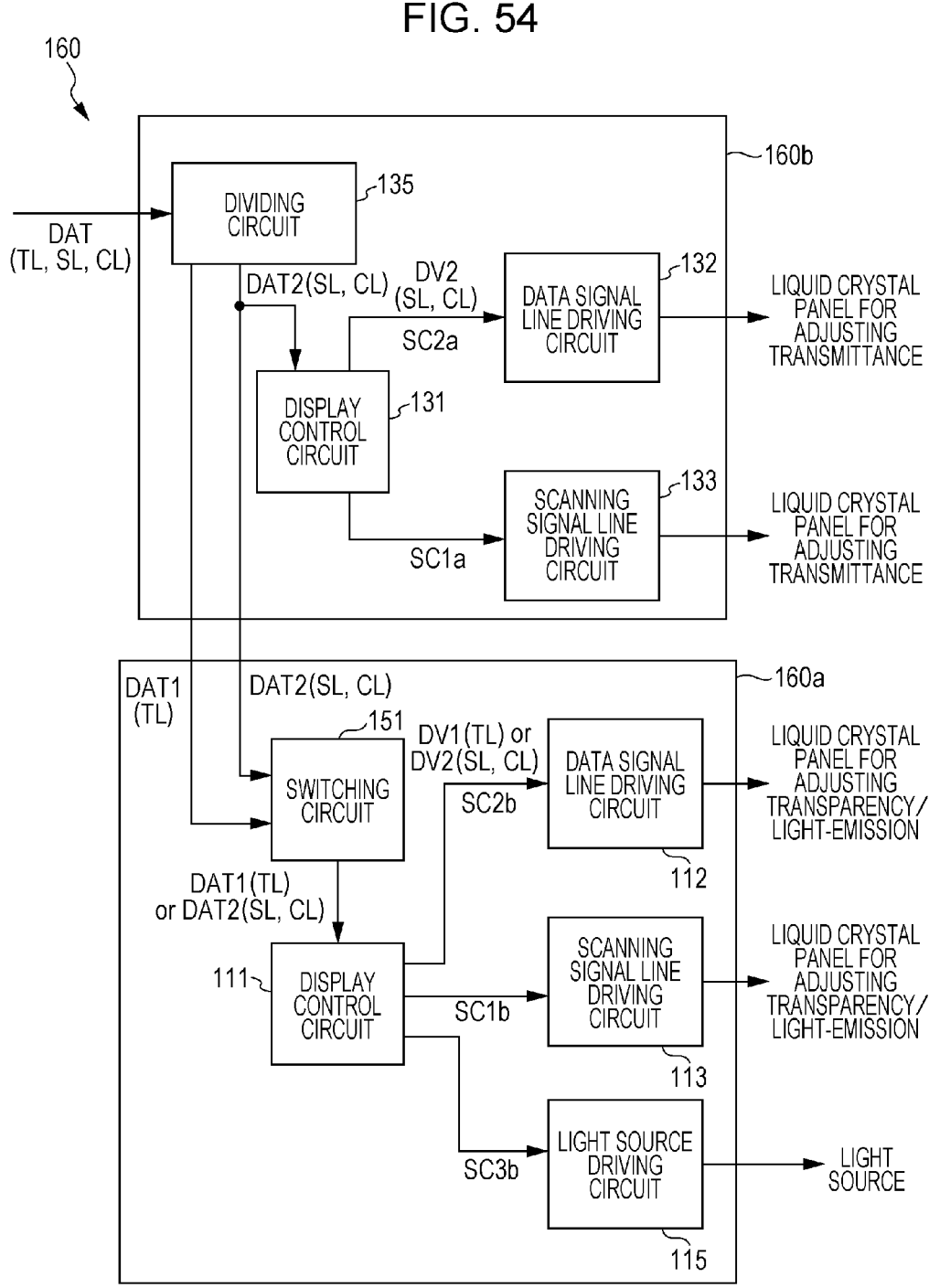
FIG. 54 is a block diagram showing the configuration of the driving circuit in a case where the transparent/light-emitting pixel information is applied by being included in the image signal, which is included in the image display device shown in FIG. 49.

FIG. 54 is a block diagram showing the configuration of the driving circuit 160 in a case where the transparent/light-emitting pixel information TL together with the transmittance pixel information SL and the display pixel information CL is applied by being included in the image signal DAT. As shown in FIG. 54, the driving circuit 160 includes a first driving circuit 160a that drives the liquid crystal panel 32 for adjusting transparency/light-emission and the light source 181, and a second driving circuit 160b that drives the liquid crystal panel 31 for adjusting transmittance. The second driving circuit 160b includes the respective constituent circuits included in the second driving circuit 150b shown in FIG. 53, and a dividing circuit 135. The dividing circuit 135 is connected to the display control circuit 131 of the second driving circuit 160b and the switching circuit 151 of the first driving circuit 160a.

The transparent/light-emitting pixel information TL together with the transmittance pixel information SL and the display pixel information CL is applied to the dividing circuit 135 from the outside by being included in the image signal DAT. The dividing circuit 135 divides the image signal into the image signal DAT2 including the transmittance pixel information SL and the display pixel information CL, and the image signal DAT1 including the transparent/light-emitting pixel information TL, applies the image signal DAT2 to the switching circuit 151 and the display control circuit 131, and applies the image signal DAT1 to the switching circuit 151. The operation of the second driving circuit 160b in the case where the image signal DAT2 is applied to the display control circuit 131 is the same as the operation of the second driving circuit 150b shown in FIG. 53, and thus, the description thereof will be omitted.

The holding circuit 134 included in the first driving circuit 150a shown in FIG. 53 is not included in the first driving circuit 160a. This is because the update rate of the transparent/light-emitting pixel information TL is the same as the frame rate of the image determined by the image signal DAT since transparent/light-emitting pixel information TL is information separated from the image signal DAT. Similarly to the switching circuit 151 shown in FIG. 53, the switching circuit 151 selects any one of the image signal DAT1 and the image signal DAT2, and applies the selected signal to the display control circuit 111. In the case where the image signal DAT1 is applied, the display control circuit 111 generates the pixel information signal DV1 including the transparent/light-emitting pixel information TL based on the image signal DAT1, and applies the generated signal to the data signal line driving circuit 112. Accordingly, the liquid crystal panel 32 for adjusting transparency/light-emission is driven by the data signal line driving circuit 112, and transmits any one of the ambient light and the backlight light or both the light beams for each pixel at a predetermined ratio. Meanwhile, in the case where the image signal DAT2 is applied, the display control circuit 111 generates the pixel information signal DV2 including the transmittance pixel information SL and the display pixel information CL based on the image signal DAT2, and applies the generated signal to the data signal line driving circuit 112. Therefore, the liquid crystal panel 32 for adjusting transparency/light-emission is driven by the data signal line driving circuit 112, and serves as the mirror display that displays the image corresponding to the image signal DAT2 in the mirror.

In the above description, it has been described that the holding circuit 134 and the switching circuit 151 are included in the first driving circuit 150a in FIG. 53 and the switching circuit 151 is included in the first driving circuit 160a and the dividing circuit 135 is included in the second driving circuit 160b in FIG. 54. However, in FIG. 53, the holding circuit 134 and the switching circuit 151 may be included in any one of the first driving circuit 150a and the second driving circuit 150b, and in FIG. 54, the switching circuit 151 and the dividing circuit 135 may be included in any one of the first driving circuit 160*a* and the second driving circuit 160*b*.

<6.4 Adjustment of Image Display Device>

Figure 55:
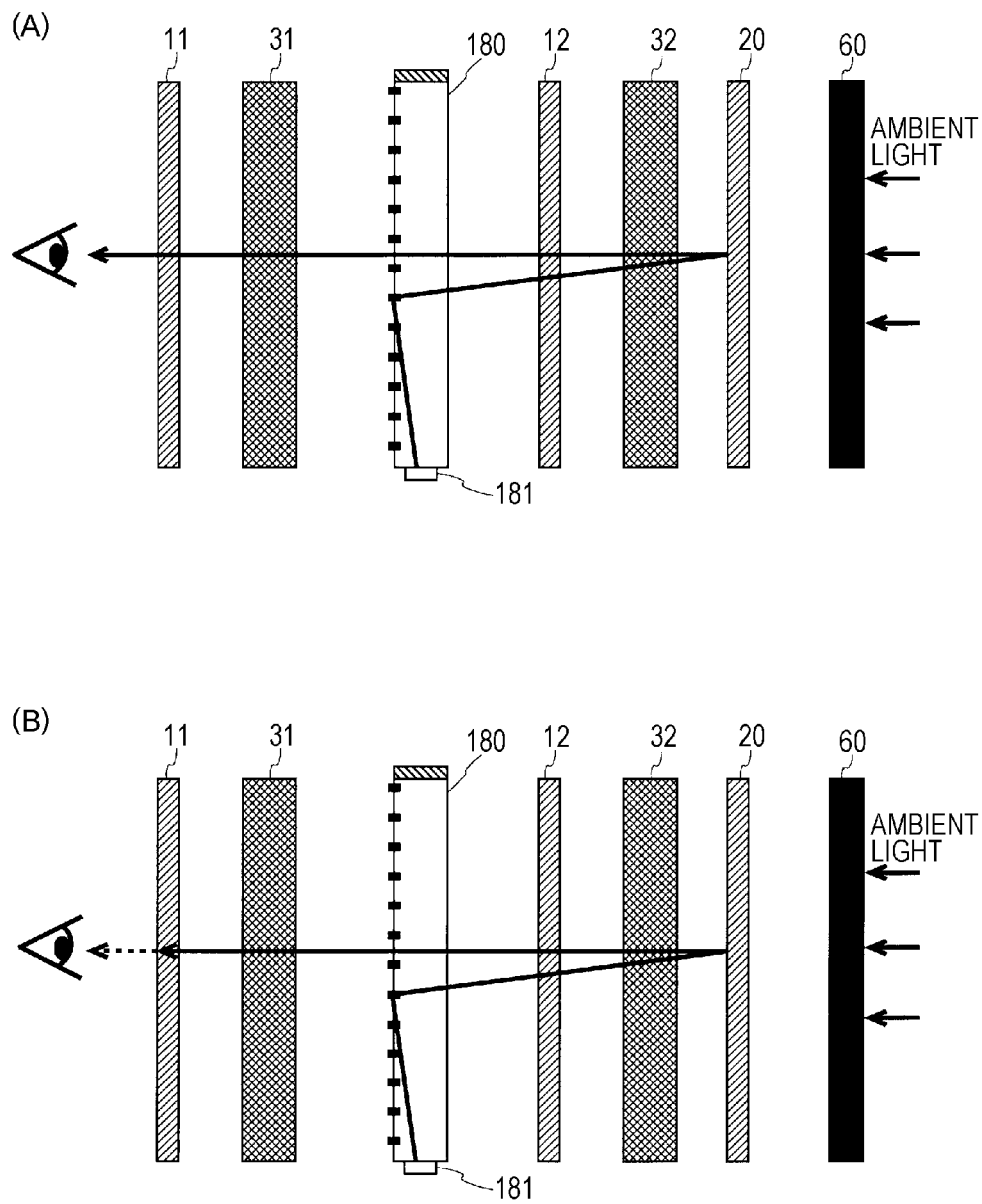
FIG. 55 is a diagram showing the passage routes of light in the respective regions of the image display device shown in FIG. 49, and more particularly, (A) is a diagram showing the passage route of light in the display region, and (B) is a diagram showing the passage route of light in the leakage region.

FIGS. 55 and 56 are diagrams showing the passage routes of light in the respective regions of the image display device 700, and more particularly, FIG. 55(A) is a diagram showing the passage route of light in the display region, and FIG. 55(B) is a diagram showing the passage route of light in the leakage region. FIG. 56(A) is a diagram showing the passage route of light in the ambient light transmission region, and FIG. 56(B) is a diagram showing the passage route of light in the black display region.

A case where the light-source light transmits through the display region will be described. As shown in FIG. 55(A), the light source 181 is turned on in a state where the ambient light is not incident from the rear surface side by covering the reflection-type polarization plate 20 with the black cloth 60. In this case, similarly to the case shown in FIG. 40(A), only the light-source light transmits through the absorption-type polarization plate 11 for adjusting transmittance, and is extracted to the front surface side.

A case where the light-source light leaks to the leakage region will be described. As shown in FIG. 55(B), the light source 181 is turned on in the case where the ambient light is not incident from the rear surface side by covering the rear surface side of the reflection-type polarization plate 20 with the black cloth 60. In this case, similarly to the case shown in FIG. 40(B), only the leaked light of the light-source light transmits through the absorption-type polarization plate 11 for adjusting transmittance, and is extracted to the front surface side.

A case where the ambient light transmits through the ambient light transmission region will be described. As shown in FIG. 56(A), since the rear surface side of the reflection-type polarization plate 20 is not covered with the black cloth 60, the ambient light is incident from the rear surface side. In this case, since the light source 181 is turned off, only the ambient light transmits through the absorption-type polarization plate 11 for adjusting transmittance, and is extracted to the front surface side, similarly to the case shown in FIG. 41(A). The luminance in the ambient light transmission region is calculated by Expression (5), based on the brightness of the background, the liquid crystal panel 32 for adjusting transparency/light-emission and the liquid crystal panel 31 for adjusting transmittance.

The black display region refers to a region where it is difficult to extract both the light-source light and the ambient light. The black display region where it is difficult to extract both the light-source light and the ambient light will be described. As shown in FIG. 56(B), the light source 181 is turned off in the state where the ambient light is not incident from the rear surface side by covering the rear surface side of the reflection-type polarization plate 20 with the black cloth 60. In this case, since the light source 181 is turned off, it is difficult to extract both the ambient light and the light-source light to the front surface side, similarly to the case shown in FIG. 41(B).

Similarly to the case of the image display device 600, in the image display device 700, the respective luminances of the light-source light transmitting through the display region, the light-source light transmitting the leakage region, the ambient light transmitting the ambient light transmission region and the light-source light transmitting through the black display region satisfy Expression (6) in the image and the background displayed on the front surface side of the display, both the image and the background are displayed with good visual quality in a state in which transparency is maintained.

In order to satisfy the relationship of Expression (6), an illumination sensor is disposed, and a light source for illumination is disposed, similarly to the case of the image display device 310 shown in FIG. 15. Similarly to the case of the image display device 310 shown in FIG. 15, values which are representative of the respective regions are used as the luminances of the respective regions.

<6.5 Application Example>

If the image display device 700 is attached to a window of an electric train so as to cause the front surface side of the display to face the inside of the electric train, it is possible to provide various information to passengers, and the passengers can enjoy outside scenery through the display. In a case where the electric train passes near an apartment, the outside scenery is not seen by displaying the display in black, and thus, it is possible to take the privacy of residents of the apartment into consideration.

Meanwhile, since a person positioned outside the electric train sees as though the display is a mirror by the reflection-type polarization plate, the person does not know the circumstances within the electric train, and thus, the privacy of the passenger is protected. In a case where the passenger closes the curtain of the window, since the passenger is hard to see the outside scenery, it is not necessary to provide information for the passenger. Thus, information such as an advertisement may be provided to the person positioned outside the electric train by switching the display to the mirror display.

The display of the present embodiment may be disposed on a window of a building. In this case, the display may be used to provide necessary information to a person inside or outside the building, or may be used to protect the privacy.

<6.6 Effect>

Similarly to the image display device 600 according to the fourth embodiment, according to the present embodiment, it is possible to display any state of the turn-on state, the turn-off state and the transparent state, or a superimposed state of these states for each pixel. When viewed from the rear surface side of the display, the image display device functions as the mirror display that displays the image corresponding to the image signal in the mirror formed by the light reflected from the reflection-type polarization plate 20 by using the light-source light transmitted through the liquid crystal panel 32 for adjusting transparency/light-emission as the backlight. As discussed above, since the image or the background can be displayed on the front surface side of the display or the rear surface side can be used as the mirror display, the image display device 700 can be variously used.

Since it is not necessary to attach the image display device 700 to a case filled with light, the image display device can be widely used without limitation of use. Since a liquid crystal panel used in a liquid crystal display panel can be used as the liquid crystal panel 31 for adjusting transmittance, the image display device 700 has high spatial resolution.

<6.7 Modification Example of Driving Circuit>

Figure 57:
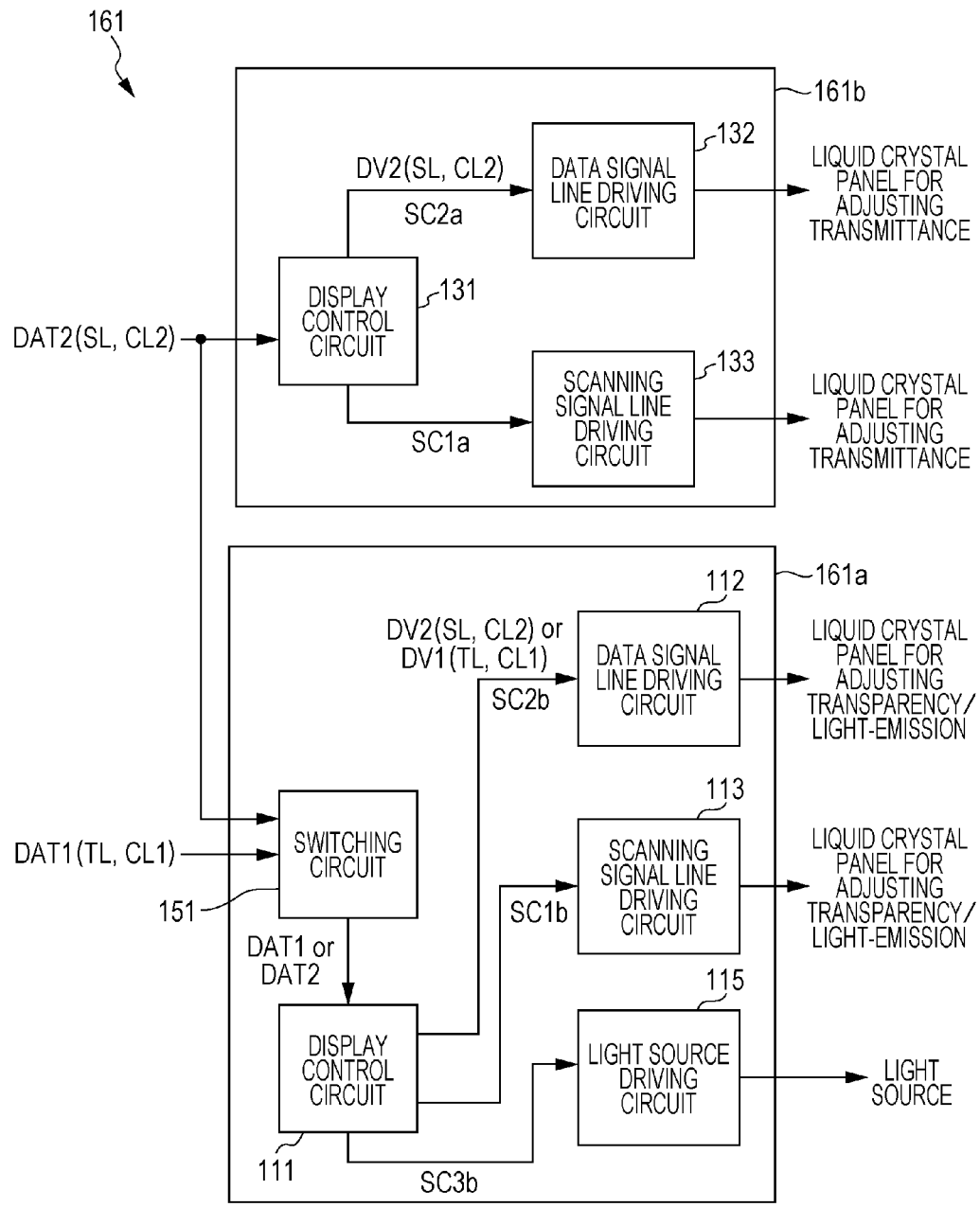
FIG. 57 is a block diagram showing a first modification example of the driving circuit included in the image display device shown in FIG. 49.

FIG. 57 is a diagram showing a first modification example of the driving circuit used in the image display device 700. Since the configuration of a driving circuit 161 of the first modification example shown in FIG. 57 is the same as the configuration of the driving circuit 150 shown in FIG. 53, the same circuits as the circuits shown in FIG. 53 will be assigned the same reference numerals, and thus, the description thereof will be omitted. In the driving circuit 161, the holding circuit is not provided, unlike the driving circuit 150 shown in FIG. 53. Thus, the image signal DAT1 including the display pixel information CL1 and the transparent/light-emitting pixel information TL, and the image signal DAT2 including the transmittance pixel information SL and the display pixel information CL2 are applied to a switching circuit 151. The switching circuit 151 selects any one of the image signals DAT1 and DAT2, and applies the selected signal to the display control circuit 111. If the image signal DAT1 is applied, the display control circuit 111 generates the pixel information signal DV1 including the transparent/light-emitting pixel information TL for setting the transparent state, the light-emitting state or the intermediate state therebetween for each pixel and the display pixel information CL1 for setting the gradation information for displaying the gradations of the image by further controlling the transmittance of the backlight light, based on the image signal DAT1, and outputs the generated signal to the data signal line driving circuit 112. If the image signal DAT2 is applied, the display control circuit 111 generates the pixel information signal DV2 including the transmittance pixel information SL for setting the transmittances of the backlight light and the ambient light for each pixel and the display pixel information CL2 for setting the gradation information for further displaying the image in which the gradations are displayed for pixels desired to display the image, based on the image signal DAT2, and outputs the generated signal to the data signal line driving circuit 112. Accordingly, the liquid crystal panel 32 for adjusting transparency/light-emission is driven by the pixel information signal DV1 or DV2. Meanwhile, since the image signal DAT2 is applied to the display control circuit 131, the display control circuit 131 generates the pixel information signal DV2 including the transmittance pixel information SL for setting the transmittances of the backlight light and the ambient light for each pixel and the display pixel information CL2 for setting the gradation information for further displaying the image in which the gradations are displayed for pixels desired to display the image, based on the image signal DAT2, and outputs the generated signal to the data signal line driving circuit 132. Accordingly, the liquid crystal panel 31 for adjusting transmittance is driven by the pixel information signal DV2.

In this case, if the liquid crystal panel 32 for adjusting transparency/light-emission is driven based on the same pixel information signal DV2 as that in the liquid crystal panel 31 for adjusting transmittance, the image corresponding to the image signal DAT2 is displayed on the liquid crystal panel 32 for adjusting transparency/light-emission. An observer positioned close to the rear surface side of the display visually perceives the image through the reflection-type polarization plate 20 disposed close to the rear surface side of the liquid crystal panel 32 for adjusting transparency/light-emission. In this case, the display functions as the mirror display that displays the image in the mirror. Meanwhile, if the liquid crystal panel 32 for adjusting transparency/light-emission is driven based on a pixel information signal DV1 different from that in the liquid crystal panel 31 for adjusting transmittance, since the light-source light and the ambient light transmitted through the liquid crystal panel 32 for adjusting transparency/light-emission are irradiated to the liquid crystal panel 31 for adjusting transmittance, as the backlight light, the display functions as a transparent display. In this case, at least any one of the backlight light and the ambient light transmitted through the liquid crystal panel 32 for adjusting transparency/light-emission is irradiated to the liquid crystal panel 31 for adjusting transmittance. Accordingly, an observer positioned close to the front surface side of the display can visually perceive the images in which the gradations are displayed so as to be superimposed on the liquid crystal panel 32 for adjusting transparency/light-emission and the liquid crystal panel 31 for adjusting transmittance, can visually perceive the transparently seen background, or can visually perceive the image in which the gradations are displayed so as to be superimposed on the background. As stated above, different images are displayed on the front surface side and the rear surface side of the display, and an observer positioned close to the front surface side of the display and an observer positioned close to the rear surface side of the display see different images.

Figure 58:
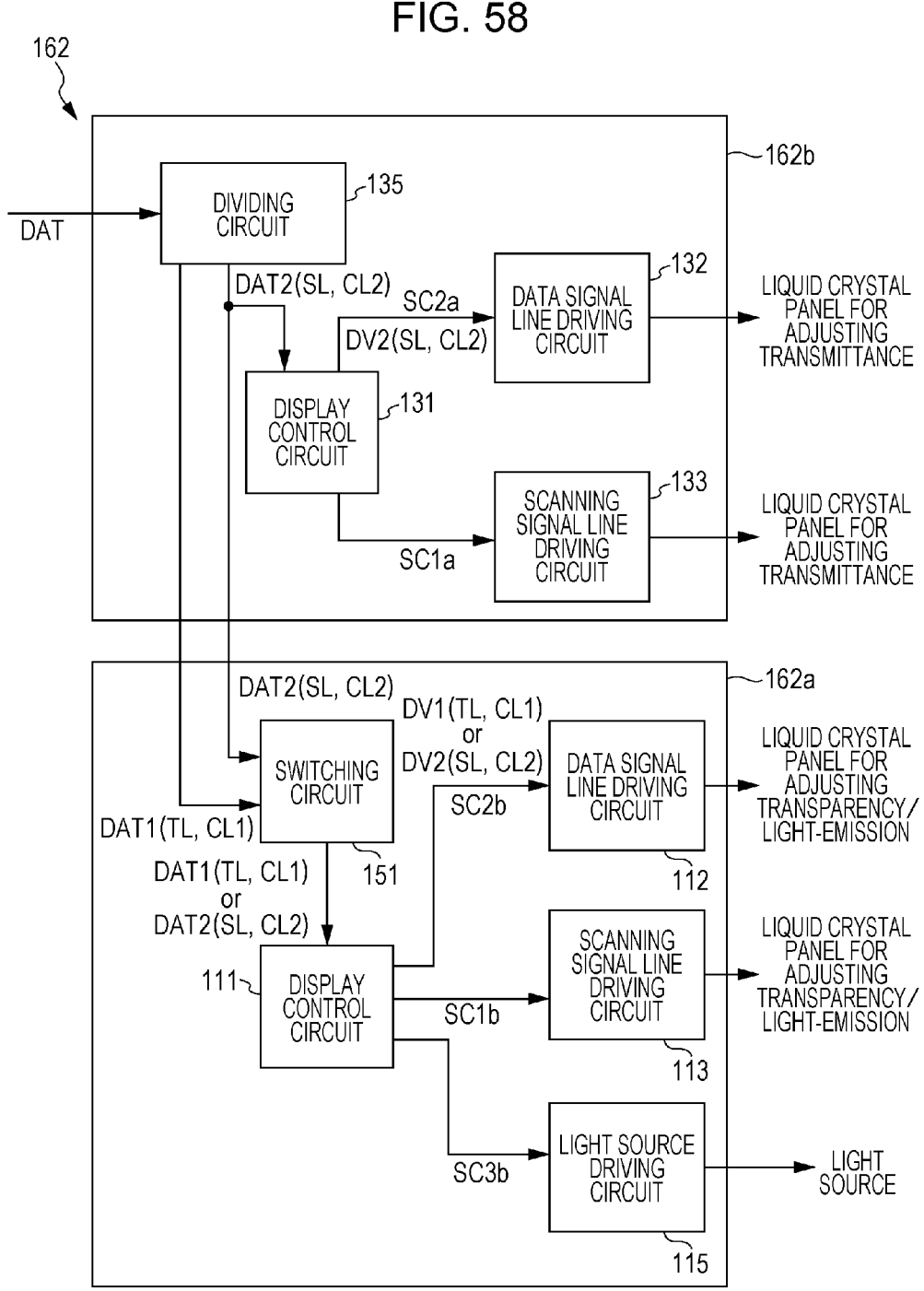
FIG. 58 is a block diagram showing a second modification example of the driving circuit included in the image display device shown in FIG. 49.

FIG. 58 is a diagram showing a second modification example of the driving circuit used in the image display device 700. Since a circuit configuration of a driving circuit 162 of the second modification example shown in FIG. 58 is the same as the circuit configuration of the driving circuit 160 shown in FIG. 54, the same circuits as the circuits shown in FIG. 54 will be assigned the same reference numerals, and thus, the description thereof will be omitted. In the driving circuit 162, the image signal DAT obtained by combining the image signal DAT1 including the transparent/light-emitting pixel information TL and the display pixel information CL1 with the image signal DAT2 including the transmittance pixel information SL and the display pixel information CL2 as one signal is input from the outside. If the image signal DAT is input to the dividing circuit 135, the dividing circuit 135 divides the image signal DAT into the image signal DAT1 and the image signal DAT2, applies the image signal DAT1 and the image signal DAT2 to the switching circuit 151, and applies the image signal DAT2 to the display control circuit 131. The processes in the switching circuit 151 and the display control circuit 111 are the same as those in the driving circuit 161 of the first modification example shown in FIG. 57, and thus, the description thereof will be omitted.

Figure 59:
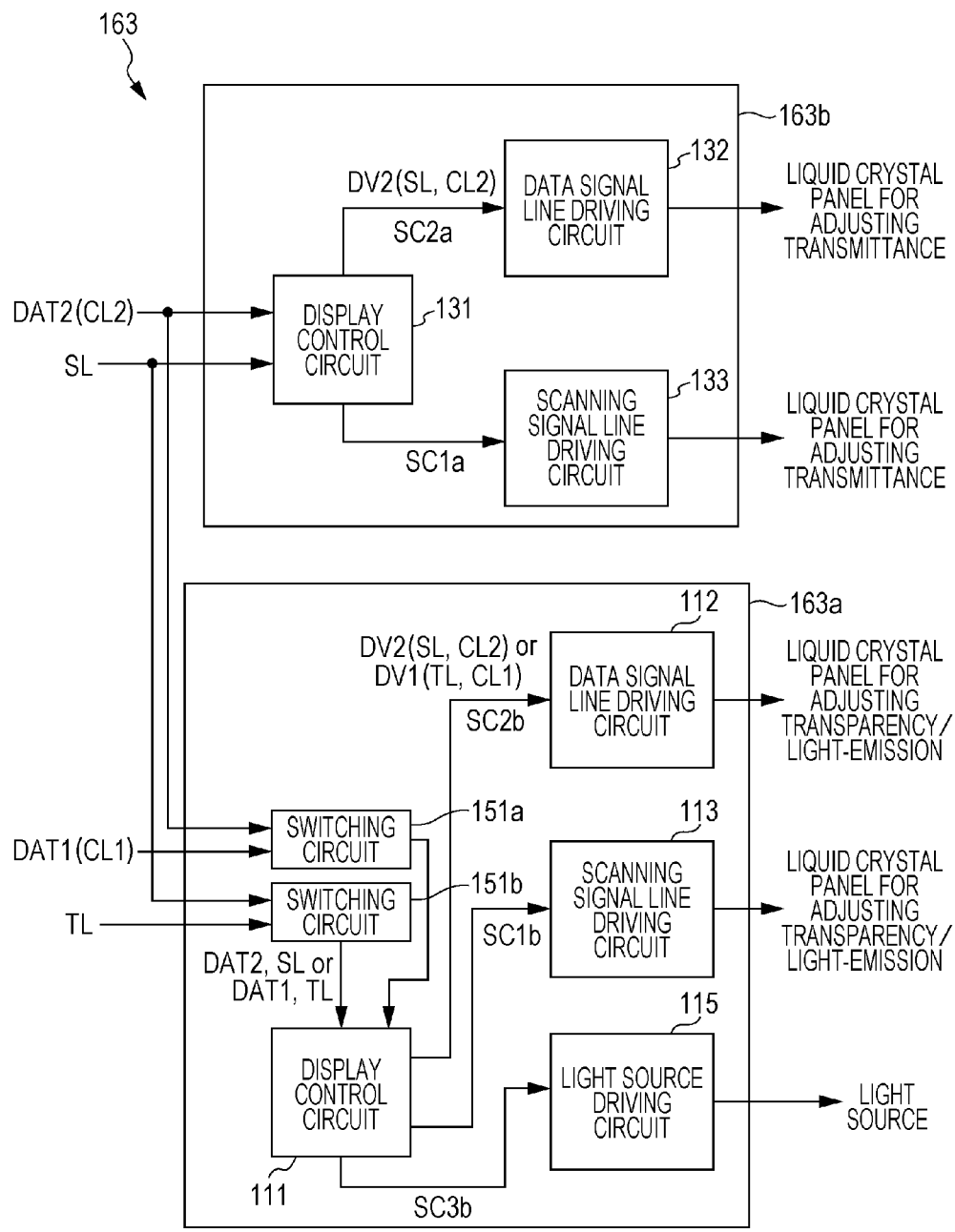
FIG. 59 is a block diagram showing a third modification example of the driving circuit included in the image display device shown in FIG. 49.

FIG. 59 is a diagram showing a third modification example of the driving circuit used in the image display device 700. Since a driving circuit 163 of the third modification example shown in FIG. 59 has the same circuit configuration of the driving circuit 161 shown in FIG. 57 except that the switching circuit is divided into two circuits, the same circuits as the circuits shown in FIG. 57 will be assigned to the same reference numerals, and thus, the description thereof will be omitted. A first driving circuit 163a includes a first switching circuit 151a, and a second switching circuit 151b. The first switching circuit 151a selects any one of the image signal DAT1 including the display pixel information CL1 and the image signal DAT2 including the display pixel information CL2. The second switching circuit 151b selects any one of the transmittance pixel information SL applied from the outside as a signal different from the image signal DAT2 and the transparent/light-emitting pixel information TL applied from the outside as a signal different from the image signal DAT1. In this case, the first switching circuit 151a and the second switching circuit 151b are switched by being interlocked with each other. That is, in a case where the first switching circuit 151a selects the image signal DAT1, the second switching circuit 151b also selects the transparent/light-emitting pixel information TL applied together with the image signal DAT1, and in a case where the first switching circuit 151a selects the image signal DAT2, the second switching circuit 151b also selects the transmittance pixel information SL applied together with the image signal DAT2. The processes in the display control circuit 111 are the same as those in the driving circuit 161 of the first modification example shown in FIG. 57, and thus, the description thereof will be omitted.

Figure 60:
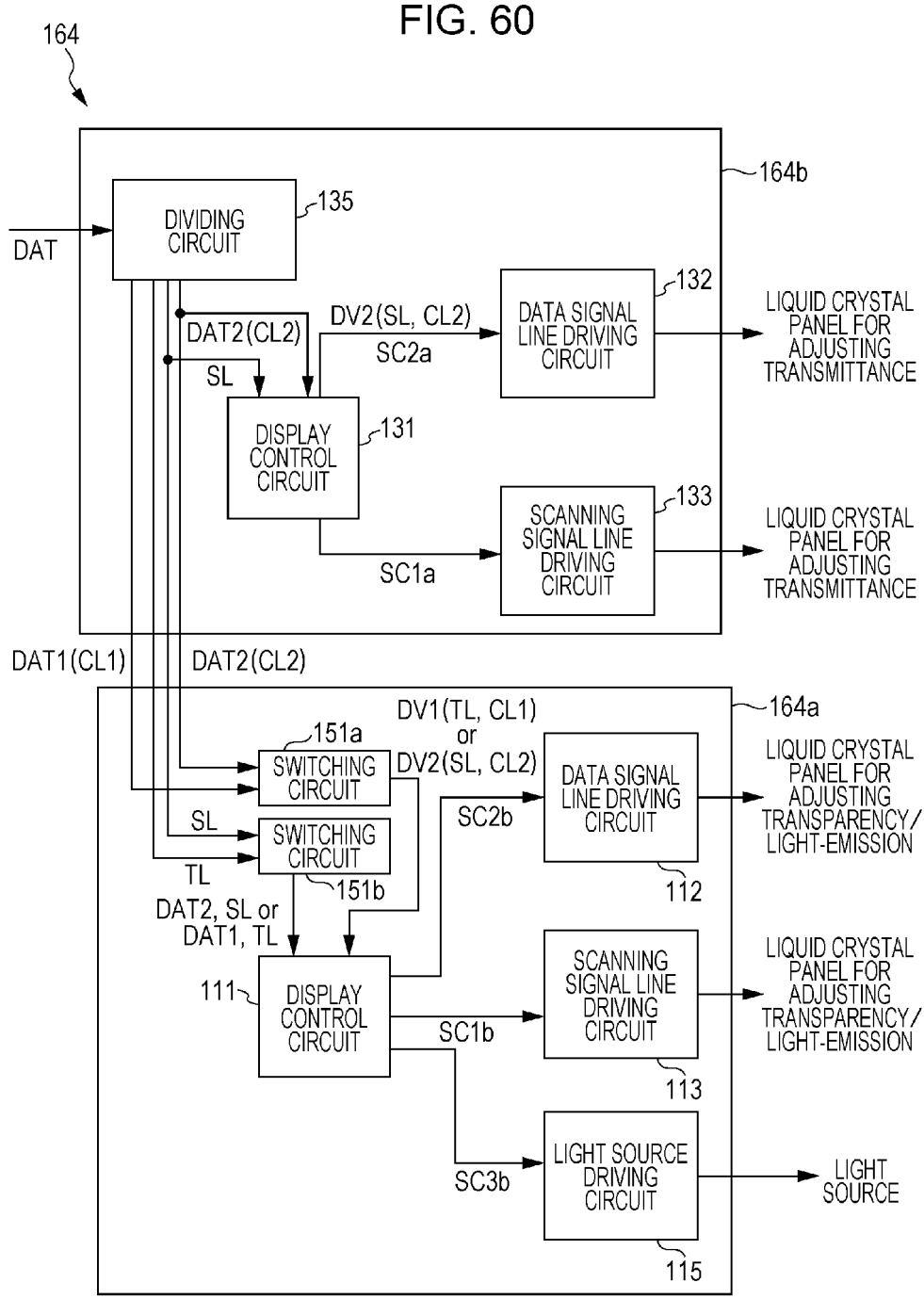
FIG. 60 is a block diagram showing a fourth modification example of the driving circuit included in the image display device shown in FIG. 49.

FIG. 60 is a diagram showing a fourth modification example of the driving circuit used in the image display device 700. Since a circuit configuration of a driving circuit 164 of the fourth modification example shown in FIG. 60 is the same as the circuit configuration of the driving circuit 162 shown in FIG. 58 except that the switching circuit is divided into the first switching circuit 151a and the second switching circuit 151b, the same circuits as the circuits shown in FIG. 58 will be assigned the same reference numerals, and thus, the description thereof will be omitted. In the driving circuit 164, the image signal DAT obtained by combining the image signal DAT1 including the transparent/light-emitting pixel information TL and the display pixel information CL1 with the image signal DAT2 including the transmittance pixel information SL and the display pixel information CL2 as one signal are input from the outside. If the image signal DAT is input to the dividing circuit 135, the dividing circuit 135 divides the image signal DAT into the image signal DAT1, the image signal DAT2, the transparent/light-emitting pixel information TL, and the transmittance pixel information SL, applies the image signal DAT2 including the display pixel information CL2 to the first switching circuit 151a and the display control circuit 131, and applies the transmittance pixel information SL to the second switching circuit 151b and the display control circuit 131. The image signal DAT1 including the display pixel information CL1 is applied to the first switching circuit 151a, and the transparent/light-emitting pixel information TL is applied to the second switching circuit 151b. The first switching circuit 151a selects any one of the image signal DAT1 and the image signal DAT2, and applies the selected signal to the display control circuit 111. The second switching circuit 151b is switched by being interlocked with the first switching circuit 151a, selects the transparent/light-emitting pixel information TL in a case where the image signal DAT1 is selected, selects the transmittance pixel information SL in a case where the image signal DAT2 is selected, and applies the selected signal to the display control circuit 111. The processes in the display control circuit 111 are the same as those in the driving circuit 163 of the third modification example shown in FIG. 59, and thus, the description thereof will be omitted.

7. Sixth Embodiment

<7.1 Configuration of Image Display Device>

Figure 61:
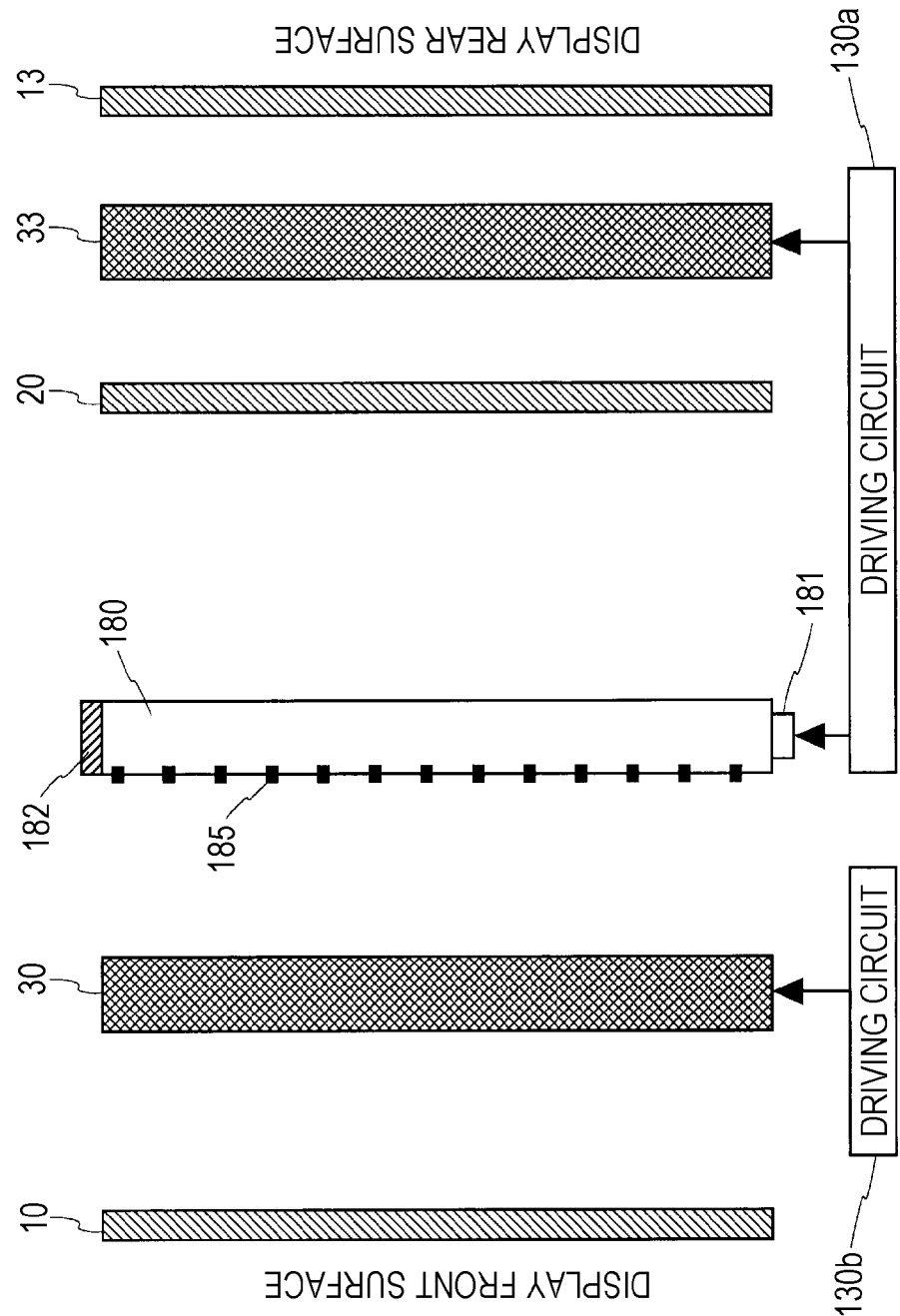
FIG. 61 is a diagram showing the configuration of an image display device according to a sixth embodiment of the present invention.

FIG. 61 is a diagram showing the configuration of an image display device 800 according to a sixth embodiment of the present invention. As shown in FIG. 61, in the image display device 800, an absorption-type polarization plate 10 for controlling polarization rotation, a liquid crystal panel 30 for controlling polarization rotation, a light guide plate 180 to which a light source 181 is attached to an end, a reflection-type polarization plate 20, a liquid crystal panel 33 for shutter, and an absorption-type polarization plate 13 for shutter are sequentially arranged so as to be parallel to one another. The second driving circuit 130b included in the driving circuit 130 shown in FIG. 35 is connected to the liquid crystal panel 30 for controlling polarization rotation, and the first driving circuit 130a is connected to the light source 181 of the light guide plate 180 and the liquid crystal panel 33 for shutter. The second driving circuit 140b included in the driving circuit 140 shown in FIG. 36 may be connected to the liquid crystal panel 30 for controlling polarization rotation, and the first driving circuit 140a may be connected to the light source 181 of the light guide plate 180 and the liquid crystal panel 33 for shutter.

In the image display device 800, the configuration of the constituent members from the absorption-type polarization plate 10 for controlling polarization rotation to the reflection-type polarization plate 20 are the same as the configuration of the image display device 310 shown in FIG. 15. The image display device 800 of the present embodiment has the configuration in which the liquid crystal panel 33 for shutter and the absorption-type polarization plate 13 for shutter are further added close to the rear surface side of the image display device 310. Thus, the respective constituent members from the absorption-type polarization plate 10 for controlling polarization rotation to the reflection-type polarization plate 20 will be assigned the same reference numerals as the reference numerals of the respective constituent members of the image display device 310 shown in FIG. 15, and thus, the description thereof will be omitted.

Figure 62:
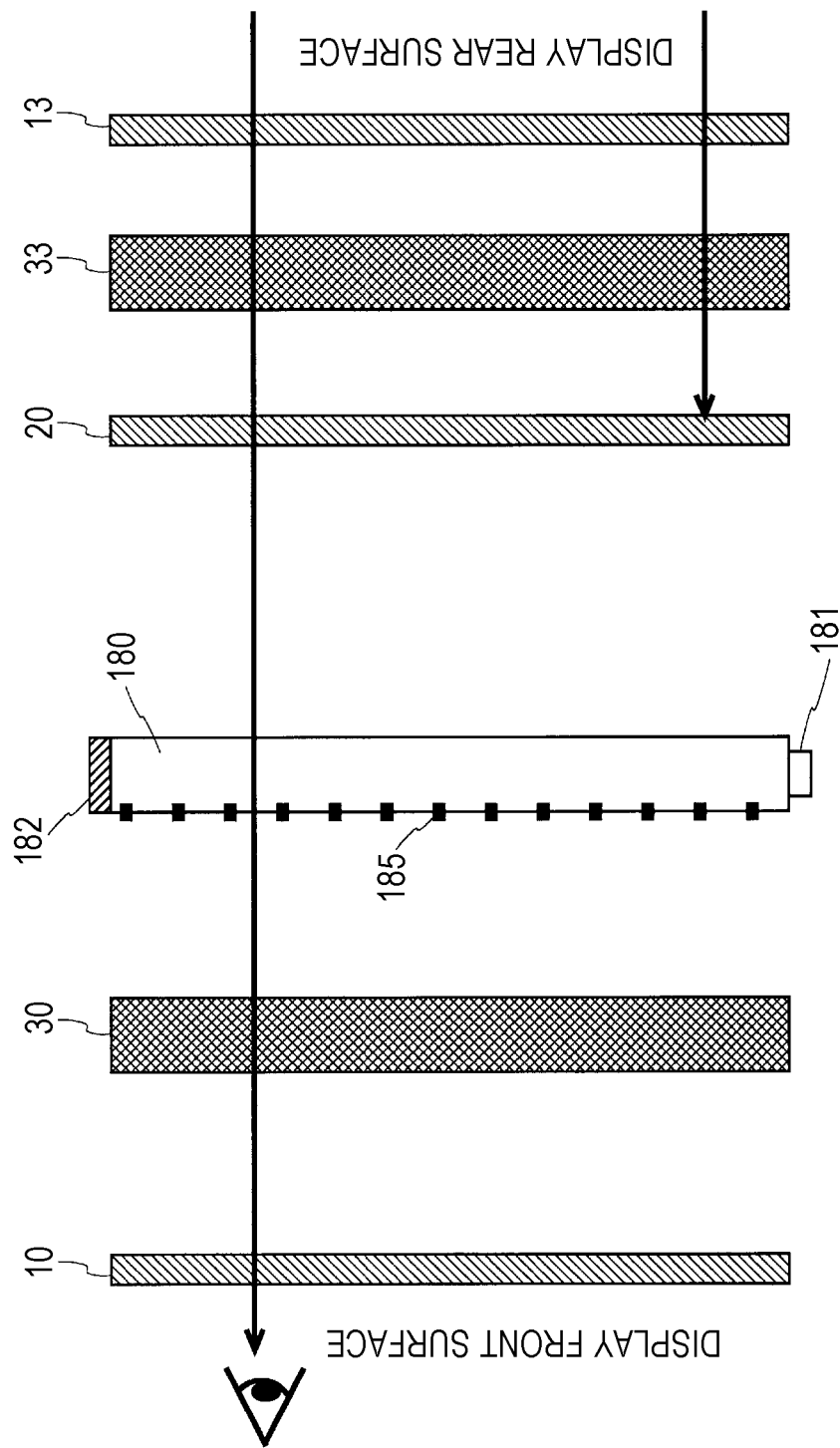
FIG. 62 is a diagram showing the passage route of the ambient light incident from the rear surface side of the image display device shown in FIG. 61.

The liquid crystal panel 33 for shutter and the absorption-type polarization plate 13 for shutter will be described. FIG. 62 is a diagram showing the passage route of the ambient light incident from the rear surface side of the display. As shown in FIG. 62, if the ambient light is incident from the rear surface side of the display, the polarization components of the ambient light having the same polarization direction as the transmission axis direction of the absorption-type polarization plate 13 for shutter transmit through the absorption-type polarization plate 13 for shutter, and are incident on the liquid crystal panel 33 for shutter. Since the transmission axis direction of the reflection-type polarization plate 20 is the same as the transmission axis direction of the absorption-type polarization plate 13 for shutter, if the polarization direction of the ambient light is rotated by the liquid crystal panel 33 for shutter by 90°, the ambient light transmitted through the liquid crystal panel 33 for shutter is reflected from the reflection-type polarization plate 20, and is hard to further travel toward the front surface side from the reflection-type polarization plate 20. Meanwhile, in a case where the polarization direction of the ambient light is not rotated by the liquid crystal panel 33 for shutter, since the polarization direction of the ambient light transmitted through the liquid crystal panel 33 for shutter is the same as the transmission axis direction of the reflection-type polarization plate 20, the ambient light transmits through the reflection-type polarization plate 20, and further travels toward the liquid crystal panel 30 for controlling polarization rotation.

As mentioned above, the liquid crystal panel 33 for shutter and the absorption-type polarization plate 13 for shutter functions as a shutter that transmits the ambient light incident from the rear surface side of the display to the front surface side or blocks the ambient light on the way. Thus, in a case where the display is viewed from the front surface side, the image display device 700 can be in the turn-on state in which the backlight light transmits and the image is displayed, the transparent state in which the ambient light transmits by opening the shutter and the background is transparently seen, or the turn-off state in which the shutter is closed by turning off the light source 181 and neither the backlight light nor the ambient light transmit to the front surface side. The image display device 800 can transmit a part of the ambient light by adjusting the polarization direction in a rotation angle of 0° to 90° by the liquid crystal panel 33 for shutter, and can block other parts of the ambient light. In this case, the image display device 800 can display the intermediate state between the turn-on state and the turn-off state, or the intermediate state between the transparent state and the turn-off state. The liquid crystal panel 33 for shutter and the absorption-type polarization plate 13 for shutter may be collectively referred to as "shutter means", and the liquid crystal panel 33 for shutter may be referred to as a "pixel array for shutter".

The light source 170 may be disposed in place of the light guide plate 180 to which the light source 181 is attached. In the case where the light source 170 is used, a lens 171, a diffusion plate 172 and a mirror 173 may be arranged in front of the light source 170.

<7.2 Application Example>

One liquid crystal panel is in the transparent state, and thus, it is possible to see the image displayed on the other liquid crystal panel. In this case, in a case where the liquid crystal panel 33 for shutter is set to be transparent and the image displayed on the liquid crystal panel 30 for controlling polarization rotation is seen from the rear surface side, it is hard to see the screen due to the following reasons. The reason why it is hard to see the screen is because the backlight light emitted from the light guide plate 180 transmits through the entire surface of the liquid crystal panel 33 for shutter the since the reflection-type polarization plate 20 is disposed between the liquid crystal panel 30 for controlling polarization rotation and the liquid crystal panel 33 for shutter.

By closing the shutter constructed by the liquid crystal panel 33 for shutter and the absorption-type polarization plate 13 for shutter, it is difficult to visually perceive the image displayed on the liquid crystal panel 30 for controlling polarization rotation from the rear surface side of the display. By opening the shutter so as to match the shape of the image displayed on the liquid crystal panel 30 for controlling polarization rotation, an observer positioned close to the rear surface side can visually perceive the image displayed on the liquid crystal panel 30 for controlling polarization rotation. In a case where strong external light such as afternoon sun is irradiated to a display disposed on a window of a building such that the front surface side of the display faces the inside of a room, the external light is blocked by closing the shutter. Accordingly, an observer positioned in the room can visually perceive the image displayed on the display without being affected by the external light. The absorption-type polarization plate 13 for shutter may be referred to as a "third absorption-type polarization plate".

<7.3 Effect>

Similarly to the image display device 600 according to the fourth embodiment, according to the present embodiment, if the image display device 800 is viewed from the front surface side, any state of the turn-on state, the turn-off state and the transparent state, or a superimposed state thereof is displayed for each pixel. Meanwhile, if the image display device is viewed from the rear surface side, any state of the turn-on state, the turn-off state and the mirror state, or a superimposed state thereof is displayed for each pixel.

Since the liquid crystal panel 30 for controlling polarization rotation that displays the image is a liquid crystal panel of a normally black type, as the applied voltage becomes higher, the degree of transparency becomes higher, and thus, the liquid crystal panel for controlling polarization rotation strongly emits the light. Thus, it is possible to use a liquid crystal panel used in a typical liquid crystal display device, as the liquid crystal panel 30 for controlling polarization rotation. Meanwhile, the liquid crystal panel 33 for shutter is a liquid crystal panel of a normally white type in which as the applied voltage becomes higher, the degree of transparency becomes lower, and thus, the display is displayed in black. However, the liquid crystal panel for shutter merely transmits or blocks the ambient light, it is not necessary to perform advanced control. Thus, the image display device 800 using the liquid crystal panels 30 and 33 has a structure to which the technology of the liquid crystal panel of the related art is easily applied, and can be easily manufactured and adjusted. Since it is not necessary to attach the image display device 800 to a case filled with light, the image display device is widely used without limitation of use.

<7.4 First Modification Example>

Figure 63:
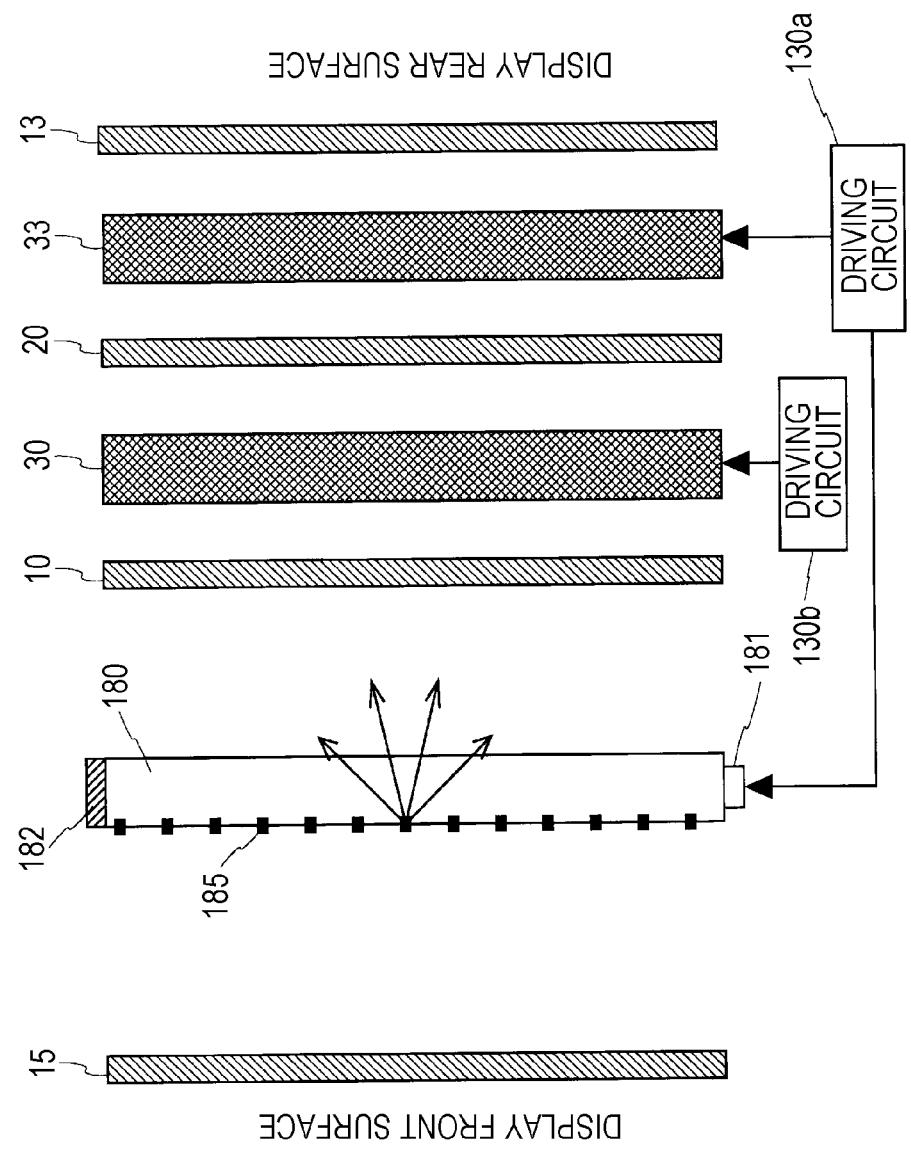
FIG. 63 is a diagram showing the configuration of an image display device according to a first modification example of the sixth embodiment shown in FIG. 61.

FIG. 63 is a diagram showing the configuration of an image display device 810 according to a first modification example of the present embodiment. As shown in FIG. 63, in the image display device 810, an absorption-type polarization plate 15 for suppressing leakage, a light guide plate 180 to which a light source 181 is attached to an end, an absorption-type polarization plate 10 for controlling polarization rotation, a liquid crystal panel 30 for controlling polarization rotation, a reflection-type polarization plate 20, a liquid crystal panel 33 for shutter, and an absorption-type polarization plate 13 for shutter are sequentially arranged from the front surface side toward the rear surface side of the display so as to be parallel to one another.

The second driving circuit 130*b* included in the driving circuit 130 shown in FIG. 35 is connected to the liquid crystal panel 30 for controlling polarization rotation, and the first driving circuit 130*a* is connected to the light source 181 of the light guide plate 180 and the liquid crystal panel 33 for shutter. The second driving circuit 140*b* included in the driving circuit 140 shown in FIG. 36 may be connected to the liquid crystal panel 30 for controlling polarization rotation, and the first driving circuit 140*a* may be connected to the light source 181 of the light guide plate 180 and the liquid crystal panel 33 for shutter.

In the image display device 810, the configuration of the constituent members from the absorption-type polarization plate 15 for suppressing leakage to the reflection-type polarization plate 20 are the same as the configuration of the image display device 500 shown in FIG. 27. The image display device 810 of the present embodiment has the configuration in which the liquid crystal panel 33 for shutter and the absorption-type polarization plate 13 for shutter are further added close to the rear surface side of the image display device 500. Accordingly, the respective constituent members from the absorption-type polarization plate 15 for suppressing leakage to the reflection-type polarization plate 20 will be assigned the same reference numerals as the reference numerals of the respective constituent members of the image display device 500, and thus, the description thereof will be omitted. The shutter constructed by the added liquid crystal panel 33 for shutter and absorption-type polarization plate 13 for shutter has the same configuration and function as those of the shutter of the image display device 800 shown in FIG. 61, and thus, the description thereof will be omitted.

According to the present modification example, the image display device 810 functions as a display that displays any state of the turn-on state, the transparent state and the turn-off state, or a superimposed state thereof for each pixel. Since a liquid crystal panel used in a liquid crystal display device can be used as the liquid crystal panel 31 for adjusting transmittance, the image display device 800 has high spatial resolution.

As described in the fourth embodiment, the absorption-type polarization plate 15 for suppressing leakage is disposed in order to suppress reduction in display quality by the light leaked to the front surface side from the light guide plate 180. However, in a case where the reduction in display quality is allowable, the absorption-type polarization plate 15 for suppressing leakage may not be provided. The light source 170 may be disposed instead of the light guide plate 180 to which the light source 181 is attached. In the case where the light source 170 is used, a lens 171, a diffusion plate 172 and a mirror 173 may be arranged in front of the light source 170.

<7.5 Second Modification Example>

FIG. 64 is a diagram showing the configuration an image display device 820 according to a second modification example of the present embodiment. As shown in FIG. 64, in the image display device 820, an absorption-type polarization plate 10 for controlling polarization rotation, a liquid crystal panel 30 for controlling polarization rotation, a diffraction grating sheet 40, an absorption-type polarization plate 14 for selecting ambient light, a liquid crystal panel 33 for shutter, and an absorption-type polarization plate 13 for shutter are sequentially arranged from the front surface side toward the rear surface side of the display so as to be parallel to one another. A light source 170 that emits single polarized light is disposed near a space between the liquid crystal panel 30 for controlling polarization rotation and the diffraction grating sheet 40, and the light source 170 applies the single polarized light toward the diffraction grating sheet 40.

The second driving circuit 130*b* included in the driving circuit 130 shown in FIG. 35 is connected to the liquid crystal panel 30 for controlling polarization rotation, and the first driving circuit 130*a* is connected to the light source 170 and the liquid crystal panel 33 for shutter. The second driving circuit 140*b* included in the driving circuit 140 shown in FIG. 36 may be connected to the liquid crystal panel 30 for controlling polarization rotation, and the first driving circuit 140*a* may be connected to the light source 170 and the liquid crystal panel 33 for shutter.

In the image display device 820, the constituent members from the absorption-type polarization plate 10 for controlling polarization rotation to the absorption-type polarization plate 14 for selecting ambient light are the same as the configuration of the image display device 400 shown in FIG. 22. The image display device 820 of the present modification example has the configuration in which the liquid crystal panel 33 for shutter and the absorption-type polarization plate 13 for shutter are further added close to the rear surface side of the image display device 400. The respective constituent members from the absorption-type polarization plate 10 for controlling polarization rotation to the absorption-type polarization plate 14 for selecting ambient light will be assigned the same reference numerals as the reference numerals of the respective constituent members of the image display device 400 shown in FIG. 22, and thus, the description thereof will be omitted. The shutter constructed by the added liquid crystal panel 33 for shutter and absorption-type polarization plate 13 for shutter has the same configuration and function as those of the shutter of the image display device 800 shown in FIG. 61, and thus, the description thereof will be omitted.

According to the present modification example, the image display device 820 functions as a display that displays any state of the turn-on state, the transparent state and the turn-off state, or a superimposed state thereof for each pixel.

<8. Others>

In the above description, it has been described that both light emitted from the light source 170 or the light guide plate 180 and the ambient light are linearly polarized light. However, the present invention is similarly applicable to circularly polarized light or elliptically polarized light.

The driving type of the liquid crystal panel may be classified into TN (Twisted Nematic) driving, VA (Vertical Alignment) driving, and IPS (In-Place-Switching) driving, but the present invention is applicable to a liquid crystal panel of any driving type.

INDUSTRIAL APPLICABILITY

The present invention is applied to an image display device capable of performing transparent display in which a background is transparently seen from the front surface side of a display, and is particularly appropriate for a display window or a magic mirror.

REFERENCE SIGNS LIST

10 Absorption-type polarization plate for controlling polarization rotation
11 Absorption-type polarization plate for adjusting transmittance
12 Absorption-type polarization plate for adjusting transparency/light-emission
13 Absorption-type polarization plate for shutter
14 Absorption-type polarization plate for selecting ambient light
15 Absorption-type polarization plate for suppressing leakage
20 Reflection-type polarization plate
30 Liquid crystal panel for controlling polarization rotation
31 Liquid crystal panel for adjusting transmittance
32 Liquid crystal panel for adjusting transparency/light-emission
33 Liquid crystal panel for shutter
40 Diffraction grating sheet
70 Second absorption-type polarization plate
80 Liquid crystal panel for adjusting transmittance
90 Liquid crystal panel for adjusting transparency/light-emission
110, 120, 130, 140, 150, 160 Driving circuit
130*a*, 140*a*, 150*a*, 160*a* First driving circuit
130*b*, 140*b*, 150*b*, 160*b* Second driving circuit
134 Holding circuit
135 Dividing circuit
151 Switching circuit
170 Light source
180 Light guide plate
181 Light source
185 Reflection member
186 Transparent dot
187 Non-transmission member
188 Groove
200 to 820 Image display device

The invention claimed is:

1. An image display device capable of performing transparent display in which a background is transparently seen from a front surface side of a display, the device comprising:
a light-source light/ambient light adjuster which includes a pixel array in which a plurality of pixels is arranged, controls a polarization direction of light for each pixel in response to an image signal applied from outside, and transmits light having a desired polarization component to the front surface side of the display;
a polarization component selector which is disposed closer to a rear surface side than the light-source light/ambient light adjuster, selects one polarization component of ambient light incident from a rear surface side of the display to transmit the selected polarization component of the ambient light, selects a component of polarization components of light-source light incident from the front surface side of the display which is perpendicular to the polarization component of the ambient light to reflect the selected component of the light-source light, and guides the polarization components of the ambient light and the light-source light to the light-source light/ambient light adjuster; and a light-source light irradiator which is disposed closer to the front surface side than the polarization component selector, and irradiates the light-source light toward the rear surface side of the display, wherein the image signal includes transparent/light-emitting pixel information for determining a ratio of transmission at which the ambient light which is incident from the rear surface of the display and is selected by the polarization component selector and the light-source light which is irradiated from the light-source light irradiator is selected by the polarization component selector transmit through the light-source light/ambient light adjuster, and the light-source light/ambient light adjuster adjusts, for each pixel, a ratio at which the light-source light and the ambient light transmit by respectively controlling the polarization component of the ambient light selected by the polarization component selector and the polarization component of the light-source light selected by the polarization component selector, based on the transparent/light-emitting pixel information.

2. The image display device according to claim 1,
wherein the polarization component selector includes a reflection-type polarization plate that transmits polarization components of the ambient light and the light-source light which have an identical polarization direction as a transmission axis direction, and reflects polarization components which have an identical polarization direction as a reflection axis direction, and the light-source light irradiator is disposed in a space interposed between the light-source light/ambient light adjuster and the reflection-type polarization plate or near the space, and irradiates the light-source light to the reflection-type polarization plate.

3. The image display device according to claim 1, further comprising:
a first absorption-type polarization plate that is disposed closer to the front surface side of the display than the light-source light irradiator; and
a second absorption-type polarization plate that is disposed close to a front surface side of the light-source light/ambient light adjuster, and causes the polarization direction of the light-source light or the ambient light transmitted through the light-source light/ambient light adjuster to be in line with a polarization direction of the first absorption-type polarization plate,
wherein the polarization component selector includes a reflection-type polarization plate that transmits polarization components of the ambient light and the light-source light which have an identical polarization direction as a transmission axis direction, and reflects polarization components which have an identical polarization direction as a reflection axis direction,
the light-source light irradiator is disposed in a space interposed between the first absorption-type polarization plate and the second absorption-type polarization plate or near the space, and irradiates the light-source light to the second absorption-type polarization plate, and the first absorption-type polarization plate transmits at least any one of the light-source light and the ambient light transmitted through the second absorption-type polarization plate to the front surface side of the display, and absorbs light-source light which has leaked to the front surface side, of the light-source light irradiated from the light-source light irradiator.

4. The image display device according to claim 1,
wherein the light-source light irradiator includes a light source that emits the light-source light including a plurality of polarization components having different polarization directions,
the polarization component selector includes a polarization component selecting sheet that reflects the light-source light to the front surface side of the display at an angle different from an incident angle, a first polarization component selecting polarization plate that is disposed close to a rear surface side of the polarization component selecting sheet, and transmits polarization components having a specific polarization direction, of the ambient light incident from the rear surface side of the display, and a second polarization component selecting polarization plate that is disposed on a surface of the light source, and transmits a polarization component having a polarization direction, which is perpendicular to the specific polarization direction, of the light-source light emitted from the light source, and
the light source is disposed near a space interposed between the light-source light/ambient light adjuster and the polarization component selecting sheet, and irradiates the polarization components of the light-source light, which have transmitted through the second polarization component selecting polarization plate, to the polarization component selecting sheet.

5. The image display device according to claim 2,
wherein, on the display, a luminance of the light-source light transmitted through a first region set such that only the light-source light transmits, a luminance of the light-source light leaking to the front surface side from a second region set such that the light-source light does not transmit, and a luminance of the ambient light transmitting through a third region set such that only the ambient light transmits satisfy the following relationship:

Luminance of Light-source Light Transmitted through First Region>Luminance of Ambient Light Transmitted through Third Region>Luminance of Light-source Light Leaking from Second Region.

6. The image display device according to claim 1, further comprising:
a transmittance adjuster which is disposed close to a front surface sided of the light-source light/ambient light adjuster, and adjusts transmittances of the light-source light and the ambient light transmitted through the light-source light/ambient light adjuster; and
a first absorption-type polarization plate that is disposed close to a front surface side of the transmittance adjuster,
wherein the polarization component selector includes a reflection-type polarization plate that transmits polarization components of the ambient light and the light-source light which have an identical polarization direction as a transmission axis direction, and reflects polarization components having an identical polarization direction as a reflection axis direction, the light-source light irradiator is disposed in a space interposed between the light-source light/ambient light adjuster and the reflection-type polarization plate or near the space, and irradiates polarization components of the light-source light which have a polarization direction perpendicular to a specific polarization direction to the reflection-type polarization plate, and the transmittance adjuster transmits polarization components of at least any one of the light-source light and the ambient light to the front surface side of the display by adjusting, for each pixel, transmittances of pixels through which polarization components of the light-source light and the ambient light extracted by the light-source light/ambient light adjuster transmit, based on transmittance pixel information which sets the transmittance for each pixel.

7. The image display device according to claim 6, further comprising:
a first driving circuit that drives a pixel array for adjusting transparency/light-emission included in the light-source light/ambient light adjuster;
a second driving circuit that drives a pixel array for adjusting transmittance included in the transmittance adjuster;
a first display control circuit that controls the first driving circuit; and
a second display control circuit that controls the second driving circuit,
wherein the image signal includes the transparent/light-emitting pixel information for setting, for each pixel, a ratio of transmission at which the ambient light and the light-source light transmit through the pixel array for adjusting transparency/light-emission, and the transmittance pixel information for setting, for each pixel, a transmittance of the pixel array for adjusting transmittance,
the first driving circuit adjusts, for each pixel, a ratio between the light-source light and the ambient light which transmit through the pixel array for adjusting transparency/light-emission, based on the transparent/light-emitting pixel information, and
the second driving circuit adjusts, for each pixel, transmittances of the light-source light and the ambient light which transmit through the pixel array for adjusting transmittance, based on the transmittance pixel information.

8. The image display device according to claim 7,
wherein the image signal further includes at least any one of first display pixel information for setting gradation information for displaying an image which is gradation-displayed in each pixel of the pixel array for adjusting transparency/light-emission, and second display pixel information for setting gradation information for displaying an image which is gradation-displayed in each pixel of the pixel array for adjusting transmittance.

9. The image display device according to claim 7,
wherein the first driving circuit causes a plurality of pixels of the pixel array for adjusting transparency/light-emission corresponding to the plurality of pixels connected to an identical scanning signal line of the pixel array for adjusting transmittance to be in a light-emitting state, based on the transparent/light-emitting pixel information.

10. The image display device according to claim 8,
wherein the transparent/light-emitting pixel information and the first display pixel information for setting the gradation information for displaying an image which is gradation-displayed in each pixel of the pixel array for adjusting transparency/light-emission, and the transmittance pixel information and the second display pixel information for setting the gradation information for displaying an image which is gradation-displayed in each pixel of the pixel array for adjusting transmittance are respectively input to the first and second display control circuits from outside, as a first image signal and a second image signal.

11. The image display device according to claim 7,
wherein the image signal includes the transparent/light-emitting pixel information, the transmittance pixel information, first display pixel information, and second display pixel information, and
after the image signal is divided into a first image signal which includes the transparent/light-emitting pixel information and the first display pixel information and a second image signal which includes the transmittance pixel information and the second display pixel information, the first image signal is input to the first display control circuit, and the second image signal is input to the second display control circuit.

12. The image display device according to claim 1, further comprising:
a transmittance adjuster which is disposed close to the front surface side of the light-source light/ambient light adjuster, and adjusts transmittances of the light-source light and the ambient light transmitted through the light-source light/ambient light adjuster;
a first absorption-type polarization plate that is disposed close to a front surface side of the transmittance adjuster; and
a second absorption-type polarization plate that is disposed close to a front surface side of the light-source light/ambient light adjuster, and transmits at least any one of the light-source light and the ambient light transmitted through the light-source light/ambient light adjuster,
wherein the polarization component selector includes a reflection-type polarization plate that transmits polarization components of the ambient light and the light-source light which have an identical polarization direction as a transmission axis direction, and reflects polarization components having an identical polarization direction as a reflection axis direction,
the light-source light irradiator is disposed in a space interposed between the transmittance adjuster and the second absorption-type polarization plate or near the space, and irradiates the light-source light toward the second absorption-type polarization plate,
the light-source light/ambient light adjuster controls polarization directions of the light-source light and the ambient light such that at least any one of polarization components of the light-source light which is irradiated from the light-source light irradiator and is reflected by the reflection-type polarization plate, and polarization components of the ambient light which are incident from the rear surface side of the display and are perpendicular to the polarization components of the light-source light are extracted, or controls the polarization direction of the light-source light emitted from the light-source light irradiator such that the light-source light is extracted to the rear surface side of the display, and the transmittance adjuster transmits polarization components of at least any one of the light-source light and the ambient light to the front surface side of the display by adjusting, for each pixel, transmittances of pixels through which the polarization components of the light-source light and the ambient light extracted by the light-source light/ambient light adjustor transmit, based on transmittance pixel information.

13. The image display device according to claim 12, further comprising:
a first driving circuit that drives a pixel array for adjusting transparency/light-emission included in the light-source light/ambient light adjuster;
a second driving circuit that drives a pixel array for adjusting transmittance included in the transmittance adjuster;
a first display control circuit that controls the first driving circuit;
a second display control circuit that controls the second driving circuit; and
a switching circuit that is connected to the first display control circuit, selects any one of a first image signal and a second image signal included in the image signal if the first and second image signals are input, and outputs the selected signal to the first display control circuit,
wherein the first image signal includes the transparent/light-emitting pixel information for setting, for each pixel, a ratio of transmission at which the ambient light and the light-source light transmit through the pixel array for adjusting transparency/light-emission, and first display pixel information for setting gradation information for displaying an image with gradations, and the second image signal includes the transmittance pixel information for setting, for each pixel, a ratio of transmission at which the ambient light and the light-source light transmit through the pixel array for adjusting transmittance, and second display pixel information for setting gradation information for displaying an image with gradations,
if the second image signal is applied to the second display control circuit and the first image signal selected by the switching circuit is applied to the first display control circuit, the first driving circuit drives the pixel array for adjusting transparency/light-emission such that a transmission ratio between the ambient light and the light-source light is adjusted for each pixel and the ambient light and the light-source light transmitted through the pixel array for adjusting transparency/light-emission are respectively irradiated to corresponding pixels of the pixel array for adjusting transmittance, based on the first image signal, and the second driving circuit drives the pixel array for adjusting transmittance such that the ambient light and the light-source light irradiated from the pixel array for adjusting transparency/light-emission transmit at transmittances set for each pixel, based on the second image signal, and
if the second image signal is applied to the second display control circuit and the second image signal selected by the switching circuit is applied to the first display control circuit, the first driving circuit drives the pixel array for adjusting transparency/light-emission such that an image corresponding to the second image signal is displayed, and the second driving circuit drives the pixel array for adjusting transmittance such that an image corresponding to the second image signal is displayed.

14. The image display device according to claim 13, wherein the first image signal is input to the switching circuit from outside, and the second image signal is input to the switching circuit and the second display control circuit from outside.

15. The image display device according to claim 13, wherein, if the image signal which includes the first image signal and the second image signal is input from outside, after the image signal is divided into the first image signal and the second image signal, the first and second image signals are applied to the switching circuit, and the second image signal is applied also to the second display control circuit.

16. The image display device according to claim 6, wherein, on the display, a luminance of the light-source light transmitted through a first region set such that only light-source light transmits, a luminance of the light-source light leaking to the front surface side from a second region set such that the light-source light does not transmit, a luminance of the ambient light transmitting through a third region set such that only the ambient light transmits, and a luminance of the light-source light leaking to the front surface side from a fourth region set such that neither the light-source light nor the ambient light transmits satisfy the following relationship:

Luminance of Light-source Light Transmitted through First Region>Luminance of Ambient Light Transmitted through Third Region>Luminance of Light-source Light Leaked from Second Region>Luminance of Light-source Light Leaked from Fourth region.

17. The image display device according to claim 2, wherein the light-source light irradiator is a light guide plate provided with a plurality of reflection members on a front surface side thereof, and the reflection member is made of a transparent material having an identical refractive index as that of the light guide plate, and includes a transparent dot formed on a surface of the light guide plate, and a non-transmission member formed so as to cover the transparent dot.

18. The image display device according to claim 2, wherein the light-source light irradiator is a light guide plate provided with a plurality of reflection members on a front surface side thereof, and the reflection member includes a groove formed on a surface of the light guide plate, and a non-transmission member formed so as to cover the groove.

19. The image display device according to claim 1, further comprising:
a shutter which is disposed closer to the rear surface side of the display than the polarization component selector, and blocks at least a part of the ambient light incident from the rear surface side.

20. The image display device according to claim 19, wherein the shutter includes a third absorption-type polarization plate that transmits polarization components of the ambient light incident from the rear surface side, which have an identical direction as a transmission axis of the polarization component selector, and a pixel array for shutter capable of changing a blocking ratio of polarization components of the ambient light transmitted through the third absorption-type polarization plate.

* * * * *